(12) United States Patent
Rathod

(10) Patent No.: US 8,856,075 B2
(45) Date of Patent: Oct. 7, 2014

(54) SYSTEM AND METHOD OF SHARING IN A PLURALITY OF NETWORKS

(75) Inventor: Yogesh Chunilal Rathod, Maharashtra (IN)

(73) Assignee: OnePatont Software Limited, Mumbai, Maharashira (IN)

( * ) Notice: Subject to any disclaimer, the term of this patent is extended or adjusted under 35 U.S.C. 154(b) by 737 days.

(21) Appl. No.: 12/948,483

(22) Filed: Nov. 17, 2010

(65) Prior Publication Data

US 2011/0125906 A1    May 26, 2011

Related U.S. Application Data

(62) Division of application No. 11/995,343, filed as application No. PCT/IN2006/000260 on Jul. 18, 2006, now Pat. No. 7,991,764.

(30) Foreign Application Priority Data

Jul. 22, 2005  (IN) .......................... 878/MUM/2005

(51) Int. Cl.
    *G06F 17/00*    (2006.01)
    *G06Q 10/00*    (2012.01)
    *G06Q 30/02*    (2012.01)
    *G06F 17/30*    (2006.01)

(52) U.S. Cl.
CPC .......... *G06F 17/30657* (2013.01); *G06Q 10/00* (2013.01); *G06Q 30/0255* (2013.01); *G06Q 30/0251* (2013.01); *G06Q 30/0269* (2013.01); *G06Q 30/0243* (2013.01); *G06Q 30/0249* (2013.01); *G06F 17/30867* (2013.01)
USPC ..... 707/627; 707/769; 705/14.73; 705/14.49; 705/319; 709/203; 709/226; 709/230

(58) Field of Classification Search
CPC ................... G06F 17/30657; G06F 17/30867; G06Q 30/0251; G06Q 30/0255; G06Q 30/0243
USPC .................. 707/706, 733, 769, 609, E17.108, 707/E17.005, E17.014, 627; 709/204, 206, 709/219, 223, 224, 226, 217; 705/14.66, 705/14.42, 14.73, 14.49, 319; 715/747, 751
See application file for complete search history.

(56) References Cited

U.S. PATENT DOCUMENTS

| | | |
|---|---|---|
| 6,009,432 A | 12/1999 | Tarin |
| 6,199,063 B1 | 3/2001 | Colby et al. |
| 6,311,186 B1 | 10/2001 | MeLampy et al. |
| 6,480,885 B1 | 11/2002 | Olivier |
| 6,745,178 B1 | 6/2004 | Emens et al. |
| 6,810,401 B1 | 10/2004 | Thompson et al. |
| 6,871,322 B2 | 3/2005 | Gusler et al. |
| 6,895,412 B1 | 5/2005 | Hutchinson |
| 6,901,394 B2 | 5/2005 | Chauhan et al. |
| 6,938,068 B1 | 8/2005 | Kraft et al. |
| 7,010,518 B1 | 3/2006 | Bedell et al. |
| 7,266,764 B1 | 9/2007 | Flam |
| 7,299,240 B1 | 11/2007 | Crozier |
| 7,325,012 B2 | 1/2008 | Nagy |
| 7,669,123 B2 | 2/2010 | Zuckerberg et al. |
| 7,827,208 B2 | 11/2010 | Bosworth et al. |
| 7,899,915 B2 * | 3/2011 | Reisman ...................... 709/228 |
| 7,921,369 B2 | 4/2011 | Bill |
| 7,991,764 B2 | 8/2011 | Rathod |
| 8,417,729 B2 * | 4/2013 | Baker ........................... 707/794 |
| 8,700,738 B2 * | 4/2014 | Moore et al. .................. 709/219 |
| 2002/0120462 A1 | 8/2002 | Good |
| 2002/0188689 A1 | 12/2002 | Michael |
| 2004/0193691 A1 | 9/2004 | Chang |
| 2005/0044008 A1 | 2/2005 | Freishtat et al. |
| 2005/0086290 A1 | 4/2005 | Joyce et al. |
| 2005/0165656 A1 | 7/2005 | Frederick et al. |
| 2005/0234864 A1 * | 10/2005 | Shapiro ............................ 707/1 |
| 2005/0283474 A1 | 12/2005 | Francis et al. |
| 2005/0286546 A1 * | 12/2005 | Bassoli et al. ................ 370/432 |
| 2006/0218225 A1 * | 9/2006 | Hee Voon et al. ............ 709/201 |
| 2006/0271997 A1 | 11/2006 | Jacoby et al. |
| 2007/0174244 A1 | 7/2007 | Jones |
| 2007/0174258 A1 | 7/2007 | Jones et al. |
| 2007/0174273 A1 | 7/2007 | Jones et al. |
| 2007/0179792 A1 | 8/2007 | Kramer |
| 2007/0185843 A1 | 8/2007 | Jones et al. |

| | | | |
|---|---|---|---|
| 2007/0260520 A1* | 11/2007 | Jha et al. | 705/14 |
| 2008/0016218 A1 | 1/2008 | Jones et al. | |
| 2008/0021755 A1 | 1/2008 | Jones et al. | |
| 2008/0021884 A1 | 1/2008 | Jones et al. | |
| 2008/0021885 A1 | 1/2008 | Jones | |
| 2008/0033791 A1 | 2/2008 | Jones et al. | |
| 2008/0033917 A1 | 2/2008 | Jones et al. | |
| 2008/0033959 A1 | 2/2008 | Jones | |
| 2008/0033970 A1 | 2/2008 | Jones et al. | |
| 2008/0040474 A1 | 2/2008 | Zuckerberg et al. | |
| 2008/0051064 A1 | 2/2008 | Jones et al. | |
| 2008/0228537 A1 | 9/2008 | Monfried | |
| 2008/0270389 A1 | 10/2008 | Jones et al. | |
| 2009/0006333 A1 | 1/2009 | Jones et al. | |
| 2009/0010004 A1 | 1/2009 | Godo | |
| 2009/0070219 A1 | 3/2009 | D'Angelo et al. | |
| 2009/0100032 A1 | 4/2009 | Jones et al. | |
| 2009/0119167 A1 | 5/2009 | Kendall et al. | |
| 2009/0119263 A1 | 5/2009 | Jones et al. | |
| 2009/0119264 A1 | 5/2009 | Bostic et al. | |
| 2009/0132500 A1 | 5/2009 | Jones et al. | |
| 2009/0157523 A1 | 6/2009 | Jones et al. | |
| 2009/0172773 A1* | 7/2009 | Moore | 726/1 |
| 2009/0182589 A1 | 7/2009 | Kendall et al. | |
| 2009/0228464 A1 | 9/2009 | Jones et al. | |
| 2010/0010822 A1 | 1/2010 | Bal et al. | |
| 2010/0030734 A1 | 2/2010 | Chunilal | |
| 2010/0114965 A1* | 5/2010 | Dean et al. | 707/784 |
| 2010/0146054 A1 | 6/2010 | Armstrong et al. | |
| 2010/0146443 A1 | 6/2010 | Zuckerberg et al. | |
| 2010/0318571 A1 | 12/2010 | Pearlman et al. | |
| 2011/0004692 A1 | 1/2011 | Occhino et al. | |
| 2011/0004831 A1 | 1/2011 | Steinberg et al. | |
| 2011/0029612 A1 | 2/2011 | Bosworth et al. | |
| 2011/0078018 A1 | 3/2011 | Chunilal | |
| 2011/0078128 A1 | 3/2011 | Chunilal | |
| 2011/0078129 A1 | 3/2011 | Chunilal | |
| 2011/0078583 A1 | 3/2011 | Chunilal | |
| 2011/0082881 A1 | 4/2011 | Chunilal | |
| 2011/0113094 A1 | 5/2011 | Chunilal | |
| 2011/0145279 A1 | 6/2011 | Chunilal | |
| 2011/0153413 A1 | 6/2011 | Chunilal | |
| 2011/0153759 A1 | 6/2011 | Rathod | |
| 2011/0154220 A1 | 6/2011 | Chunilal | |
| 2011/0161314 A1 | 6/2011 | Chunilal | |
| 2011/0161319 A1 | 6/2011 | Chunilal | |
| 2011/0161419 A1 | 6/2011 | Chunilal | |
| 2011/0162038 A1 | 6/2011 | Chunilal | |
| 2011/0179118 A1* | 7/2011 | Dean et al. | 709/204 |
| 2011/0191417 A1 | 8/2011 | Rathod | |
| 2011/0208822 A1 | 8/2011 | Rathod | |
| 2011/0225293 A1 | 9/2011 | Rathod | |
| 2011/0231363 A1 | 9/2011 | Rathod | |
| 2011/0231489 A1 | 9/2011 | Rathod | |
| 2012/0233259 A1* | 9/2012 | Work | 709/204 |
| 2012/0290659 A1* | 11/2012 | Rao et al. | 709/204 |
| 2012/0296974 A1* | 11/2012 | Tabe | 709/204 |

FOREIGN PATENT DOCUMENTS

| | | |
|---|---|---|
| WO | WO 2006/059343 A2 | 6/2006 |
| WO | WO 2008/134279 A1 | 11/2008 |
| WO | WO 2010/001406 A1 | 1/2010 |

OTHER PUBLICATIONS

Ellen Spertus, Mehran Sahami, and Orkut Buyukkokten—"Evaluating similarity measures: a large-scale study in the orkut social network"—Proceeding KDD '05 Proceedings of the eleventh ACM SIGKDD international conference on Knowledge discovery in data mining—pp. 678-684.*

Eagle, N. and Pentland, A.—"Social serendipity: mobilizing social software"—Published in: Pervasive Computing, IEEE (vol. 4 , Issue: 2 ); Date of Publication: Jan.-Mar. 2005; pp. 28-34.*

Applicant-Initiated Interview Summary for U.S. Appl. No. 12/193,702 (Oct. 20, 2011).

Applicant-Initiated Interview Summary for U.S. Appl. No. 12/195,321 (Oct. 19, 2011).

Non-Final Official Action for U.S. Appl. No. 12/195,321 (Sep. 22, 2011).

Request for Ex Parte Reexamination under 37 C.F.R. § 1.510 for U.S. Patent No. 7,991,764 (Sep. 6, 2011).

Non-Final Official Action for U.S. Appl. No. 12/193,702 (Jul. 25, 2011).

Notice of Allowance and Fee(s) Due for U.S. Appl. No. 12/853,108 (Jun. 23, 2011).

Notice of Allowance and Fee(s) Due for U.S. Appl. No. 12/948,495 (Jun. 22, 2011).

Belkin et al., "Linked: Network Updates Uncovered," http://qconsf.com/dl/qcon-sanfran-2009/slides/RuslanBelkin_and_SeanDawson_LinkedInNetworkUpdatesUncovered.pdf, pp. 1-42 (Downloaded from the Internet May 11, 2011).

O'Neill, "The Complete Guide to Twitter," http://manuals.makeuseof.com.s3.amazonaws.com/twitter-guide.pdf, pp. 1-53 (Downloaded from the Internet May 11, 2011).

Screenshot of Meme from Yahoo, http://meme.yahoo.com/home/, p. 1 (Downloaded from the Internet May 11, 2011).

Screenshot of Twitter About Screen, http://twitter.com/about/, p. 1 (Downloaded from the Internet May 11, 2011).

"Twitter," http://en.wikipedia.org/wiki/Twitter, pp. 1-23 (Downloaded from the Internet May 11, 2011).

"What's with Web Activities," http://windowslive.ninemsn.com.au/livesuite/article/792840/whats-with-web-activities, pp. 1-21 (Downloaded from the Internet May 11, 2011).

"Windows Live team blog archive," http://windowslivearchive.wordpress.com/2008/12/22/sharing-what-you-do-outside-of-windows-live-web-activities/, pp. 1-5 (Downloaded from the Internet May 11, 2011).

Commonly-assigned, co-pending U.S. Appl. No. 13/104,524 for "A System and Method for Dynamically Monitoring, Recording, Processing, Attaching Dynamic, Contextual and Accessible Active Links and Presenting of Physical or Digital Activities, Actions, Locations, Logs, Life Stream, Behavior and Status," (Unpublished, filed May 10, 2011).

Commonly-assigned, co-pending U.S. Appl. No. 12/853,108 for "A System and Method of Peer to Peer Searching, Sharing, Social Networking and Communication in One or More Networks," (Unpublished, filed Aug. 20, 2011).

Indian Patent Application No. 1174/MUM/2011 for "A System and Method for O-Mail or Omnipresent Communication, O-Mail Address, O-Mail Service, O-Mail Client, O-Mail Server, Network, Platform and Pin Point Communication Protocol (PPP)," (Unpublished, Filed Apr. 8, 2011).

Notice of Allowance and Fee(s) Due for U.S. Appl. No. 11/995,343 (Mar. 30, 2011).

PCT International Application No. PCT/IB2011/051319 for "A Method and System for Customized, Contextual, Dynamic and Unified Communication, Zero Click Advertisement, Dynamic E-Commerce and Prospective Customers Search Engine," (Unpublished, Filed Mar. 29, 2011).

PCT International Application No. PCT/IB2011/051318 for "A Method and System for Dynamically Publishing, Sharing, Communication and Subscribing," (Unpublished, Filed Mar. 29, 2011).

Restriction and/or Election Requirement for U.S. Appl. No. 12/853,108 (Mar. 25, 2011).

Indian Patent Application No. 868/MUM/2011 for "A System and Method for Managing, Monitoring, Tracking, Updating, Measuring and Facilitate in Maintaining User Status and State," (Unpublished, Filed Mar. 24, 2011).

Commonly-assigned, co-pending U.S. Appl. No. 13/045,490 for "A System and Method for Managing Dynamically Created Groups," (Unpublished, filed Mar. 10, 2011).

Commonly-assigned, co-pending U.S. Appl. No. 13/045,489 for "A System and Method for Communication, Publishing, Searchign and Sharing," (Unpublished, filed Mar. 10, 2011).

Interview Summary for U.S. Appl. No. 11/995,343 (Feb. 25, 2011).

Screenshot of Experts Exchange Main Screen, http://www.experts-exchange.com/aboutUs.jsp, p. 1 (Downloaded from the Internet Feb. 23, 2011).

International Preliminary Report on Patentability and Written Opinion of the International Searching Authority for International Application No. PCT/IN2008/000425 (Jan. 5, 2011).
"Flickr: Recent Activity," http://www.flickr.com/photos/caseorganic/4816582827/, p. 1 (Copyright 2011).
"Network Updates," LinkedIn, http://www.linkedin.com/mbox?displayNetworkUpdates, p. 1 (Copyright 2011).
"Post Network Update," LinkedIn, http://developer.linkedin.com/docs/DOC-1009, pp. 1-2 (Copyright 2011).
"The Recent Activity Box," YouTube, http://www.google.com/support/youtube/bin/answer.py?hl=en&answer=118693, pp. 1-2 (Copyright 2011).
"Windows Live: Services," http://profile.live.com/webactivities, pp. 1-2 (Copyright 2011).
Commonly-assigned, co-pending U.S. Appl. No. 13/001,785 for "A System and Method for Social Networking for Managing Multidimensional Life Stream Related Active Note(s) and Associated Multidemisional Active Resources and Actions," (Unpublished, filed Dec. 28, 2010).
Communication pursuant to Article 94(3) EPC for European Application No. 06 842 707.9 (Dec. 7, 2010).
Non-Final Official Action for U.S. Appl. No. 11/995,343 (Nov. 16, 2010).
Hearing Submissions for Indian Patent Application No. 878/MUM/2005 (Sep. 27, 2010).
Hearing Submissions for Indian Patent Application No. 878/MUM/2005 (Apr. 9, 2010).
PCT International Application No. PCT/IN2010/000122 for "A System and Method for Social Networking for Managing Multidimensional Life Stream Related Active Note(s) and Associated Multidimensional Active Resources and Actions," (Unpublished, Filed Mar. 3, 2010).
Indian Patent Application No. 467/MUM/2010 for "A System and Method for Social Networking for Managing Multidimensional Life Stream Related Active Note(s) and Associated Multidimensional Active Resources and Actions," (Unpublished, Filed Feb. 22, 2010).
Hearing Letter for Indian Patent Application No. 878/MUM/2005 (Feb. 1, 2010).
"Google Buzz: See updates in real time," http://www.google.com/buzz, p. 1 (Copyright 2010).
Reply to First Examination Report for Indian Patent Application No. 878/MUM/2005 (Dec. 15, 2009).
International Search Report for International Application No. PCT/IN2008/000425 (Jul. 6, 2009).
First Examination Report for Indian Patent Application No. 878/MUM/2005 (Feb. 17, 2009).
International Preliminary Report on Patentability and Written Opinion of the International Searching Authority for International Application No. PCT/IN2006/000260 (Jan. 22, 2008).
"Notice from the European Patent Office dated Oct. 1, 2007 concerning business methods," Official Journal EPO, pp. 592-593 (Nov. 2007).
Indian Patent Application No. 878/MUM/2005 for "A System for Universal Information and Knowledge Transmission, Reception, Searching and Management Using Human Capabilites Powered by Universal Computing Grid for Enhanced Social Networking and Instituting Knowledge Dissemination Infrastructure," (Jul. 6, 2006).
"NetAlter Service Browser: An Interface that connects to a truly service oriented architecture based framework; enabling on-demand web services and rich/thin/smart client applications over the NetAlter network, harnessing the power of its GRID," NetAlter Service Browser White Paper, NetAlter Software Limited, pp. 1-32 (May 2006).
"Peer-to-Peer Personal Network Implementation in NetAlter: Peer-to-peer computing gets a new meaning as it forms the core structure of the NetAlter framework in bringing about new innovations," NetAlter Peer2Peer White Paper, NetAlter Software Limited, pp. 1-21 (May 2006).
"MySpace Developer Team News and Announcement," http://developer.myspace.com/Community/blogs/devteam/archive/2008/04/02/friend-updates.aspx, pp. 1-3 (Copyright 2003-2009).
Malone et al., "Intelligent Information-Sharing Systems," Communications of the ACM, vol. 30, No. 5, pp. 390-402 (May 1987).

* cited by examiner

*Primary Examiner* — Anh Ly
(74) *Attorney, Agent, or Firm* — Potter Anderson & Corroon LLP

(57) ABSTRACT

A system for transmission, reception and accumulation of the knowledge packets to plurality of channel nodes in the network operating distributedly in a peer to peer environment via installable one or more role active Human Operating System (HOS) applications in a digital devise of each of channel node, a network controller registering and providing desired HOS applications and multiple developers developing advance communication and knowledge management applications and each of subscribers exploiting the said network resources by leveraging and augmenting taxonomically and ontologically classified knowledge classes expressed via plurality search macros and UKID structures facilitating said expert human agents for knowledge invocation and support services and service providers providing information services in the preidentified taxonomical classes, wherein each of channel nodes communicating with the unknown via domain specific supernodes each facilitating social networking and relationships development leading to human grid which is searchable via Universal Desktop Search by black box search module.

33 Claims, 76 Drawing Sheets

FIG. 19

HSNM & HSNE (HSNS-Subscriber Active) [Journal]

Journal - HumanServiceNet (Subscriber-Amitabh)

Journal Search — 20A

| Date | HSN URL | Source | Service | From | Box | Utilities | Status | Message/Details/Desc. | Attachments | Workspace & Taxonomy | Size | More |
|---|---|---|---|---|---|---|---|---|---|---|---|---|
| 20/06/2005 | HSNS.Amit... | Subscriber | Travel | Amitabh | SentBox | HSN IM | Active | I need travel Info. for Los Vegas? | | Trave.USA.LV. | 5kb. | Details |
| 21/01/2005 | HSNATA.LV... | AI Agent | Travel | LVT_AIA | InBox | HSN IM | Active | 76 Los Vegas Travel Experiance... | LV_AIA.ZIP | Trave.USA.LV. | 760kb. | Details |
| 21/01/2005 | HSNB.SP... | Broker | Travel | Sam Page | InBox | HSN IM | Active | Best HA match Link. | Details.ZIP | Trave.USA.LV. | 876kb. | Details |
| 21/01/2005 | HSNS.CO... | Subscriber | Travel | Cameron (PN) | InBox | HSN IM | Active | Resource attachments... | LVT_RES.ZIP | Trave.USA.LV. | 760kb. | Details |
| 22/01/2005 | HSN.HA.YR... | Human Agent | Travel | Yogesh Rathod | InBox | HSN IM | Active | I send detail travel resources... | LVT_RES.ZIP | Trave.USA.LV. | 400kb. | Details |
| 22/01/2005 | HSNSAmit... | Subscriber | Travel | Amitabh | Draft | HSN IM | Active | Hotel Booking Request... | LVH_Tour.ZIP | Trave.USA.LV. | 20kb. | Details |

— 20B

To: Yogesh Rathod (Human Agent- Travel)
Subject: Hotel Booking Request

I want to book in Hotel Las Vegas
Please give Payment Details, Hotel Details, Contact Details
Thanking You,
Mr. Amitabh
— 20C HSN Message- Journal (Total 5 entries)

HSNM & HSNE (HSNHA-Human Agent Active) [Journal]

Journal - HumanServiceNet (Human Agent-Yogesh Rathod)

Journal Search ──→ 23A

| Date | HSN URL | Source | Service | From | Box | Utilities | Status | Message/Details/Desc. | Attachments | Worksque & Taxonomy | Size | More |
|---|---|---|---|---|---|---|---|---|---|---|---|---|
| 20/06/2005 | HSN.S.Amit.. | Subscriber | Trave | Amitabh | InBox | HSN IM | Active | I need travel Info. for Las Vegas? | - | Trave.USA.LV. | 5kb. | Details |
| 21/01/2005 | HSN.AIA.LV.. | AI Agent | Trave | LVT_AIA | InBox | HSN IM | Active | 76 Las Vegas Travel Information.. | LV_AIA.ZIP | Trave.USA.LV. | 760kb. | Details |
| 21/01/2005 | HSN.AIA.LV.. | AI Agent | Trave | LVT_Gov_AIA | InBox | HSN IM | Active | Complete Las Vegas Travel Info.... | LVgovAIA.ZIP | Trave.USA.LV. | 876kb. | Details |
| 22/01/2005 | HSN.HA.YR | Human Agent | Trave | Kirsten (HC) | InBox | HSN IM | Active | Resource attachments.. | LVT_RES.ZIP | Trave.USA.LV. | 760kb. | Details |
| 22/01/2005 | HSN.HA.YR | Human Agent | Trave | Yogesh Rathod | SentBox | HSN IM | Active | send detail travel resources.. | LVT_RES.ZIP | Trave.USA.LV. | 400kb. | Details |
| 22/01/2005 | HSN.HA.YR | Human Agent | Trave | Yogesh Rathod | Draft | HSN IM | Active | Hotel Booking Request.. | LVH_Tour.ZIP | Trave.USA.LV. | 20kb. | Details |

── 23B

To: Amitabh (Subscriber)

Subject: Hotel Booking

Thanks for booking in Hotel Las Vegas
Payment Details: 1 day- night only 1760$
Hotel Details: Attachments <u>LVH_Tour.Zip.</u>
Contact Details:
   Hotel Las Vegas
   1234, Las Vegas Tower
   Las Vegas
Thanking You,
   Mrs. Jennifer

23C ──→

HSN Message- Journal (Total 5 entries)

HSNM & HSNE (HSNHA-Human Agent Active) [Wizards]

28A
Human Service Net (Yogesh Rathod-Human Agent)
(HSNS- HumanServiceNet Subscriber)
(1) Browse HSNS (2) Search-Match-Bookmark HSNS (3) Check Request (4) Send Matched Content
(5) Send Package Keys Browse Subscribers:
- Yogesh Rathod
- Rajesh Rathod
- Vijay Rathod
- Dr. Kirsten
- Julia Robert
- Morgan Jennifer Buttons: Search | Match | Bookmark | Check Request | Send Matched Content via Organizer | Send Package Keys

[Back] [Next] [Cancel]

28B
Human Service Net (Yogesh Rathod-Human Agent)
(HSNB- HumanServiceNet Broker)
(1) Check Service Details (2) Make Payments (3) Get Package keys (4) Subscribe Select Brokers:
- Kirsten
- Marlon Morgan
- Julia Garner Buttons: Search | Match | Filter | Service Details | Make Payments | Request Package keys | Subscribe Services Select Services:
- Travel
- Hotels Choose Brokers Services:
- Travel
- Hotels

[Back] [Next] [Cancel]

HumanServiceNet AI Agents communication with AI Agents, Service Providers, Brokers, Brokers, Human Agents and Subscribers

Service Package Keys Management

Create Package for 1 or more services
1) HSN (Services & Subscription for HSN Online Portal, Messenger and E-Mail service),
2) HSND (AI Agent & Apps on subscription basis),
3) HSNSP (Services (KIS), RES, SMS & AIS)
4) HSNHA (Services (KIS), KSS, RES, SMS & AIS)
5) HSNB (Services)
[e.g. Package ID=1, Package Name=Combo]

↓

Configure or customize 1 or more services of 1 or more packages
1) Give Service Name,
2) Set Duration,
3) Set No of Answers or messages or Hits,
4) Set Fix Price for services or on demand variable price or set & negotiate price or free or sponsored or trial
5) Other package Details (mark as Group Service of many related Services via service collaboration)
[e.g. Package ID=1, Service Name= Travel Service, Duration= 6 Months or 180 Days, No of Answers=20, Price= Free, Service Owner= <HSN URL>]

*Prepaid & Postpaid Package keys (e.g. HSN Ad, Campaign package keys)
* Products (software as service and Online softwares) subscription package keys
*Trial Package keys
*Combo Package keys (1 or more services from1 or more sources)
*Ruled enabled services Package keys
*KSS Package keys customized as per requirements (No. of use hours, per page scanning, No. of relevant results, expertise fields and levels, sales and turnover, profits, duration, amount or quantity of data handling (per MB), fixed or negotiation etc. for routing, scanning; analysis, filtering, searching, matching, mapping, categorizing, bookmarking of contents & sources, communication, advertising and e-commerce services (follow-up, ordering, billing, payments i.e. pre trade, trade & post trade), review, analysis and categories surveys and submit surveys results etc..

↓

Generate Package Keys as per requirements [e.g. Package ID=1, Package key= abcd -efgh-ijkl-mnop]

↓

Send 1 or more Package Keys via 1 or more Communication Channel (e.g. Phone, E-Mail, Fax, Mail, Integrated utility, Online etc...) as per request and customization requirements after confirming payments for package keys.

↓

Record or track 1 or more services usage related to 1 or more packages of 1 or more users [e.g. Product Users No =100, Service Name= Travel Service, No of Answers or Hits= 10, Duration= 2 Months or 60 Days, Created= <Date>, Package ID= <List>, Renew Date= <Date>

↓

Renew and upgrade 1 or more Package Keys as per request and requirements.

↓

Re-send 1 or more Package Keys in case of loss and theft.

FIG. 49

Product Keys Management

Generate default Product Keys for 1 or more installed Products,
1) HSN (HOS) (HSNM, HSNE, HSNEM, Default AI Agents, Attached Applications, Utilities, Add-Ons and Plug-In for 3rd party applications).
2) HSND (Field or utility specific AI Agents, Communication Utilities and Applications),

[e.g. ID =1, Software Name= HSNM, Product Key= 1234-5678-1234-5678, Product Version=2.0, Edition= Enterprise, Host Name= HSNServer, Max Users=1, Multi Language= English, Attached Utilities= <List>, Storage Systems= Multi System, Registered= N] etc...

↓

Configure and customize Product Keys for 1 or more installed Products,
1) HSN (HSNM, HSNE, HSNEM, Default AI Agents, Attached Applications, Utilities, Add-Ons and Plug-in for 3rd party applications).
2) HSND (Field or utility specific AI Agents, Communication Utilities and Applications),

[e.g. ID=1, Software Name= HSNM, Product Key = 1234-5678-1234-5678, Product Version= 2.0, Edition= Enterprise, Host Name= HSNServer, Max Users= 5, Multi Language= English, Gujarati, Attached Utilities= <List>, Storage Systems=Multi System, Registered= Y ] etc...

↓ send 1 or more Product Keys via 1 or more Communication Channel (e.g. Phone, E-Mail, Fax, Mail, Integrated utility, Online etc...) as per request and customization requirements after confirming payments for package keys.

↓

Record or track and registered 1 or more product users 1 or more product keys

[e.g. ID= 1, Product User No= 12345, Software Name= HSNM, Product Key= 1234-5678-1234-5678, HDID= <Unique Hard Disk ID> Product Version= 2.0, Edition= Enterprise, Installation Date = <Date>, Negotiate= Y, UID= pqrst, Password= wwwyyy, Host Name= HSNServer, Max Users= 5, Multi Language= English, Gujarati, Attached Utilities= <List>, Storage Systems= Multi System, Registered= Y] etc...

↓

Upgrade 1 or more Product Keys as per request and requirements.

↓

Negotiate and Re-send 1 or more Product Keys in case of loss and theft.

*FIG. 50*

HSN Human Agents' Human Services via Web Services (HSNWS)

AnySearchEngine.Com
—57A

Membership   Log-In ( Online Shopping )  ( My Web )  ( Email )  ( Download )

Search: [Travel in Las Vegas]   [Search]  Advance Search
57B — ○HumanServiceNet(HSN) ○AnySearchEngine ⦿Both   Preferences
HSN Address: [HumanServiceNet.Travel.USA.HotelLasVegas.HumanAgent.YogeshRathod.HotelService]  [Go/Connect!]
57C — [Taxonomy] [+] [Domain ▼] [Human Agents ▼] [Human AgentName ▼] [Service Name ▼]

57D —— Results 1-5 of 76 for Travel in Las Vegas 30 from HumanServiceNet (HSN), 20 from AnyServiceEngine

[1] Human Agent (Yogesh Oboral): Travel Service- Details- Subscribed- Package- Payment
HumanServiceNet.Travel.USA.HotelLasVegas.HumanAgent.YogeshRathod.TravelService   57E

[2] Human Agent (Yogesh Oboral): Guide Service- Details- Subscribed- Package- Payment
HumanServiceNet.Travel.USA.HotelLasVegas.HumanAgent.YogeshRathod.GuideService

[3] Human Service Net (Repository): 100 Las Vegas Resources- Details- Subscribed- Package- Payment
HumanServiceNet.Travel.USA.LasVegas

[4] Las Vegas City Information
www.LasVegasCity.com- 100k- 20 Jul 2005

[5] Travel in Las Vegas: Complete Las Vegas Travel Information
www.LasVegas.com- 100k- 20 Jul 2005

Result Page:  1 2 3 4 5 6 7 8 9 10  Next
57F

*FIG. 57*

Human Grid and Computing Grid - Unutilized & Untapped Human & Computing Resources Utilization

| Row | Col 1 | Col 2 | Col 3 | Col 4 | Col 5 | Label |
|---|---|---|---|---|---|---|
| Universal Human Operating System—58A | | | | | | 58K—Universal Human ID |
| Universal Human Service Framework—58B | Money | Logic | Experience | Guess | Suggestion | 58L—Universal Human Knowledge Transfer |
| Universal Human Relationship Management—58C | | Property | Knowledge | Resources | | 58M—Universal Human Resources Repository |
| Universal Innovation Networking—58D | Physical | | Skills | | Guidance | 58N—Universal Human Linking & Network |
| Universal Clustered Virtual Brain—58E | | 58V— | | | | 58O—Universal Human Taxonomy Classification |
| Universal Social Networking—58F | | 58W— Human Grid | | | | 58P—Universal Human Resource Planning |
| Universal Knowledge Management—58G | End User | | Processing | | Capability | 58Q—Universal Human to Human Communication |
| Universal Digital Divide Solver—58H | | Understanding | Learning | Dependent | | 58R—Universal Human Collaboration |
| Universal Human Search Engine—58I | Wants | | Variety | | Intelligence | 58S—Universal Human Grid Utilization |
| Universal Human Match Maker—58J | Dynamic | | Living | | | 58T—Universal Human society |

58U—Universal Human and Machine Collaboration via Human (Services) Grid and Information & Computing Grid

FIG. 58

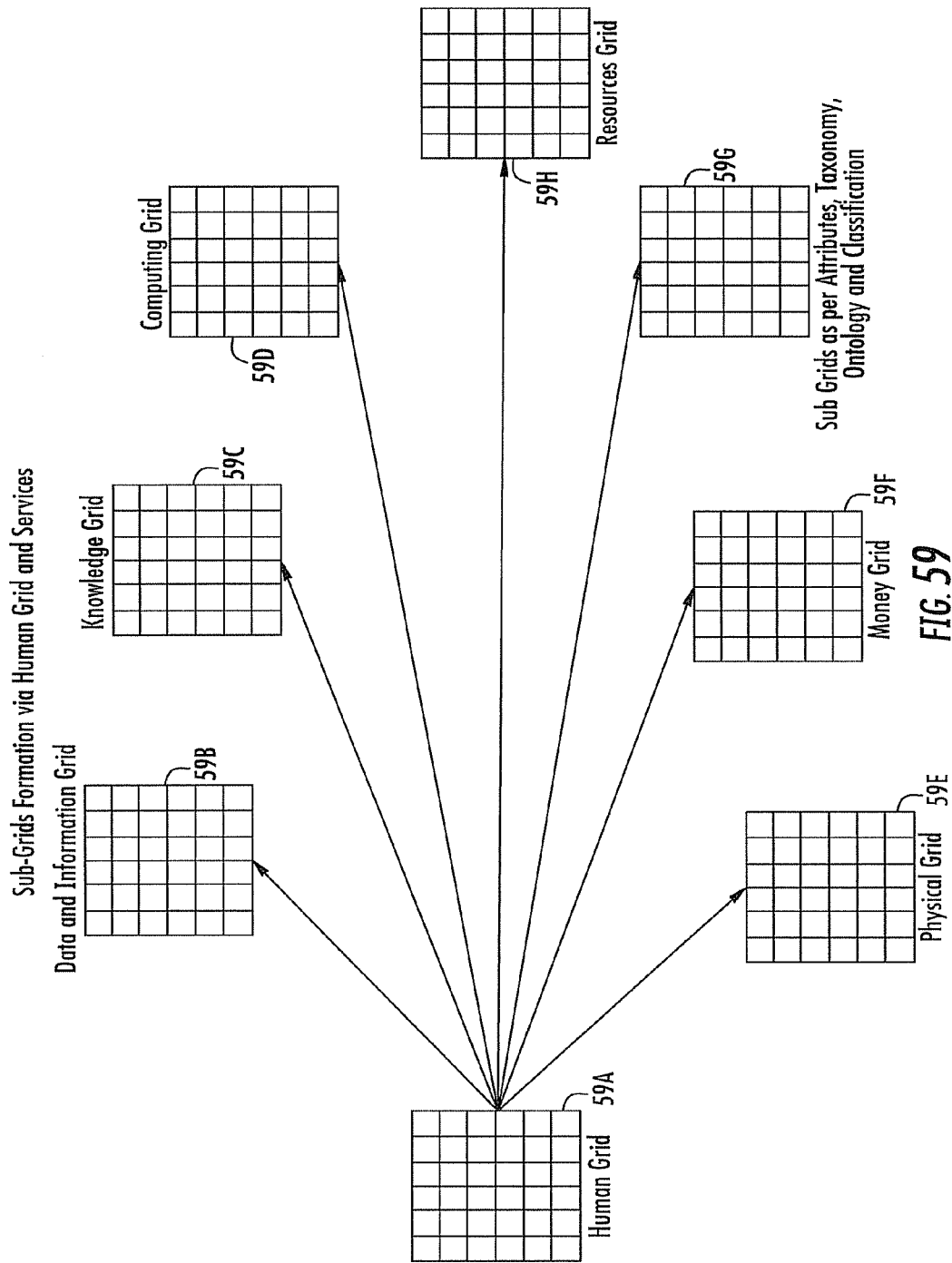

SYSTEM AND METHOD OF SHARING IN A PLURALITY OF NETWORKS

PRIORITY CLAIM

This application is a divisional of U.S. patent application Ser. No. 11/995,343, now U.S. Pat. No. 7,991,764 B2, filed Jan. 11, 2008, which is a 371 application of PCT International Application No. PCT/IN2006/000260 filed Jul. 18, 2006, which claims the benefit of Indian Patent Application No. 878/MUM/2005 filed Jul. 22, 2005; the disclosures of which are incorporated herein by reference in their entireties.

COPYRIGHTS INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention relates to constitution and configuration of peer to peer distributed universal knowledge management framework for information and knowledge transmission, communication and enhanced searching including human knowledge searching, human mediated information searching, universal desktop searching, universal knowledge and information database searching, survey based searching, search macros system and advertising system therefor, specifically relates to devising of semantically linked system, interfacing human knowledge storage and handling system with computational knowledge storage and handling system for effective knowledge invocation and derived social networking thereby.

BACKGROUND OF THE INVENTION

The rapid growth in information technology and the emergence of the Internet and World Wide Web over the last several years have changed the ways and means of communication in broader aspect. At present there are world over around 815 million internet users enjoying services of internet framework and increasing at the rate of 125% a year.

The Internet was designed to hold smaller networks together, turning then into one big network. The major limitations with internet framework is disability at user end to cross check the accuracy, currency, authority, reliability, objectivity and truthfulness of its contents. Further virus and spamming attacks to the connected network users put users at risk making internet itself a hazardous product being offered to users violating all laws with customers' been privileged with. Likewise, IPR being meant for protection tool to inventor, via internet IP that worth billions of dollars is infringed in terms of copyright infringement.

This enormous growth of internet till date has generated around 60 to 100 billion of publicly available web pages all over the world to search for and simultaneously another estimated 20 billion intranet pages to that matter. Using this mean of internet framework huge amount of information is being thrown on the servers in roughly unorganized manner.

Plurality of search engines have been designed to Similarly to track and find out desired information hosted at plurality of internet servers wherein Google do manage to index at the most around 8.0 billion web pages which means 60% of web contents are not searchable by this means.

Unfortunately, end users are often overwhelmed. They spend most of their time searching, navigating & sorting through the data, spending less time interpreting, and even less time actually doing something about what they find.

The human being today is living in direct and indirect civilizations simultaneously in a concurrent mode. Every civilization is believed to function with certain determined patterns of norms and conditions. The era we are living in has come up the ages wherein we are following certain fixed learning and evolving approach through our societal, institutional, moral and beliefs based framework. The learning being the specialized component of evolution of human being, all aspects of human efforts are concentrated towards acquiring knowledge, experiencing, development, and such other brain training assignments. The significant aspect of human behavioral trait towards these learning and evolution practices is we are dealing with our learning interface essentially in close proximity to ourselves, though telecommunication and remote access has revolutionized our lives.

After widely using web as a source for information, businesses, knowledge workers and web user in general are demanding greater deal of intelligent utilities to fulfill their knowledge requirement. Web being a information platform facilitating a 'information highway' where huge number of data and information stalls on the said high way are continuously storing their contents and users surfing on the said highway browsing that contents. Search engine proving a boon to surf on the said high way to find out relevant information, wherein unfortunately knowledge access is far from reality. Various e-Learning modules developed so far are trying to satisfy this demand in much personalized manner, alternatively, knowledge searching itself asks for three core requirements 1. Knowledge resources,
2. Intelligent searching tool, and
3. Economic model for knowledge dissemination.

The syntax and structures have formed basic building blocks of the said information highway, remarkably missed out with context and semantics of the information hence lacking intelligence to an interpretative level. Thus currently searching via various search engines are carried out on the said information highway on the similar structured format, leading to provide unresponsive, irrelevant results rather than something very contextual and relevant. Many such techniques follow comparative use trends, to formulate relevance level. Alternatively other search techniques rely on categorization of web sites to further focus the search results to areas anticipated to be most relevant. These are all index driven approach rather than context driven, hence lesser intelligent.

On the other hand knowledge is by and large is pretty dynamic entity wherein one cannot present knowledge with the rigid boundaries. Human communication in general exploits this very virtue of our brain to express things in the plurality of contextual engagements. While identifying it in the network environment the data should have semantic identifiers to be understood by the machine, this forms important consideration for the evolution of 'semantic web', a project that intends to create a universal medium for information exchange by giving meaning, in a manner understandable by machines, to the content of documents on the Web forming an extension of the current Web, in which we add support for databases in machine-readable form. The current Web supports documents, pages of text and figures designed for humans. The Semantic web aimed to add support for databases, vast collections of information neatly organized to be processed by machines. Searching proposed to be similar fashioned but having more machine understandable contexts and semantics written in structured language for machines. By no means is the semantic web aimed to build thinking, feeling Artificial Intelligence, but merely to collect data in a useful way, like a large database.

Thus interacting with uncontrolled information and communication media of Internet refers to indirect civilization, wherein we are having two lives to live with, a true-life and a fictitious one, Internet information doesn't reflects the relations and contents available in true life, though it provides unlimited unstructured communication opportunities. Trading is also a human centric process; hence it signifies the human involvement in the e-commerce activities, which is presently highly machine based process, we need human interpretation to arrive at a judgmental state of mind, as one of the intriguing aspect of knowledge gaining is it needs fresh resources to check, recheck and crosscheck available information to fulfill and satisfy brain demand so as to convert the said information into dependable knowledge.

However human psychology towards receiving something from somewhere depends on his trust in the source of knowledge. Globally knowledge is distributed in plurality of human brains, which need to be preidentified to prosper trust towards knowledge seeking behavior of human being. Currently knowledge management systems which are under public use are mainly addressing broader issues and are subject focused in nature, one such example is of www.expertsexchange.com, which is a knowledge portal mainly provides answers for computer science related questions only that too from unidentified experts, wherein knowledge seeker and expert does not undergo a active dialog, which ultimately put the questions at the perusal of the said expert thus not ensuring any control over timely delivery of answers. Thus one way communication pattern seems to be not very systematic and intelligent enough to guide knowledge seeker to relevant expert.

Similarly existing internet advertisement and eCommerce facilities are trying to communicate with users at pretty superficial level which simply can't appeal to human psychology unless very relevant or which is exactly what a particular user is searching for. The similar eCommerce related advertising contents are exemplified in the patent application no 20050165656 which is teaching enablement of wide scale programmatic interaction of heterogeneous applications and computers by means of prevailing protocols including HHTP, SOAP, WSDL and UDDI via invocation of plurality of web services. Interestingly the said system enabling wide scale management of web services providers and web services consumers, assuring the sales transactions facilitating ecommerce in much transparent way. Though this system works efficiently within its boundaries, on the downside lacks real time human intelligence integration and use of it to facilitate ecommerce, as that's been the usual way the trade works in real life. Still further though centralize web services invocation provide comprehensiveness, consistency, enhanced search features unfortunately has certain inherent shortcomings on the ground of local control, flexibility, fixed file formats and prohibited sharing thereof, huge server and indexes maintenance, dependency on server for all resources. The system does not have any provision for multilateral communication, also real time knowledge invocation is not possible and anybody can not contribute anything from anywhere and as with other systems here too users are made passive, restricting communication with unknown.

Presently available all systems of communication mainly works on the unique identity of users, the same is highly ignored aspect in internet communication, leaving apart knowledge sharing a more sensitive and valued entity, which catapulted into open unstructured information platform which provides open ground for cyber crimes, theft and insecure communication. Understandably enough we discuss, share and communicate our private, sensitive and secrete matters on phone just because we know identity of a person and we believe no body else is tapping in between the wires the same doesn't applies to internet information communication medium.

Hence it presses on paramount requirement of human identity throughout the network to share securely. A unique identity creation underlines imagination of serialized and structured world wherein each identity specific changes are stored, monitored and regulated with systems offering access on the basis of said unique commonly defined parameter. This sounds something over demanding from our social and civilized practices and governmental machinery to devise unique identity. There are various pitfalls which we have come across and badly experienced since the advent of internet including cyber crimes, hacking, viruses spreading, etc, all because of unknown identity and opportunity to be destructive at will without harming oneself.

The secured systems can only foster knowledge availability in the network environment the same not guaranteed today hence point toward important global concern of human knowledge, skills and expertise underutilization. Furthermore all existing infatuation and knowledge dissemination systems are working on a negative business model, wherein the system doesn't provides users with an arrangement to proactively exploit system. In later case, users are considered as a passive entity and can't offer any services to the system thus a user in possession of knowledge; skills and expertise are not used at all.

The wastage of human knowledge requires formation of human grid to exploit the enormous human brain power. Lack of security pointing out identity creation challenge to keep track of knowledge sources, offering local processing, sharing and data management are some of the features not available in existing information and knowledge systems.

Hitherto knowledge induction for individuals, entity and institutions has been organized by means of libraries, scholarly journals, digital libraries, exhibitions, symposiums, conferences, classroom teaching, mentoring etc. All of the above methods of knowledge inductions require communication, wherein communication forming the essential media for such induction. Through advances in information technology, this very need of communication has been tremendously addressed evolving plurality of communication modes including email, chatting, messaging, video conferencing, and online coaching, etc. The preceding modes though providing efficient ways of communication lack system for aggregation of knowledge. It seems that the very premise of knowledge management has been misleading or misinterpreted by industry wherein all prior efforts are concentrated on making system (digital) more intelligent so as to impart knowledge to human being, which is not true as best mode of communication is human to human communication, wherein technology is always going to be facilitating instrument doing some part of human brain rather than one having an exact human like behavior and intelligence, wherein the behavior propound the dynamics of human both mental and physical activities.

Information technology and contemporary related technologies has addressed this issue of human to human communication through plurality of ways including public domain access media i.e. internet providing free information with easy access by means of search engines enabling the selection & filtration of huge information contents on the web comprising Static, out dated (not current), irrelevant, not processed. Unfortunately the precision and relevance level of results of existing engines are not satisfactory though useful with plurality of attempts and efforts therefor. Similarly the ecommerce and marketing feature thereof has been restricted because of multiple practical problems faced by trade and industry requiring authority, genuinity, and physical guarantors towards purchase, no doubt technical implementation has been successful carried out, it is still lacking on the user-friendly extensive ecommerce enabled features and are deemed necessary for next generation cyber trading business.

In the category of private domain access i.e. peer to peer communication has been extensively used and perused system for social, relational & personal networks and other networks including business and enterprise-wise networks still human intelligence aspect of the same is not addressed with similar nature of problem facing the industry with increased contents thereof, catapulting the similar efforts to the knowledge management initiatives. The seamless activity of knowledge sharing is possible only by institution of systems facilitating anything being potentially connected to anything. However although P2P computing systems being able to establish a direct connection with each other that enables the sharing of data and system resources with minimal involvement of centrally managed servers, what is not available therein is relationship dynamism management to accommodate dynamic network connectivity pattern and enhanced decentralize mode of operandi providing significant level of autonomy to users from centralized index or repository. P2P is proving to be a promising to improve communication, collaboration and information sharing. The sharing capability of the same is exemplified by one or more applications like Napster and Gnutella which have made it possible for internet users to actively share MP3 files across the net without the need of a central repository of files. On the similar lines a P2P based knowledge sharing system is still in the nascent stages as one cannot tag knowledge as files.

On the communication front P2P has also made real time communication possible by instant messaging. The enterprise wide enablement efforts has resulted in pretty effective P2P systems such as Groove Network, OpenCola, and Nextpage which are promising range of communication, collaboration, search and file sharing services.

In a debate over centralize versus decentralize system, each one demonstrate its own advantages and disadvantages wherein on one hand as centralize system offers wide scope, control and organization on the other hand decentralize system promising future advantages of ad hoc loosely coupled systems, specialist file sharing, and specialist indexing and deployment. Groove and Napster being ad hoc and loosely coupled systems offered creation of virtual teams, and cross-company B2B projects facilitating multidimensional collaboration assistance which is not possible with centralize system. Searching nodes for information in P2P does not call for file type redundancies as with central server software which is more data focused than actual resources; an extension of similar studies is underway on JXTA P2P Platform.

Collaboration and discovery are important aspects of knowledge management in a P2P environment one such example of it is a Groove Networks developed by Ray Ozzie which offers a Groove platform for development and deployment of collaborative solutions based on peer to peer communications. A platform consists of the Groove client, underpinned by system, development and integration services, enabling group of users to communicate and share information using a set of out of the box tools including instant messaging, live voice, text chat, and file sharing, viewing and editing. Similarly knowledge discovery in P2P environment refers to knowledge searching, an up healing and semantically improved task. On the front of information discovery OpenCola, a Open Collaborative Object Lookup Architecture provides peer to peer model for information discovery having application platform using autonomous, collaborative agents to collect, analyze, and deliver dynamic content wherein users with OpenCola Folders defining areas of interest by selecting relevant documents and Opencola's 'relevance queues' locating other OpenCola peers and looking for the document that match the profile. Relevant documents being returned to the user who can score them for relevance and thus train the Folder about their interests, thus searching on the basis of user profiling is significant advantage of P2P systems. However searching and relevantly matching by means of metadata automatically generated by said system poses serious question on the relevancy factor of the search results, making knowledge discovery a difficult task, though technology is promising in that regard.

Till date all knowledge management projects are mainly concentrated at managing knowledge resources at an enterprise level having limited subjects to deal with having passive environment of client-server methodology to access a knowledge base. However a distributed model working on the P2P platform for active knowledge sharing has yet not evolved.

It is well established in the industry that knowledge sharing is an active process rather than currently followed passive process. For active sharing one needs to hold active communication, underlining the requirement of human intervention in the very process of knowledge discovery thus none of knowledge discovery is complete without human communication. Presently available communication platform like Chat platform forms an effective and interactive mode of communication. The non real time counterpart of the same is discussion groups or Usenet wherein each user joining in discussions, ask questions, help others with questions, make announcements related to the group, or just see what others are talking about. Thus forming reactive forum discussing one or more undefined topics making the discussion matter out of scope of subject matter further adding to the irrelevancy in the process of knowledge discovery.

All communication within a discussion group is carried on by e-mail. A user joins or subscribes to a group and then shares in the discussions of the group. A message sent to the group is usually broadcast via e-mail to all members of the group. So these discussions are public. There is an exception; some groups are moderated and a message sent to the group is first routed to the person serving as moderator. On the downside the lacks of control lead to disastrous ending and unwanted spate in the members of the group wherein 'flame' being the usual phenomenon includes insulting, scolding, berating, or downrighting nasty about the author of the original message, which is far away from any valuable information sharing and doesn't solve any means. Furthermore several Usenet, social, relational and personal network development initiatives have resulted into big failure because of multiple reasons including lack of control, lacks of matching, searching shortcomings, lesser value added contents.

ECommerce because of financial concerns being significantly important faculty of knowledge discovery regarding product sell and purchasing make human involvement mandatory, the same is emulate by various companies by extending existing call centre technology into Internet sales environments. The further improvement of it is realized in terms of customer Relationship Management modeled in online mode as eCRM facilitating availability of product catalogs and FAQs not satisfying customer need up to the mark, few of it facilitates meaningful, direct human interaction through online channel. However online chatting or instant messaging is the most personalized and sophisticated mode of interaction provide effective tool for rich interaction including guiding materials and voice over IP (VOIP) communication, if the all the communicating parties having right equipment to their computer. Still further the existing systems declining the very availability of expert human to transfer knowledge and a system meant for searching and matching the same.

In an attempt to add more intelligence to communication process, in patent application no 20050044008 providing a method for customer needs identification and accordingly forwarding the same to appropriate agent for sales transaction. The customer however, while engaging sessions on the enterprise web site is not an identified entity, thus chances of considering casual customers as a serious prospective customer are more and ultimately leading to increased failure in sales transactions. Identification of customer can provide monitoring ability to well judge the prospective customer profile and the same is missing in the present system. Also the system function is only limited as a supplementary module to ecommerce facilitation. The problem of effective asking & providing knowledge, knowledge community building and collaboration are far away from sight due to centralize structure of the system.

In the U.S. Pat. No. 6,938,068 issued to IBM a knowledge delivery system is devised wherein plurality of experts are categorically and quality wise listed in a centralize database are questioned by one or more question poser and expert answering the question. Though this forms an effective knowledge gaining medium, the communication is only a one way, wherein users can not contribute anything to said system other than question. Further a class of dumb students where only teacher is delivering knowledge and students are only listening to it forms a absolutely ridiculous and wrong learning method, learning is a pretty active process wherein knowledge seeker always desirous of discussing it with the peers, the system lacks such arrangement putting users in an unidentified discrete isolated environment.

Further aspects of knowledge progression are not taken into consideration wherein the system leaves preidentified experts without any assistance to gain, manage their knowledge resources to solve their problems, subsequently resulting in the poor quality of answering as knowledge is a actionable intelligence engrossed in the brain through direct experiences or indirect experiences and needs active interaction for its progression, the present system curtails this very mandatory requirement of the knowledge sharing.

On the economic front the present system follows a typical shopping store customs of customer as a purchaser and service provider as a provider. However knowledge is such an entity which all human bears in one or the other sense, hence everybody should be able to share and sale it, the one who is in possession of it should be able to price it, negotiate it and sell it within his abilities and system having quality control over it.

The present system doesn't insures instant knowledge availability because of its centralize nature, as experts are listed on the centralize web site, a knowledge seeker attempting to pose question may encounter busy status, this expert unavailability problem is identified in an another U.S. Pat. No. 6,871,322 issued to IBM, wherein the posed question queuing method is adopted, which ultimately results in withheld timely delivery of answer to the question poser, thus the very issue of timeliness of answering is not solved.

In an another patent application no 20050086290 a method for expert support and system for customer interaction is provided wherein though this system provides advantage over the prevailing services like "Google answers" (http://answers.google.com/answers/) and yahoo answers (http://answers.yahoo.com/) in terms of instant online interaction with customer mediated through dummy expert called agent being supported in the background by real expert group. Such system may work effectively but would again be forming a class of dumb knowledge seekers, listening to experts and more interestingly lacking freedom of expansion wherein with increase in the subject matters experts group will keep on increasing, it will become for this system to handle the complexities of expert group management as the system itself is of limited scope to support the customer service division of any enterprise, does not simulate the public wide knowledge sharing network. Whereas Google and Yahoo answering systems are typically passive answering systems which are more a entertainment than serious knowledge dissemination where a querying party posing their questions and experts answering the same in certain estimated time, wherein the experts answering the questions are not identified and no provisions are made to provide freedom on part of users to choose the experts or to contribute own expertise into the system as user is also a unidentified entity, further the experts liability towards improper answer is also a debatable issue.

Similarly yet another patent application no 20050283474 aimed at centralize knowledge base creation in preidentified categories thereof wherein the said knowledge base is created through collaborative efforts of distributed contributors who input their questions and answers pairs alongwith its classification into the system by means of look up tables so that the knowledge seekers while extracting knowledge from the system could identify precategorised knowledge by means of similar look up tables. On the flipside, again the said system illustrating only a enterprise level limited knowledge management system having no control over the data inputted into the system. Further the system doesn't encourage human to human communication, hence lacks real time availability of knowledge, wherein the systems ignoring the contextual relations between preidentified categories and keywords also does not take into consideration variability, absolency and dynamics of info information in form of answers stored therein.

Yet another U.S. Pat. No. 6,901,394 issued to AskMe Corporation teaches an enhanced knowledge management system facilitating person to person knowledge sharing via centrally managed knowledge portal exerting load on said system resulting in delay at the user end. Further the communication between knowledge seeker and expert is one way wherein the expert is acting as passive entities, merely listed under a list of experts denying the consultative knowledge sharing wherein such consultant is paid for impartation of particular expertise of knowledge, thus underlying the causal connection of information and knowledge valuation and economics behind it and same is not addressed in the present invention. Further the answering methodology is not controlled hence system cannot guarantee timely answers, and reiteratively as economics behind answering queries is not clearly defined hence keeping users away from competitive quality and pricing.

In an attempt to widen the scope of relevant human to human communication so as to add collaborative intelligence in searching internet resources a U.S. Pat. No. 6,745,178 issued to IBM teaches a method for tracking users of similar interest based on certain rationale of results called answer sets of one or more proprietary search engines. This technique relies on historical user search trends to make basic assumptions as to compare desired information. On the flipside though systems technically seems sound in deriving matching algorithms, the matching parameters itself is a weak candidate to compare, as human integration in a network medium is possible only when the parties communicating are at a currently considered instance are interested in the subject matter or not. Matching the uses on the basis of historic data contents may result in the mismatch as any user may no longer be interested in the subject matter. The human behavioral dynamicity being uncontrolled act is highly ignored fact while devising the present matching methodology wherein said dynamicity of users in terms of likings, behavior and needs may culminate into the system indexing too many things related to each user which may become uncontrollable.

Further context of queries matching based on score difference of respective answer sets facilitating matching seems to be quite dubious approach as prestored answer sets may loose contextual attachment with the queries resulting in error matching score and hence irrelevant user matching.

Still further the answer sets are formed from the plurality of search engines, as each search engine uses different search algorithm result in different search results for similar search strings, hence deriving similarity score based on the one or more different sources of searching following different methodology of semantic interpretation may result in contextual mismatch even though having match score much above threshold level.

The indexed data, answer sets storage and handling of multiple queries at a centralize server accounts for enormous amount of hardware resources, wherein timeliness of such collaborative searching and chatting can not be guaranteed considering the fact that users are looking forward to faster and more relevant search results.

The complexities involved in adding intelligence to human query interpretation and reply by the machine has been addressed through the artificial intelligence enablement of man machine interaction by means of capturing semantic details of the same through specialized tools of taxonomies and semantic ontology. In this effort it works best for data interpretation, the further part of it including the supernatural human ability to understand context and related perspectives can not be addressed beyond doubts.

As human abilities of experiencing, real time answering, both implicit and explicit understanding of matters, problem solving capability, knowledge, guidance, guess, suggestion, logic, interpretation, and related data interpretation is beyond comparison with relationally empowered intelligence of computing machines.

Till date presently available web technologies and other communication media are more or less passive in nature. The concept of blogging providing an effective active medium for knowledge sharing. Still is restrictive and lacks organizer and other management mechanisms to derive most relevant as well as real time knowledge through active dialog.

The internet and peer to peer infrastructure comprises enormous uncommunicated information, making the present digital repositories less knowledgeable. Also as information being a dynamic entity, changes rapidly wherein untraced information in human brain demands certain organizing and managing means. The real time communication with related peers by means of interest wise peer identification has been enabled in various chat and centrally managed limited knowledge management systems. The one such example of peer to peer enablement is KAZZA wherein peers in the distributed network are communicating via file sharing and that of like peer identification is SKYPE wherein like peers are identified and informed to the communicating users online in the a particular chat session. However these existing peer to peer communication systems only communicate and identify information and not knowledge, as knowledge is outstandingly differentiable entity in comparison to information. Thus existence of information and existence of knowledge are two similar possession of brain; they can be very well identified with respect to human expertise. And human sources of expertise need to be preidentified and should be under control based on quality and knowledge dissemination behavior, the same not even suggested in existing systems.

Further the knowlegibility aspect of the these information means is improved upon by means of search engines, unfortunately search engines searches having lesser relevancy, provides improper and incomplete results. Since indexing methods of keyword possibly would be identifying sources which are out of context to the user hence irrelevant. The lack of semantic in existing search engine restricting the present information jungle of web to a mere mine of irrelevant junk information for users. There are various information search engines to find the information are www.google.com, www.yahoo.com, www.baidu.com, www.altavista.com etc. If we look at certain preorganised information databases like www.dialog.com, www.stn.org, which provide search results of higher relevance, it prudent fact that ultimately at the background of it lot of human knowledge expertise is rendered to organize, index, classify and add value to it to get better search solution, thus knowledge organization and dissemination are certainly human centric activity which require technological facilitation for faster, effective and environment specific enability.

Centralize indexing has inherent severe security & management limitations, further universal search is not possible wherein prevailing security concerns does not allow anybody from anywhere anything, the probable solution soughed after for enabling universal search is desktop searching, however centralize model for desktop searching wherein each of desktop by itself is a computing resource does not suit and support universal level adaptation. Rather use of the desktop for indexing self data and making them available for searching sounds to be workable concept.

Security of users' data and information in the network is of paramount importance when operating in an organized networked environment for successful implementation thereof, hence while indexing user's computer contents the usability control must rest with the user himself/herself. In this context permission based sharing is not practiced in the presently available desktop search engines.

The general approach followed even during hot discussions about the effective enability the desktop search engine is about only sharing contents and indexes to make them searchable by others, whereas actual entry of the said searching keyword is not regulated at the host desktop wherein the each of host cannot predefine its preferences for allowing search for any of the keyword or taxonomical derivatives thereof which are obliviously linked through parent class thereof. Thus blocking search conduction at the host requires distributed processing of the indexed data and its host level validation for secured operation thereof.

To inculcate the aspect of semantic intelligence a formation of semantic web by means of implementation of semantic ontology and RDF technologies are underway, which are proving to be very complex for users to operate and tedious in execution. These drawbacks of the prior art underlining the importance of human intervention in the knowledge activity and machine as a supplementary solution for intended solution.

Example: The question "How to setup Software Company in New York, USA?" can not be answered completely by search engines thus requires human agents' multi Human Services combined with multi sources of information enabled via technology and logical organization of the framework to enable technology is been addressed herewith as a principal of the present invention.

Still though exceptionally intelligent advertising methods are working successfully, the eCommerce enablement by that means is doubtful and questionable. The significant basic thrust, of either advertising or eCommerce is the customer. The existing system and methods though claims to identify the related customer, the question remains if the said user is an actual customer. Hence it is well set and widely experienced by almost everybody that the rate of eCommerce conversion from the said adverting is remarkably low as the ad viewers are not the actual customers or the one who are being adjudged on the probabilistic model of chances.

Thus what we further need is worldwide distributed knowledge organization and distribution system, ascertaining human to human communication for want of knowledge.

Timely knowledge is great help; hence a system which automatically presents a knowledgeable human expert agent in real time is highly required.

An organizing and controlling means for accrediting such expert human agents is needed as in case of any knowledge dissemination sources, which needs approval and qualification to operate hindering the improper utilization of intellectual properties.

Enhanced level of human mediation in all aspects of knowledge gaining and dissemination process via a technological enablement is an urgent requirement.

A new rule based economic model to govern and regulate such human mediation for more intelligent and satisfying knowledge and resources sharing.

In the view of foregoing, the present invention disclosure of Universal Human Service Framework (UHSF) system and method provides software implemented automation facilitating human involvement in the process of knowledge invocation in a distributed peer to peer environment.

OBJECT OF THE INVENTION

The principal object of the present invention is to organize cyber civilization through underlining the "Human" aspect as most effective and prudent of all methods used to exchange, share and spread knowledge, forming a effective learning and evolution destination in all aspects including academia, business, skills etc. even though being in remote mode.

Another significant objective of the present invention is to provide world transformational model in terms of knowledge availability making it (world) more intelligent and knowledge abundant by means of virtually empowering brains through Human Service Network (HSN).

Yet another important objective of the present invention is to devise Universal Human Service Framework (UHSF) providing intelligent communication system exploring the human information and knowledge resources in terms of formulation of effective "human grid"

Yet another significant aspect of the present invention is to communicate securely with unknown human user or human circle via said "human grid" segregated in subject specifically allowing querying or sharing knowledge universally and search & share human minds logically like search & share information via internet (Human to Human communication & sharing)

Another significant objective of the present invention is to devising a central authority forming a unique repository of information & provides multi services and knowledge services.

Yet another significant aspect of the present invention is implementation of artificial intelligent (AI) agents for searching domain specific info intelligently & in background i.e. without human intervention Yet another aspect of the present invention is to formulate infrastructure comprising information and knowledge service providers and brokers thereof simulating anybody, anywhere, anything at anytime information and knowledge system sharing information, knowledge, experience, guidance, consulting and other resources acquired by human agents.

Yet another significant object of the present invention is to obvious combination of services from such central controller (HumanServiceNet), multi AI Agents services, Info Service Providers and brokers.

Yet another objective of the present invention is to formulate Universal social networking framework based on information and knowledge sharing.

Yet another objective of the present invention is to devise reusable, repetitive and redistributable information and knowledge sharing and utility system.

Yet another simulative objective of the present invention is to provide infinitivally resource address details represented in finer segregation thereof forming web style human linking with infinitesimally finer association thereof.

Yet another objective of the present invention is to constitute the system in layered segmentation following associated segregation of all involved parameters therein and imparting searching capabilities in that regard.

Yet another objective of the present invention is to offer offline human information and knowledge services via said framework.

Yet another significant objective of the present invention is to institute the said Human Service Network framework to function in Peer to peer environment sharing human knowledge, experience, information, discussion, and processing.

Yet another significant objective of the present invention is provide for configuration of search macros facilitating recording of each action and events carried during the process of knowledge invocation by one user and transferring and playing the said recorded knowledge package so as to provide the system users with the ready to use knowledge package and need not waste time, money and energy for the trifle cause.

Yet another significant objective of the present invention is creation of universal database structure for effective real-time and relevant sharing and searching of relational information and knowledge database.

Yet another significant objective of the present invention is enablement of universal desktop searching and ensuring security and data confidentiality.

Yet another significant objective of the present invention is to devise system for offering knowledge support services to the users.

Yet another significant objective of the present invention is to devise system for offering subscriber support services to the users Yet another significant objective of the present invention is offer searching system and communication utilities which can provide an opportunity to communicate with the unknown in the networked system.

Yet another significant objective of the present invention is to devise multiple modalities for understanding of human behavior, wants, needs, and understanding recording.

Yet another significant objective of the present invention is to provide appropriate services to most relevant and appropriate user via advertisement optimization system.

Yet another significant objective of the present invention is to devise system for enablement of rule based system operation.

Yet another significant objective of the present invention is to devise system effective clustered searching system.

Yet another significant objective of the present invention is to provide for ranked services and products to the system users.

Yet another significant objective of the present invention is to provide for repository and accounting of federated groups and services.

Yet another significant objective of the present invention is to facilitate federation, aggregation, integration, choreography and orchestration, collaboration, comparison, coordination, workflow, and transaction of plurality of tasks involved in the said distributed network.

SUMMARY OF THE INVENTION

Various aspects of the present invention including information and knowledge invocation functions, knowledge support function, human & computing grid utilization and UHSF system implementation for enterprise working, and widespread use of project planning, workflow management, and communication enablement are illustrated herein under describing in general a typical use, exploration and exploitation pattern and method of UHSF system tools and resources by the users.

Further aspects and advantages of the present invention will become apparent from the ensuring description, which is given by way of example only.

These technological enablements substantiating the communication needs, wherein the further aspects of the said communication process leading to management of such communicated or accumulated knowledge are largely overlooked wherein principal theory of knowledge generation is not followed. The Principal theory states that data generates information and information once communicated to human being upon requisite processing takes shape of knowledge and this knowledge further advances knowledge, generating new data and information. It is largely understood fact that human can interpret human in the best possible way wherein data and information transfer rate is highest and such transferee situation wise modulates the contents, making it faster, relevant, concise and more knowledge inclined.

The replicative mode of global civilization has been represented by means of cyber existence of distributed components of plurality of societies with plurality of cultural and ethnical backgrounds. Still one thing is common, wherein all efforts are concentrated on exploring new dimensions of life through knowledge of the peers by learning and gaining knowledge. The cyber civilization is still too unorganized to impart knowledge sharing amongst its peers.

The present Human Service Network (HSN) providing plugging interface for human brain to machine for active participation and interaction via this communication media, wherein brain to brain communication is established via Human Operating System (HOS) thus forming Human Grid (HG) by means of systematically designed taxonomies, ontology and filtering mechanisms with plurality of ways of exploiting Human Services offered via plurality of accredited human agents or knowledge sources selection in terms of HSN Messenger, HSN Mail service and HSN online portal.

Another significant aspect of the present invention is a means to maximize knowledge availability, sharing, and management thereof by means of infrastructure constituted therein. The constituted framework in principal is a set of brain mapping tools, wherein each query or search is directed to highly relevant brains (Human Agent) for knowledge demand and such reciprocal multi-coordinated action are executed in an organized fashion, wherein the such matched Human Agent In the principal of the preferred embodiment of the present invention human has been considered to be the best and effective source of knowledge. Considering human knowledge at the centre stage as a principal component of the present invention. Moreover contrasting to other sources of knowledge human himself as a knowledge provider builds the principal ground of the present invention.

Since ages human being is at the crescent of information & knowledge services. Human being is a very flexible media of information and knowledge transfer wherein plurality of transactions can be carried out amongst and via human beings includes primarily each of accredited human agent offering plurality of services referred to as human services, wherein the said accreditation status of the said agent in the field is predetermined on the basis of precalculated criterions suggesting the expertise of the said agent in the respective filed. The said human agents are classified based on taxonomical and ontological derivation representing conceptualization of a knowledge domain including service subjects and related information thereof. Ontology is a controlled vocabulary that describes objects and the relations between them in a formal way, and has a grammar for using the vocabulary terms to express something meaningful within a specified domain of interest. The vocabulary is used to make queries and assertions. Ontological commitments are agreements to use the vocabulary in a consistent way for knowledge sharing. Ontology can include glossaries, taxonomies and thesauri, but normally have greater expressivity and stricter rules than these tools. A formal ontology is a controlled vocabulary expressed in an ontology representation language.

The present invention fundamentally reflects a system emulating tools to deal with and frame approaches as one follows in the real life dealings in any of the societies around the world. The present invention based on the "Theory of Knowledge Transmission" and extends further as every human being experiences multiple things each day in his life time. Thus the packets of knowledge are residing with each human being. Few individuals specializes by accumulating greater no of knowledge packets, in general others possesses one or the other knowledge packets accumulated via personal experiences, which are practically relevant to share with others.

The present invention forming a system for transmission, reception and accumulation of the said knowledge packets. The classification of the said knowledge packets via generating taxonomy and ontology of the said knowledge provides for multiple tools to transmit, receive, search and accumulate information and knowledge. Wherein the said accumulation and transmission of information and knowledge is assumed to be cumulative and continuous process. As stated earlier each of human being is in possession of certain no of knowledge packets, these live human knowledge bases are being provided with computational communication interfaces having mechanism for monitoring permission based IN and OUT entries via said interfaces and further management including storage and pecuniary transactions.

The present invention further provides real time communication functionality via messenger, email, voice over IP, internet streaming, wireless communication, video and public switched telephone network ("PSTN") in an distributed environment, that facilitating live and effective communication between the said packets transmitter and receiver thereof. However the present invention is in general facilitating the development of social networking by identifying each individual with respect to his/her areas of interest, and needs.

The preferred embodiment of any data, information and knowledge transmission system is the precise configuration of the communication layer of the entire system and flexible designing of its internal operating software components and external performing human component. Largely this aspect has been addressed through evolvement of various de-facto standards including JAVA, and working platform wherein platform independency for universal functioning of standalone, networked or internet wide applications are enabled, however the concept of providing a universal platform itself over which one can streamline the process of data, information and knowledge sharing, transmission and reception hasn't been through of or proposed satisfactorily. In the yet further extension of the internet exploitation to offer multivendor web services which are software system designed to support interoperable machine-to-machine interaction over a network which are typically based on the Java, IBM, Microsoft etc. The present system forming a platform independent solution working on windows, XP, Linux, etc.

The inter systems interaction with the Web service is carried out in a manner prescribed by its interface defined via WSDL using messages, which may be enclosed in a SOAP envelope, or follow a RESTful approach and are conveyed via HTTP having XML conjunction with other Web-related standards. Software applications written in various programming languages and running on various platforms can use web services to exchange data over computer network like the Internet in a manner similar to inter-process communication on a single computer. For interoperability de-facto standards are consentauly following open standards wherein OASIS and W3C are the primary committees responsible for the architecture and standardization of web services. The further efforts are poured into it to improve interoperability between web service implementations the WS-I organization has been developing a series of profiles to further define the standards involved.

The present invention is for use in connection with the Internet environment as offered access via online portal (HS-NOP) and more specifically in the distributed peer to peer environment, whether wired or wireless including smart devices. The present invention has application in offline environment wherein replication and synchronization techniques providing, for updated as well as scheduled information. For example the information about the products during the product market research from the machine of the field executive who is working offline is replicated and synchronized in all of the linked databases of the other users of the enterprise related to product analysis.

The present invention employs framework for the Rapid Rich Web Client development which uses DOT NET REMOTING asp.net. This framework allows to manipulate complex data (Objects, Classes) on the client the same way the data is manipulated on the server. This framework unifies the client and the server programming. It creates the replicas of the server objects on the web client and provides the means for data initialization and delivery. The client and the server objects are interchangeable wherein SDK for .NET allows to build Bidirectional network applications which provide for Bidirectional synchronous and asynchronous communication by sending the objects or executing methods on the server and are accessibility for Clients behind Firewall or Proxy, Supported protocols TCP, HTTP, UDP, HTTP and TCP & UDP Object based Broadcasting, File Transfer, and Encryption.

However the general development consideration varies and generally case and situation specific wherein selective employment of VB dot net, Asp dot net, C # dot net for online, offline and smart applications will be dependant on the enability grounds. The UHSF system applications supporting range of existing Protocols including HTTP, TCP/IP, FTP, SMTP, POP, wireless protocol, and Bluetooth wherein the UHSF HOS products and applications are abiding these protocol in the peer to peer operations mostly and centralize web functional model remains the same.

Similarly the said product research company can engage one or more accredited human agents for the accomplishment of the product research in one or more territories by using human services offered thereby wherein offline human services via centers can also be provided.

The present invention specifically addresses the current lack of information and knowledge management and integration function within the same system installation or accession online. Currently available information and knowledge are in the complex format, each information and knowledge facilitating system having its proprietary storage and transmission formats wherein integrating such complex information and knowledge leads to horribly awesome situation. The present invention provides for integration of all functions required for easement of information and knowledge seeking.

The present invention provides for development of new enterprises and services while acting as channel node of the said UHSF system, the functional aspects are being manageable by said enterprises via said software applications, tools and utilities in conjunction with the system, resources and various subscribers & channel nodes acting therewith.

In an another significant embodiment of the present invention the UHSF system framework further provides for enterprise wide information and knowledge management via UHSF prototype implementation wherein the fire walls and other external information sharing functions are customized at the administrative intervention, the system rule and protocols acting in the same fashion as what has been used in the universal solution, the application and utilities are being part of implementation and upgrades and updates are regular feature of the said system.

In a notably significant embodiment of the present invention as stated above information and knowledge invocation through human involvement via remarkably interactive tools emulating real life interaction providing high end communication enablement with provision to keep tract of events and history is facilitated via imperative searching and matching system, logic and algorithm, wherein multiple search options provides support for variety of needs of each of searcher in the system. For example: an art enthusiast, who wants to purchase sculptures would not only be interested in knowing only the sellers thereof but also would like to know the other persons who share the similar interest. Hence the searching strategy employed would be to search for get Sources, as well as to get HSNS options so as to receive two different sets of search results serving to two different intends of the same searcher. Wherein the get Sources providing the list of vendors dealing in that subject area for further facilitating the eCommerce operation and get HSNS providing for matched HSNS having the same liking as of the searcher for development of social networking and relationship network.

In the present invention a searching system has been devised considering a human information and knowledge seeking behavior paradigm, wherein the said system has clinically preidentified the human psyche of information or knowledge goal achievement. For example if a said art enthusiast from India is planning to purchase a sculpture, a typical goal oriented searching pattern can be identified on the following quantifiers resulting out of sequential thought process:
Goal 1: Art sculpture purchasing:
Question 1: who is the vendor who deals in it?
Question 2: who else has earlier bought it?
Question 3: what other purchase options available? (Exhibition)
Question 4: who is currently interested in the subject matter?
Question 5: To whom I can consult to?
Question 6: what are information resources available in the subject matter?
Hence a typical searcher frames his/her goal in a keyword format either using command or simple text query. However noticeably enough that searching for other facets of art and sculpture while searching for vendors for a typically defined sculpture is waste of searching energy and ideal preparation for lesser relevant search results. As it is widely experienced that presently available searching system being simply index based searching system only carries on searcher from one related topic to another rather than sticking to the exact definition of the search goal, wasting time and adding to the distraction of the searcher. Thus as explained in a foregoing example a typical information and knowledge seeking behavior of a searcher, wherein a prime searching focus is on the broad goal in the mind and serial questions related to it regarding sources, people and persons to whom he/she can consult to. The generalization of this very human psyche will be evidented from the following another example wherein an international Art society at Paris is interested in procuring of some of the fine sculptures collections from India, would typically go about this in a sequential thought process as follows.
Goal 2: sculptures procurement from India.
Question 1: who are the vendors of art and sculpture?
Question 2: who else has earlier bought it?
Question 3: what other purchase options available? (Exhibition)
Question 4: who is currently interested in the subject matter?
Question 5: To whom I can consult to?
Question 6: what are information resources available in the subject matter?
Wherein searching for question 2 answer shall come across an art enthusiast from India, who would be the suitable person to get into dialog with. Thus at every search attempt one behaves in a pattern of serial questions and is inquisitive about sources, people and persons to whom one can consult to.

In the fundamental embodiment of the present invention providing for a system, method, computer program products, composite search algorithm and a business method for a computationally assisted human mediated and rule based information & knowledge invocation.

The said system is preferably a distributed Universal Human knowledge invocation Service Framework (UHSF) which facilitates aggregation and convergence of each of components externally as well as internally connected and configured within the said framework. The UHSF system comprising of plurality if internal and external components. The internal components specifically identified in terms of human components and computational components. The human components are strictly role specific and acting in a predefined channel defined by the UHSF system during the registration or accreditation process and each of human component is known as channel node comprising of multiple users, service & product providers and includes:
  i. plurality of Developers (HSND)
  ii. plurality of Human Agents (HSNHA)
  iii. plurality of providers (HSNSP)
  iv. plurality of AI Agents (HSNAIA)
  v. plurality of brokers and (HSNB)
  vi. plurality of subscribers (HSNS)
each of human components is identified with respect to the role it has opted for or being assigned to it based on the credentials thereof. Subscribers (HSNS) representing a user component of the UHSF system information and knowledge resources, exploits the services and products offered by other channel nodes. The provision of the performing roles assignment in the said system ensures the strict protocol determination and more essentially enables the successful information and knowledge invocation.

In an another aspect of the present invention each channel node downloading and installing or subscribing online one or more communication software clients including HSN Messenger, HSN Explorer, HSN Email, HSN Online Portal, and HSN Web Services and posting online channel specific registration request including consumer defined products & services and use conditions thereof with HSN Controller and receiving product key and/or package keys after request validation by HSN controller alongwith concurrent synchronizing said channel node entry within UHSF activating requested rights.

In the priming mode of the system operation any person, entity desirous of connecting the UHSF system for any of the specific channel node or multiple channel nodes requests for award of role specific registration key (package key) wherein the said prospective channel node logs on to the UHSF online portal (HSNOP) and is being directed to register through sequential registration steps. Upon successful registration being provided with package key or bundle package key for one or more role activation requested. The said registration process comprising of typical credential checks and profile verification to ensure security and reliable authorization of each of channel node in the system.

The registration details generally include identification details, address details, profile of the channel node and role intended to perform in the UHSF system, wherein the said registration, certification and verification is being administered via HumanServiceNet controller, a unique channel node responsible for all control, administration, repositing, routing and monitoring of each of action in the said UHSF system. This particular registration model though having post registration operations in the peer to peer distributed environment, registration process is typically is carried out in the centralize communication model via web server, having its own advantage for information processing & management for administrative purposes, wherein verification function can be left at the third party perusal and accreditation, certification and ranking of each of verified channel node is carried our via HSN controller.

In the present invention the system provides for presegregation of information and knowledge into taxonomical classification having preformatted as well as ready to customize ontology of controlled vocabulary expressing the instant knowledge representation in the said knowledge domain, wherein the indexing system indexing the said knowledge representational vocabulary so as to map the said taxonomically defined knowledge domain. In the UHSF system each of channel nodes are provided with at least one knowledge domain identification via taxonomy classification thereof, which further facilitates the search function wherein the said knowledge domain identification is in ontological agreement with the metadata assigned for each of information and knowledge units defined. In the present system each of the channel nodes falls in one or more taxonomically defined subject categories having ontology of controlled vocabulary defined therewith and searchable via said controlled vocabulary.

In another significant embodiment of the present invention knowledge is invoked from the each of the Human Agent (HA), wherein each of HA being taxonomically identified in a specific knowledge domain, facilitating knowledge dissemination in the said knowledge domain upon receiving the query from the HSNS. The process of knowledge invocation by each of HSNS is a typical questioning and answering method at the first instance. However the UHSF system provides for value added online consultation platform to each of HA and providing for plurality of interactive tools and resources for validated information, communication, linking and routing. Wherein the said HAs forming a personal knowledge network preferably known as Human circle for sharing, collaborating and forwarding the queries to one or more members of the said human circle. Each of HA can be member of one or more human circles subjected to knowledge domain identification validation by the said human circles. Each of subscriber (HSNS) searching for one or more HAs and posting query to one or more HAs based on the UHSF wide ranking thereof via query manager application or via one or more Human Operating System (HOS) products for information and knowledge invocation, communication, data management and knowledge project planning functions, wherein each of HA upon receiving the said query answering the said query via answer manager application and optionally publishing the said query and answer.

Information and knowledge invocation in the real life essentially involves communication, wherein the said communication incorporates plurality if aspects concerning the said knowledge domain. In the present invention communication is enabled via various communication tools including email, messenger, VOIP, video and communication via the smart devices and the other aspects including plurality of task of referencing, reviewing, forwarding, linking, routing, storing, comparing, computing, publishing, pushing and pulling are enabled via multiple software tools, utilities and applications developed by one or more developers (HSND). Wherein each of developer developing one or more software utilities and applications and issuing product keys after receipt of specified consideration in response to the product subscription request from the set of plurality of products thereof including communication and ontology service agents, attached utilities, applications, rules based software applications and domain specific AI Agents posted via one or more communication utilities by registered Human Agents and Subscribers and each of users consuming said subscribed products and services for offering and accessing plurality of services the said applications.

In one embodiment of the present invention the automation in the system is generally incorporated by means of functional task specific AI agents, wherein the UHSF system possessing default AI agents and multi AI agents serving essential automation function. In addition to this the enhanced and task specific AI Agents and multi AI agents are developed by various developers, wherein the development of AI agents may form a function of number of requests or demands received from the UHSF channel nodes. Each of AI agents operating in the UHSF system is based on FIPA standards and may follow any contemporary standards available therewith.

In the process of information and knowledge subscribers are further assisted by one or more said knowledge domain specific brokers, facilitating referral of one or more Human Agents and Providers facilitating availability and referral of plurality of information sources including $3^{rd}$ parties services via web services to consumers thereof. The said brokers forming an intermediate interface between the subscriber and the knowledge source i.e. human agents and service provider. The broker active channel node having knowledge specific understanding regarding the system behavior based on the rank assigned to each of human agents and on the basis of previous results of the said query. The broker being a live medium for determining and analyzing the quality of the said knowledge invocation system is empowered to assign rank to each of human agent encountered in the process of their mediation. The brokering services are offered are either one way or two way brokering, wherein each of broker providing package keys to one or both the parties and receiving commission.

In an another aspect of the present invention the said each of service provider (HSNSP) providing for the information resources related to preidentified knowledge domain via package key and to the third parties via web services invocation logic.

In an another aspect of the present invention the UHSF system though working in the distributed mode of communication the central registering, ranking, indexing and repositing functions provides for plurality of lookup directories for each of channel node and information precisely segregated in the exhaustive taxonomy wide knowledge domains having ontological controlled vocabulary attached therewith. Each of channel nodes in the UHSF system primarily searching directly via the said lookup directories and in an alternative searching attempt emulating the said lookup directories to route and process the said search term through the specified search processes.

In an another aspect of the present invention the HSN controller maintaining the data repository in the predefined taxonomical knowledge domain classes termed as Universal Knowledge Information Databases (UKID). HSN controller defining broadly the UKID structures for data management and universally uniforming the said data structures, wherein each of channel node downloading the said data structures for specific taxonomy of identified knowledge domain for personal data management and sharing forming Local Knowledge Information Databases (LKID) structures. Each of LKID of each of channel node combinely constitutes UKID structure, wherein any updated or new addition or amendment of the taxonomy structures are alerted and synchronized in UHSF system wide. In addition to this UKID structure are searchable and each of LKID facilitates sharing and data migration in the distributed environment.

ABC online shopping mall has 100 of products and service categories, download existing related taxonomywise UKID structures via search and match. download required utilities via HSND, customize datastructure i.e. LKID, data inputting from multi sources via tools and utilities, index all data of each of databases, publish selective or full index to related one or more taxonomywise SN, publish all databases for public use. Customer XYZ wants to purchase mobile before purchasing the require comparative analysis based on price feature and latest model and other criterions, send one or more keywords to UKID i.e. all LKID, SN autorouting request to related multi LKID or matched multi LKID or via scanning SN directory or get KSS support, each LKID search the contents related to the mobile keyword, send pointers to searchers, searcher selecting the related sources for full consents and then download the datastructure and related contents and then compare the mobile prices and preferences to order the mobile for purchase.

In an another significant embodiment of the present invention the UHSF system providing optionally rule based platform and plurality of means for federation, aggregation, integration, collaboration, composition, comparison, coordination, workflow handling, orchestration and choreographing of plurality of services, facilitating means for pecuniary transactions, products and services subscription, searching & matching operations, communication, information and knowledge management operations by HSN controller and plurality of distributed channel nodes wherein said central unique HSN controller facilitating ranked knowledge invocation and one or more knowledge support services from identified and unidentified human experts and data sources.

For example a manufacturing company involved in the process of new product development and desirous of conducting a worldwide said product market analysis. Generally the said task is assigned to the specific market analyst firm in a specified territory, wherein the Markey analyst carries out the research and submits the report to the manufacturing company. A manufacturing company receiving the reports from plurality of such analyst from various part of the world, wherein the said manufacturer aggregating the said report details for testing the data on various grounds, seeking further explanations from various earlier engaged analysts, discussing the said details with the management bodies and engineering staffs and thereby arriving at any particular decision. In the recent development in the information technological implementation, the said task is eased by means of enhanced communication and data storage technologies. However integration of each of them seems difficult and also considering the variety of people involved in the communication process uniformity of application is highly desirous for quick and integrated working of each of the functions associated therewith practically any task accomplishment. The UHSF system providing simplification and integration of each aspect of the various tasks accomplishment, wherein considering the said manufacturer planning the said product launch creating project named "ABC product launch" in the project explorer thereof and further creating various associated subprojects thereunder the said project title including Market research data gathering, surveying, analysis, human resource management, recruitments, legal analysis, marketing partners, advertising, manufacturing alliances, competitors watch, etc. creating further subdivision of each of subproject into desirous no of heads. The product launch project implementation herein assuming that each of users of the said project having UHSF system browsers installed and are provided with full feature communication abilities, wherein the said manufacturer receiving the reports regarding any development in any task in any part of the said subdivided project titles and same is being replicated in all of the either privileged or selectively selected workspaces of associated member of the project. The said manufacturer and the associated members therein the said project downloading the required software application and utilities for project enablement. The said manufacturer monitoring the said project of "ABC product launch" in the workspace thereof, wherein controlling, directing and communicating with each of project associate towards a assigned task accomplishment, furthermore scheduling each of task to be accomplished in the said project explorer within its workspace. The said project providing for the aggregation of the data in a single database and multiple tools for the analysis of the same. The additional applications and utilities required are searchable and downloadable from developers.

In an another aspect of the present invention the said UHSF system framework facilitating selling, purchasing and sharing of information and human knowledge by providing subscription to each of channel node for plurality of products and services including Human Operating System (HOS) by connecting to the central web server and to the plurality of products and services form multiple channel nodes to the other multiple channel nodes in a distributed peer to peer environment. The software development part exploiting web services SDK and multiple programming APIs alongwith the multiple third party programming tools for realizing peer to peer and centralized web server framework.

In an another aspect of the present invention each of multiple of subscribers sharing information and knowledge with other Subscribers within one or more personal workgroups and providing one or more subscriber support services (SSS) wherein each of CHN being enabled with searching one or more known and unknown subscribers (HSNS) via search engine and autoworking thereof intermittently providing automatched one or more subscribers of like subject interest to each of CHN so as to facilitate each of CHN to identify and form relevant one or more information and knowledge sharing groups, and prospective consumers of services thereof and each of Human Agents to learn prospective information and knowledge seekers. In addition to this the identification of peers of like interest further boost the prospects of improved social networking, collaboration and sharing of information and knowledge. The system is reflective enough and operating in a real time replication and synchronization module wherein plurality of means are employed to update subscribers profile in the UHSF network, including intermittent survey conduction, auto sensing of subscribers needs and interest. For example: A said art enthusiast interested in subject of sculpture, recently developed for paintings, which he either expresses in the network or conducts search for the same, wherein system having IN and OUT sensors depicting the user's interests over the network or alternatively the said art enthusiast downloading and submitting the survey form so as update profile thereof, making him searchable with the updated attributes facilitating high relevancy social networking and online business operations.

Survey system forming significant part of the searching system, wherein the user's behaviors, wants, needs and multiple attributes in the said network and domain specific search preferences are recorded, for customized and highly relevant and real time searching.

For example, 'Henry' a software professional is about to migrate from one part of the country to the others, downloading taxonomically categorized survey forms and filling the said survey form depicting his requirement and needs for the said migration including, packers and movers, real estate support, transportation, passport and visa assistance, and so many others things. Thus updating his profile in the network and is searchable with respect to his new updated attributes or even can provide for suggestion, guidance to other users in his social network upon experiencing the said particulars, like if John is about to migrate from the same place to the same destination as that of Henry, would be searching the profile history of Henry and establishing active communication through various means for invoking knowledge from Henry.

The centralize functioning of HSN Controller includes facilitating Human operating System (HOS) products and governing authority for administering, monitoring and controlling of registrations, certifications of the requesting distributed channel nodes and centralize and distributed searching and matching authority wherein maintaining brief profile details of each of channel nodes, transactional inventory maintenance, event log records, accounting and metering of use of the UHSF resources. In addition to this HSN controller further maintaining taxonomically categorized lookup directories for each of channel node and the allocation of taxonomical knowledge domain to the each of supernode.

In an another significantly important embodiment of the present invention multiple distributed "Super Nodes" (SN) are configured wherein as in the UHSF system connected and nodes are taxonomically classified and ontologically described through a set of customizable ontology. The UHSF system being configured to work in the distributed mode, the provision of central server model for communication is discarded, wherein the communication, network mapping and searching has been provisioned through configuration of qualified supernodes (SNs). As stated above the HSN controller maintaining the taxonomically categorized supernode directory representing knowledge domain for handling each of search query. The supernode identification and configuration module working in a centralize fashion via multiple AI agents.

In the further aspect of the present invention each of supernode having data storage means for maintaining the extended and exhaustive profiles of each of subscribers in the UHSF system network, wherein the said storing means further updating the profiles in accordance with the survey details being routed to the said supernode alongwith real time HSNS preferences, resource offerings and HSNS and referrer URL. In addition to this the "Auto Sense Logic" executed via various AI agents routing and storing the record of real time content searching CNN's metadata during OUT permission by HSNS and advertiser CHN's and matched HSNS metadata during IN permission by each of HSNS. The identification to real time configuration of each of supernode amounts to the configuration of various supernodes, wherein the said configuration is a continuous process, for facilitating real time and high relevance searching experience.

In an another significant aspect of the present invention HSN controller centrally storing plurality of public repositories including:
 1. HSN contents and repositories
 2. HSND directory
 3. HSNHA directory
 4. HSNHC directory
 5. HSNFS directory
 6. HSNB directory
 7. HSNSP directory
 8. HSNS directory
 9. HSNAI-HSNAIS directory
 10. Supernode directory
 11. HSNS-SSS offering inventory
 12. HSNHA-KSS offering inventory
 13. Rules repository
 14. Ontology and taxonomy repository
 15. UM structures repository
 16. Web services directory
 17. Resources offering inventory
 18. Survey repository
catering to plurality of channel nodes and replicating and synchronizing via and through active human mediation at each level of storage and modification of contents thereof in essentially a centralize manner.

In an another significant aspect of the present invention HSN controller centrally storing plurality of private repositories including:
 1. Channel node registration databases
 2. Payment and transaction databases
 3. Product and package key database
 4. Accounting and metering databases
 5. Report and analysis
 6. Ontology and taxonomy directory
 7. Survey result repository
 8. Advertisement database
 9. Hit, rank and plurality of statistics databases
which are necessarily secured HSN controller's system resources being updated and modified by HSN controller only facilitating HSN controller UHSF wide administration and management.

In an another aspect of the present invention the knowledge project management includes workspace management, role active explorer management, reports and analysis, HSNFS and HC management, projects and topic collaboration management facilitating each of channel node to manage one or more information contents and knowledge invocation projects within the UHSF system.

In an another aspect of the present invention the UHSF framework being distributed exploits all existing PSTN and communication network, alongwith wireless communication in the smart digital devises. The HSN controller server arrangement centrally managing the UHSF system inventory by distributedly locating and centrally indexing and monitoring identified Human experts, intermediately acting brokers, providers, supernodes and information resources source pointers within the functionally segregated organizational structure of a community of plurality of channel nodes of a computer network. The said server registering the one or more users in the database, wherein one or more Human Operating System (HOS) software products thereof facilitating initiation and completion of transactions between preidentified channel nodes for successful entering the registration record therein the database. The HOS comprising of various communication and interaction means including HSNM, HSNE, HSNEM, and HSNOP and various tools, applications, attached utilities and AI agents.

The said registered users further acting as role active channel nodes in the UHSF system, wherein the said HSN Controller server maintaining the inventory and one or more database servers repositing plurality of UHSF wide contents and utilities catering to plurality of channel nodes.

wherein the said server creating a primary transaction record in response to a first registration request in the database thereof via information inputted by each of the unregistered user, the primary transaction record includes at least one field representing an identity of a said unregistered user and a field representing a role of the said unregistered user in the primary transaction;

wherein after completion of said first registration HSN controller generating a channel identity for such registered channel node further authenticating access via award of product key, package key and login data attached therewith;

wherein the server registers the unregistered user with the HSN controller and activating channel node thereof, and further recording the associative one or more secondary transaction status of each of channel nodes with said HSN controller and the other channel nodes within the UHSF system. For example: In the scenario of knowledge seeking by the group of 5 students belonging to hospitality, travel, and tourism faculty registering with the HSN controller as a subscriber active nodes obtaining the product key for any one or more HOS products as per requirement of each of students and package key as per extent of UHSF system utilization from the HSN controller. A 5 star South African hotelier H having past 20 years experience as Chief chef and manager in the hotel and tourism industry, registering with HSN controller as a Human Agent active channel node and a traveling enthusiast T registering with HSN controller as a subscriber active node and a software development solution provider D registering with the HSN controller as a developer active node, is in the travel and tourism software related business for past 10 years has submitted proposal with HSN controller for development software providing world maps, tourist destination navigation and searching tools, transportation calculator, budget calculator as the utilities.

In such a scenario 5 students searching for expert human agent to post query to, come across H, wherein each of students posting queries of own interest and receiving the answer thereof for some consideration prefixed via package key. H is in need of more advance software to ease his consultation task, searching for software developer in the specific taxonomy, come across D, posting request for some of the products and D selling the said products for certain prefixed consideration. A traveling enthusiast T planning for trip to South Africa, searching for expert tourism consultant for traveling and also for few software tools to facilitate his travel plan. Come across H and D and subscribing services and products respectively therefrom by means of predetermined consideration for package and product keys respectively. The 5 students forming a social networking group discussing and sharing each others experiences. The H searching for other human agents for collaboration in multiple countries and so on and so forth each of joining channel node searching and managing the operations in the UHSF system pretty objectively.

In the one embodiment of the present invention searching and matching system comprising of plurality of computing and human components wherein each of component supplementing the inputs to the other through an interactive query manager. The searching is systematized through assignment of subject tag to each of component therein the system whereby identifying plurality of taxonomically precategorized, certified and identified channel nodes and resources and respectively associated metadata, keywords, system data, ontology, and attached resources therewith. In addition to this HSN controller devising a universal distributed knowledge and information database (UKID) structures for management of the knowledge sharing in the said taxonomical categories and further systematical relational information management thereof. Each of UHSF system user i.e. various channel nodes using the part of the said UKID structures for own use and downloading the required UKID structures, the said personalized structures transforming into local distributed knowledge and information databases (LKID);

wherein one or more distributedly located CHNs either independently or collaboratively selecting for only Human mediated, only via machine or with combination of both searching modality, specifying one or more penta tier depth refinement selection;

one or more CHNs searching for preidentified and unidentified CHNs via one or more searching means including basic searching, command based searching, search wizard and advance search, generating one or more search templates;

for searching and selecting one or more role specific precategorised and preidentified CHNs and resources thereof in the centrally stored directories thereof and establishing direct connection therewith, for searching one or more unidentified subscriber channel nodes and resources thereof based on likings, interests and specific matching criterions thereof recorded in the centrally stored partial profile, plurality of extended profiles and SN's real time relevance based HSNS keyword indexes DB, routing and mapping profiles thereof stored at the one or more supernodes, wherein the searching channel node alongwith query term, preselecting one or more penta tier depth refinement specifier, indicating extent of search refinement upto relevant 1. supernodes, 2. HSNS, 3. sources, 4. abstracts and 5. contents searching depth;

wherein the said search query terms are matched with taxonomically categorized supernodes via HSN controller central search and match engine and routing and replicating relevant matched SNs result to each of querying channel node towards $1^{st}$ tier refinement depth selection;

one or more routing agent routing query term to $1^{st}$ online available matched supernode wherein said SN matching query term with plurality of HSNS extended shared profiles, indexed keywords, black box indexes, LKID resources in peer to peer environment by multiple taxonomy matching logic based on the profiles of plurality of HSNS being updated and clusterwise posted in the taxonomically classified profile database of one or more supernodes which are being selected on predefined logic stored therein the database thereof and routing & replicating relevant matched HSNSs result to each of querying channel node towards $2^{nd}$ tier refinement depth selection;

one or more matched and filtered HSNS receiving request for content source pointers or advertisement either from querying CHN or to each of matched HSNS directly from matched SN and each of requested HSNS routing & replicating relevant matched source pointers result to each of querying channel node or advertisement subscription request to respective advertisers thereof towards $3^{rd}$ tier refinement depth selection wherein each of HSNS preselectively enabling or disabling respective BBS and LKID search thereof;

one or more HSNS of $2^{nd}$ tier refinement depth result after routing source pointers, receiving abstract request from querying CHN and in response to that routing & replicating automatically or manually one or more abstract of one or more source pointers to each of querying CHN towards $4^{th}$ tier refinement depth selection;

each of querying CHN filtering abstracts for determining and sending final selection request to one or more HSNS of $2^{nd}$ tier refinement depth result and one or more HSNS responding and sending full contents via associated one or more publications or resources towards $5^{th}$ tier refinement depth selection;

wherein one or more KSS or SSS providers and searching SNet thereof facilitating searching services of any one or more tier refinement depth and the pair of each of HSNS subscribing to advertised contents and searcher thereof alongwith metadata thereof are being routed to HSN controller's prospective customer Database facilitating suggestive ecommerce therein the UHSF system.

In an another aspect of the present invention search wizard provides for a guided searching utility being provided to each of CHN, prompting the continuous one or more search preferences and criterions selection interfaces guiding users thereof to precise and relevant search results via providing for the selection options for normal and advance search prompting a continuous series of screens for search refinement and required selection of one or more search preferences and criterions providing users thereof highly refined and relevant search results.

In an another aspect of the present invention each of CHN initializing the host system wherein undertaking Presearch preparations including downloading of one or more taxonomies from HSN controller's centralize taxonomy directory In an another aspect of the searching system the relevancy has been addressed through the implementation of universal desktop search system wherein a black box search logic working at the host computer facilitating a customized desktop (computer) resources and activities indexing and a publication module providing for scheduled or manual publication of the said indexes on to the SN, making them searchable publicly or privately. In an alternative to this a host computer of the user enabled for deeper search strategy implementation wherein a black box indexes are itself made searchable by the said host user wherein the searchers sending a search keyword or command or advertisement at the host computer and are entertained at the reception module of a black box for restrictions if any and providing for IN permission selection option and the search and match engine providing for search results for the said keyword alongwith the OUT permission for providing the said search results and resources thereof to the searcher, wherein the searcher selectively accepting or denying the said OUT operation of the search results.

A typical black box searching system module comprising of resource index management unit for indexing files, images, docs, video, databases, favorites, registry, cookie, folders, emails, attachments, programs, contacts, machine configuration & all other info. which are further auto indexed, filtered, and categorized from local machine or network or server via multiple algorithms or methods or systems and publishing IN and OUT full or partial index to the multiple matched SN, the incoming keyword is searched and matched by means black box search and match engine wherein the indexed resources provided by resource index management unit and based on the search and match results transmitting multiple permissions generation signals to the permission and selection management unit. If the query containing linking and routing request alongwith depth thereof for extended matching the host user forwarding the said incoming query via linking and routing management unit to the multiple users' BBS systems. In a typical searching system and method stated above, each of component involved in the process of information and knowledge invocation are necessarily in the searching facilitation engagement wherein CHN sending search query at matched SNs and each of SNs sending the matched HSNS and resources thereof wherein the said matched SNs are obtained by sending SN matching query at the HSN controller.

All peer's all contents are indexed via BBS, partially or full index is published to one or more SN, searchers sending one or more keywords or query to SN, or alternatively browsing and scanning the SN directory and route the query to one or more matched resource destination, wherein the BBS creating list of matched contents and resources, BBS user selects one or more IN or OUT contents and resources with permissions, user can universally search desktops and share the resources with permission through secured channel.

For example: user A send one or more keywords or query to one or more matched SN automatically of manually via browsing and scanning or exploiting expert KSS support, SN routing query automatically or route manually to particular one or more BBS for searching and matching resources presenting users machine or network, all matched BBS matches the resources with keyword and create list of matched resources for permission, users get all matched selective resources with permission or establish communication.

Similarly a advertiser B looking for matched prospectively interested users in his product, intended to send an advertise as a part of his advertisement campaign either manually, or automatically by scheduling via SN, or via exploiting the HA's KSS services, wherein sending keyword related to advertise to any of the means, the said means matching the said keyword with the BBS of multiple users and the matched users are routed to the advertiser B, wherein the advertiser either manually or through any of the means sending the advertisement to the such matched users wherein the matched user either accepting or denying IN permission generated therewith.

In one of the significant embodiment of the present invention a system, method, and a constitutional infrastructure is devised to constitute knowledge storing, searching, sharing and management mechanism via Universal Human Service Framework (UHSF) forming system for Human grid development connecting brains to equally like brains for knowledge sharing in the plurality of modes i.e. real time, online, and offline.

In the further aspect of the present invention taxonomy categorized knowledge domains and semantic-ontology assigned thereto facilitating highly relevant search and match features alongwith enhanced level of precision in the process of knowledge invocation. Each of channel nodes searching knowledge in the desired level of granularity defined via penta tier search depth selection which provides for multiple filters and openers and multiple combination thereof whereby determining the search criterion to limit search to any selected tier of search system. The location and language specifier further narrowing or broadening the search query dimensions.

In an another aspect of the present invention the UHSF system employs XML schema datatypes and uses topic maps for more sophisticated scoped relationships with clarity on use and mention of the concepts, with formal processing model for manipulating them and can be related to RDF and validate literal contents having XML serialization of ontology. Each of XML elements is given a unique ID-attribute. Using this ID, any node in the semantic tree can refer to any other node. As a result, arbitrary graphs can be encoded in this manner keeping the basic data-model intact. The UHSF system provides for XML tagging for multiple purposes facilitating serialization syntax for other markup languages. All data sets, metadata sets and resources are further represented via RDF having the basic construction of an object-attribute-value triple wherein an object O has an attribute A with value V wherein the said triple corresponding relation is represented via A(O,V) defining a nested object-attribute-value structure.

In an another significant embodiment of the present invention each of the search results browsing events and actions carried out by one or more subscriber, service provider and human agent is recorded in the search macro which forms a ready made knowledge packages for instant access under any particular taxonomy category defined in terms of a keyword in specific context therewith. There may be multiple macros in the particular taxonomically identified knowledge domain specific search macros wherein each of subscribers, service providers and human agents optimizing the information and knowledge invocation function with the use of said macros substantially saving time and efforts thereof alongwith providing highly relevant information and knowledge contents referrally validated in the closest context in the said knowledge domain, further facilitating a ready to use medium for utilizing experience and efforts taken by configuring CHN thereof in the information and knowledge invocation medium, capturing the actions, events and behavior to decipher relative high relevancy of the intended keyword and packaging the said experience and efforts in the said macros wherein one or more human agent experts developing multiple macros for the one or more keyword in context of a particular taxonomical category representing a specific knowledge domain optimizing information and knowledge seeking experience.

In the further aspect of the search macro management system and method each of subscribers, human agents and service providers configuring the said macros by means of macro management explorer having plurality of tools to devise macro configuration projects in the broader taxonomical category and multiple sub groups thereof having multiple keywords for each macro.

In the further aspect of the search macro management system and method each of macro configuring CHN having recording unit for macro configuration depicting and recording the each prespecified events and behavioral aspects determining relevancy thereby.

In the further aspect of the search macro management system and method the said behavioral aspect comprising of no of hits generated, no of times said keyword occurring in the said text, audio or video and amount of time the said media is under use.

In the further aspect of the search macro management system and method each of the macros refurbishing through the life cycle of the each keyword appending updates, modifications, and event recording therewith by the configuring CHN thereof providing retrospective recordings of the each of the keyword in a particular knowledge domain forming sequential or chronological events and knowledge maps within the said knowledge domain associated in the context with the said keyword.

In the further aspect of the search macro management system and method one or more macro configuring CHNs recording the one or more macros via taxonomically defined project management formulating plurality of subgroups therein the said project having one or more keywords to configure macros for, recording the said macros alone or in the collaborative engagement with the other search macro configuring CHNs, or via one or more KSS and SSS offering human agents and subscribers respectively and attaching metadata therewith including date, author, url, description, associated taxonomy, price and payment type, assigning security features including user ID, Password and certificate therewith, testing, registering with the HSN server.

The deployment site of such configured macros is CHN subjective wherein each of configuring CHN deploying the search macros at respective servers for use by plurality of subscriber, human agents and service providers. Each of search macro configuring subscriber deploying the said macros at the related one or more knowledge domain specific supernodes and human agents and service providers deploying the configured search macros at the personal computing machine.

Each of macro searching CHN searching and downloading the said search macro and playing on the personal digital medium whereby optimizing instant information and knowledge gaining experience and saving time, money and energy employed therefor.

In the further aspect of the search macro management system and method each of subscribers, service providers and human agents searching one or more search macros based on the rank, date and taxonomical context or scheduling the download and use thereof utilizing unutilized human grid connected in the networked environment of digital communication, further customizing and deploying one or more macros for CHN use or sharing with the other macro configuring and utilizing CHNs saving collaborative human search effort.

In the further aspect of the search macro management system and method each of macro is meant to be record and played on the local desktop or within the network, peer to peer, enterprise wide intranet or internet wide for packaging searching, browsing experiences recorded via subscribers, service providers and expert human agents wherein the said macros recording plurality of events a user carrying out in the said medium comprising of contents or sources searching from one or more sources, window closing events, content and image scanning, content copying, repeated search frequency, links searching, repeated links searching, web pages saving, downloading, printing, emailing, links book marking, navigation, web pages browsing, analysis, and time spent on the particular page.

E.g. Though there are wide range of usability of search macros, it has strongest feature to make current search engine obsolete, as predefined taxonomical knowledge domain at the first instance narrowing down the search and preconfigured macros would provide for instant knowledge package for the said user, hence saving on time, money and energy and as macros are configured for all best in the said knowledge domain nothing is left out of the search. Considering a school having teachers and pupils related with each other in a fixed identified taxonomical knowledge domain, now if a 'Physics' searching in the web media for "laws of motion", the teacher would be searching through plurality of pages to collect knowledge, if the actions and event during this complete knowledge gaining exercise is recorded and made available to the pupil as ready to use taxonomically categorized search macro. The pupil can learn all things their master have searched and gone through, imparting effective knowledge in a quick time, saving money and energy.

In a one embodiment of the present invention the system uses specialized storage system formatted and relationally connected universally via serialization of taxonomical knowledge domains defined under Universal Knowledge and Information Data structures (UKID) in the database thereof each of channel nodes in the UHSF system wherein the said databases uses file system and next generation winFS storage subsystem, and database system including open source databases and commercial databases including MS SQL, MSD, ORACLE, etc.

The present invention provisioned for information and knowledge to anybody, anywhere and at anytime for any thing. For example the system facilitates any information, knowledge, experience, guidance, consultancy or any recourses to any channel node in relation to its use conditions and non violation of service protocols to communicate via any utilities including HSN IM, HSN Email, Phone, Fax, Collaborative tools, File sharing tools, E-Mail etc.

In the system of the present invention identifies in advance each of registered individual, network, group, or organization for specific role, wherein users preferably termed as "subscriber" is provided with multiple services and products via such registered preidentified individual, network, group, or organization preferably known as channel nodes the channel nodes includes human agents (HSNHA), service providers (HSNSP), developers (HSND), and brokers (HSNB). Each channel node being identified with respect to its role. Each of channel nodes and subscribers (HSNS) are functioning in a distributed environment. However for creating identity and ensuring security of operations each of channel nodes are made to register at the Human service net controller server, and are need to subscribe for one or more communication utilities therefrom. Each of registered channel node and subscribers downloading role active HOS application for management of information and communication with the other channel nodes and subscribers.

The HSN being configured for the central control of the said human service network have been supplemented with plurality of developers HSND which are developing plurality of subject specific AI agents, communication utilities, add-ons and applications wherein the service provider offering subject specific information and knowledge services via plurality of sources and web services, wherein the said AI agent (HSNAIA) functioning preferably in the background without human intervention are means for systematic information tracking through information repositories and related sources.

The human agent (HSNHA) is a means for very specific field of knowledge and information as derived and represented via ontology and taxonomies thereof is a person expert in the filed offering his/her information or knowledge services maintaining the dual mode presence within the said HSN framework, providing matched resources from multi sources including 1) HumanServiceNet, 2) Info Service Providers, 3) AI Agents, 4) Human Agents wherein the said human agents forming a human circle comprising expert human agents in related field possessing Information and knowledge related with queries via (Paid or sponsored) or Public (free) subscription and 5) Human Agents local or remote Networks offering ready information related to query and adjunctively forming federated human circle to provide collaboratively various human services.

The plurality of human agents and their quality has been quantified, graded, and ranked by means of HumanServiceNet Broker (HSNB) and are means for brokering of human agents services to the intended HumanServiceNet Subscriber (HSNS) wherein the said subscriber obtaining matched resources from multi sources including 1) HumanServiceNet, 2) Info Service Providers, 3) AI Agents, 4) Human Agents 5) Subscribers' local Network, and 6) Personal Network of Subscribers offering Information related with query via (Paid or sponsored) or Public (free) subscription.

The HSN so configured has predefined communication links wherein the human agent subscribing to human circle to become part of it. Wherein the multi search and match algorithm helps exploring the services and human agents thereof in relation to intended search and query. The search and exploration path followed therein in relation to any specific search or query varies having multiple sources offering the most relevant information and same being traversed in the present constituted infrastructure of Human Service Network framework.

In an another aspect of the present invention the Universal Human Service Framework (UHSF) is providing for new interactive communication system preferably HumanServiceNet Messenger (HSNM) & HumanServiceNet Explorer (HSNE) to take advantage of humans' (human grid) capability in terms of semantic-ontology & taxonomy categories human services (physical i.e. works, actions etc. & logical i.e. knowledge, experience, info sharing and transactions etc.) communicate securely with unknown human user or human circle or federated human circles for information related to particular field or subject or query or share knowledge universally and search & share human minds logically like search & share information via internet (Human to Human communication & sharing)

In addition to this the workflow management is operable in an offline mode, wherein replication and synchronization of all updated entries is carried out via multiple AI agents.

In the one embodiment of the present invention the said UHSF system facilitating the Universal social networking by means of exploiting the plurality of searching means, repository, interactive communication tools, scheduling technique and customization and personalization of the system. In addition to this the added searching and matching intelligence alongwith the intelligence generated out of taxonomically categorizing and attaching various set of user defined ontology to the said taxonomical category, further making it more personalize to the extent of understanding the subject matter and easing the searching in the personal network of the set of users which lead to facilitation of social network.

The relationship aspect of the social network is further managed in the said system by means of workspace provided therein whereby each of user in the system managing the various relations including personal, business, and project related, consultancy related but not limited thereto via various workspace management features. The said workspace providing for personalization and customization of the said each of relation wherein users can add, delete, modify the each of relation defined in the said workspace.

In an another aspect of the present invention the UHSF system forming a human mediated knowledge dissemination system wherein the said disseminated knowledge is stored possessed continuously at plurality of channel nodes making it value added, customized, personalized, reusable, repetitive and redistributable to other channel nodes in the UHSF system and third parties.

In an another significant embodiment of the present invention the emailing system providing for unknown communication wherein each of user mailing the contents alongwith it describing the metadata and taxonomical category of the said mail in terms of OUT preferences. The said mail can be published at the multiple taxonomical categories as per the mailer OUT preferences also can be published universally or in the determined personal networks. Similarly each of channel node in the UHSF system predefining the IN preferences so as to filter or fix the taxonomy categories of the mail to be received in the inbox thereof. A typical HSNMail (HSNM) service works in a following manner which is presented as example only and does not limit the scope of its working 1. "A" the subscriber mailing "I want to sale laptop" in universally and assigning it in the taxonomy computers, and assigning keywords, laptop, computer, notepad, etc.
2. Entry of mailing is stored in the sent items of the said subscriber.
3. Each one of other channel nodes having defined computer taxonomy as IN preferences receiving in the said mail thus said mail of the subscriber is communicated to unknown. Or
4. Alternatively each of channel nodes searching for mail in the computer taxonomy will be finding the said mail in the said taxonomy, also the keywords and metadata defined by the said subscriber making the mail searchable.

In an another significant aspect of the present invention the UHSF system providing for the platform for opening up new business or revenue model and interactive and searchable platform for sale of any knowledge useful to any body via plurality of means for consideration wherein the knowledge currency is a barter means for exchanging Knowledge for Knowledge and the extent of sharing is left at the user perusal. An advertisement management system for storage, retrieval, routing, linking, and dissemination of plurality of advertisements and accomplishing associated pecuniary transaction effected thereby, functioning in tandem with the plurality of searching, matching and ecommerce activities within the UHSF system, facilitating posting of plurality advertisements by the plurality of advertisers comprising of plurality of components including:
 1. A HSN controller's advertisement management system
 2. HSN online portal facilitating multi vendor shopping cart
 3. Plurality of advertiser management systems 4. A advertisement routing system
5. Advertisement viewing system
6. HSN customer preference DB
7. HSN Prospective customer DB
8. HSN historical prospective customer DB
9. HSN advertisement and tracking DB
10. One or more sponsored service providers
11. Match making and business logic engine
12. one or more searching Channel Nodes and
13. one or more HSNS wherein each of intended advertiser downloading advertisement wizard and management system and registering with HSN controller and requesting package key therefrom for posting one or more advertisements campaigns at HSN advertisement and tracking database and/or at HSNOP by means of HSN advertise wizard and management system;

wherein the HSN controller creating and managing plurality of the advertises in the advertisements and tracking database, prospective customer and customer preferences databases so as to facilitate advertisement and prospective customer match making, wherein selecting relevant advertisement from the HSN advertisement and tracking database and matched customers therewith from the prospective customer and customer preferences database by means of a match making logic engine; and applying business logic to the each of associated channel nodes, subscribers and advertisers for fees and commission receipts or payments;

and facilitating the advertise viewing to each of such matched adviewer enabling eCommerce operations thereby via multi vendor shopping cart at HSNOP.

In an another aspect the said associated channel nodes for said advertisement are being determined via at least one correspondence relationship of each of CHN including:
    a. CHNs posting, routing, hitting or linking the said advertise
    b. CHNs referring the said prospective customers stored in the URL attached therewith the said advertise
    c. CHNs offering sponsored services for the said advertise and
    d. Prospective customers of the said advertise.

wherein each of correspondingly related CHNs are provided with commissions on performing predetermined activities stipulated therewith by HSN advertisement management system.

HSN Ad management system in the first place receiving the payments for each advertisement posting and later for commissions effected thereby in the further process of routing, linking and viewing of each of the said advertise campaign wherein the receipt of payments from and delivery of commissions to each of correspondingly related CHN is carried out thereby.

For example New York Travel co. are appointed as travel agent for NY travel, were planning for worldwide advertise campaign specific focused on the important cities of the world, devised N no of advertise each for different city. The said travel company being advertiser requesting package key for ad campaign from the HSN Controller, create and post ad via as management system, set daily budget and bid percentage, and preference like languages, locations and other preferences, get KSS support for best target customer ad routing, via browsing and scanning SN directory, some travel services and products can purchase or book or subscribe online via HSNOP, regular analysis and monitoring of ad campaign results, change ad campaign as per ad responses from the respective city, check hits, collections, CTR, etc, HSN prospective customers database and prospective customer database suggest customer and routing adverting to the said customers in their ad viewers via ads web services, advertising comes with answers, publications, search results and presents or view in HSNOP, HSNEM, HSNWS and SSP and ad applications upon selecting the acceptance permission alerts positively, wherein commission goes to respective referrer or supporter. In an alternative the said advertiser searching for the prospective customer in the HSN prospective customer and prospective customer preference DB and sending advertise thereto.

In an another aspect of the present invention each of channel node are proactive entities in the network acting on their own accord and are not restricted to system doing something for them. The greatest limitation of the present Internet communication is users are only can browse the system resources and not the user actually can participate and do something into the said system. In the UHSF system subscribers are offering subscriber support services to peers performing plurality of task as determined to be performed under support function easing the operation of other channel node against some consideration may be paid, free sponsored or barter exchange. The said services are known as subscriber support services (SSS).

For example N no of subscribers registering their SSS to HSN so other users can search and use their services. E.g., user Y having preidentified social network searching for one or more SSS for one or more task accomplished as offered by the said SSS wherein the said user Y selectively outsourcing the task either to private SSS in his own social network and to the public SSS not known to him and bookmark or use direct online available users, user can use SSS for collaborative searching and sharing for particular one or more keyword, establish communication for resolving queries and get answers, inviting for one or more social network and offer other services like, filtering, categorizing, scanning, analysis, mapping, routing, formatting and other supporting services.

Similarly the knowledge function is significantly important aspect of present knowledge invocation system wherein each of human agent performing multiple knowledge support services for plurality of channel nodes, the KSS are generally containing lesser knowledge function, though demanding the systematic approach to the knowledge job.

For example A said manufacturing company having plurality of operations to be conducted simultaneously, wherein engaging various agencies to perform multiple functions. The data collection and organizing the same for ready to use form the said manufacturing company further searching for related human agents offering related KSS services for accomplishment of one or more miscellaneous tasks and negotiating and assigning the said task to such identified KSS service providers therein the product launching process thereof, and monitoring and communicating with the said KSS providers in the workspaces thereof.

BRIEF DESCRIPTION OF THE DRAWINGS

Further aspects of the present invention will become apparent from the following description which is given by way of example only and with reference to the accompanying drawings in which:

For illustrative purposes, some embodiment of the UHSF system software component are described below in which each of specific UHSF embodiments are providing various types of capabilities and functionalities with respect to various types of actions, operations and time of use, using various specific types of user interfaces and other communication and interactions including searching of various databases via said interfaces and various tools embedded exclusively and separately providing those claimed functionalities and capabilities. However those skilled in the art will appreciate that the techniques taught in this invention can be used in a variety of other situations, including services, tools and methods in part or in full in the connected digital media, internet and peer to peer distributed environment, and that the invention is not limited to the exemplary details provided.

FIG. 19 illustrates example of graphical user interface (GUI) for HumanServiceNet Subscriber (HSNS) active Organizer & Message Manager and multiple query formulation tools therefor.

FIG. 20 illustrates example of graphical user interface (GUI) for Subscriber (HSNS) active Journal illustrating multiple entries details therein the said journal.

FIG. 22 illustrates example of graphical user interface (GUI) for HumanServiceNet Human Agent (HSNHA) active Organizer & Answer Manager and multiple query answering tools therefor.

FIG. 23 illustrate example of graphical user interface (GUI) for Human Agent (HSNHA) active Journal illustrating multiple entries details therein the said journal.

FIG. 26 illustrate example of graphical user interface (GUI) for Service Provider (HSNSP) active wizards illustrating each of GUI for each of channel node and HSN controller alongwith the formatting parameters thereof.

FIGS. 27 and 28 illustrate examples of graphical user interface (GUI) for Human Agent (HSNHA) active wizards illustrating each of GUI for each of channel node and HSN controller alongwith the formatting parameters thereof.

FIG. 49 illustrate algorithmic sequences flowchart of each of CHN's Service Package Keys Management displaying multiple package key configuring parameters related to each of subscriber thereof.

FIG. 50 illustrate algorithmic sequences flowchart of each of CHN's product Keys Management displaying multiple product key configuring parameters related to each of subscriber thereof.

FIG. 57 showing graphical user interface (GUI) for binding human services from the UHSF system via web services with the $3^{rd}$ party software and web sites like e-commerce, search engine and other web sites illustrate the required tools therefor.

FIG. 58 shows discrete services which Human Grid can integrate for true universal operation.

FIG. 59 shows a logical segregation of Human Grid in term of multiple Sub-Grids and integration thereof.

DETAILED DESCRIPTION OF THE PREFERRED EMBODIMENTS

Figure 1:
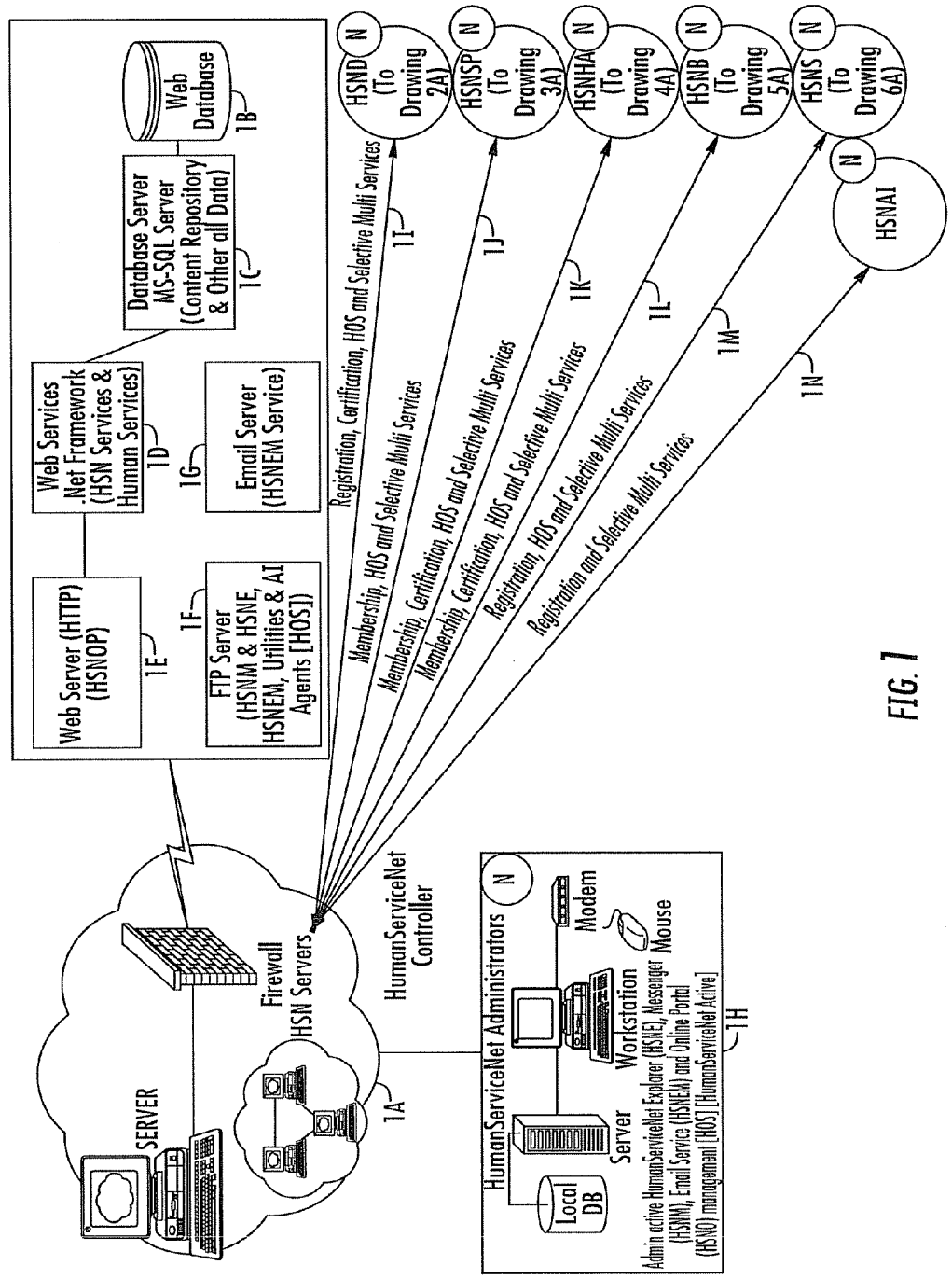
FIG. 1 shows a schematic block diagram of a preferred embodiment of Universal Human Service Framework (UHSF) illustrating structural connection of each operational channel nodes with the HSN controller alongwith the relationship aspects thereof.
Figure 2:
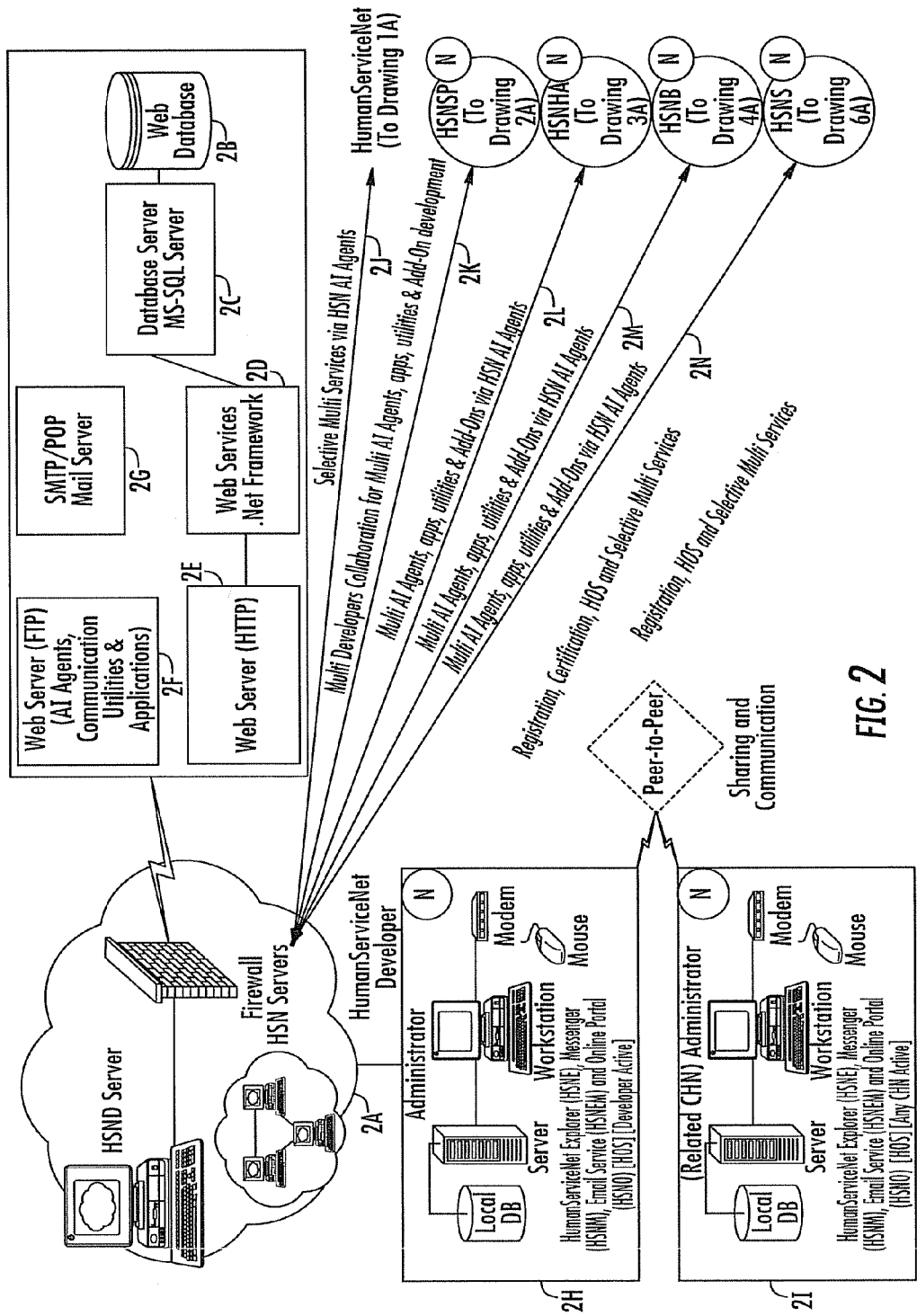
FIG. 2 shows a schematic block diagram of a preferred embodiment of Universal Human Service Framework (UHSF) illustrating structural connection of developer nodes in the peer to peer environment alongwith the relationship aspects thereof with the other channel nodes and HSN controller.
Figure 3:
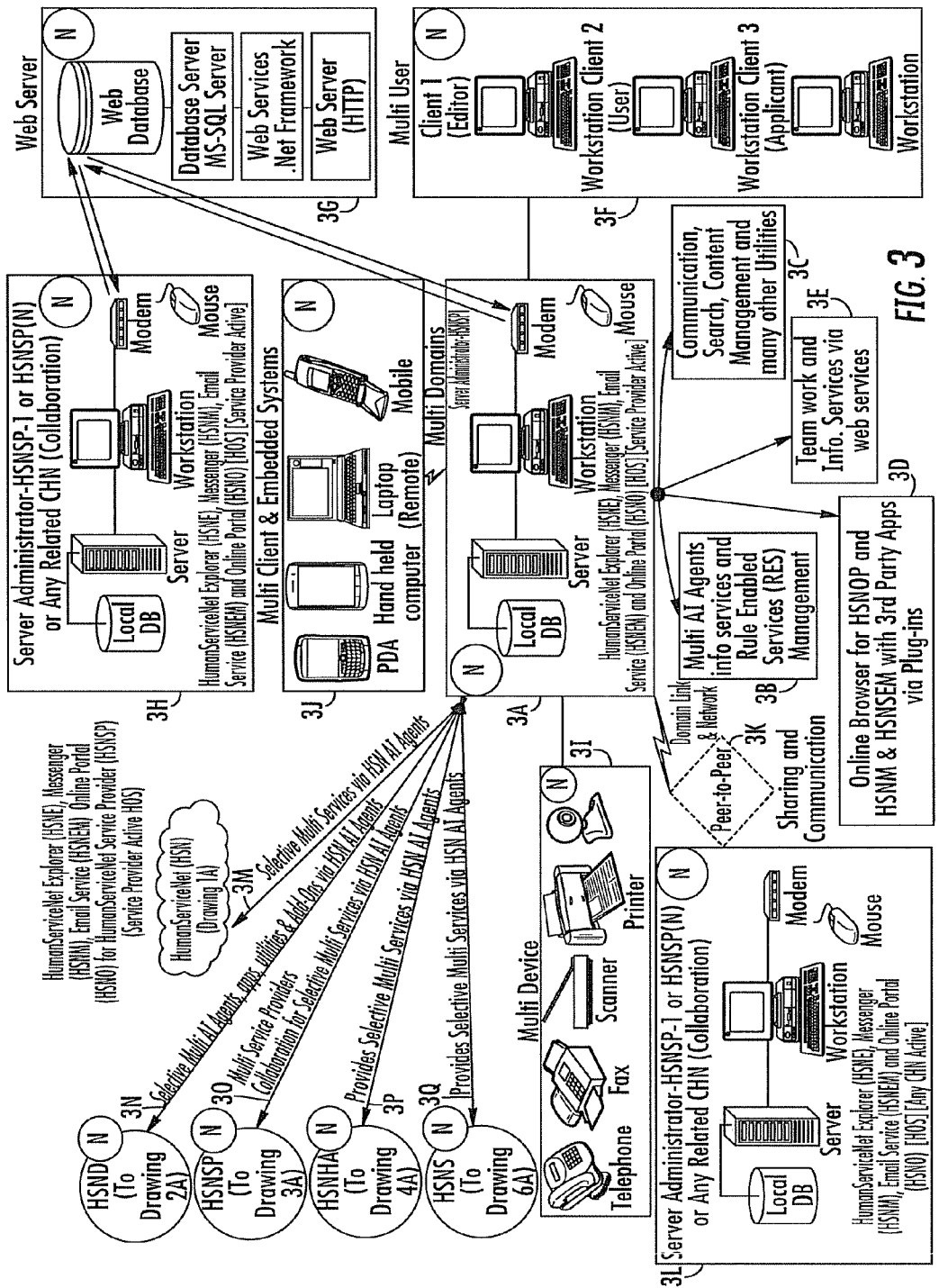
FIG. 3 shows a schematic block diagram of a preferred embodiment of HumanServiceNet Service Provider (HSNSP) illustrating each relational communication modality with other channel nodes therein the UHSF system alongwith possible tools and methodology for service offering thereof.

FIG. 1 illustrate a schematic block diagram of an essential embodiment of the Universal Human Service Framework (UHSF) showing the primary and rudimentary structural connections of the components, describing the provisions for Human service net controller (1A) as a UHSF network controller and regulator of the plurality of operations in the network and is connected with various other plurality of operating components preferably known as channel nodes in the network 1I denoting the developer component, 1J denoting the service provider component, 1K denoting the Human Agent component, 1L denoting the broker component, 1M denoting the subscriber component, and 1N denoting the Artificial intelligent agent component. Furthermore the network connection lines signifying the relationship aspect of the each operational channel nodes with the HSN controller alongwith the relationship aspects thereof. 1B-1E illustrating a typical composition of the HSN controller server wherein HSN controller server (1A) forms a web server containing a cluster of servers and peer to peer coordination & discovery server, for (1B) hosting database, (1C) a MS SQL Server meant for acting as repository to all UHSF system data is communicating via protocol, (1E) a web server operating via HTTP is a means for offering online portal for UHSF activities using business logic which are in the form of web services e.g. (1D) .Net web service and hosts Human Services and other HSN Services in the form of web services. FTP Server (1F) for file and products downloading including but not limited to HSNM, HSNEM, and Applications & AI Agents. HSN E-Mail Server (1G) to provide E-Mail services via SMTP and POP and other E-Mail protocols 1I to 1M shows multiple services and products provided by HumanServiceNet Controller to all other nodes FIG. 2 shows a schematic block diagram of a preferred embodiment of Universal Human Service Framework (UHSF) illustrating structural connection of developer nodes in the peer to peer environment alongwith the relationship aspects thereof with the other channel nodes and HSN controller. 2A-2G illustrating preferred components of present web server so as to establish connection with the various HumanServiceNet Channel nodes and internet framework wherein the network connection lines signifying the relationship aspect of the each operational channel node with the said developer alongwith the relationship aspects thereof. Notably enough each of channel nodes is preidentified with specific functionalities and requirements. The enablement of the said functionalities is requiring various applications and utilities, various developers providing the required applications, utilities, add-ons and AI agents to various channel nodes, the connection lines indicating the transmission of the same by means of product or package key. Wherein (2A) shows a host computer, for HumanServiceNet Developers (HSND), in the form of web server containing a cluster of servers and peer to peer coordination & discovery server, for (2B) hosting database, (2C) MS SQL Server communicate via protocol, (2E) HTTP using business logic which are in the form of web services, (2D) .Net web service for providing related services to the related parties and provide Centralize downloads or upload for modules, demo & like so and its Updates & Upgrades via (2F) FTP web server, communicate to the all related parties, (2J) HumanServiceNet, (2K) HumanServiceNet Developer (HSND), (2L) HumanServiceNet Service Provider (HSNSP), (2M) HumanServiceNet Human Agent (HSNHA), (2N) HumanServiceNet Subscriber (HSNS) & other 3$^{rd}$ parties via (2G) Mail Server and all other required services and (2I) Peer to Peer sharing and communication with all related CHN FIG. 3 shows a schematic block diagram of a preferred embodiment of HumanServiceNet Service Provider (HSNSP) illustrating each relational communication modality with other channel nodes and peer service providers therein the UHSF system wherein the communication tool including HSNM, HSNE, HSNEM, and HSNOP facilitating the communication for service offering thereof, the network connectivity is illustrated in various modes including peer to peer and via web server wherein each of operational modes for multidevice (3I) enablement is represented alongwith multiuser (3F) operation and multiclient usability in the various smart devices (3J) thereof. (3A) illustrates a computer for HumanServiceNet Service Provider (HSNSP) on which (3B) Multi AI Agents and (3C) communication, management & other utilities are installed to provide Domain Server Admin capability to the provider to facilitate Communication using Selective multi AI Agents, applications, utilities & Add-On from selective (3N) HSN Developers, Selective multi Collaboration for Selective Multi Services from (3O) HSN Service Providers, Provides Selective Multi Services to (3P) subscribed HSN Human Agents and Provides Selective Multi Services to (3Q) subscribed HSN Subscribers. (3A) HSNSP could have multiple domains and (3F) Multi User & Admin levels capability, could share & synchronized data, share files and communicate via (3G) web server remotely with (3H) Remote Server and/or with other Domain Server for Collaboration via (3K) peer to peer with (3L) Remote Server and/or with other Domain Server for collaboration or with other (3J) Multiple Client e.g. PDA, Mobile etc (3D) HSNOP or using (3E) $3^{rd}$ parties application, utilities, tools & services and/or share & synchronized data within the modules using connected (3I) Multi Devices for the same.

Figure 4:
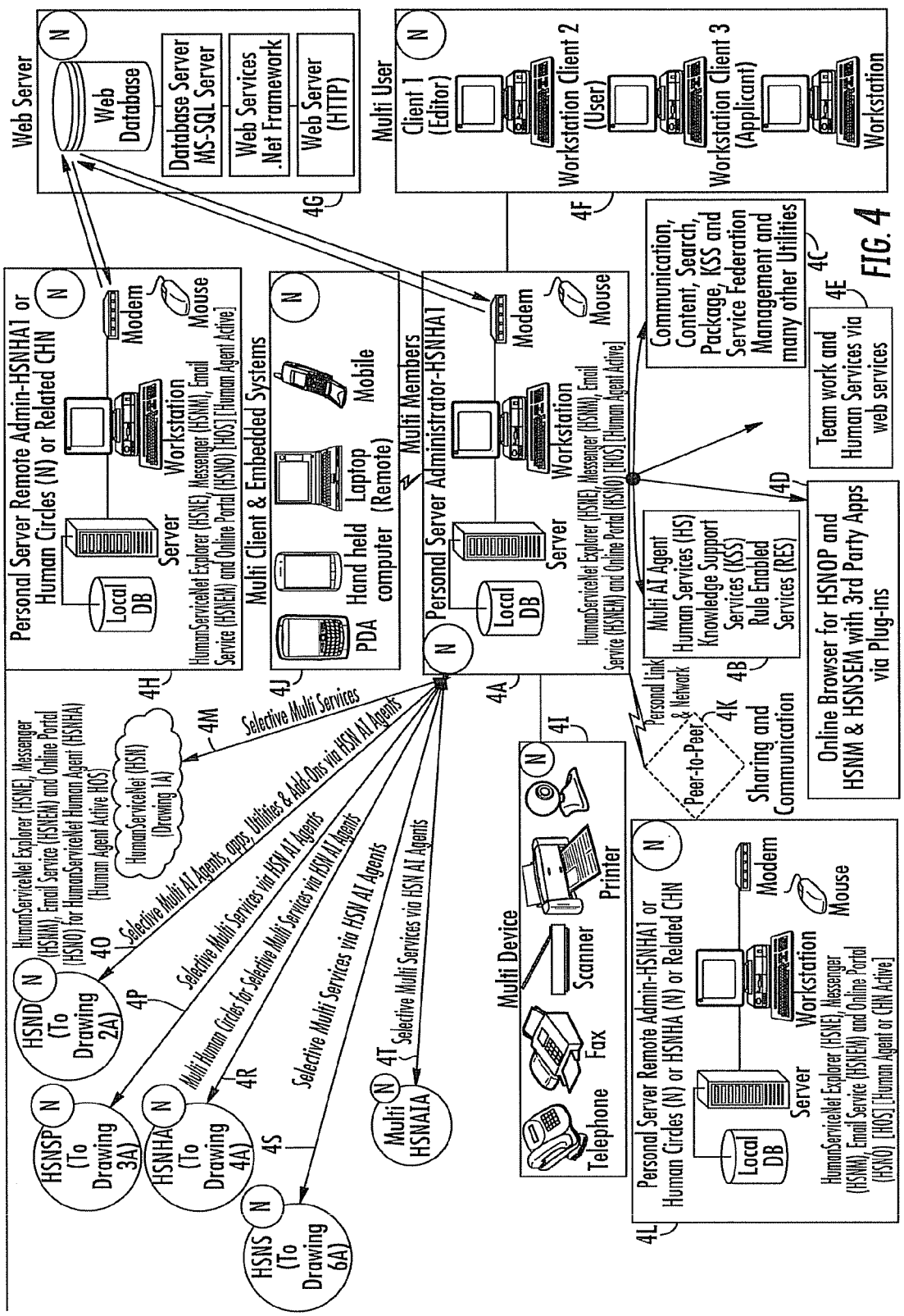
FIG. 4 shows a schematic block diagram of a preferred embodiment of HumanServiceNet Human Agent (HSNHA) illustrating each relational communication modality with other channel nodes therein the UHSF system alongwith possible tools and methodology for service offering thereof.

FIG. 4 shows a schematic block diagram of a preferred embodiment of HumanServiceNet Human Agent (HSNHA) illustrating each relational functional protocol based communication modality with other channel nodes and peer service providers therein the UHSF system wherein the communication tool including HSNM, HSNE, HSNEM, and HSNOP facilitating the communication for service offering thereof, the network connectivity is illustrated in various modes including peer to peer and via web server wherein each of operational modes for multidevice (4I) enablement is represented alongwith multiuser (4F) operation and multiclient usability in the various smart devices (4J) thereof. (4A) illustrates a computer for HumanServiceNet Human Agent (HSNHA) on which (4B) Multi AI Agents and (4C) communication, various management & other utilities are installed to provide Domain Server Admin capability to the Human Agent to facilitate Communication using Selective multi AI Agents, applications, utilities & Add-On from selective (4O) HSN Developers, Selective multi Collaboration for Selective Multi Services from (4Q) Human Agents, Provides Selective Multi Services to (4P) subscribed HSN service providers and Provides Selective Multi Services to (4S) subscribed HSN Subscribers and (4R) Brokers. (4A) HSNHA could have multiple domains and (4F) Multi User & Admin levels capability, could share & synchronized data, share files and communicate via (4G) web server or via (4K) peer to peer connectivity remotely with (4H) and (4L) Remote Server and/or with other Domain Server for Collaboration or with other (4J) Multiple Client e.g. PDA, Mobile etc via (4D) HSNOP or using (4E) $3^{rd}$ party application, utilities, tools & services and/or share & synchronized data within the modules using connected (4I) Multi Devices for the same.

Figure 5:
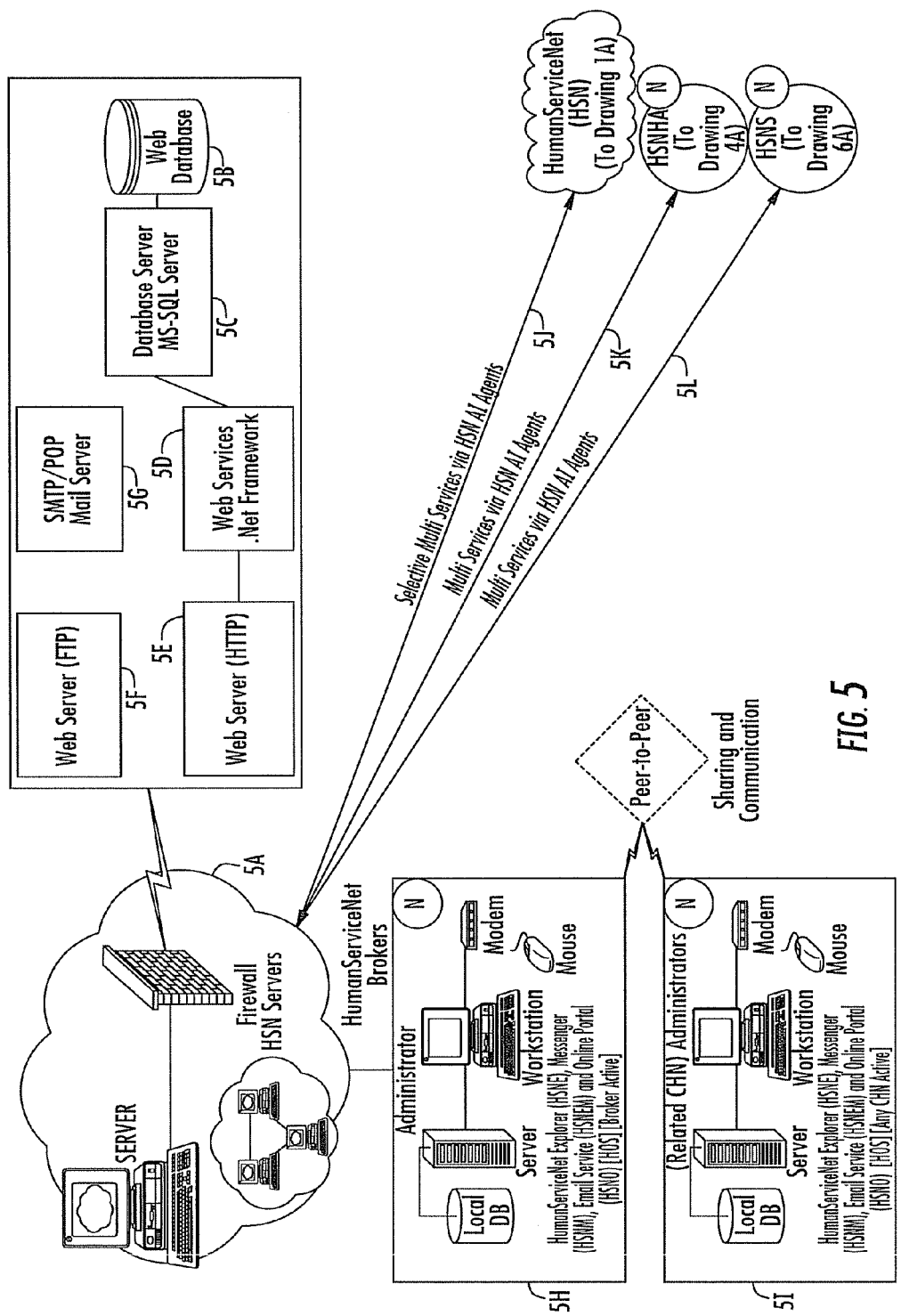
FIG. 5 shows a schematic block diagram of a preferred embodiment of HumanServiceNet Broker (HSNB) illustrating relational engagement and communication modality thereof with multiple subscriber and multiple Human Agent nodes therein the UHSF system.

FIG. 5 illustrates a schematic block diagram of a preferred embodiment of HumanServiceNet Brokers (HSNB) protocol based relationship and communication modality via peer to peer and web server wherein 5A, a broker's host computer characterizing the general computing aspects of the broker and communication channel of the said broker with the various component of a typical web server comprising a cluster of servers and peer to peer coordination & discovery server, (5B) hosting database, (5C) MS SQL Server communicate via protocol, (5E) HTTP using business logic which are in the form of web services, (5D) .Net web service for providing related services to the related parties and provide Centralize downloads or upload for modules, demo & like so and its Updates & Upgrades via (5F) FTP web server, communicate to the all related parties i.e. (5I) HumanServiceNet, (5J) HumanServiceNet Human Agent (HSNHA), (5K) HumanServiceNet Subscriber (HSNS) & other $3^{rd}$ parties via (5G) Mail Server and all other required services. Each of broker channel node the UHSF system by default protocol communicating with various human agents and subscribers. The broker is meant for facilitation of services of the said human agents to the appropriately matched subscribers wherein each of brokers analyzing and categorizing various services of various human agents so as to provide cost effective and reliable services sources to various subscribers and receiving the predefined or preagreed uni-way or bi-way commission in the said service subscription transaction via same intermediate link of communication between human agent and the subscriber.

Figure 6:
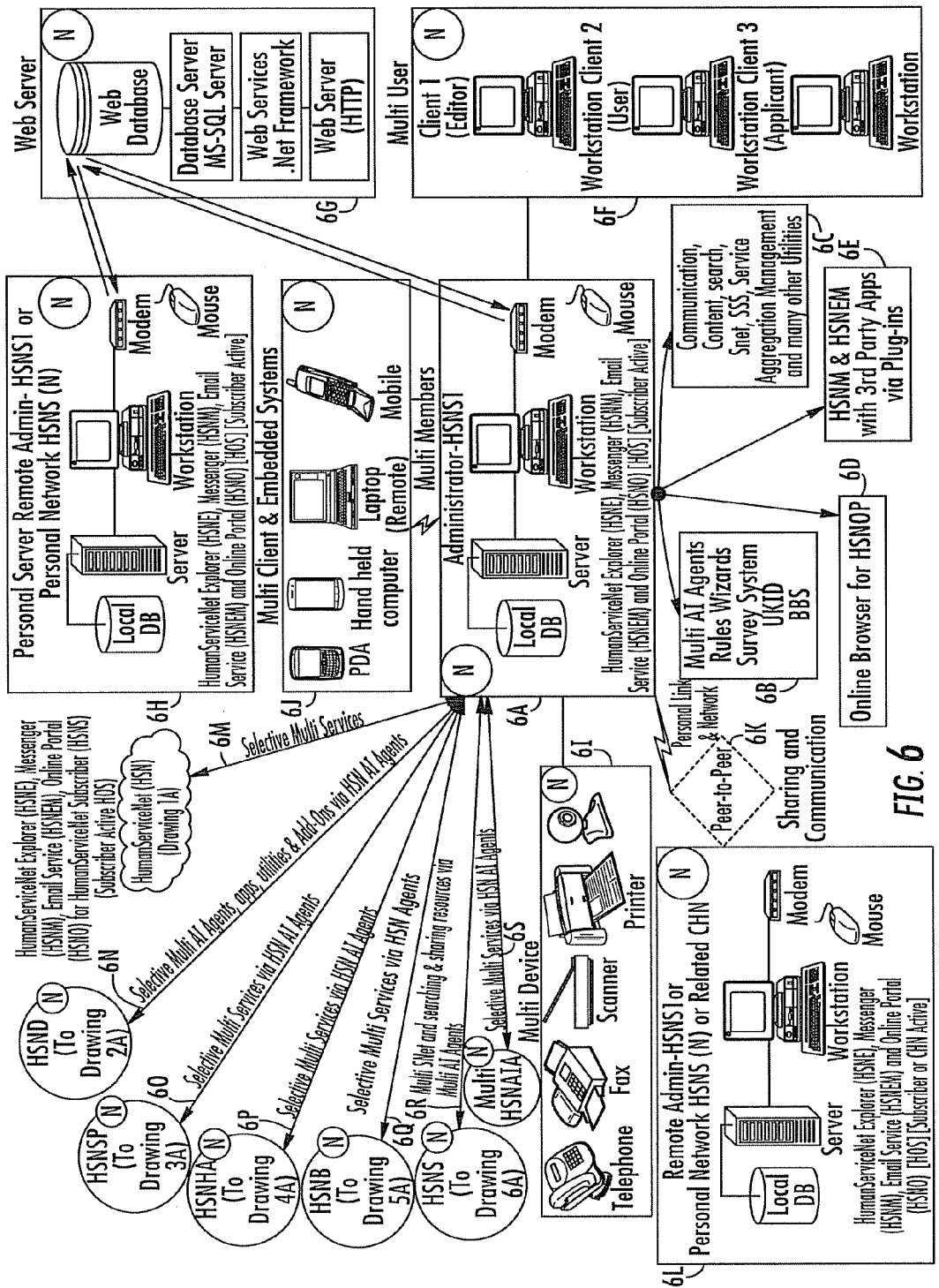
FIG. 6 shows a schematic block diagram of a preferred embodiment of HumanServiceNet subscriber (HSNS) illustrating each relational communication modality with other channel nodes therein the UHSF system alongwith possible tools and methodology for service offering.

As the UHSF system is primarily meant for providing value added knowledge invocation and support services to each of service subscriber. Each of subscribers is essentially connected with every service and product procurement sources as illustrated in the FIG. 6 showing functional protocol based relationships of HumanServiceNet Subscriber (HSNS) with all HumanServiceNet channel nodes and various communication tools including HSNM & HSNE, HSNEM and HSNOP so as to establish said communication links. The host computer (6A) Subscriber (HSNS) is being installed with HSNM & HSNE, (6B) Multi AI Agents and (6C) communication, management & other utilities providing Admin capability to the subscriber to facilitate communication using selective Multi Services from (6M) HSN, Selective Multi AI Agents, applications, utilities & Add-On from selective (6O) HSN Developers, Selective Multi Services from Selective multi (6P) Human Agents, Selective Multi Services from Selective (6Q) Brokers and Selective Multi Resources from Selective (6R) Subscribers of Personal Networks, using (6J) Multi client e.g. PDA, Mobile etc, (6D) HSNOP or using (6E) $3^{rd}$ parties application, utilities, tools & services as well as to create (6L) Personal Network. (6A) illustrates a computer for HumanServiceNet Subscriber (HSNS), could have multiple members and (6F) Multi User & Admin levels capability, could share & synchronized data, share files and communicate via (6G) web server remotely with (6H) Remote Server and/or via (6K) peer to peer with (6L) Remote Server or with other members and/or share & synchronized data within the modules and use connected (6I) Multi Devices for the same.

Figure 7:
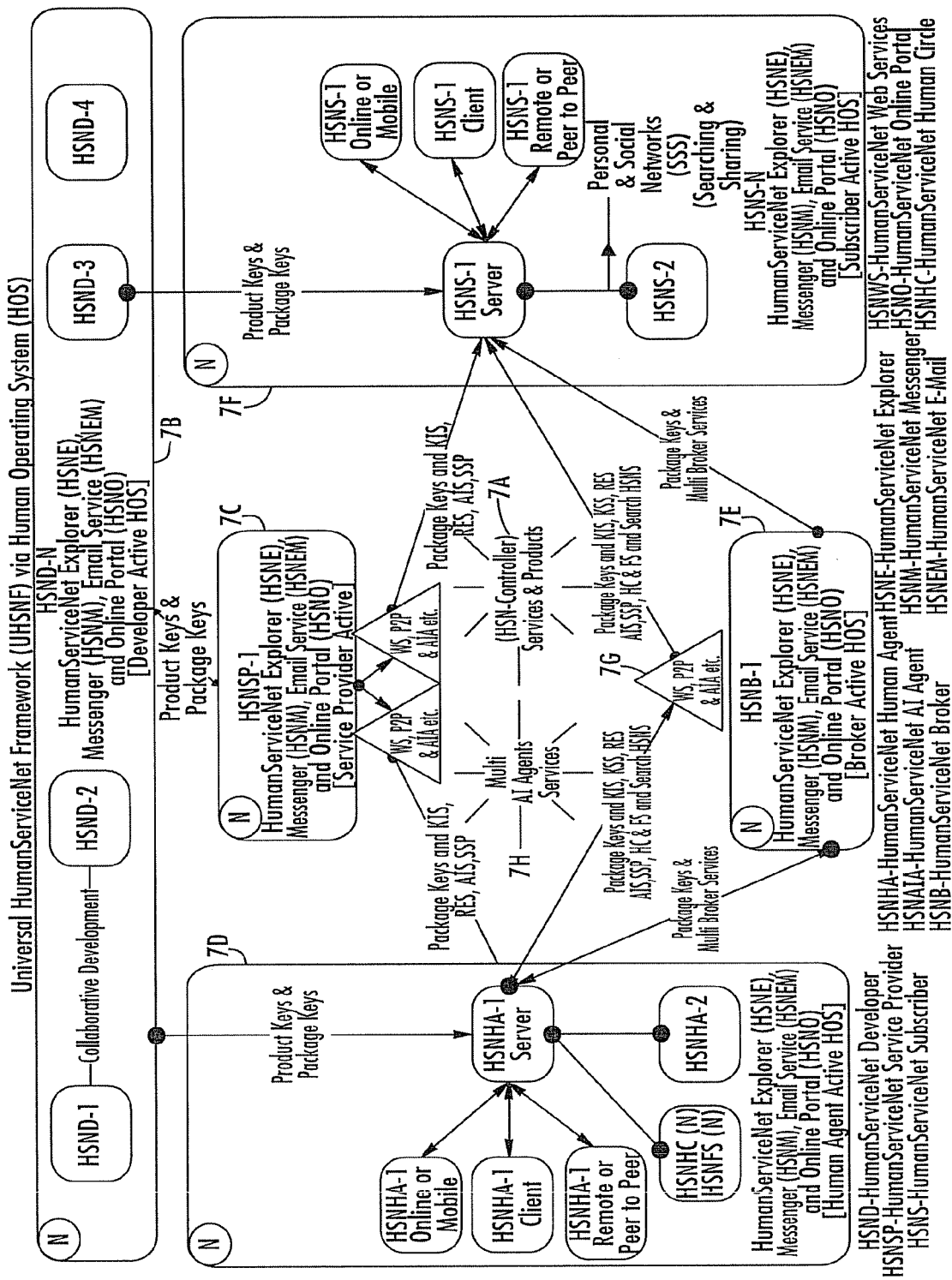
FIG. 7 shows a logical block diagram of HumanServiceNet Framework illustrating each of the relational engagement of each of the channel node alongwith communication and service or product offering inter-engagements thereof in the inter-channel and intra-channel mode of operandi.

In the UHSF system framework each of channel node communicate and transact with other channel node via predefined protocols wherein the knowledge communication being facilitated by means of various tools wherein FIG. 7 illustrates a logical block diagram of Universal Human Service Framework (UHSF) characterizing each of protocol based transaction amongst all the channel nodes illustrating interrelation map of all the channel nodes. The HSN Controller (7A) being connected via segmented lines to each of channel nodes offering various regulatory services and functional products including HumanServiceNet Messenger (HSNM) & HumanServiceNet Explorer (HSNE), HumanServiceNet E-Mail (HSNEM) and HumanServiceNet Online Portal (HSNOP) to each of channel nodes possessing active rights therefore, wherein the active rights are determined by means of product or package key issued by HSN controller in respect of the said channel node. Each of Developers (HSND) collaborating, and issuing product or package key to human agents, subscribers and providers with respect to product request therefrom and developing Multi AI Agents, Applications and Utilities & Add-On independently or collaboratively upon receiving license from HSN Controller, wherein each of subscriber mainly utilizing the human knowledge services from various human agents (7D) or from the brokers (7E) and from various service providers (7C) thereof by means of package key via various transmission modalities including peer to peer, or via web service or via web services or via AI agents. The subscribers are forming various personal as well as social networks and using the same via multi-client or multidevices enablement. Service providers (HSNOP) providing rule enabled services (RES), AI enabled services (AIS) and sponsored support services (SSP) to each of requesting human agents and subscribers and (7E) Broker (HSNB) offering intermediary services facilitation services via Package Key. (7F) Subscriber (HSNS) node alternatively can work in standalone or have client-server methodology and link with other client like online or mobile to exchange & Share data or link peer to peer to share files and share & synchronized data, communication remotely or with other members with restricted permission by exploiting the existing communication standards and modalities, however utilizing the service subscription management including rights and privileges administration.

In a methodological embodiment of HumanServiceNet, illustration 8 through 10 represents the organizational framework and control & management utilities for continues regulation & governance by each entity as per importance and functionalities attached therewith.

Figure 8:
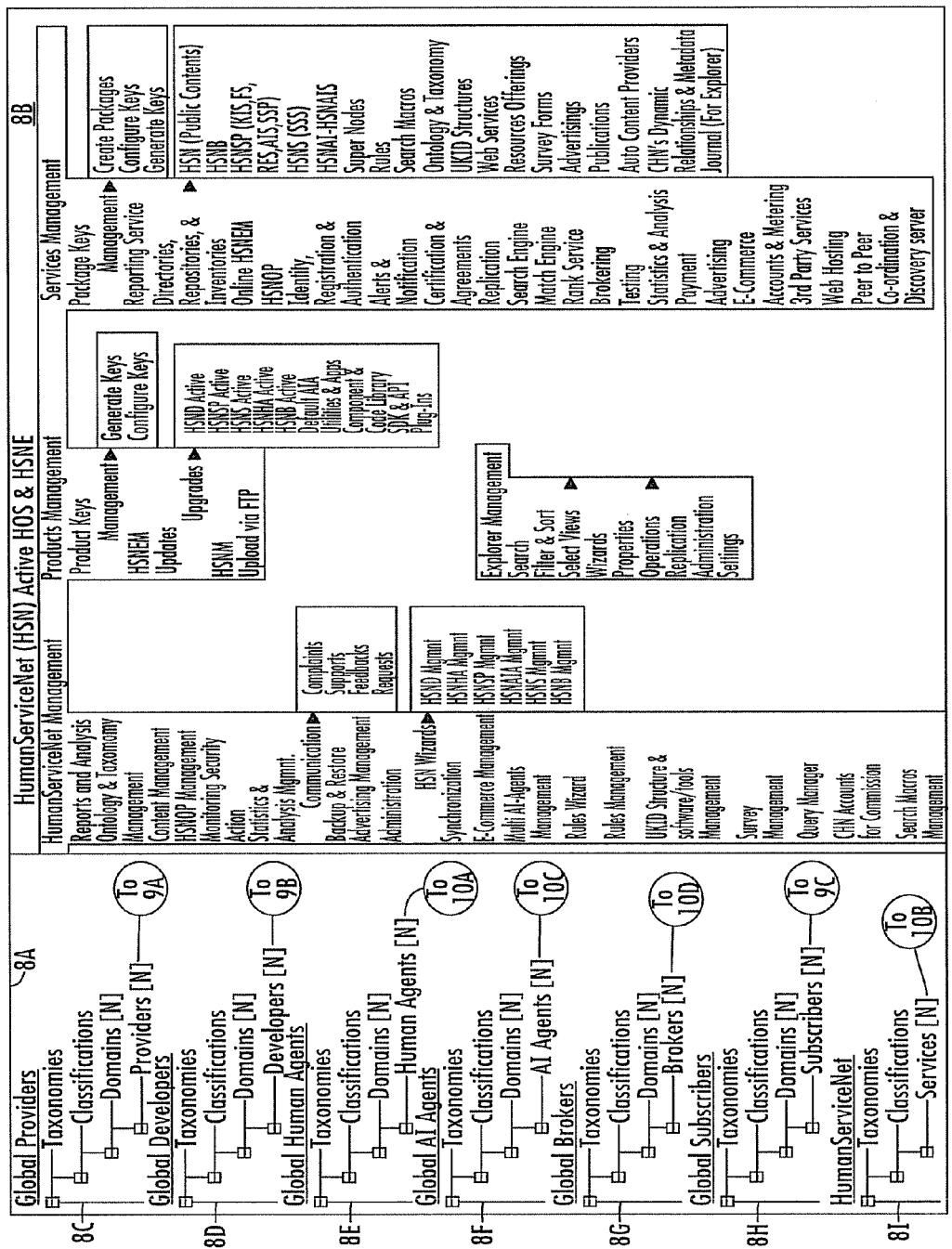
FIG. 8 shows a logical connection diagram of HumanServiceNet (HSN) active HumanServiceNet Explorer (HSNE) illustrating collapsible tree representing each of channel node wise segregation of control and management information and multiple tools employed therefor.

FIG. 8 shows a logical connection diagram of HumanServiceNet (HSN) active HumanServiceNet Explorer (HSNE) illustrating collapsible tree representing each of channel node wise segregation of control and management information and multiple tools employed therefor wherein 8C-8I showing the data arrangement of each of channel node in the HSN controller's explorer. The said explorer is meant for management of each of data related to each of channel node alongwith the repositories for various administrative data. The functional aspect of each of channel node is managed via various management utilities, product management, and service management. The functional utilities illustrated herein are examples of the interface of the explorer not essentially covering the said functions and not excluding the other which are not represented herein. The various management functions includes Reports and Analysis, Ontology & Taxonomy Management, Content Management, HSNOP Management, Monitoring, Security, Action, Statistics & Analysis Management, Communication (Complaints, Supports, Feedbacks, Requests), Backup & Restore, Advertising Management, Administration, HSN Wizards (HSND Management, HSNHA Management, HSNSP Management, HSNAIA Management, HSNS Management, HSNB Management), Synchronization, E-Commerce Management, Multi AI Agents Management, Rules Wizard, Rules Management, UKID Structure & software/tools Management, Survey Management, Query Manager, CHN Accounts for Commission and Settings, each of function facilitating HSN controller management of various essential functions. Likewise the product management utilities facilitating generation, configuration of product keys for various products, upgrades, updates and uploading of the same via FTP module. In the service management utilities facilitating package key configuration, generation and maintaining various repositories and comprising various preservice and postservice related miscellaneous function management modules including Reporting Service, Directories, Repositories & Inventories (HSN (Public Contents), HSND, HSNHA (KIS, KSS, HC, FS, RES, AIS, SSP), HSNB, HSNSP (KIS, FS, RES, AIS, SSP), HSNS (SSS), HSNAI-HSNAIS, Super Nodes, Rules, Ontology & Taxonomy, UKID Structures, Web Services, Resources Offerings, Survey Forms, Advertisings, Publications, Auto Content Providers, CHN's Dynamic Relationships & Metadata Journal (For Explorer), Online HSNEM, HSNOP, Identity, Registration & Authentication, Alerts & Notification, Certification & Agreements, Replication, Search Engine, Match Engine, Rank Service, Brokering, Testing, Statistics & Analysis, Payment, Advertising, E-Commerce, Accounts & Metering, 3rd Party Services, Web Hosting, and Peer to Peer Co-ordination & Discovery server wherein each of the said functions are performed via the software modules thereof and are integrated for combine relational data management having checks and permissions and event actuation of the said data-contents.

Figure 9:
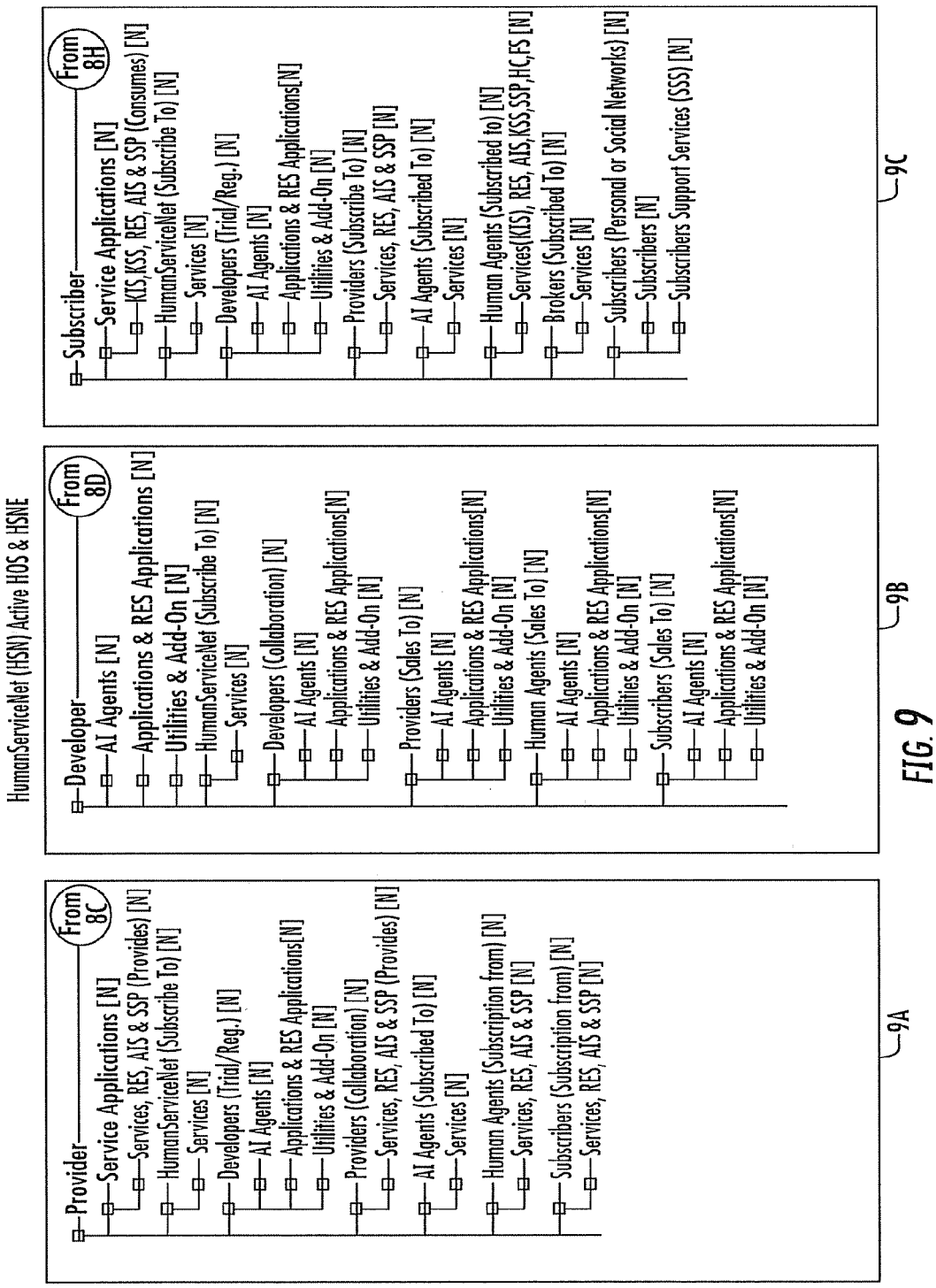
FIG. 9 shows a logical connection diagram of extended view of FIG. 8.
Figure 10:
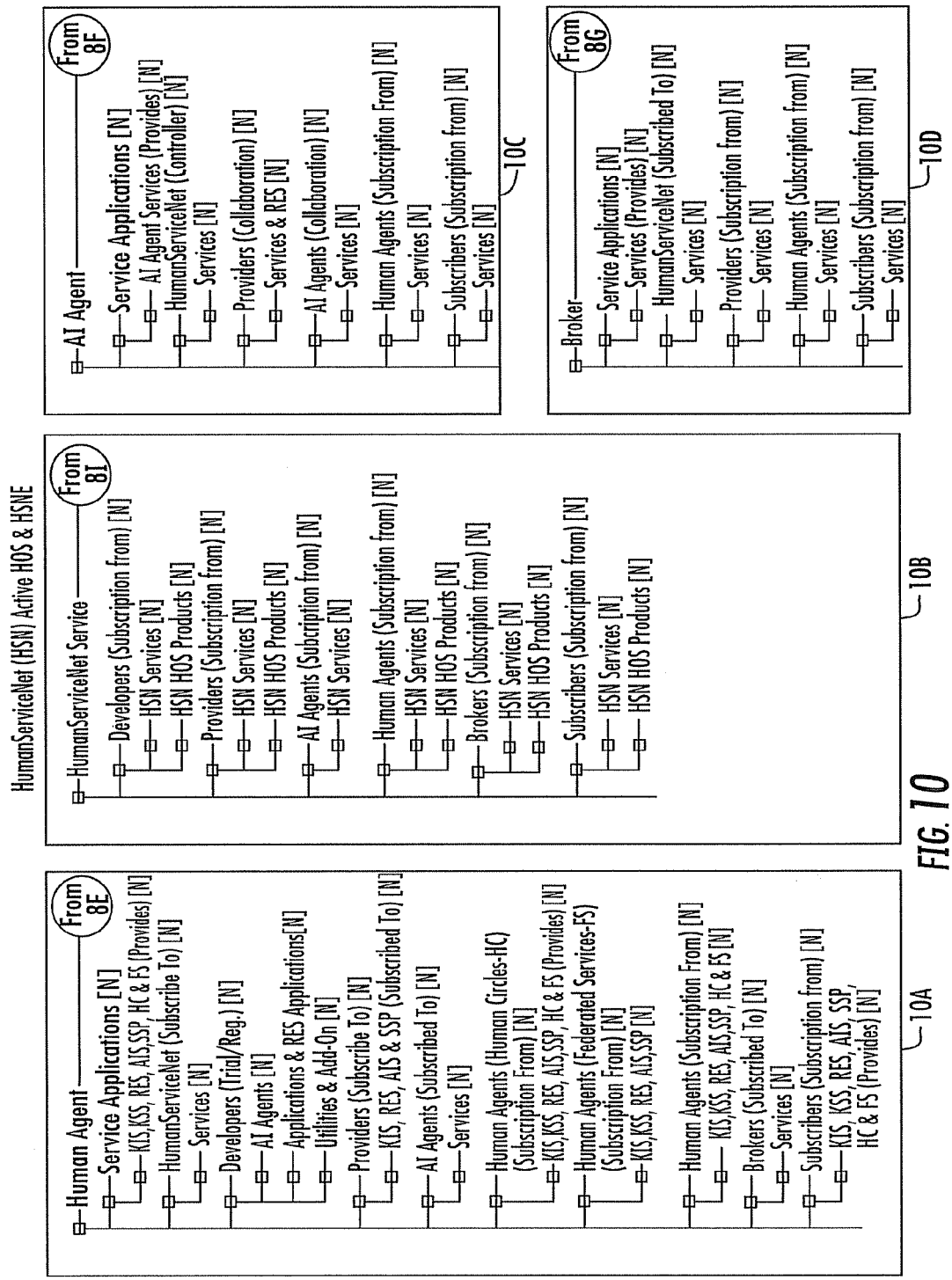
FIG. 10 shows a logical connection diagram of extended view of FIG. 8.

The explorer pane at the left side of the interface is being managed via Explorer Management utilities wherein facilitating searching, filtering, sorting, Selecting Views, Replicating, Administering, and showing properties of respective channel node details FIGS. 9 and 10 showing the extended view of FIG. 8 illustrating events and historical data related attributes referring to each of channel node as represented by 8C to 8I.

(8I) illustrates the HumanServiceNet Explorer (HSNE) part of HumanServiceNet Client Software preferably HumanServiceNet Messenger (HSNM) (HumanServiceNet Active) which lists the in-depth details related to the HumanServiceNet Services and related channel node subscribers i.e. HumanServiceNet Developer (HSND), HumanServiceNet Service Provider (HSNSP), HumanServiceNet AI Agent (HSNAIA), HumanServiceNet Human Agent (HSNHA), HumanServiceNet Broker (HSNB), HumanServiceNet Subscriber (HSNS).

(8C) illustrates the HumanServiceNet Explorer (HSNE) part of HumanServiceNet Client Software preferably HumanServiceNet Messenger (HSNM) (HumanServiceNet Active) which lists the in-depth details related to the HumanServiceNet Service Provider (HSNSP) that show the list of providers & its details in tree format the same be devised so that each higher attribute encircles the following one in a concentric encircled map. The explorer tree represents classification as per dynamic taxonomy management preferably Fields followed by Location followed by Providers (Domains). The explorer tree show (9A) a) details of specific HumanServiceNet Service Provider (HSNSP) services, b) details of HumanServiceNet services used by specific HumanServiceNet Service Provider (HSNSP) c) details of Developers from whom Multi AI Agents, Applications, Utilities & Add-On purchased by a specific HumanServiceNet Service Provider (HSNSP), d) details of collaboration with other HumanServiceNet Service Providers (HSNSP), e) details of HumanServiceNet AI Agents (HSNAIA), HumanServiceNet Human Agents (HSNHA) & HumanServiceNet Subscribers (HSNS) subscribed for services.

(8D) illustrates the HumanServiceNet Explorer (HSNE) aspect of HumanServiceNet Messenger (HSNM) (HumanServiceNet Active) which list the in depth details related to the HumanServiceNet Developers (HSND) which show the list of developers & its details in tree format the same being devised so that each higher attribute encircles the following one in a concentric encircled map. The explorer tree represents classification as per dynamic taxonomy management preferably Fields followed by Location followed by Domains followed by Developers. The explorer tree show (9B) a) details of HumanServiceNet Multi AI Agents, Applications, Utilities & Add-On developed by a specific developer, b) list and details of developers for collaborative development for AI Agents, Applications, Utilities & Add-On c) details of HumanServiceNet Service Provider (HSNSP), HumanServiceNet Human Agent (HSNHA), HumanServiceNet Subscriber (HSNS) to whom HumanServiceNet Multi AI Agents, Applications, Utilities & Add-On sold by a specific developer.

(8E) illustrates the HumanServiceNet Explorer (HSNE) aspect of HumanServiceNet Messenger (HSNM) (Human- ServiceNet Human Agent (HSNHA) Active) which list the in depth details related to the HumanServiceNet Human Agent (HSNHA) which show the list of HumanServiceNet Human Agent (HSNHA) & its details in tree format the same being devised so that each higher attribute encircles the following one in a concentric encircled map. The explorer tree represents classification as per dynamic taxonomy management preferably Fields followed by Location followed by HumanServiceNet Human Agent (HSNHA). The explorer tree show (10A) a) details of all services provide by specific HumanServiceNet Human Agent (HSNHA), b) details of HumanServiceNet services used by specific HumanServiceNet Human Agent (HSNHA), c) details of Developers from whom Multi AI Agents, Applications, Utilities & Add-On purchased by a specific HumanServiceNet Human Agent (HSNHA), d) details of restricted Human Circles (HC) with other HumanServiceNet Human Agent (HSNHA), e) details of multi service provided by specific HumanServiceNet Human Agent (HSNHA) to HumanServiceNet Subscribers (HSNS), f) details of HumanServiceNet AI Agents (HSNAIA), HumanServiceNet Brokers (HSNB) and HumanServiceNet Service Provider (HSNSP) services subscribed by specific HumanServiceNet Human Agent (HSNHA).

(8H) illustrates the HumanServiceNet Explorer (HSNE) aspect of HumanServiceNet Messenger (HSNM) (HumanServiceNet Subscriber (HSNS) Active) which list the in depth details related to the HumanServiceNet Subscriber (HSNS) which show the list of HumanServiceNet Subscribers (HSNS) & its details in tree format the same being devised so that each higher attribute encircles the following one in a concentric encircled map. The explorer tree represents classification as per dynamic taxonomy management preferably Fields followed by Location followed by HumanServiceNet Subscribers (HSNS). The explorer tree show (9C) a) details of all services subscribed by specific HumanServiceNet Subscriber (HSNS), b) details of HumanServiceNet services used by specific HumanServiceNet Subscriber (HSNS), c) details of Developers from whom Multi AI Agents, Applications, Utilities & Add-On purchased by a specific HumanServiceNet Subscriber (HSNS), d) details of restricted personal networks with other HumanServiceNet Subscribers (HSNS), e) details of HumanServiceNet AI Agents (HSNAIA), HumanServiceNet Human Agents (HSNHA) and HumanServiceNet Service Provider (HSNSP) services subscribed by specific HumanServiceNet Subscribers (HSNS).

Figure 11:
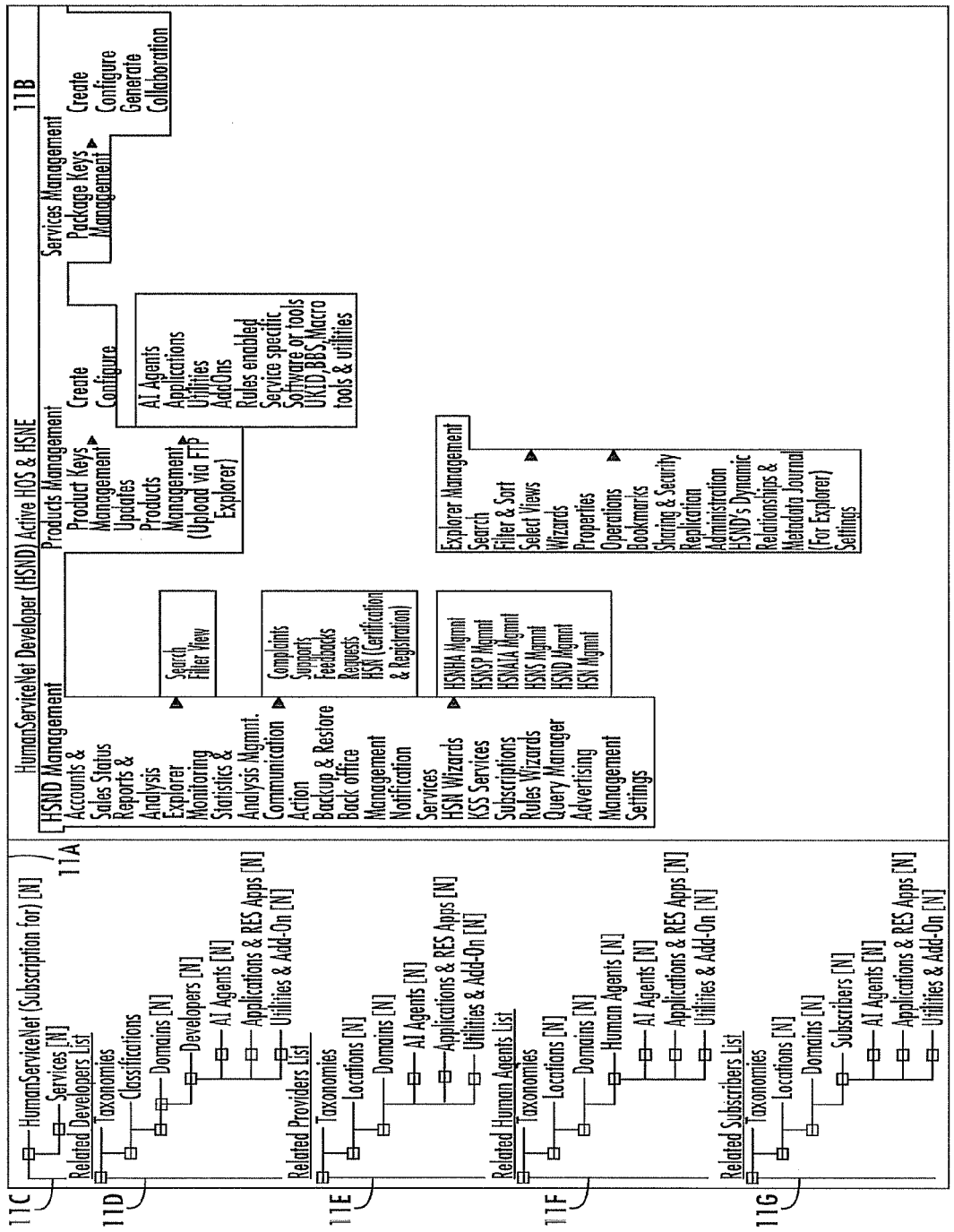
FIG. 11 shows a logical connection diagram of Developer (HSND) active HumanServiceNet Explorer (HSNE) illustrating collapsible tree representing each of channel node wise segregation of management information and multiple tools employed therefor.

FIG. 11 shows a logical connection diagram of Developer active Explorer (HSNE) illustrating collapsible tree representing each of related channel node wise segregation of control and management information and multiple tools employed therefor. (11A) illustrates the developer active explorer representing a tree structure containing information pointers and shortcut link to the related developers, providers, human agents, subscribers & $3^{rd}$ parties, the explorer tree shows the purchase details of service modules of the said developer by various service provider, subscribers and human agents and the developers with whom Service Modules, Attached Utilities, Other Utilities and Application are develop collaboratively, wherein 11C-11G showing the data arrangement of each of channel node. The explorer being a means for exploring the prearranged information related to each of related channel node wherein each of developer performing the product and customer management by means of various tools provided for Accounts & Sales Status generation, Reports and Analysis generation, Explorer customization by Filtering and searching, Statistics & Analysis Management, Communication for handling Complaints, Supports, Feedbacks, Requests, HSN (Certification & Registration), performing Backup & Restore operations, Notification generation, Wizards for handling various channel nodes and formulating rules, KSS management, Query Manager and Advertising Management. Each of developer being provided with the Products Management utilities for generating, Configuring and updating the product keys and for uploading the said products via FTP module. Adjunctively each of developer providing the product subscriptions via HSNOP on predefined usage basis and by means of creating & configure package keys.

Data management being one of the significant function of the explorer, various tools for customization and for manipulating the explorer are provided therein the utilities sections facilitating searching, Filtering & Sorting, views determination, wizards execution, bookmarking, sharing and security determination, and replication of each of element in the explorer tree.

Figure 12:
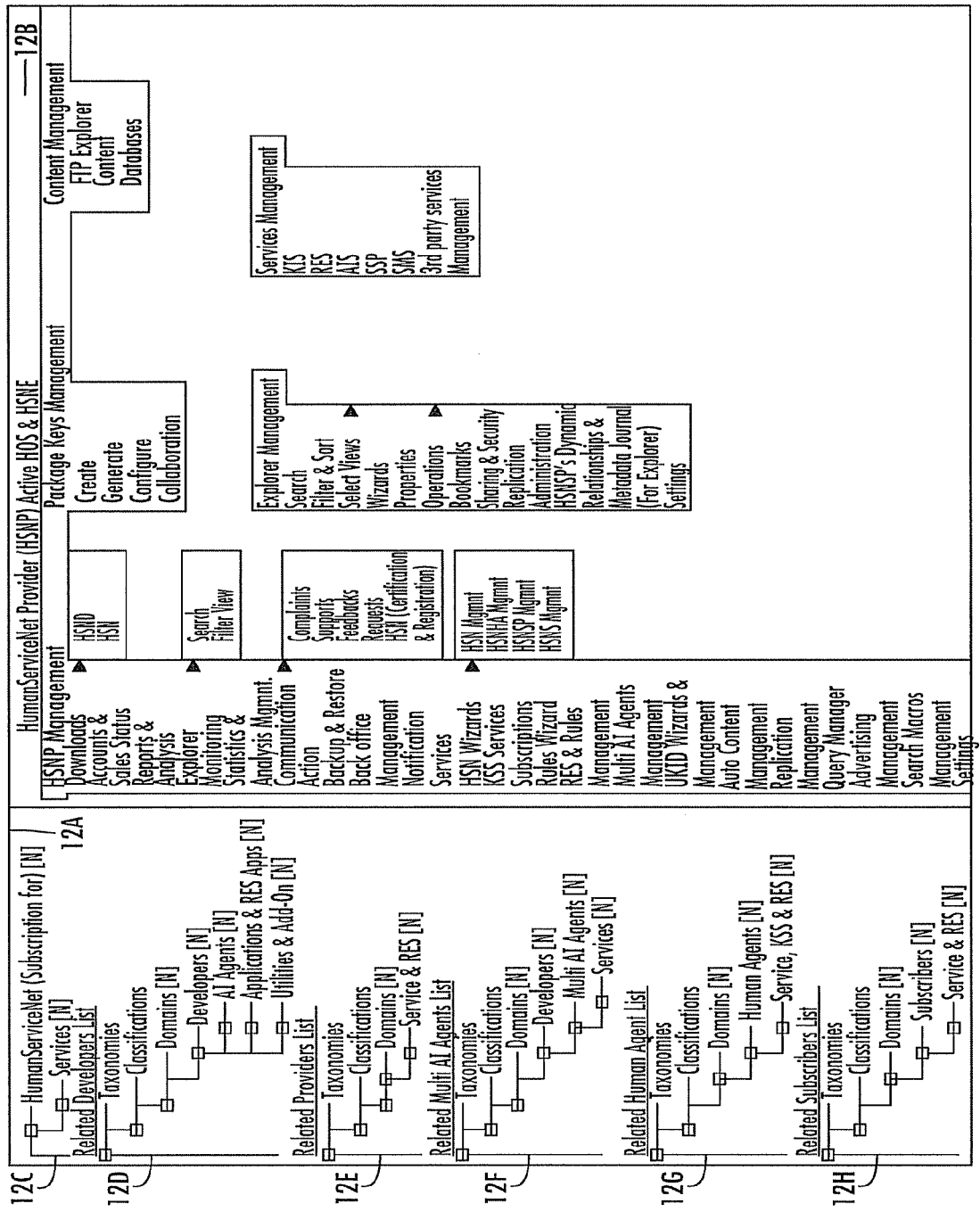
FIG. 12 shows a logical connection diagram of Service Provider (HSNSP) active HumanServiceNet Explorer (HSNE) illustrating collapsible tree representing each of channel node wise segregation of control and management information and multiple tools employed therefor.

FIG. 12 shows a logical connection diagram of provider active Explorer (HSNE) illustrating collapsible tree representing each of related channel node wise segregation of control and management information and multiple tools employed therefor. (12A) illustrates the provider active explorer representing a tree structure containing information pointers and shortcut links to the related developers, providers, human agents, subscribers & $3^{rd}$ parties, the explorer tree shows the subscription details of various services of the said provider by various service provider, subscribers and human agents and the developers, wherein 12C-12H showing the data arrangement of each of channel node. product and customer management by means of various tools provided for Accounts & Sales Status generation, Reports and Analysis generation, Explorer customization by Filtering and searching, Statistics & Analysis Management, Communication for handling Complaints, Supports, Feedbacks, Requests, HSN (Certification & Registration), performing Backup & Restore operations, Notification generation, Wizards for handling various channel nodes and formulating rules via rules wizards, KSS management, UKID wizard management, search macro management, Query Manager and Advertising Management. Each of provider being provided with the information storage and management utilities are generating, configuring and updating the package keys. Various tools for customization and for manipulating the explorer are provided therein the utilities sections for explorer management facilitating searching, Filtering & Sorting, views determination, wizards execution, bookmarking, sharing and security determination, and replication of each of element in the explorer tree.

Figure 13:
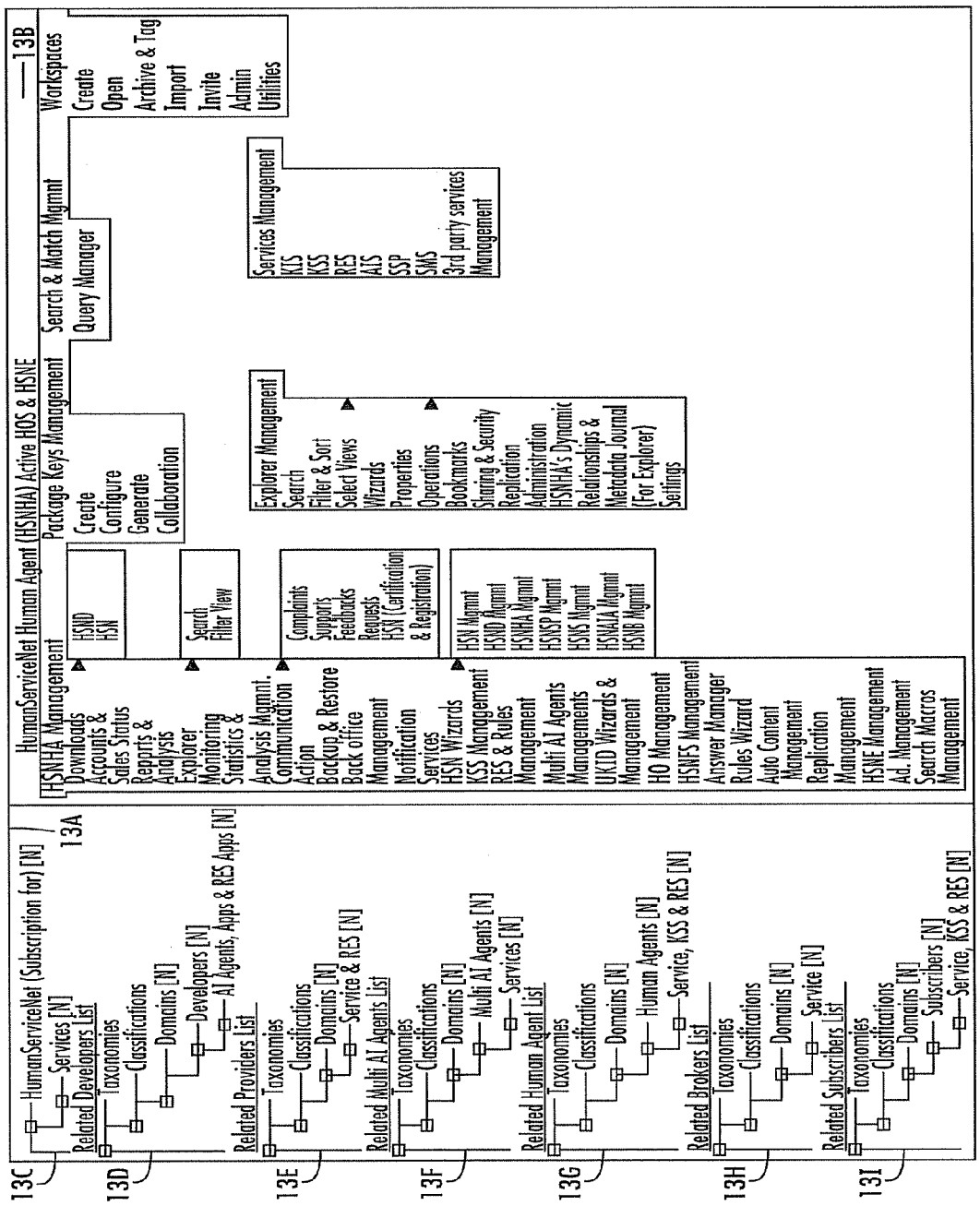
FIG. 13 shows a logical connection diagram of Human Agent (HSNHA) active HumanServiceNet Explorer (HSNE) illustrating collapsible tree representing each of channel node wise segregation of control and management information and multiple tools employed therefor.

FIG. 13 shows a logical connection diagram of human agent active Explorer (HSNE) illustrating collapsible tree representing each of related channel node wise segregation of control and management information and multiple tools employed therefor. (13A) illustrates the human agent active explorer representing a tree structure containing information pointers and shortcut links to the related developers, providers, human agents, subscribers & $3^{rd}$ parties, the explorer tree shows the subscription details of various services of the said human agent by various service provider, subscribers and human agents and the developers, wherein 13C-13I showing the data arrangement of each of channel node product and customer management by means of various tools provided for Accounts & Sales Status generation, Reports and Analysis generation, Explorer customization by Filtering and searching, Statistics & Analysis Management, Communication for handling Complaints, Supports, Feedbacks, Requests, HSN (Certification & Registration), performing Backup & Restore operations, Notification generation, Wizards for handling various channel nodes and formulating rules via rules wizards, KSS management, UKID wizard management, search macro management, HC management, answer Manager, replication management and Advertising Management. Each of provider being provided with the information storage and management utilities are generating, configuring and updating the package keys. Various tools for customization and for manipulating the explorer are provided therein the utilities sections for explorer management facilitating searching, Filtering & Sorting, views determination, wizards execution, bookmarking, sharing and security determination, and replication of each of element in the explorer tree, wherein each of human agent initially downloading the requisite communication and software utilities from the HSN controller and developers and providing knowledge services by means of answer manager having provided with the workspaces creation and modification tools for project management. The knowledge services and knowledge support services are being offered via package keys wherein each of human agents creating, configuring various package keys.

Figure 14:
FIG. 14 shows a logical connection diagram of Subscriber (HSNS) active HumanServiceNet Explorer (HSNE) illustrating collapsible tree representing each of channel node wise segregation of control and management information and multiple tools employed therefor.

FIG. 14 shows a logical connection diagram of subscriber active Explorer (HSNE) illustrating collapsible tree representing each of related channel node wise segregation of control and management information and multiple tools employed therefor. (14A) illustrates the subscriber active explorer representing a tree structure containing information pointers and shortcut links to the related developers, providers, human agents, subscribers & $3^{rd}$ parties, the explorer tree shows the subscription details of various subscribed services of the said subscriber from various service provider, subscribers and human agents and the developers, wherein 14C-14I showing the data arrangement of each of channel node. product and customer management by means of various tools provided for Accounts & Sales Status generation, Reports and Analysis generation, search macro player and search macro management, Explorer customization by Filtering and searching, Statistics & Analysis Management, Communication for handling Complaints, Supports, Feedbacks, Requests, performing Backup & Restore operations, Notification generation, Wizards for handling various channel nodes and formulating rules via rules wizards, KSS service subscription management, SSS management, various project collaboration management, UKID wizard management, replication management, social networking management and Advertising Management. Each of subscriber posting request for package keys Various tools for customization and for manipulating the explorer are provided therein the utilities sections for explorer management facilitating searching, Filtering & Sorting, views determination, wizards execution, bookmarking, sharing and security determination, and replication of each of element in the explorer tree.

The explorer tree shows the details of (14C) HSN services and subscriptions, (14D) part of the explorer tree shows the details of developers whose service modules, attached utilities, other utilities and application are used by a service subscriber, list of other related service module developers which are further made searchable for desired attributes found with the help of search & filter and more, (14E) part of the service explorer providing details of service provider whose services are subscribed or intended to subscribed and are being bookmarked by the subscriber and the list of other related service providers which are further made searchable for desired attributes. (14G) part of the service explorer providing details of human agents whose services are subscribed or intended to subscribed and are being bookmarked by the subscriber and the list of other related human agents which are further made searchable for desired attributes. (14H) part of the service explorer providing details of brokers whose services are subscribed or intended to subscribed and are being bookmarked by the subscriber and the list of other related brokers which are further made searchable for desired attributes. (14I) part of the explorer tree shows the details of subscribers, details of services subscribed by subscriber, list of subscribers in the personal networks and list of subscribers found with the help of search & Filter for facilitating social networking.

Figure 15:
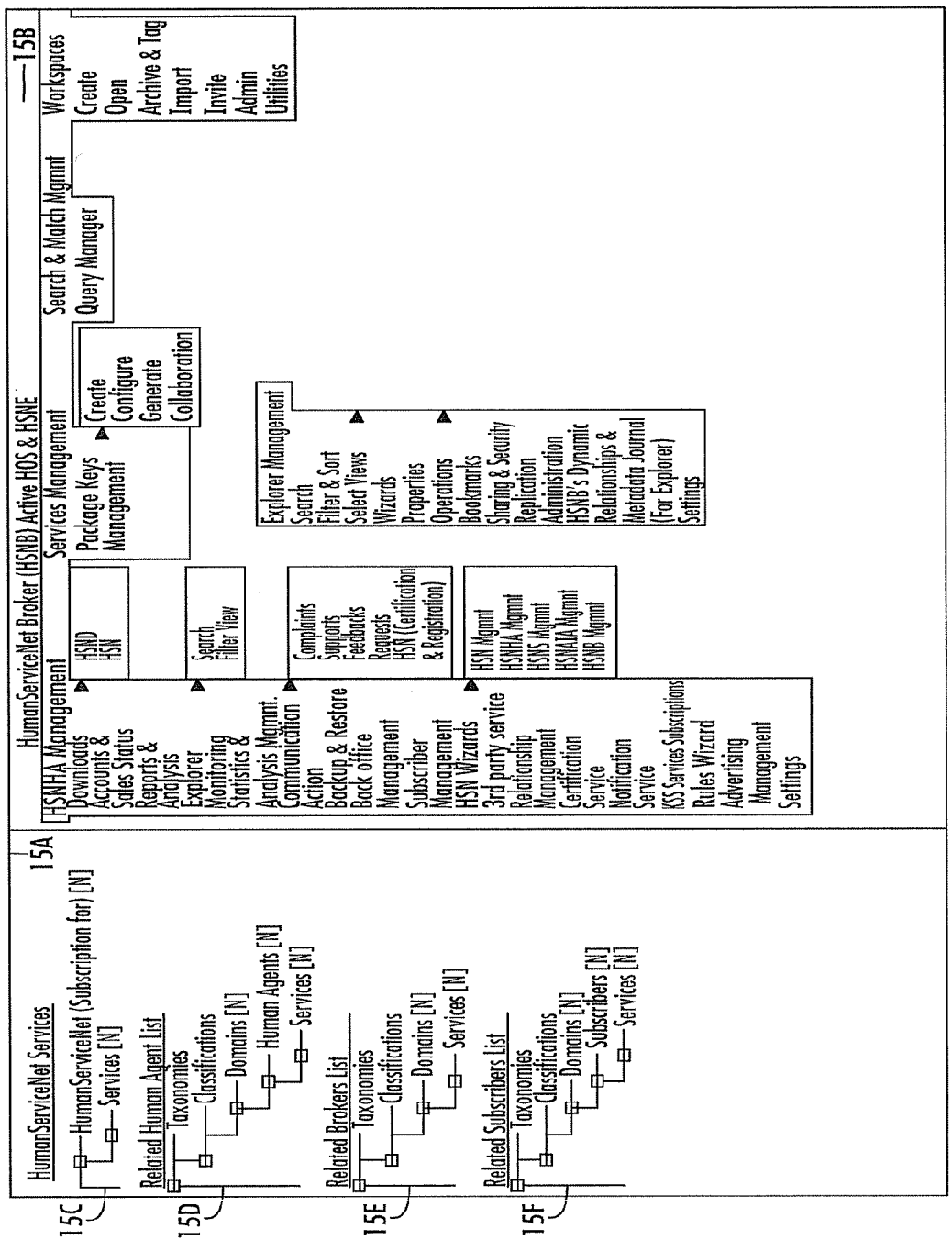
FIG. 15 shows a logical connection diagram of Broker (HSNB) active HumanServiceNet Explorer (HSNE) illustrating collapsible tree representing each of channel node wise segregation of control and management information and multiple tools employed therefor.

FIG. 15 shows a logical connection diagram of broker active Explorer (HSNE) illustrating collapsible tree representing each of related channel node wise segregation of control and management information and multiple tools employed therefor. (15A) illustrates the broker active explorer representing a tree structure containing information pointers and shortcut links to the human agents and subscribers, detailing the subscription details of various services human agents and subscribers, wherein 15C-15F showing the data arrangement of human agents and subscribers channel nodes. 15B representing the management pane facilitating product and customer management by means of various tools provided for Accounts & Sales Status generation, Reports and Analysis generation, Explorer customization by Filtering and searching, Statistics & Analysis Management, Communication for handling Complaints, Supports, Feedbacks, Requests, HSN (Certification & Registration), performing Backup & Restore operations, Notification generation, Wizards for handling various channel nodes and formulating rules via rules wizards, KSS management, UKID wizard management, Query Manager and Advertising Management. Each of provider being provided with the information storage and management utilities are generating, configuring and updating the package keys. Various tools for customization and for manipulating the explorer are provided therein the utilities sections for explorer management facilitating searching, Filtering & Sorting, views determination, wizards execution, bookmarking, sharing and security determination, and replication of each of element in the explorer tree.

Figure 16:
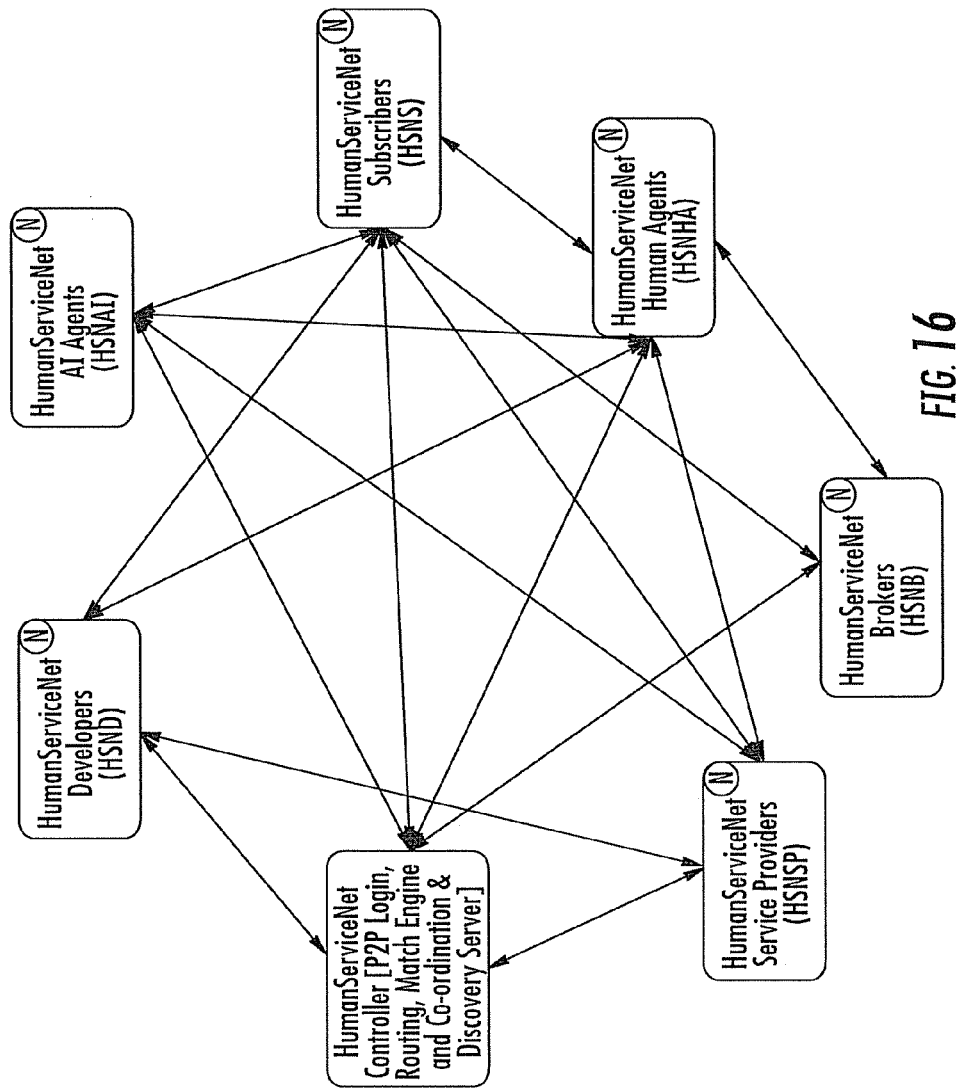
FIG. 16 shows a logical connection line diagram of Universal HumanServiceNet Framework (UHSF) illustrating all possible combinations of Peer to Peer (Human to Human & Machine to Machine) relational connections.

FIG. 16 illustrating a typical connection diagram for UHSF system, depicting mainly the protocol based relationship networking and communication patterns, wherein showing combinations of Peer to Peer Files Sharing, Data Sharing & Synchronization, and communications between all the parties in the UHSF system. Beside combination it also show the advantages Peer to Peer Files Sharing, Data Sharing & Synchronization, and communications. All connections are loosely coupled having high level of integrity to manage system resources so as to facilitate fast copying & sharing with the help of a combined browser having all the roles active rights. The peer to peer enability via said browser makes searching, matching, sharing, synchronization and communication a effective experience.

Figure 17:
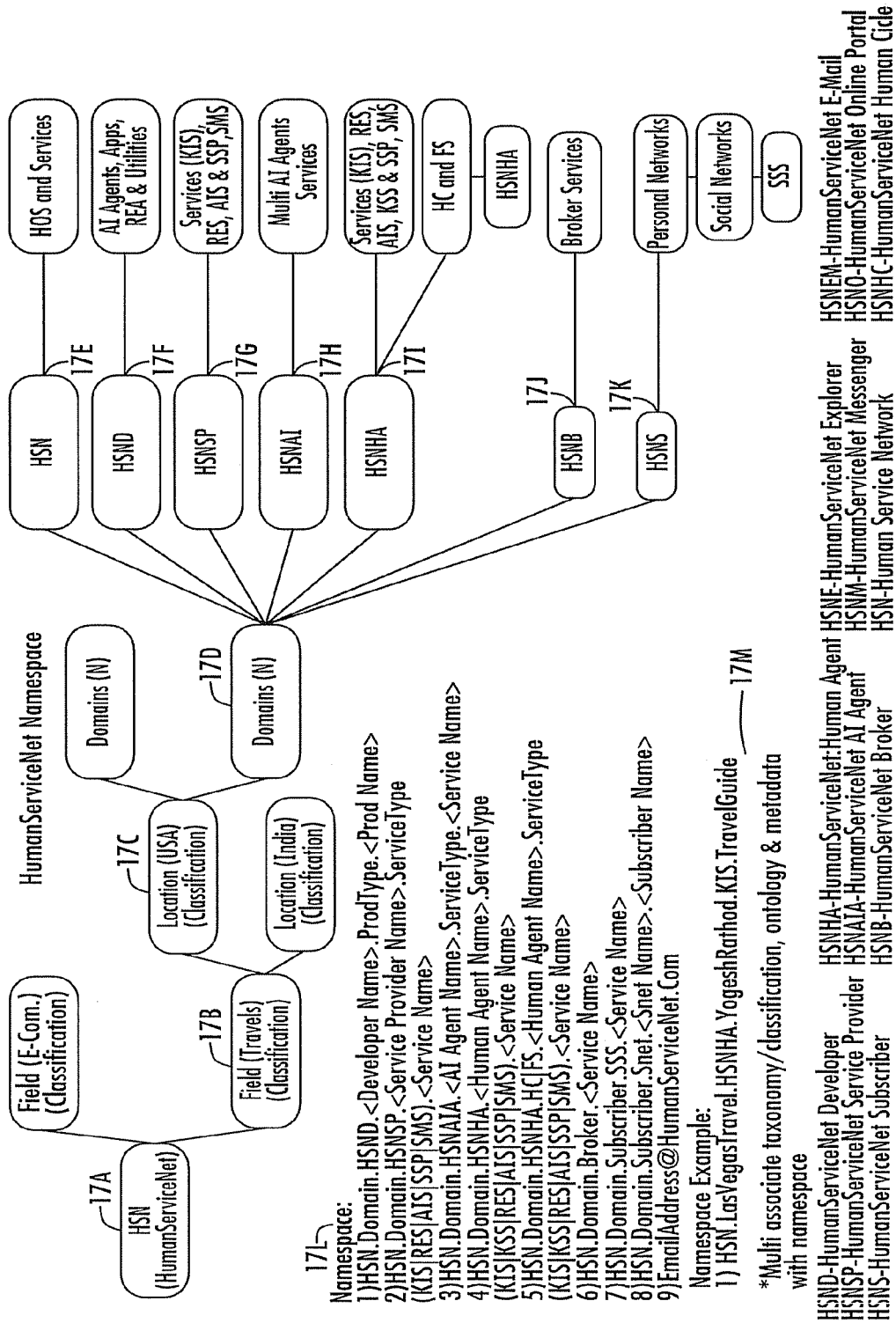
FIG. 17 shows a logical block diagram of HumanServiceNet Framework's Namespace or URI or Domain Name (URL) illustrating multiple identifier and example of path traversal for representation thereof.

Communication has been a very systematic process since developed, it identifies source, destination and various channels of data flow. In the UHSF system as shown in FIG. 17 namespace is a tool to systematically shape up the communication channel. Namespace traverses all hierarchical nodes in the UHSF system and are separated by an interval as illustrated in an example (17M). A typical linear representation model of namespace showing 17A traveling through various nodes in a linear fashion i.e. from HSN controller to various channel nodes. This traversal is varying in nature with regards to source of the information comprising one or more optional parameters. For example with respect to channel node a typical namespace derivation stands as follows 1. HSN.Domain.HSND.<Developer Name>.ProdType.<Prod Name>
2. HSN.Domain.HSNSP.<Service Provider Name>.ServiceType.(KIS|RES|AIS|SSP|SMS).<Service Name>
3. HSN.Domain.HSNAIA.<AI Agent Name>.ServiceType.<Service Name>
4. HSN.Domain.HSNHA.<Human Agent Name>.ServiceType (KIS|KSS|RES|AIS|SSP|SMS) <Service Name>
5. HSN.Domain.HSNHA.HC|FS.<Human Agent Name>.ServiceType (KIS|KSS|RES|AIS|SSP).<Service Name>
6. HSN.Domain.Broker.<Service Name>
7. HSN.Domain.Subscriber.SSS.<Service Name>
8. HSN.Domain.Subscriber.Snet<Snet Name>.<Subscriber Name>
9. EmailAddress@HumanServiceNet.Com E.g.: HSN.LasVegasTravel.HSNHA.Yogesh-Rathod.KIS.TravelGuide The first example of HumanServiceNet Namespace shows HumanServiceNet Namespace parameters for (17M) start with Root the first which indicate the top most node i.e. (17A) HumanServiceNet itself. The second parameter in the HumanServiceNet Namespace is Domain, the third parameter is the CHN name, the forth parameter is the human agent name, fifth parameter is service type and the sixth parameter is service name.

Figure 18:
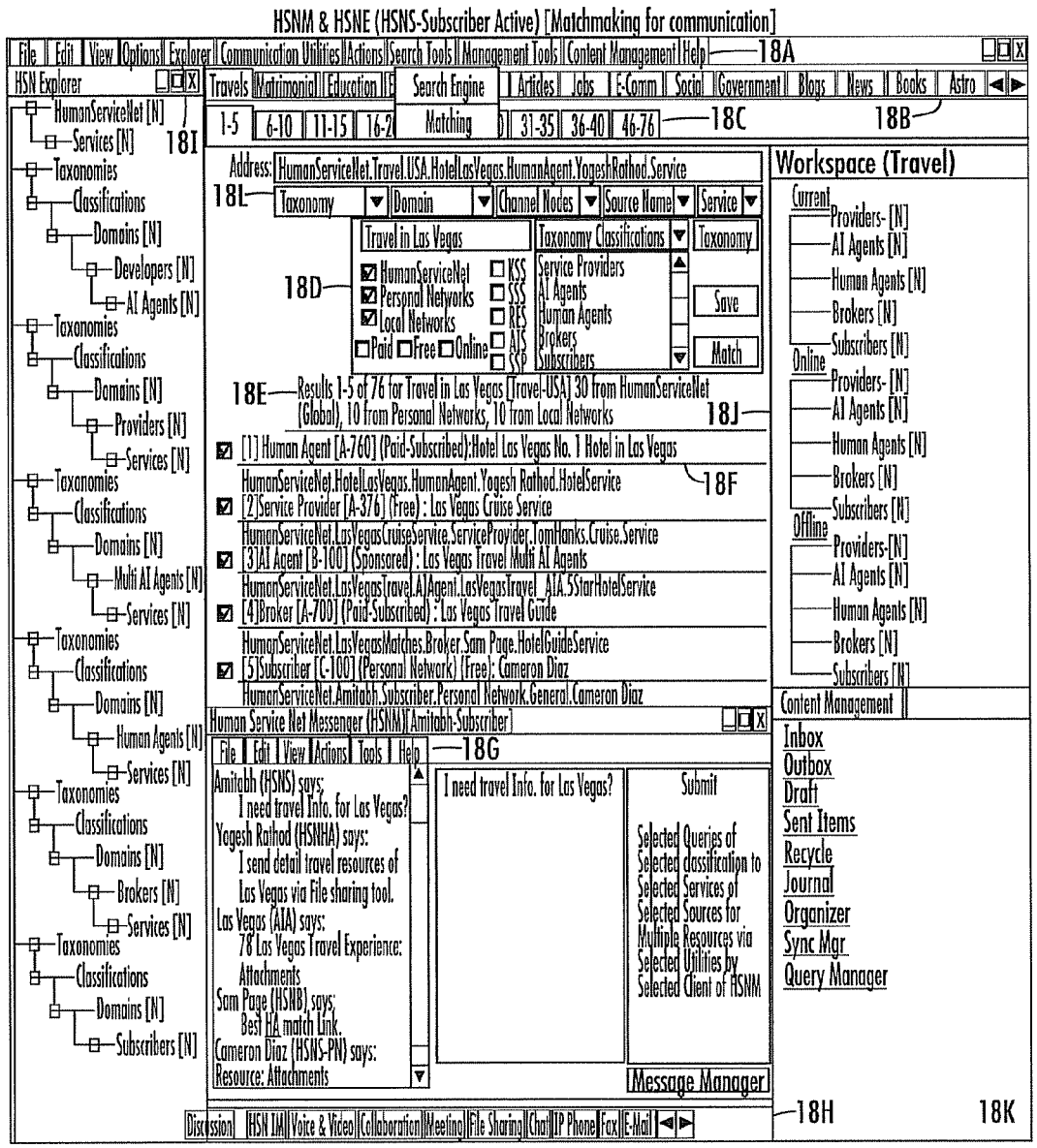
FIG. 18 showing comprehensive view of operational graphical user interface (GUI) for Subscriber (HSNS) illustrating the HumanServiceNet Messenger (HSNM) & HumanServiceNet Explorer (HSNE) positioned therein alongwith workspace, Match Engine and communication interface therefor.
Figure 21:
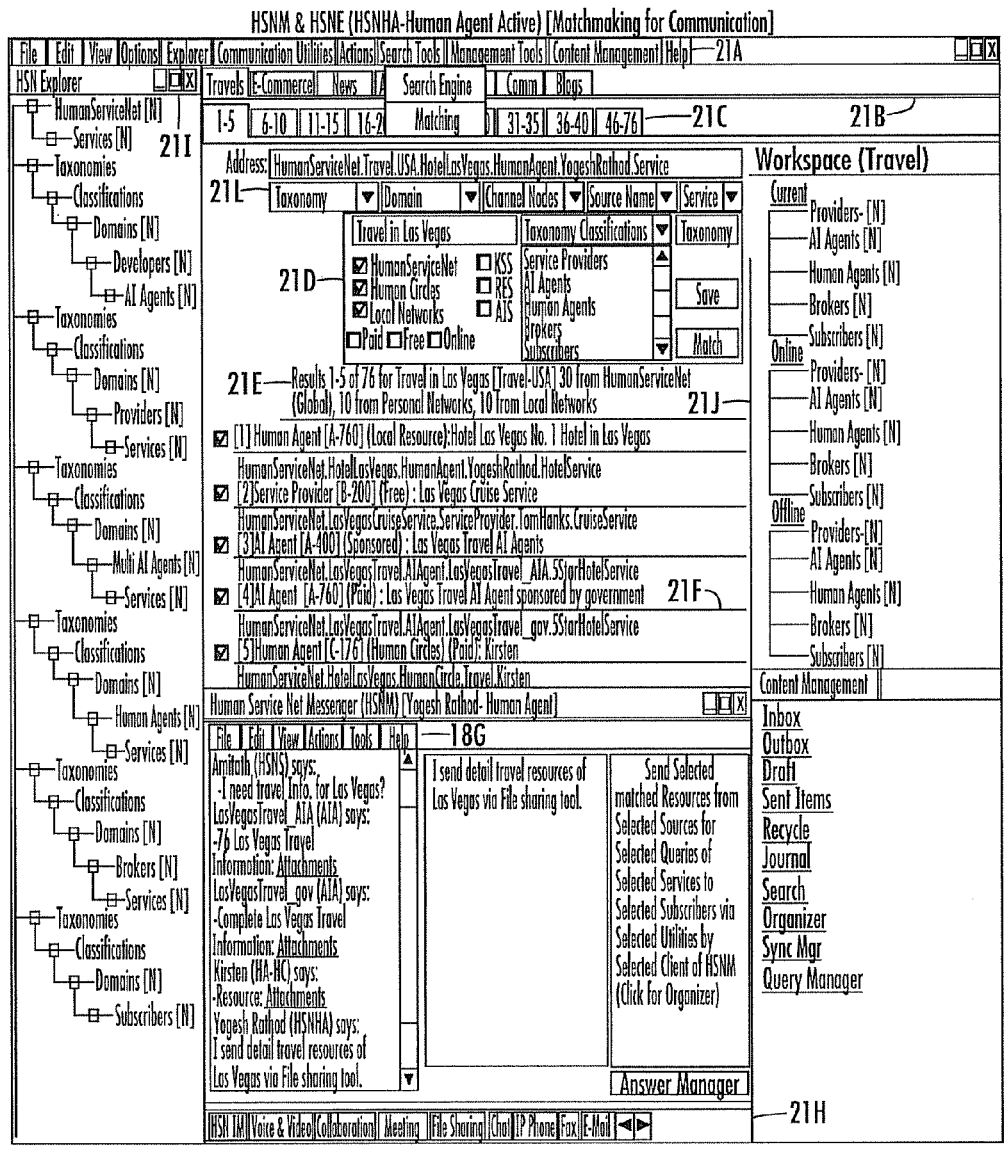
FIG. 21 showing comprehensive view of operational graphical user interface (GUI) for Human Agent (HSNHA) illustrating the HumanServiceNet Messenger (HSNM) & HumanServiceNet Explorer (HSNE) positioned therein alongwith workspace, Match Engine and communication interface therefor.

FIGS. 18 and 21 showing graphical user interface (GUI) for Subscriber (HSNS) and human agent active Messenger (HSNM) having embedded Explorer (HSNE) illustrate various tools for match making, various (18L and 21L) parameters selection including taxonomy classification, domain, channel node, source name and service. The subject field is selected via 18B & 21B, the 18L & 21L selection fields are linked with the subject field (18B and 21B) and (18D and 21D) providing for further multiple channel nodes and UHSF identified cluster as well as service type including paid, free, offline smart client, mobile or wireless client, HSN via web services and HSNM with 3rd party applications and services for devising strategies for conditional match making by means of plurality of Booleans logical combinations to improve upon search specificity in particular domain thus saving on time and network resources employed therein. Search engine further facilitating search conduction at four different granular levels including HSN, Taxonomy classification based Service Cluster, Personal Networks and Local Networks, restricting search to specific domain wherein each of human agent sending selected resources from selected sources for selected queries of selected services to selected subscribers via selected utilities by selected client of HSNM. As HSN employs cluster approach for improving on service orientation ground, same tool of clusters is used to limit the search to specific cluster of operation. 18E and 21E represents a typical format of search results and are browsed via 18C & 21C changeable tab selection and 18F & 21F showing search status bar showing description of match making result and actual annotated results, with its namespace appended therein respectively. 18G & 21G showing a messenger having a input area and messaging contents of each of participant in the communication process with the said subscriber or within the said group, the said match making engine employing plurality of match making techniques to retrieval relevance and precision optimization conducting basic match making, wizard based match making, advanced match making, and command based match making, wherein 18H & 21H providing for selection of various communication modality including text messaging, voice & video, file sharing, chatting, IP phone, fax, emailing, meeting and collaborating. 18J & 21J showing a subscriber's and human agent's workspace respectively, providing for management of different searching attempts which are carried on the project basis, providing details regarding current contacts which are currently active with in the said workspace, online contacts which are currently online in the UHSF system and offline contact which are not currently logged in to the UHSF system, wherein the users can manipulate each of the member in the workspace by creating, deleting, renaming, copying, restoring, and sending workspaces. Workspaces are categorized into 1. Active, 2. Unread and 3. Read wherein active workspaces are the one which members have open for reading or updating, Unread workspaces contains new or updated information, and Read workspaces that do not currently contains any new or updated information.

The said GUI is fully customizable as per requirements. Section 18I & 21I navigation tree structure is based on dynamic taxonomy classification (e.g. Field, Location and Domain etc.) of each of channel node and subscriber can select node & use $3^{rd}$ click menu options to take necessary actions, Section 18D & 21D of the search engine GUI illustrate basic match making engines enabling selection of various searched parameters based on The HumanServiceNet match making engine is enabled for tracking operations for plurality of channel nodes based on predefined specified criterions, expressed in terms of plurality of keywords with combinational Booleans logic involved therein. Also the said search engine employs subject specific semantic ontology to improve upon precision and relevance of searched information into the HumanServiceNet framework. Further the matched or searched results are operated with plurality of functional tools including but not restricted to sorting, ranking, tracking, filtering, settings, printing, sending matched or searched results, downloading information, comparing, multiple view generating, auto matching, exporting and saving the said results.

18D & 21B provides for text box to enter Keywords and Boolean Logic like (AND (+), OR (|), NOT (−), Phrases, Multi Brackets for Multi Inner searches, ontology & taxonomy selection tools to select hierarchical categorization or classification of entities or services within a domain or field e.g. taxonomy classification of services like Fields, location, domain category, sub-category etc., multiple Channel nodes and check box selection to provides granularity in searching approach is enabled by penta tier searching facilitated by searching depth determination.

The matched results (18F & 21F) containing URI or HSN Namespace or URL, Source channel node name, weight, rank, grade or points, Paid or free or sponsored or relational (Personal network) service, status (subscribed or not subscribed) for particular service, short information of source.

Users are being enabled to bookmark, save results or sent queries to selected sources and can click hyperlink for more details, further performing $3^{rd}$ click operations on hyperlinks for more actions like ask for more details, subscribe and make payments, sort results (node wise, ASC, DESC etc.), take printouts etc.

Figure 19:
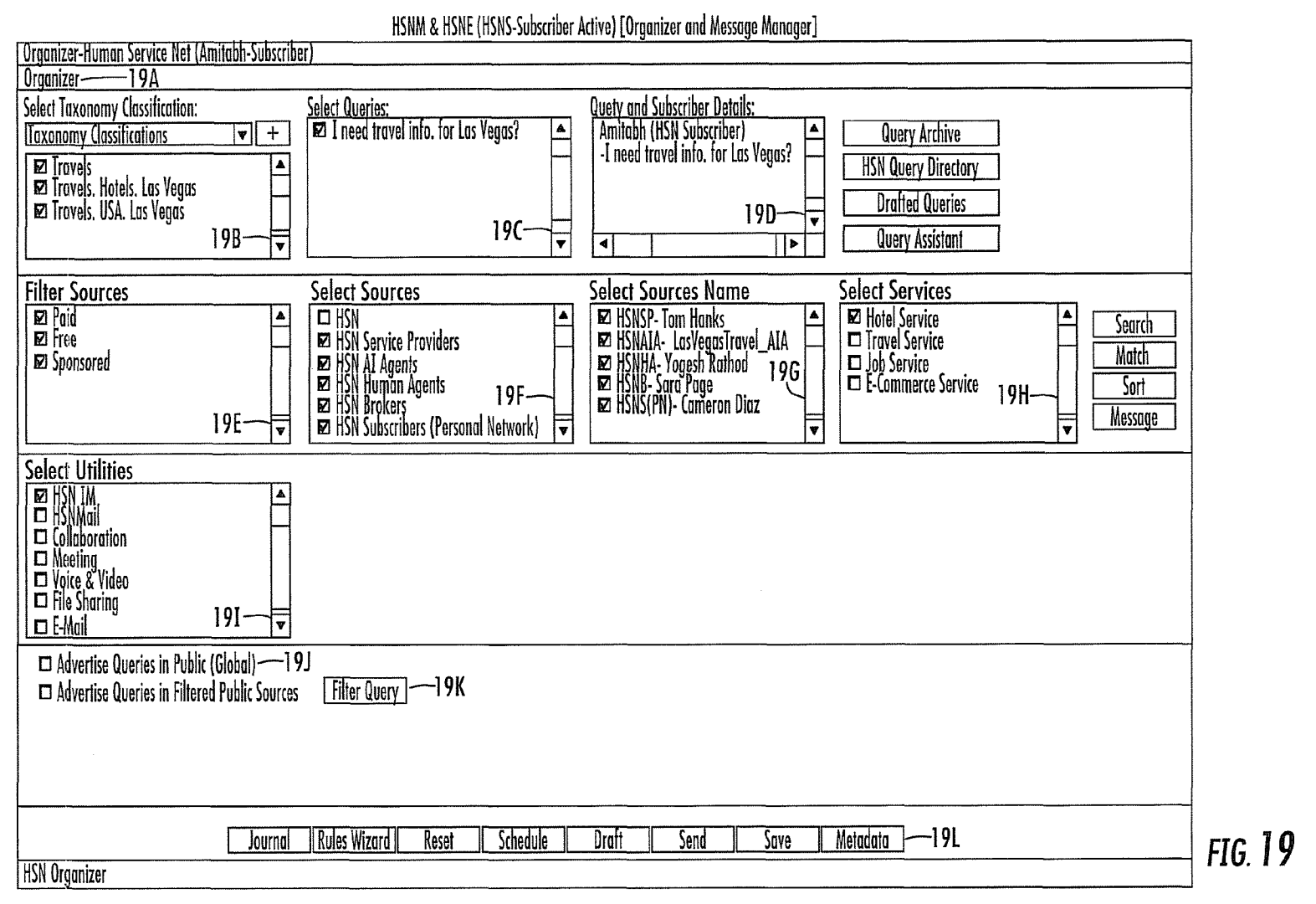

FIG. 19 illustrating a query manager a means for organizing the queries via various selection provisions, wherein necessarily each of intended query need to be selected from a specific taxonomy class from the selection in 19B, the query can be keyword based, natural language queries (19C), or command based and the said query can be selectively posted at the selected sources, for selected consideration via selected communication utility (19I). Additional tool facilitating the management of the said query considering it to be knowledge invocation activity for archiving the posted queries, providing query directory, query assistant for helping user to draft queries, scheduling, saving, and publishing the said queries. Queries posted therein are ready to use query or query syntax or query in the repository, or published query (taxonomy classification based) wherein each of query are validated for protocol based role activity.

FIGS. 20 and 23 illustrating a GUI of a journal module showing various entries of the actions and responses of each the HSNS and human agent respectively wherein the recording fields includes date, HSN URL, source, from, box, service, communication details, status, messages, details, descriptions, attachments, lists, taxonomy classification, size, workspace, and tracking status for each of action and transaction of the said subscriber and human agent, the said journal is being made searchable (20A & 23A) and can be sorted in the desired sort preference.

Figure 22:
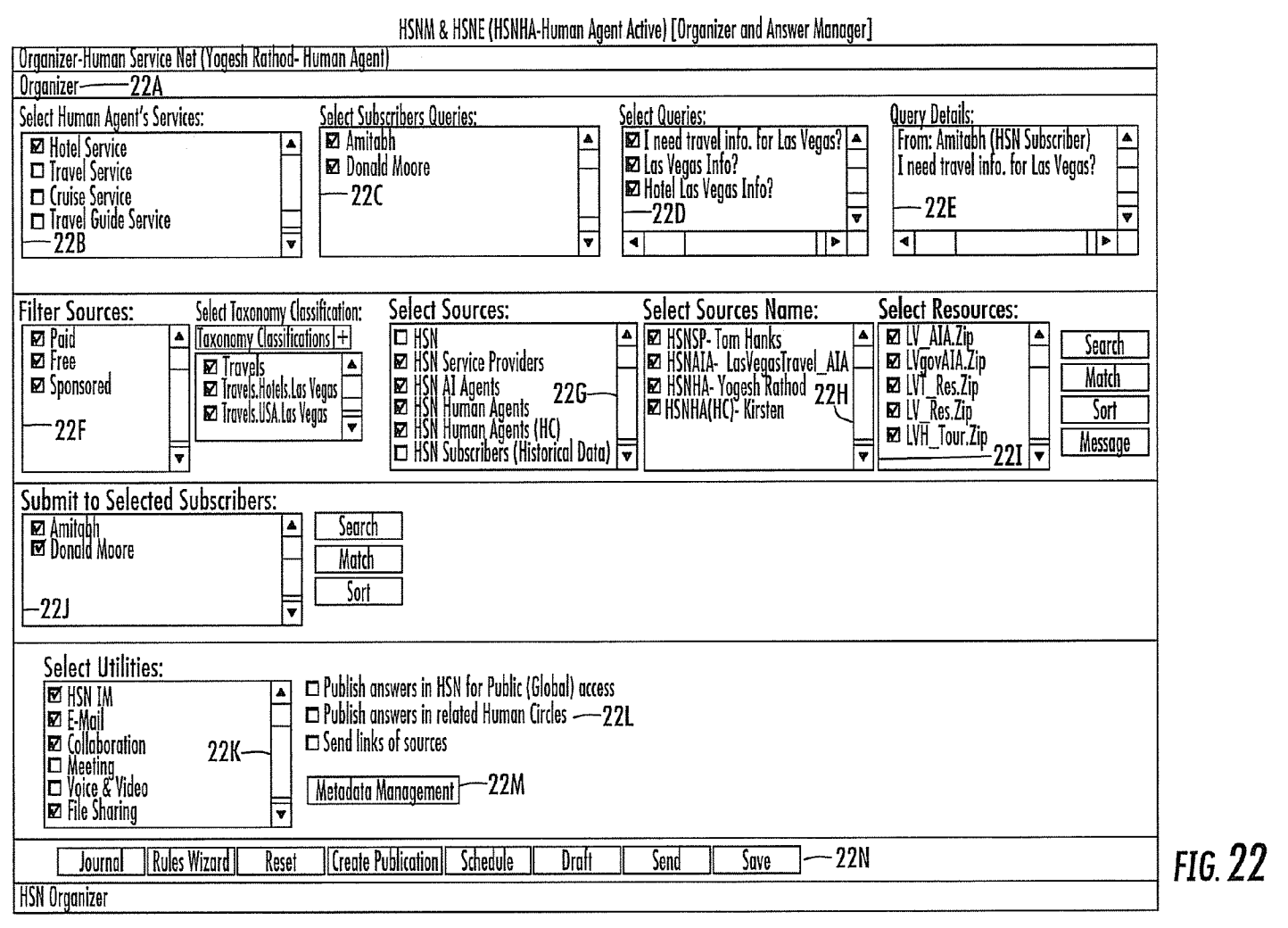

FIG. 22 showing GUI for various utilities and provisions for organizer and answer manager for each of human agent, facilitating human agent to organize each of received queries from one or more subscriber wherein selecting subscribers (22C) via selection window and actively exploit multiple UHSF system resources (22G & 22H) for answering the said queries alongwith resources are provided to querying subscriber (22I). Further the communication utilities can be selected for forwarding answers to subscribers via 22K multiple communication utility selection windows. Wherein human agent optionally publishing the said answer globally UHSF wide, or in the related human circles based on the mutual data confidentiality agreement terms acceptance by mutual parties. Additional answer organizing tools are provided (22N) which are providing for scheduling, creating publication, drafting, saving and exploiting rules wizard.

Figure 24:
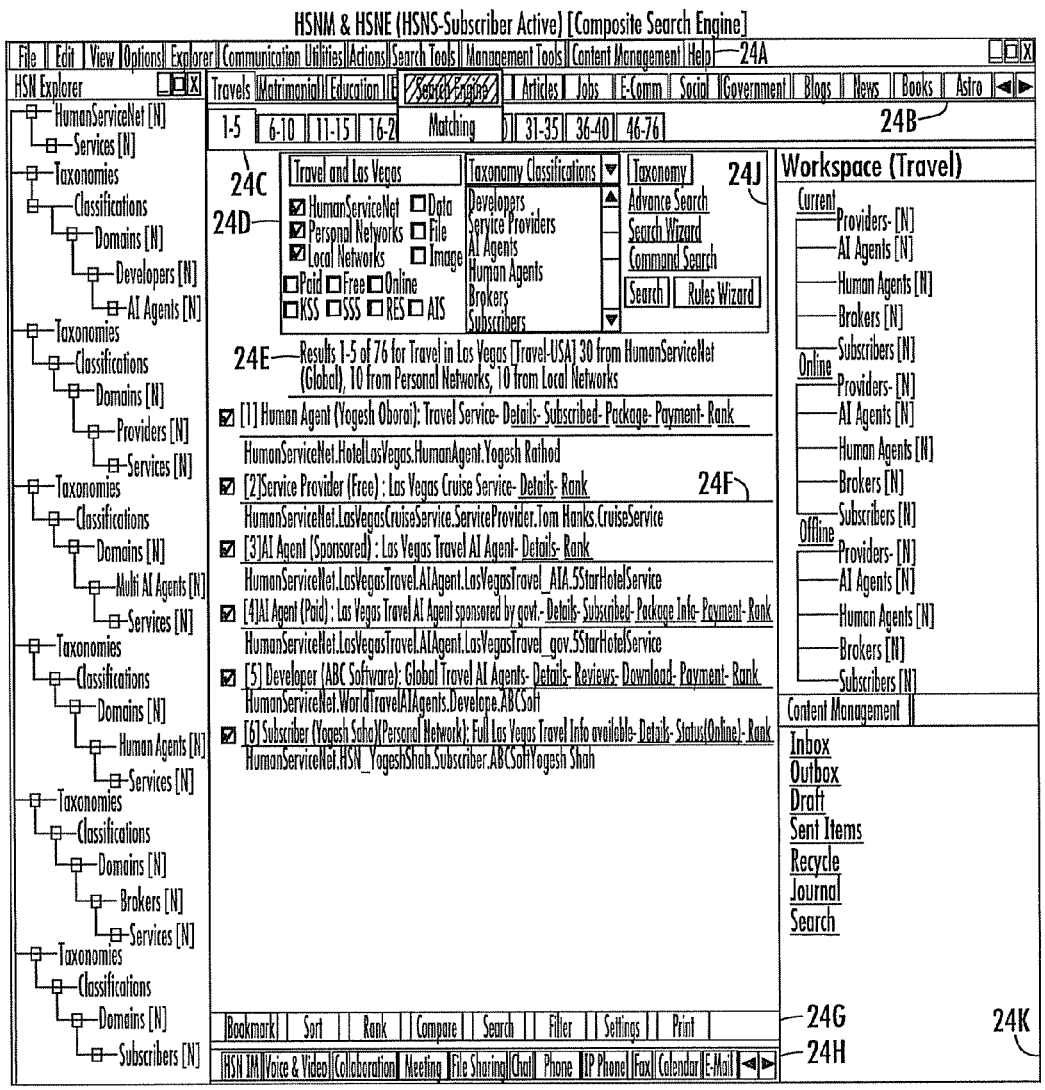
FIG. 24 illustrate example of graphical user interface (GUI) for Subscriber active composite search engine alongwith the multiple search results thereof and multiple searching tools therefor.
Figure 25:
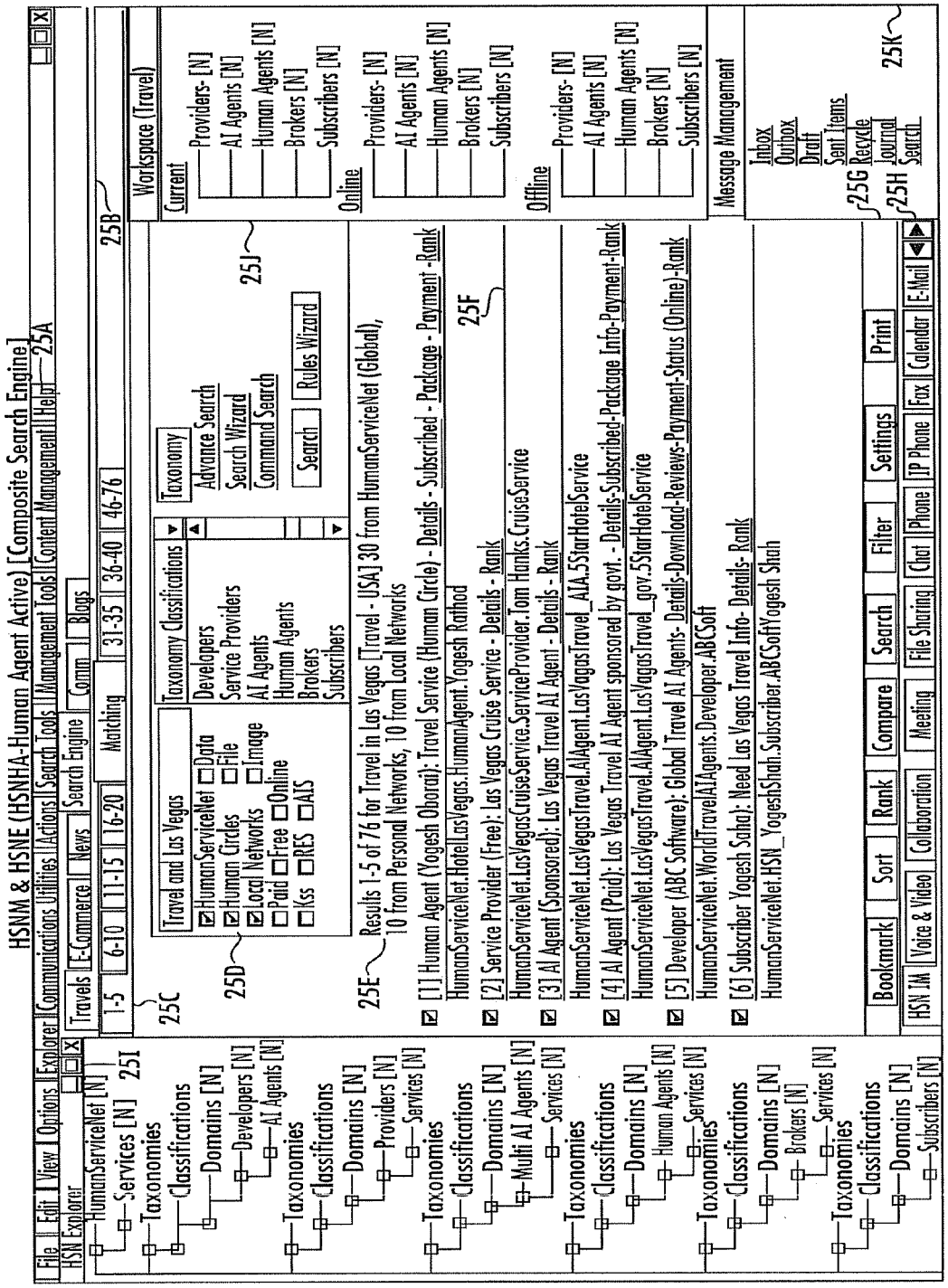
FIG. 25 illustrate example of graphical user interface (GUI) for Human Agent active composite search engine alongwith the multiple search results thereof and multiple searching tools therefor.

FIGS. 24 and 25 illustrate example of graphical user interface (GUI) for Subscriber and human agent active composite search engine alongwith the multiple search results thereof and multiple searching tools therefor including tools for bookmarking, sorting, ranking, comparing, searching, filtering and printing of the search results. 24I & 25I showing the respective activity specific explorer, 24D & 25D various search parameters and 24E & 25E showing a typical representation of search results showing namespace of the result and actionable tools supplemented therewith so as to execute the said search results to its final accomplishment includes details, rank, subscribe, package details, review, download and status FIG. 26 through 31 illustrating wizard interfaces for each of channel node with respect to specific accomplishment via other channel nodes. FIGS. 26 to 31 illustrating example of graphical user interface (GUI) for Service Provider (HSNSP), HSNHA, HSNS, and HSND active wizards illustrating each of GUI for each of channel node and HSN controller alongwith the formatting parameters thereof, the formatting parameter selection is based on the predetermined selection logic for each of channel node wherein each of steps providing multiple options to choose from so as to accomplish the selected task.

Figure 26:
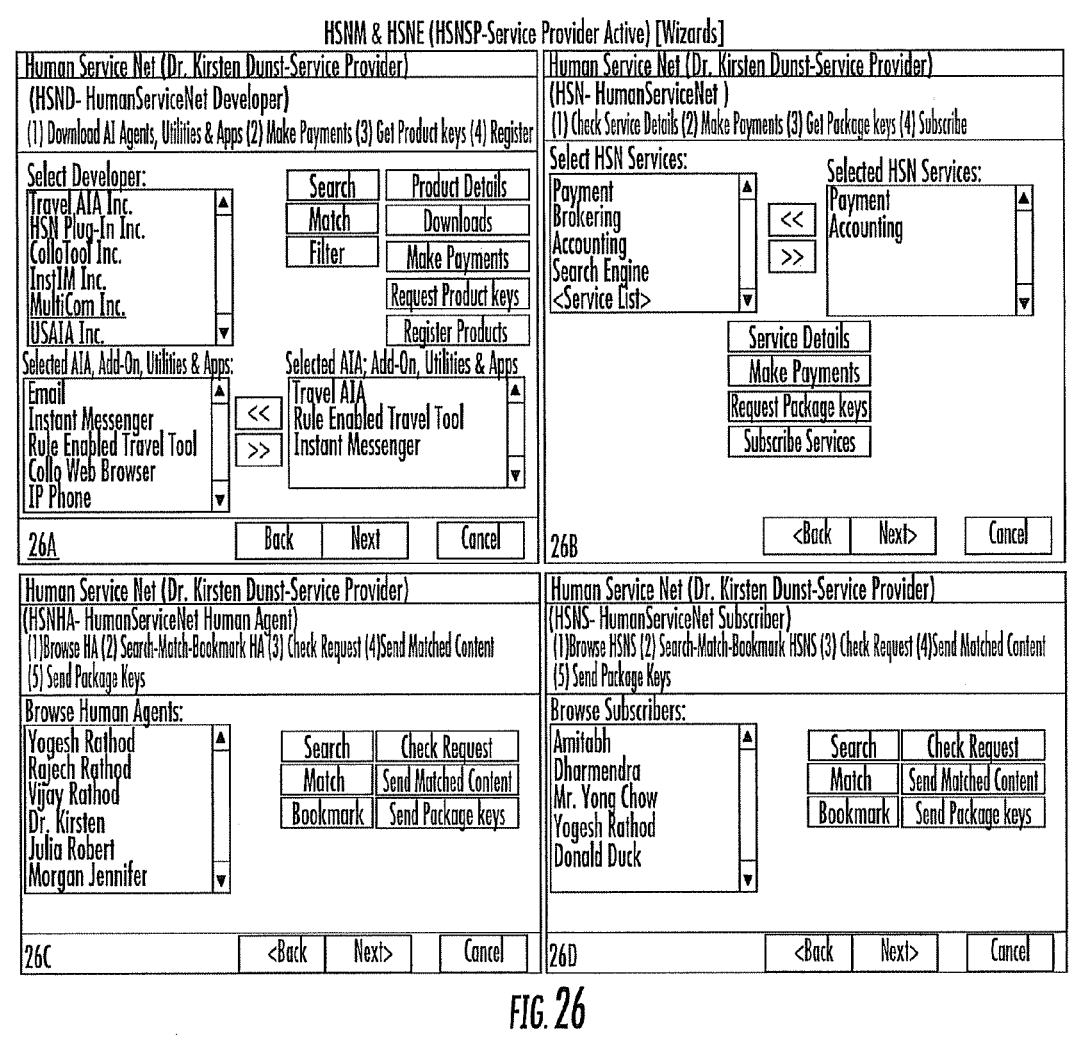

The general tasks accomplishment by each of provider via wizard in FIG. 26 with respect to particular channel node to be accomplished are as follows:

for Developer (26A): a. download AI agents, utilities, & application, b. make payments, c. get product details, d. register;

for HSN controller (26B): a. check service details, b. make payments, c. get package keys, d. subscribe;

for Human agent (26C): a. browse HA, b. search, match and bookmark HA, check request, c. send matched contents, d. send package key;

for subscriber (26D): a. brows HSNS, b. search, match, bookmark HSNS, c. check request, d. send match contents, e. send package keys;

wherein each of tasks performed via wizards are alternatively accomplished by means of separate specific functional tool or combination of tools thereof in the same order or in the different.

Figure 27:
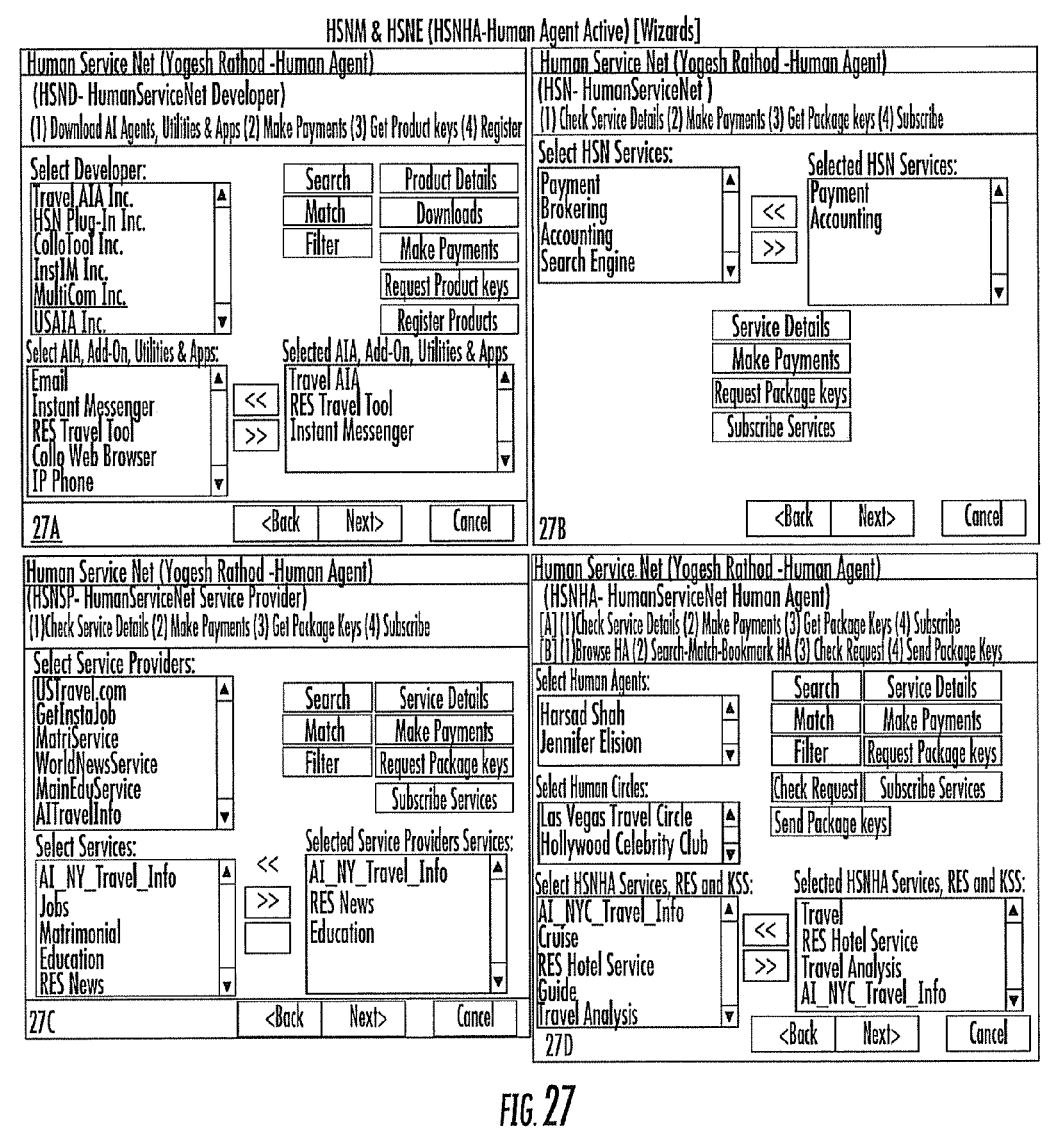

The general tasks accomplishment by each of human agent via wizard in FIGS. 27 & 28 with respect to particular channel node to be accomplished are as follows:

for Developer (27A): a. download AI agents, utilities, & application, b. make payments, c. get product details, d. register;

for HSN controller (27B): a. check service details, b. make payments, c. get package key, d. subscribe;

for provider (27C): a. check service details, b. make payments, c. get package key, d. subscribe for Human agent (27D): a. browse HA, b. search, match and bookmark HA, check request, c. send matched contents, d. send package key;

for subscriber (28A): a. brows HSNS, b. search, match, bookmark HSNS, c. check request, d. send match contents, e. send package keys;

for Brokers (28B): a. check service details, b. make payments, c. get package key, d. subscribe;

wherein each of tasks performed via wizards are alternatively accomplished by means of separate specific functional tool or combination of tools thereof in the same order or in the different.

Figure 29:
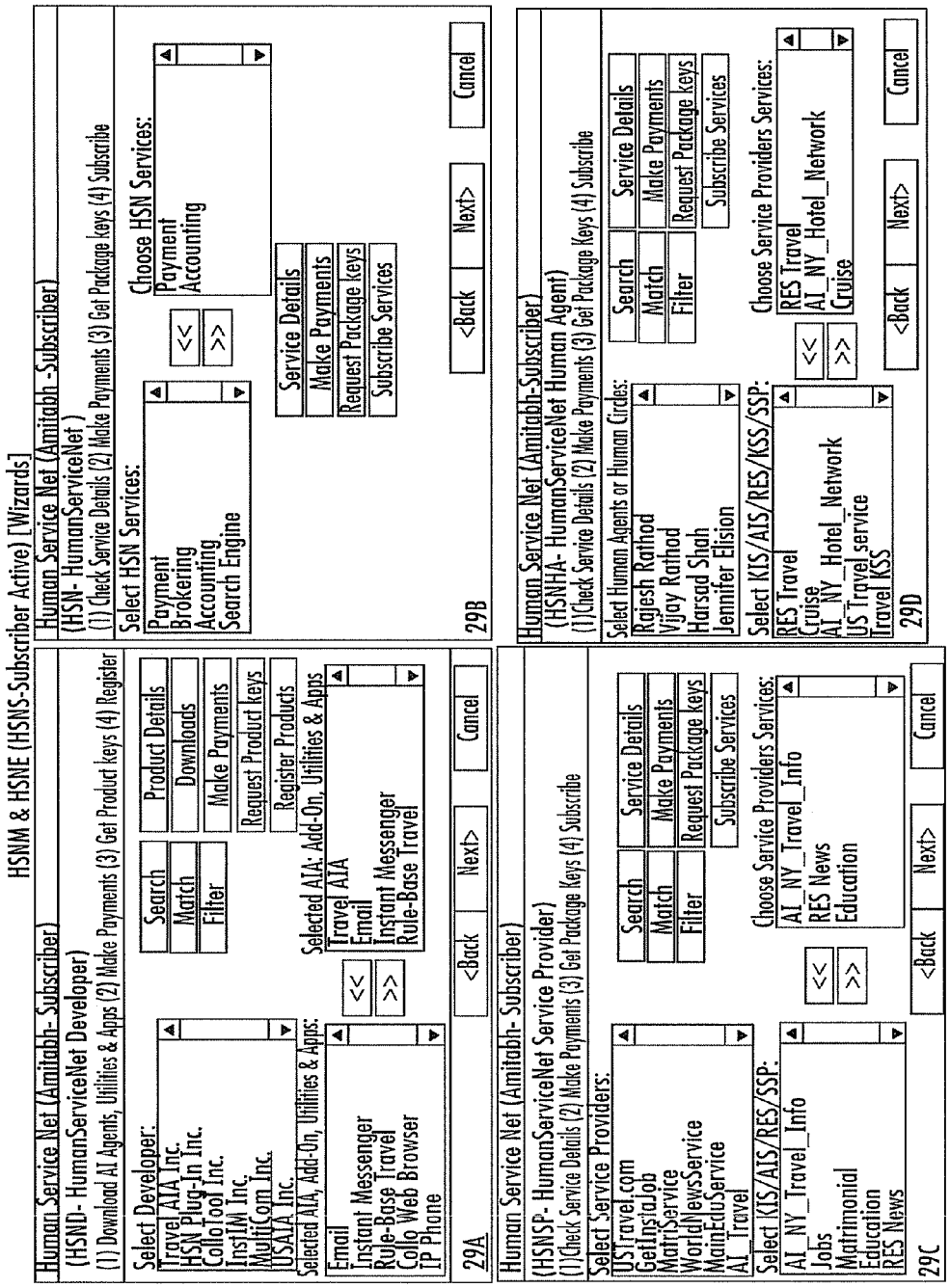
FIGS. 29 and 30 illustrate examples of graphical user interface (GUI) for Subscriber (HSNS) active wizards illustrating each of GUI for each of channel node and HSN controller alongwith the formatting parameters thereof.
Figure 30:
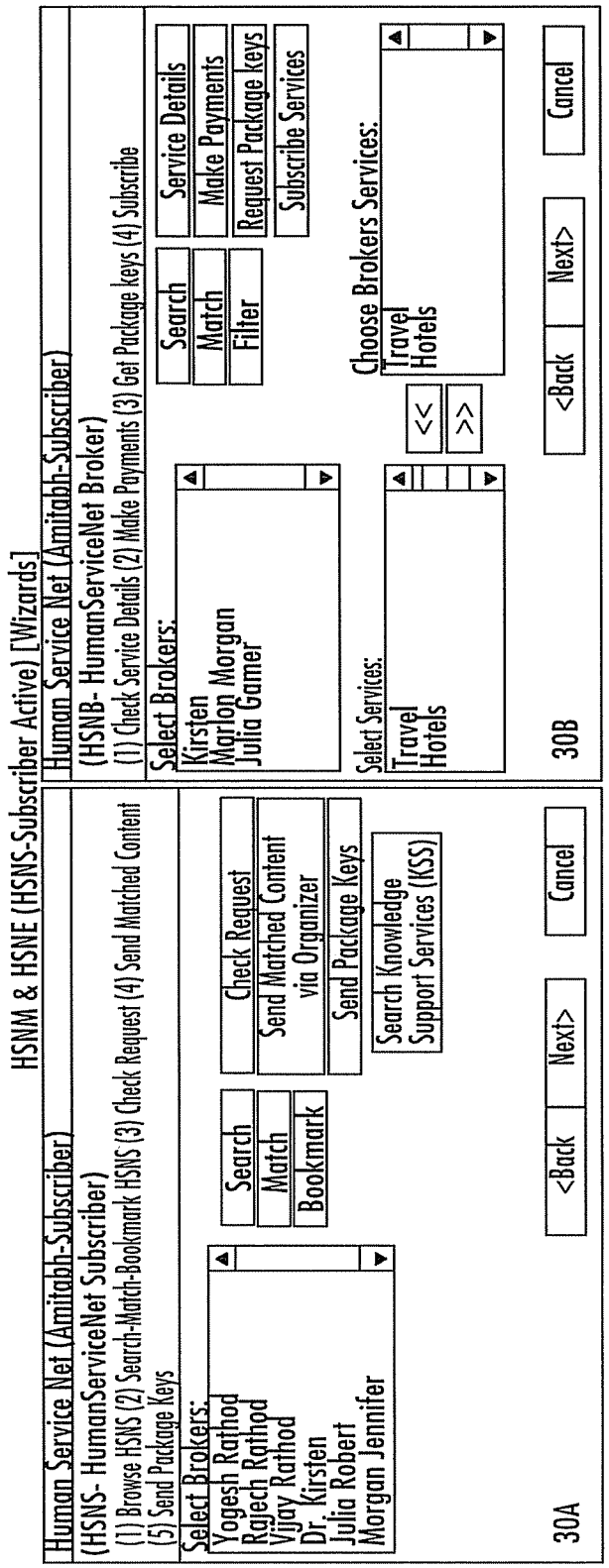

The general tasks accomplishment by each of subscriber via wizard in FIGS. 29 & 30 with respect to particular channel node to be accomplished are as follows:

for Developer (29A): a. download AI agents, utilities, & application, b. make payments, c. get product details, and d. register.

for HSN controller (29B): a. check service details, b. make payments, c. get package key, d. subscribe;

for provider (29C): a. check service details, b. make payments, c. get package key, d. subscribe for Human agent (27D): a. browse HA, b. search, match and bookmark HA, check request, c. send matched contents, d. send package key;

for subscriber (30A): a. brows HSNS, b. search, match, bookmark HSNS, c. check request, d. send match contents, e. send package keys;

for Brokers (30B): a. check service details, b. make payments, c. get package key, d. subscribe;

wherein each of tasks performed via wizards are alternatively accomplished by means of separate specific functional tool or combination of tools thereof in the same order or in the different.

Figure 31:
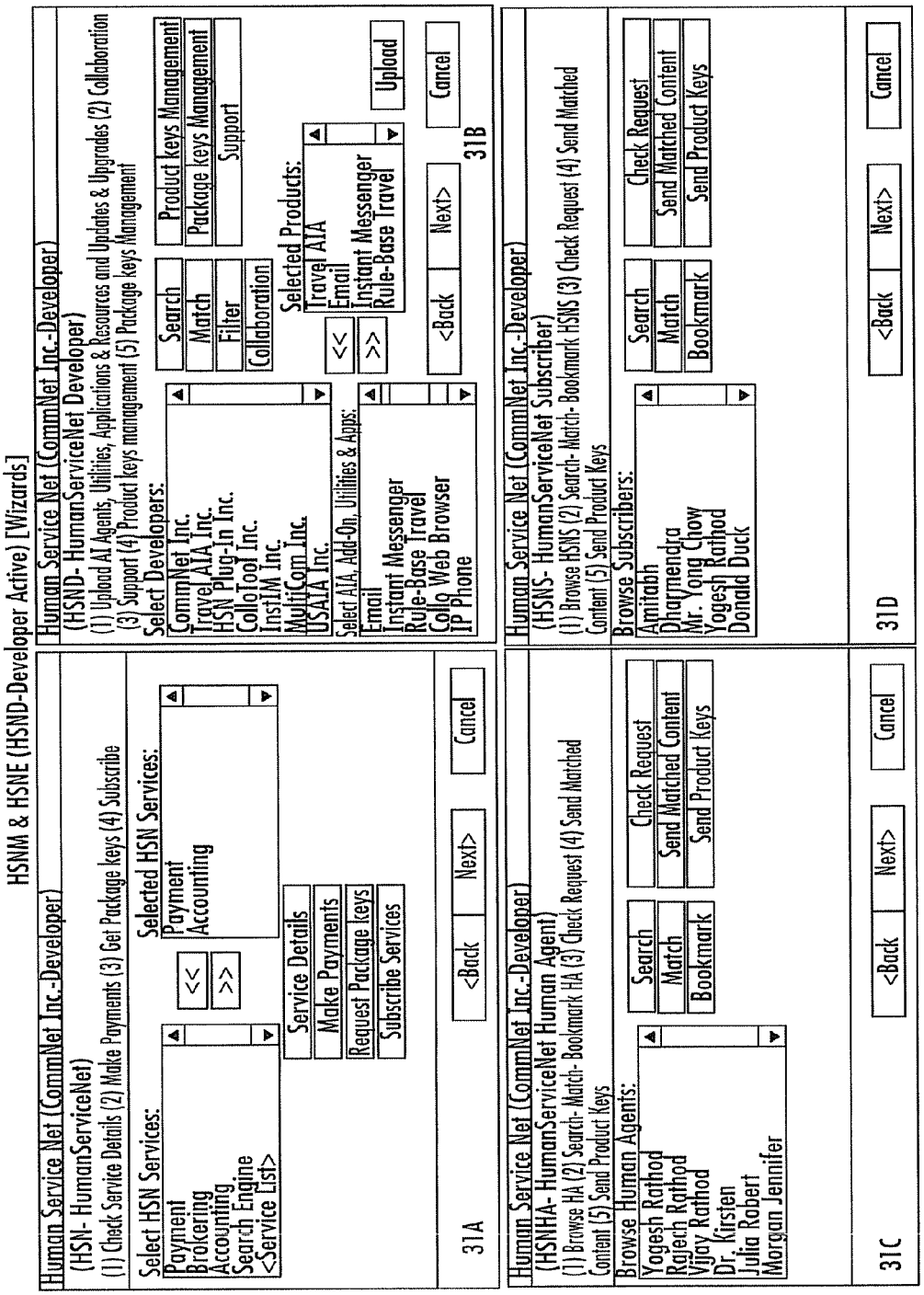
FIG. 31 illustrate examples of graphical user interface (GUI) for Developers (HSND) active wizards illustrating each of GUI for each of channel node and HSN controller alongwith the formatting parameters thereof.

The general tasks accomplishment by each of developer via wizard in FIG. 31 with respect to particular channel node to be accomplished are as follows:

for HSN controller (31A): a. check service details, b. make payments, c. get package key, d. subscribe;

for Developer (31B): a. upload AI agents, utilities, & application, resources, updates and upgrades b. collaboration, c. support, d. product key management, e. package key management for Human agent (31C): a. browse HA, b. search, match and bookmark HA, check request, c. send matched contents, d. send package key;

for subscriber (31D): a. brows HSNS, b. search, match, bookmark HSNS, c. check request, d. send match contents, e. send package keys;

wherein each of tasks performed via wizards are alternatively accomplished by means of separate specific functional tool or combination of tools thereof in the same order or in the different.

Figure 32:
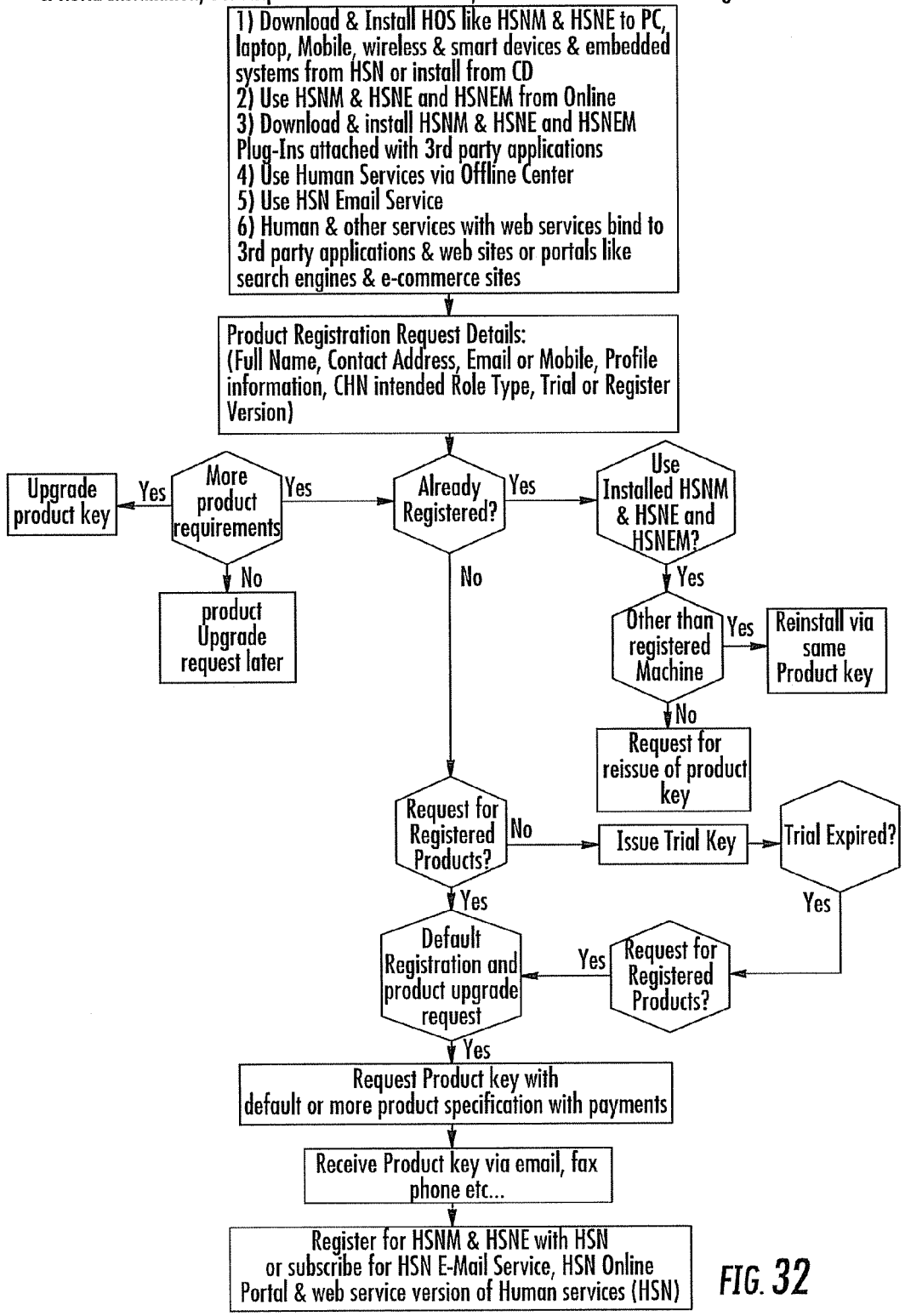
FIG. 32 illustrate algorithmic sequences flowchart for each of channel node registering for HOS products with the HumanServiceNet Controller.

FIG. 32 illustrate algorithmic sequences flowchart for registration of each of channel node with the HumanServiceNet Controller. The logical flow therein deriving dependencies from the previous status of both registered and unregistered users in the UHSF system.

Figure 33:
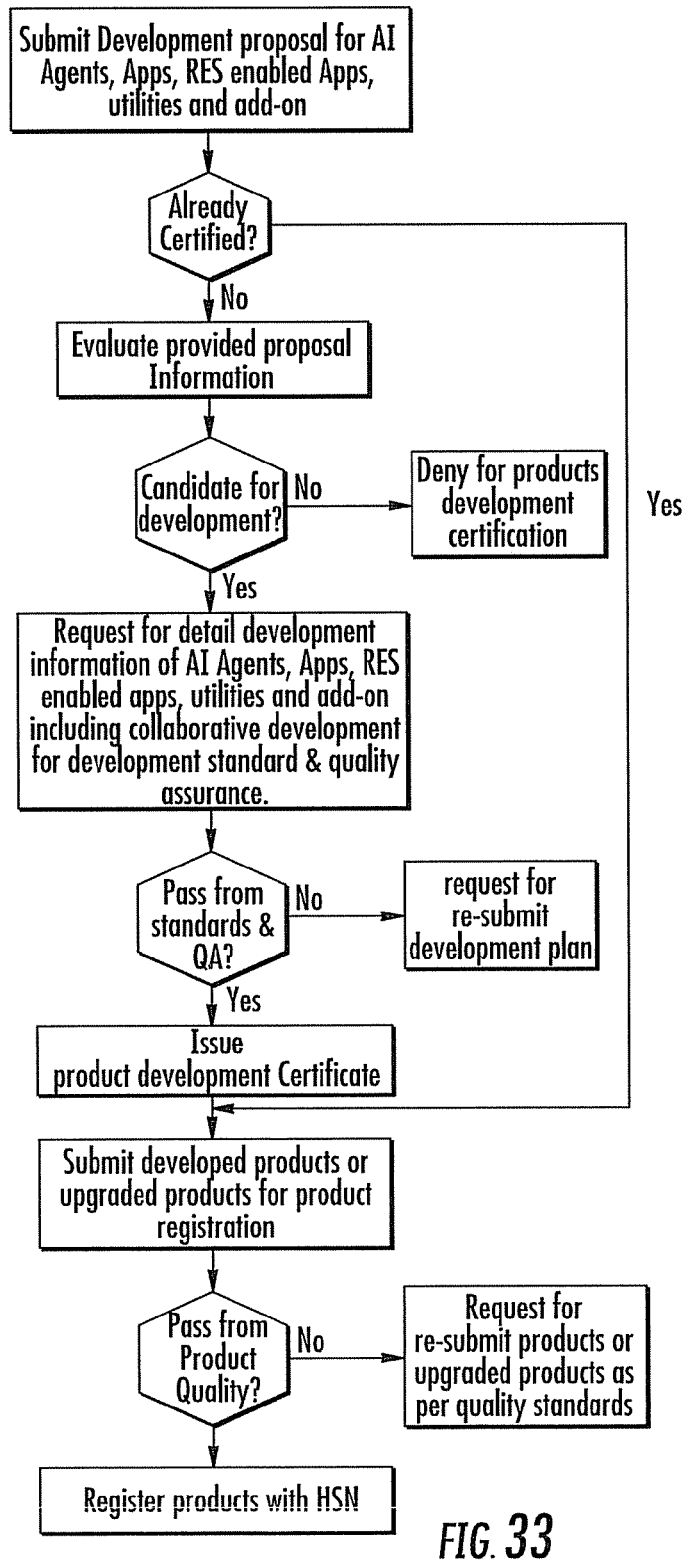
FIG. 33 illustrate algorithmic sequences flowchart of the Developers' development proposition, registration and certification methodology.

FIG. 33 illustrate algorithmic sequences flowchart of the Developers' development proposition, registration and certification methodology.

Figure 34:
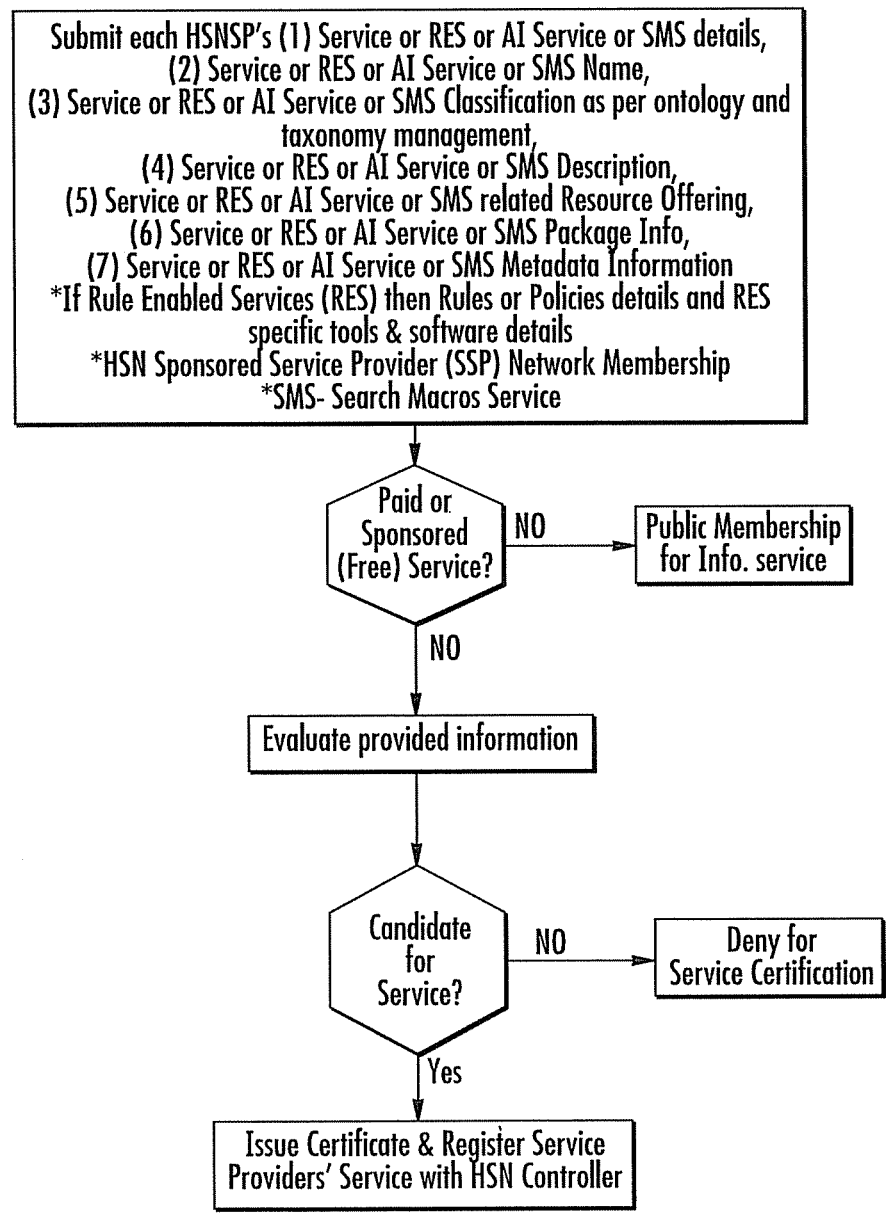
FIG. 34 illustrate algorithmic sequences flowchart of the Service providers' service offering proposition, registration and certification methodology.

FIG. 34 illustrate algorithmic sequences flowchart of the Service providers' service offering proposition, registration and certification methodology.

Figure 35:
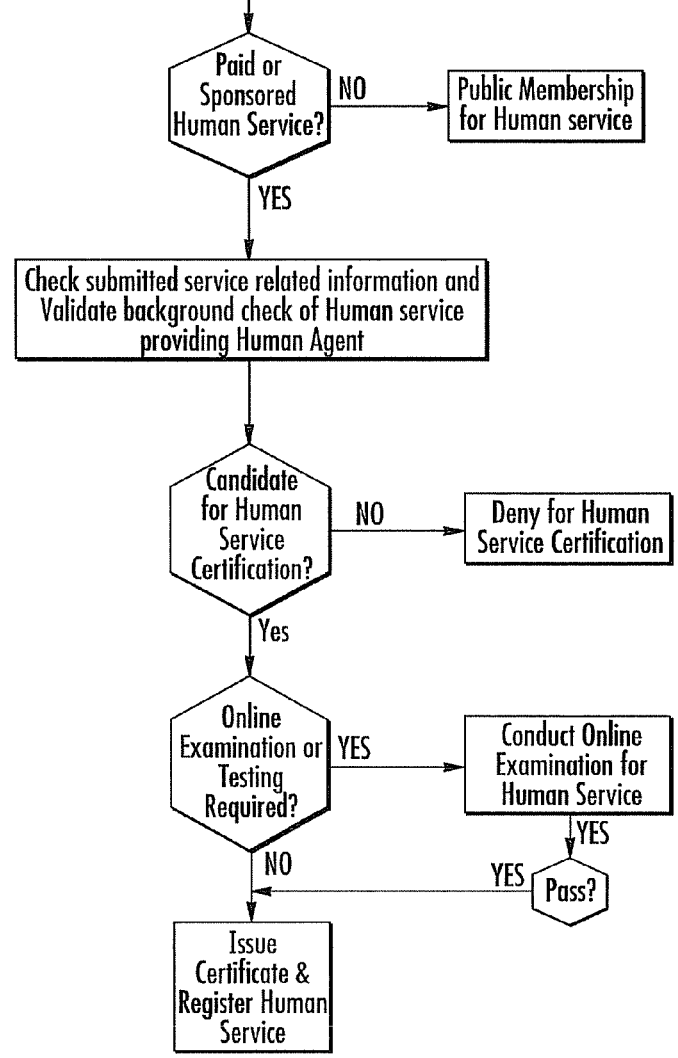
FIG. 35 illustrate algorithmic sequences flowchart of the Human Agent' service proposition, registration and certification methodology FIG. 36 illustrate algorithmic sequences flowchart of the Brokers' service proposition, registration and certification methodology.
Figure 36:
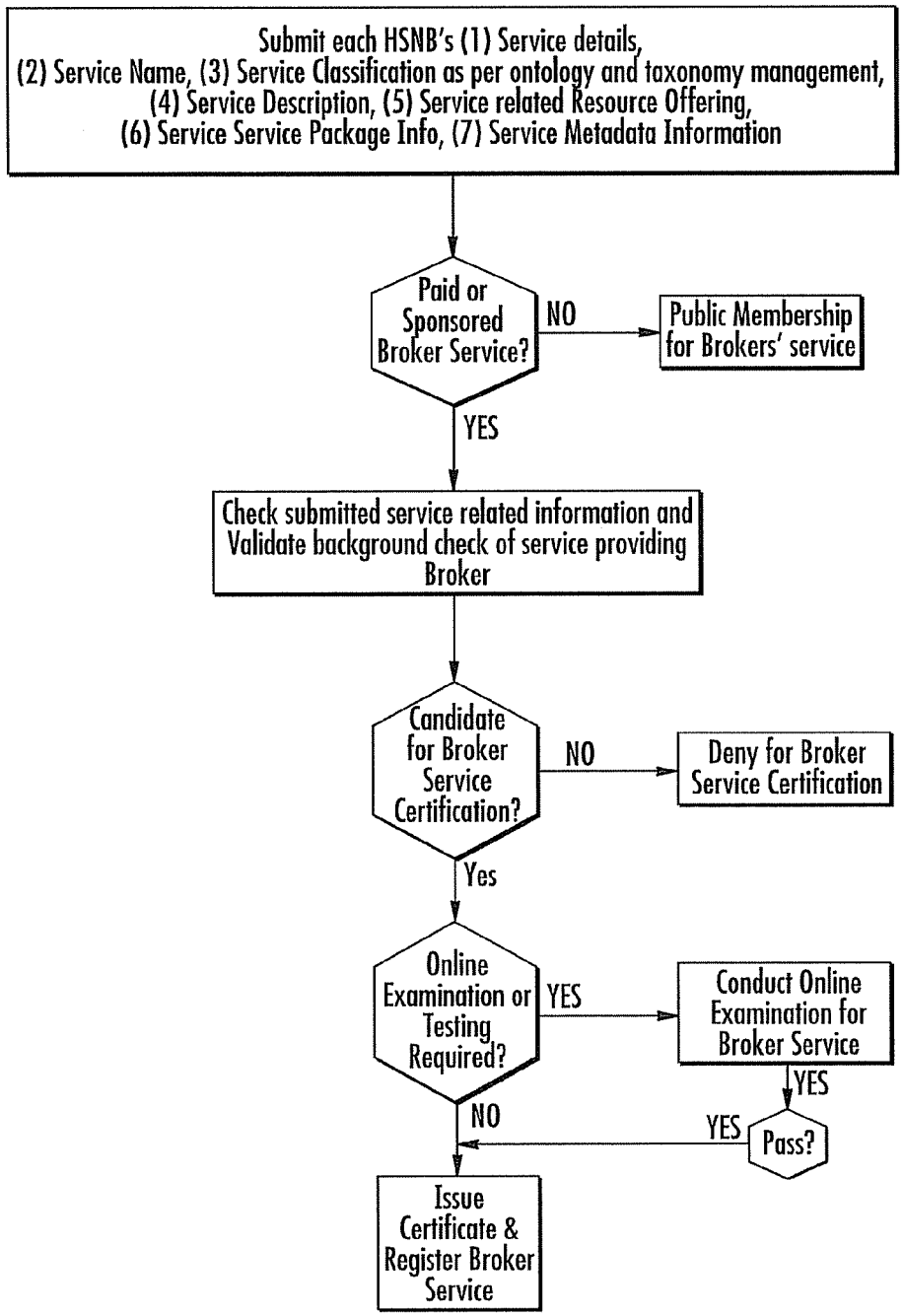

FIG. 35 illustrate algorithmic sequences flowchart of the Human Agent' service proposition, registration and certification methodology FIG. 36 illustrate algorithmic sequences flowchart of the Brokers' service proposition, registration and certification methodology.

Figure 37:
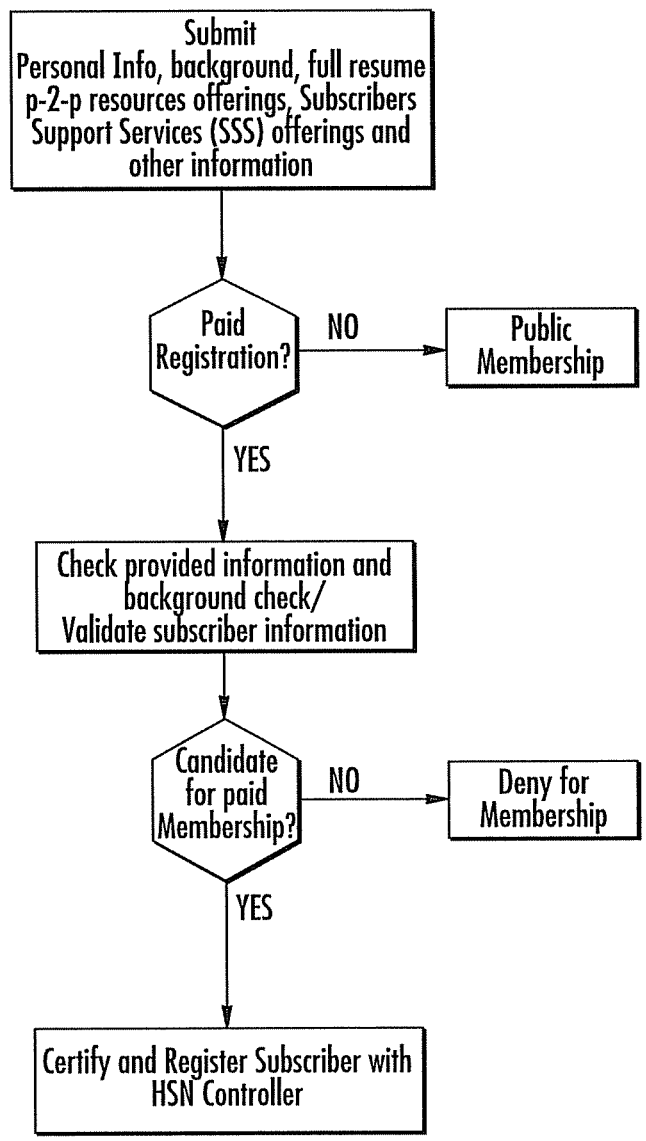
FIG. 37 illustrate algorithmic sequences flowchart of Subscribers' Paid Certification and Registration methodology with HSN Controller FIG. 38 illustrate algorithmic sequences flowchart of Registration of Human Agents', Service Providers' and Subscribers' with HSN Developer via HumanServiceNet.
Figure 38:
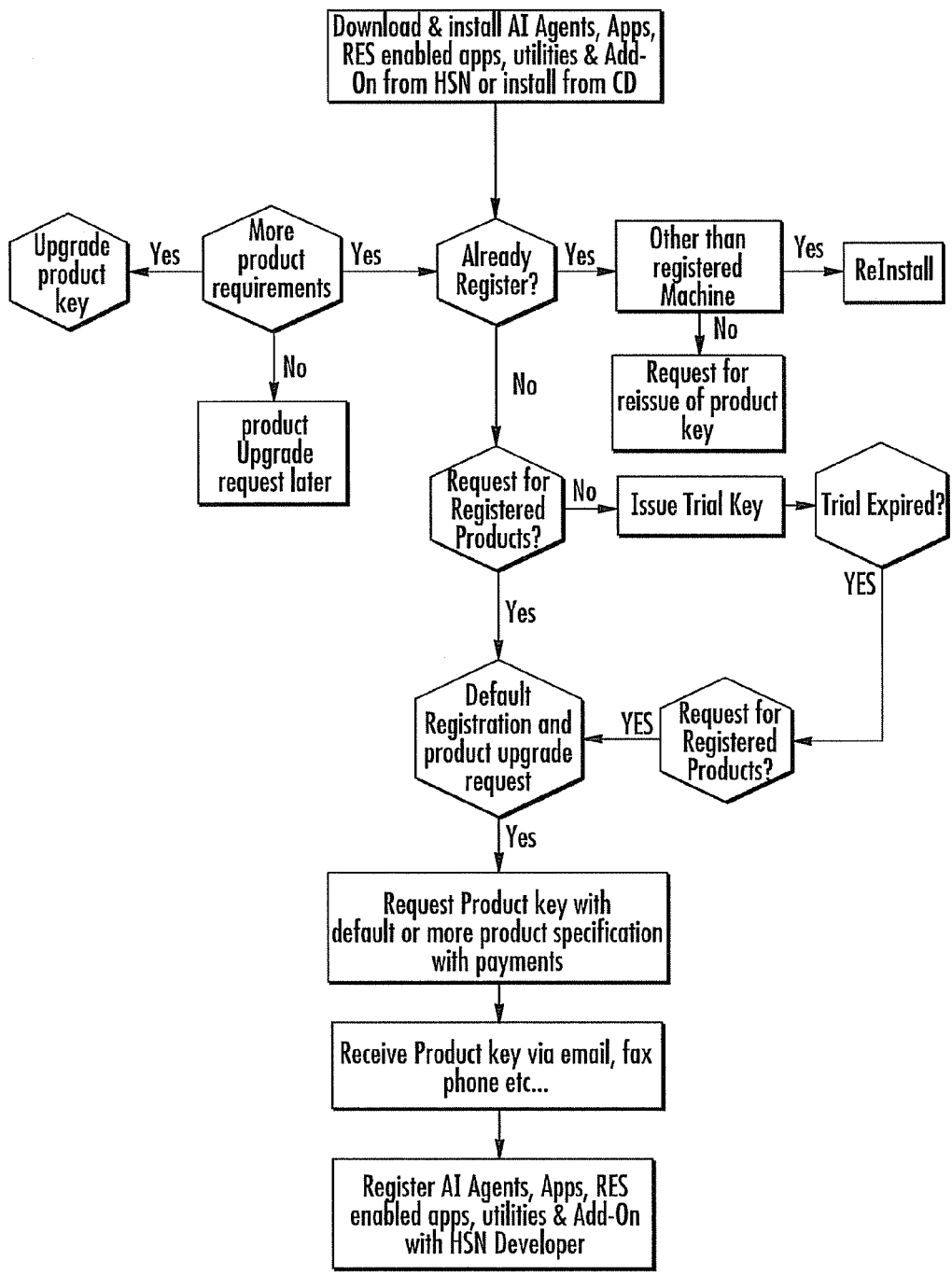

FIG. 37 illustrate algorithmic sequences flowchart of Subscribers' Paid Certification and Registration methodology with HSN Controller FIG. 38 illustrate algorithmic sequences flowchart of Registration of Human Agents', Service Providers' and Subscribers' with HSN Developer via HumanServiceNet.

Figure 39:
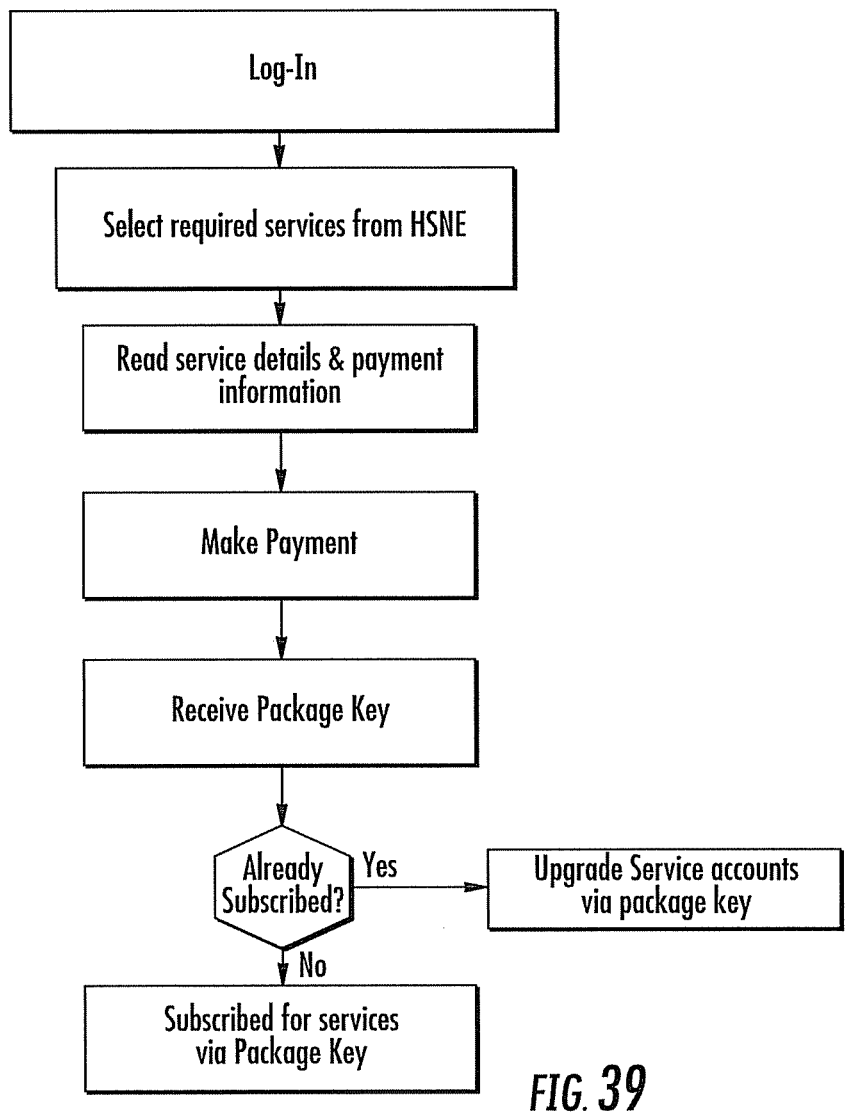
FIG. 39 illustrate algorithmic sequences flowchart of Selective Multi Services Subscription request by plurality of channel nodes and its processing by HumanServiceNet Controller and package key issuance thereby.

FIG. 39 illustrate algorithmic sequences flowchart of Selective Multi Services Subscription request by plurality of channel nodes and its processing by HumanServiceNet Controller and package key issuance thereby.

Figure 40:
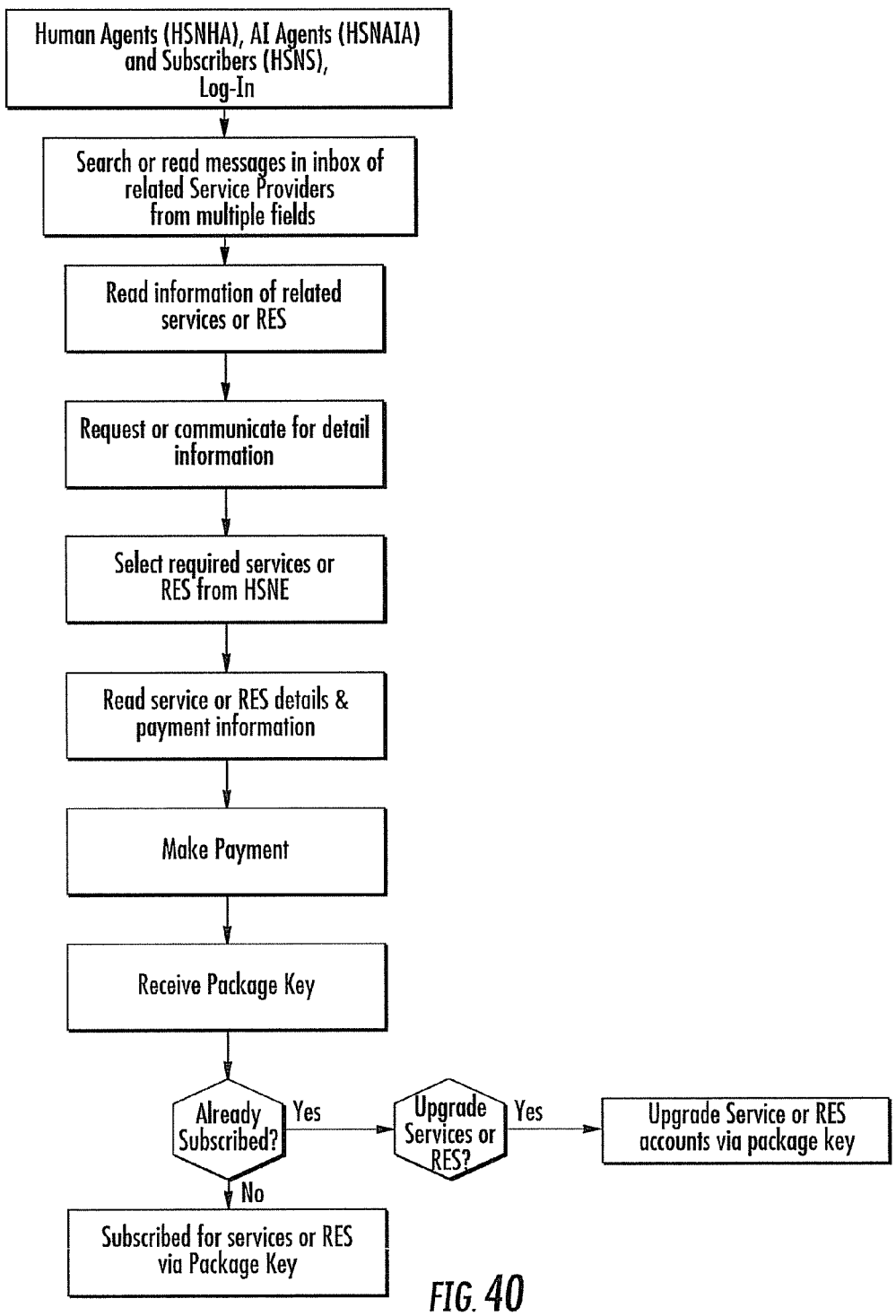
FIG. 40 illustrate algorithmic sequences flowchart of Selective Multi Services Subscription request by plurality of channel nodes and its processing by Service Providers and package key issuance thereby.

FIG. 40 illustrate algorithmic sequences flowchart of Selective Multi Services Subscription request by plurality of channel nodes and its processing by Service Providers and package key issuance thereby.

Figure 41:
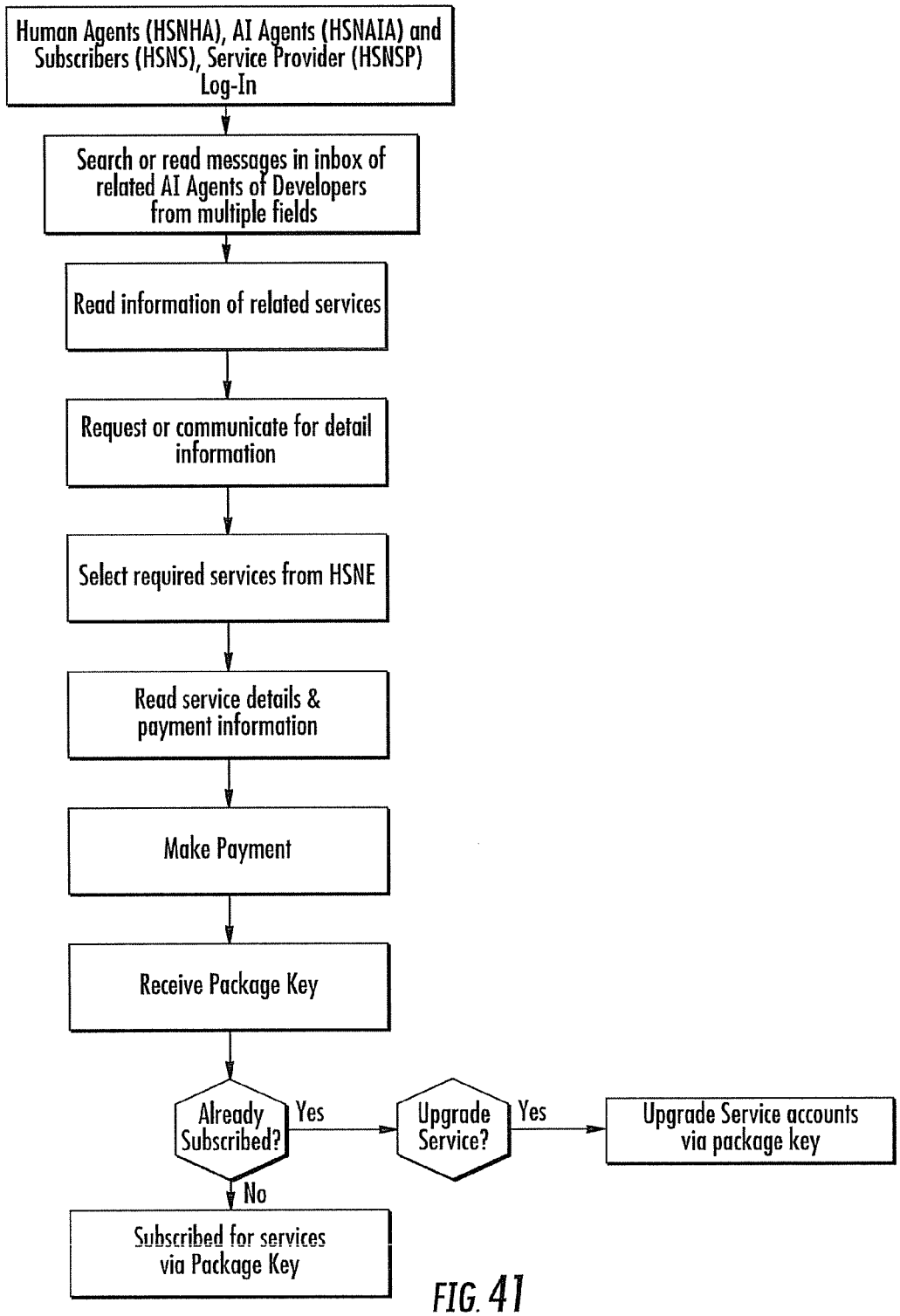
FIG. 41 illustrate algorithmic sequences flowchart of Selective Multi Services Subscription request for AI Agents by plurality of channel nodes and its processing by Developers and package key issuance thereby.

FIG. 41 illustrate algorithmic sequences flowchart of Selective Multi Services Subscription request for AI Agents by plurality of channel nodes and its processing by Developers and package key issuance thereby.

Figure 42:
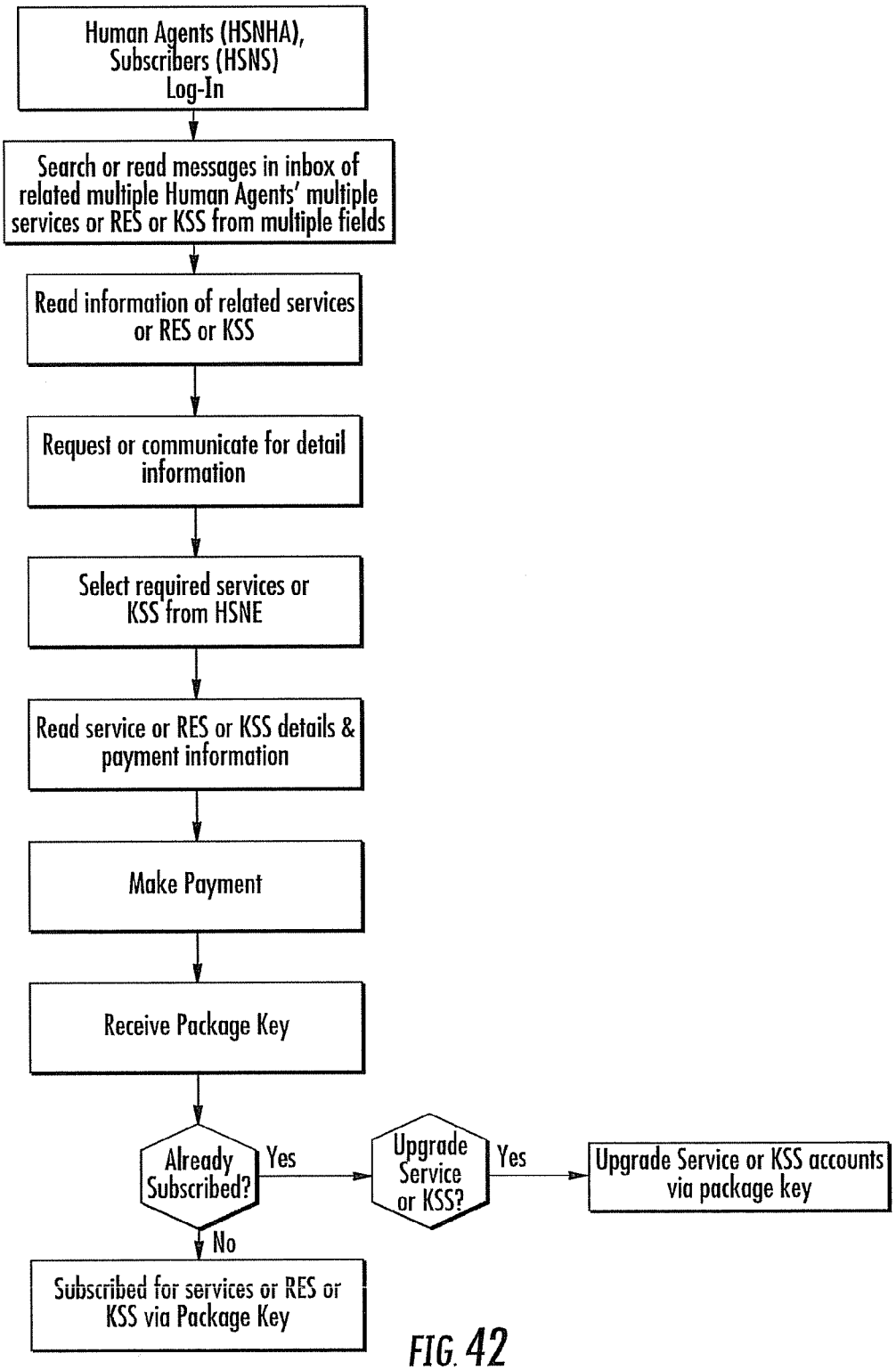
FIG. 42 illustrate algorithmic sequences flowchart of Selective Multi Services Subscription request for knowledge invocation (KIS) and knowledge support services (KSS) by one or more subscribers & Human Agents and its processing by Human Agent and package key issuance thereby.

FIG. 42 illustrate algorithmic sequences flowchart of Selective Multi Services Subscription request for knowledge invocation (KIS) and knowledge support services (KSS) by one or more subscribers & Human Agents and its processing by Human Agent and package key issuance thereby.

Figure 43:
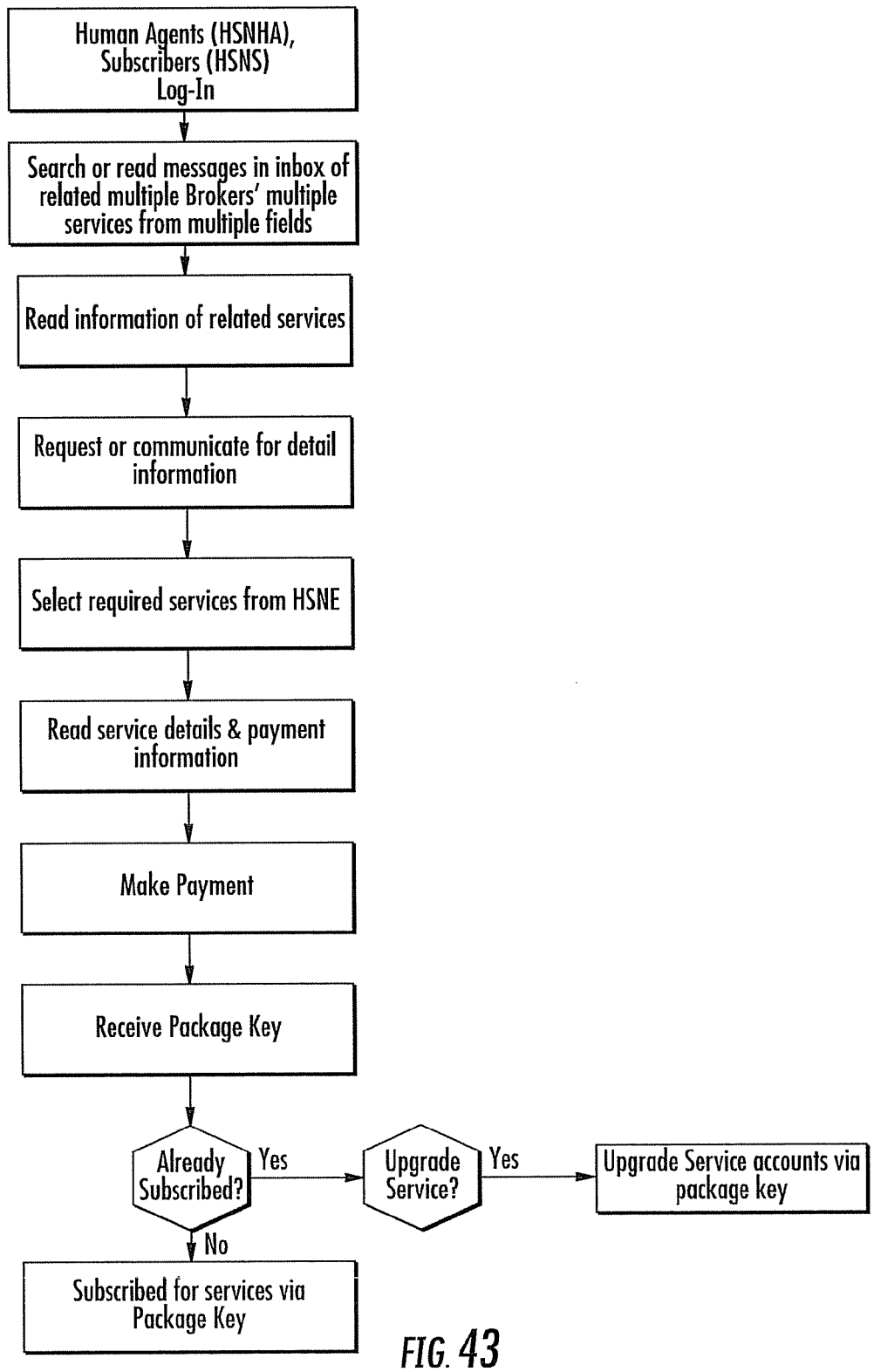
FIG. 43 illustrate algorithmic sequences flowchart of Selective Multi Services Subscription request for intermediary services by one or more subscribers & Human Agents and its processing by the Broker and package key issuance thereby.

FIG. 43 illustrate algorithmic sequences flowchart of Selective Multi Services Subscription request for intermediary services by one or more subscribers & Human Agents and its processing by the Broker and package key issuance thereby.

Figure 44:
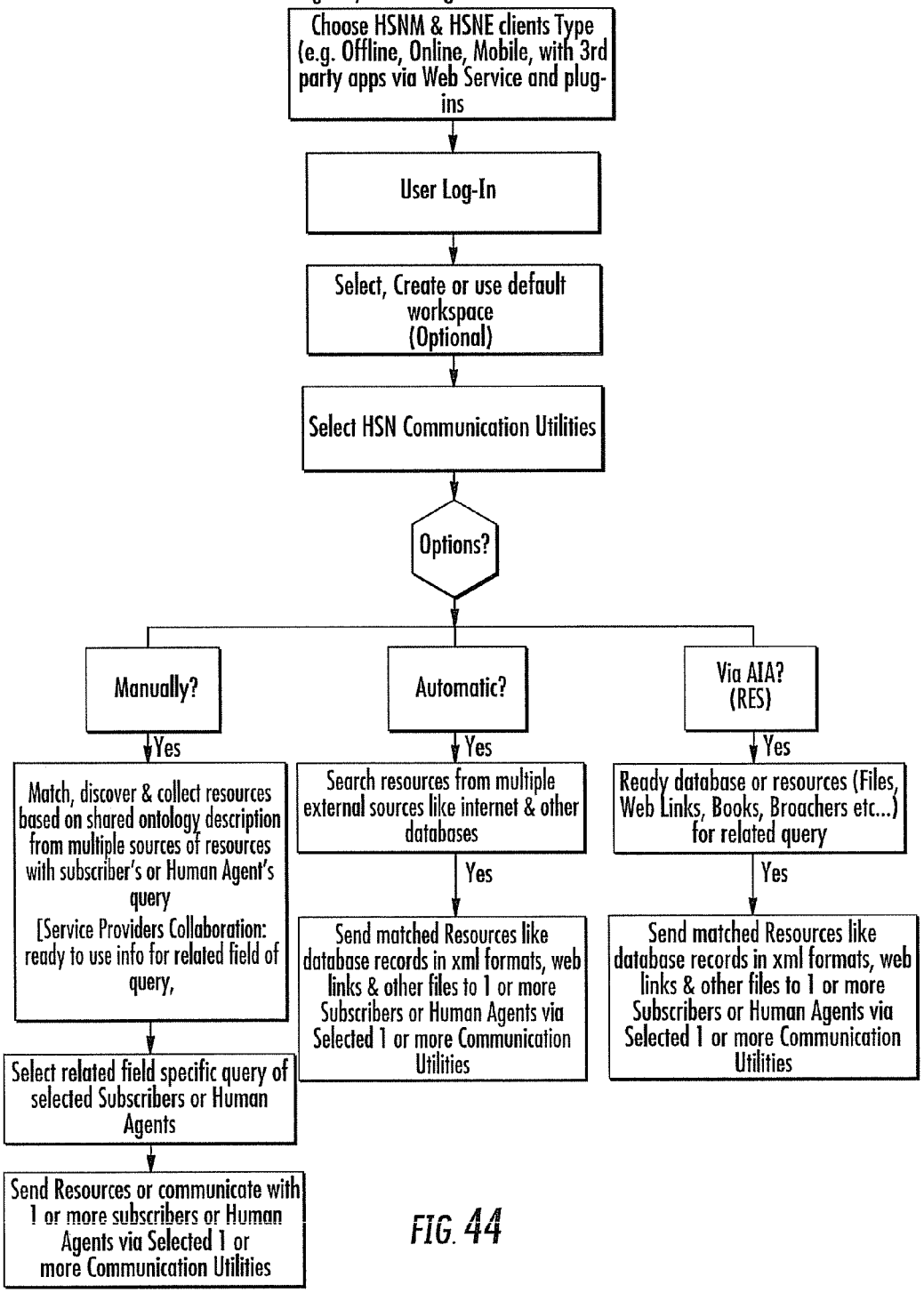
FIG. 44 illustrate algorithmic sequences flowchart of service delivery model of the Service Providers displaying multiple communications with the multiple other Service Providers, subscribers & Human Agents.

FIG. 44 illustrate algorithmic sequences flowchart of service delivery model of the Service Providers displaying multiple communications with the multiple other Service Providers, subscribers & Human Agents.

Figure 45:
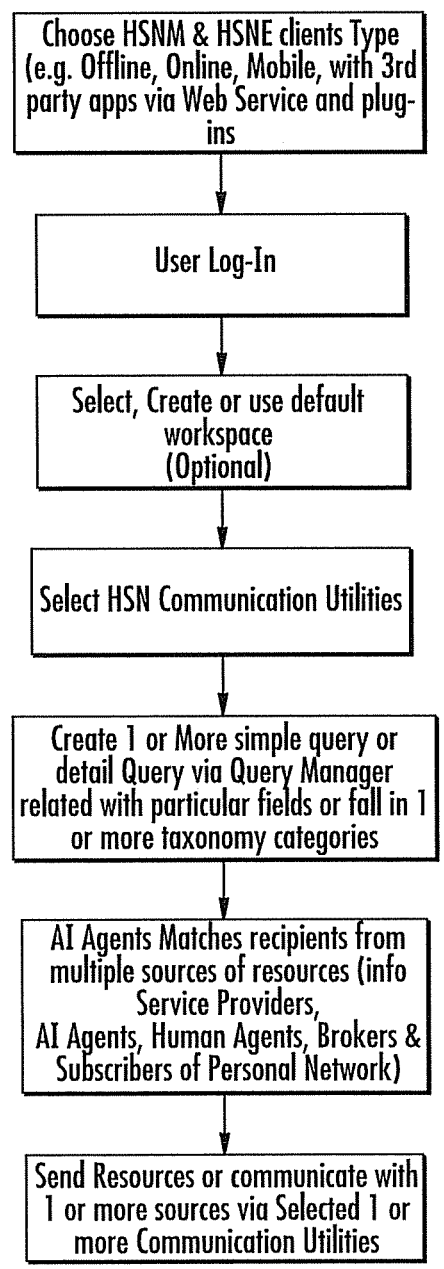
FIG. 45 illustrate algorithmic sequences flowchart of service delivery model of the AI Agents displaying multiple communications with the multiple channel nodes.

FIG. 45 illustrate algorithmic sequences flowchart of service delivery model of the AI Agents displaying multiple communications with the multiple channel nodes.

Figure 46:
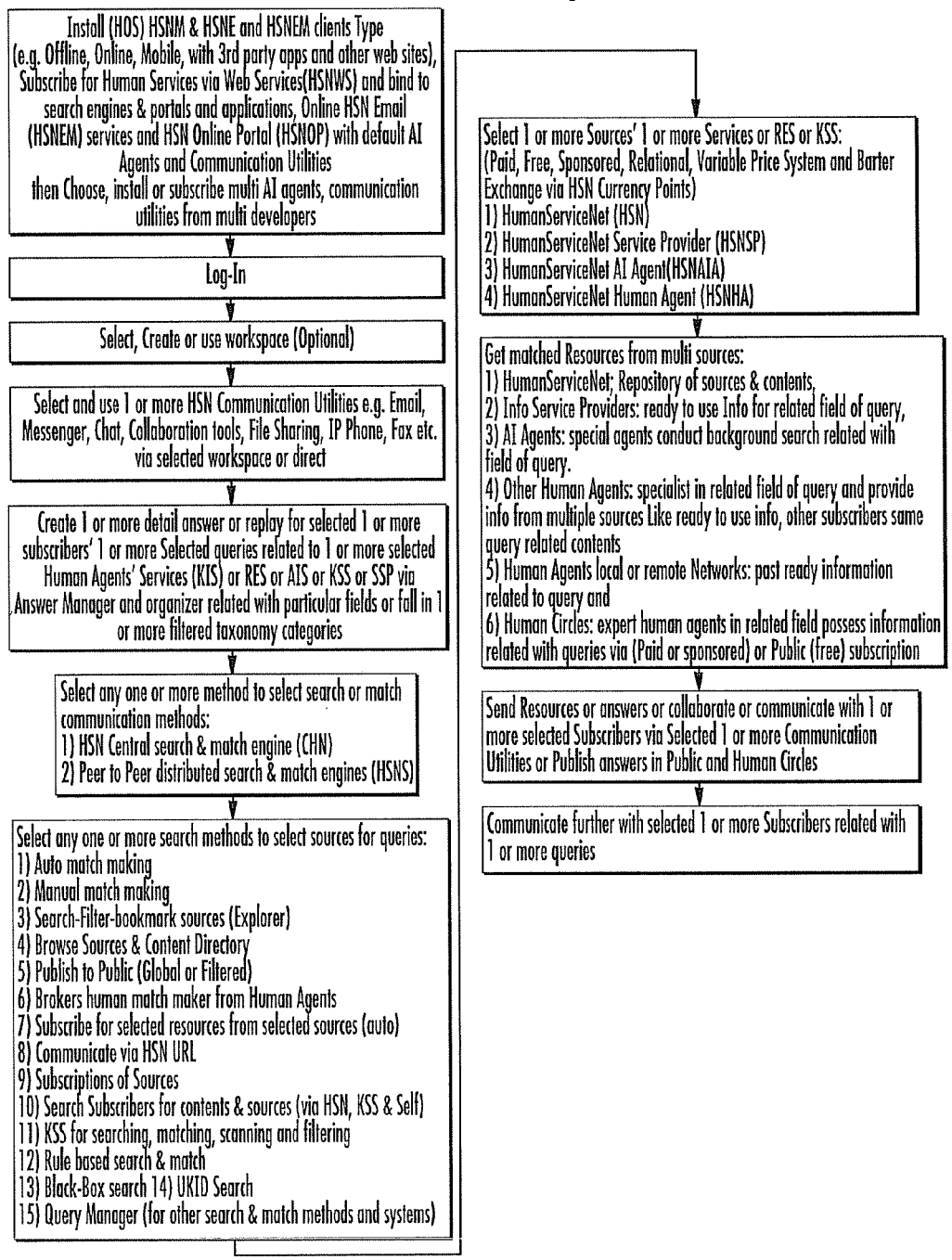
FIG. 46 illustrates algorithmic sequences flowchart of service delivery model of the Human Agents displaying multiple communications with the multiple channel nodes and one or more Human Circles thereof.

FIG. 46 illustrates algorithmic sequences flowchart of service delivery model of the Human Agents displaying multiple communications with the multiple channel nodes and one or more Human Circles thereof.

Figure 47:
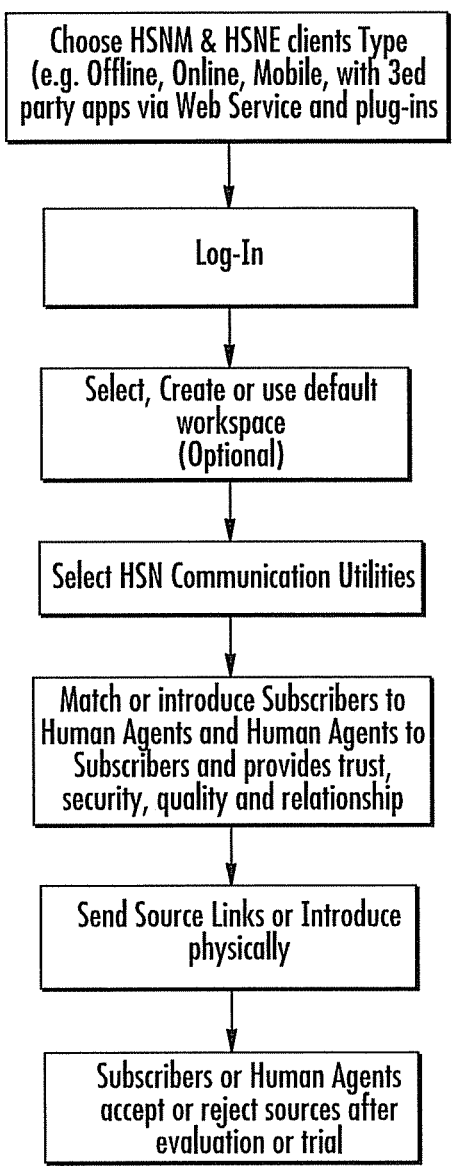
FIG. 47 illustrate algorithmic sequences flowchart of service delivery model of the Brokers displaying multiple communications with the multiple Subscribers and Human Agents.

FIG. 47 illustrate algorithmic sequences flowchart of service delivery model of the Brokers displaying multiple communications with the multiple Subscribers and Human Agents.

Figure 48:
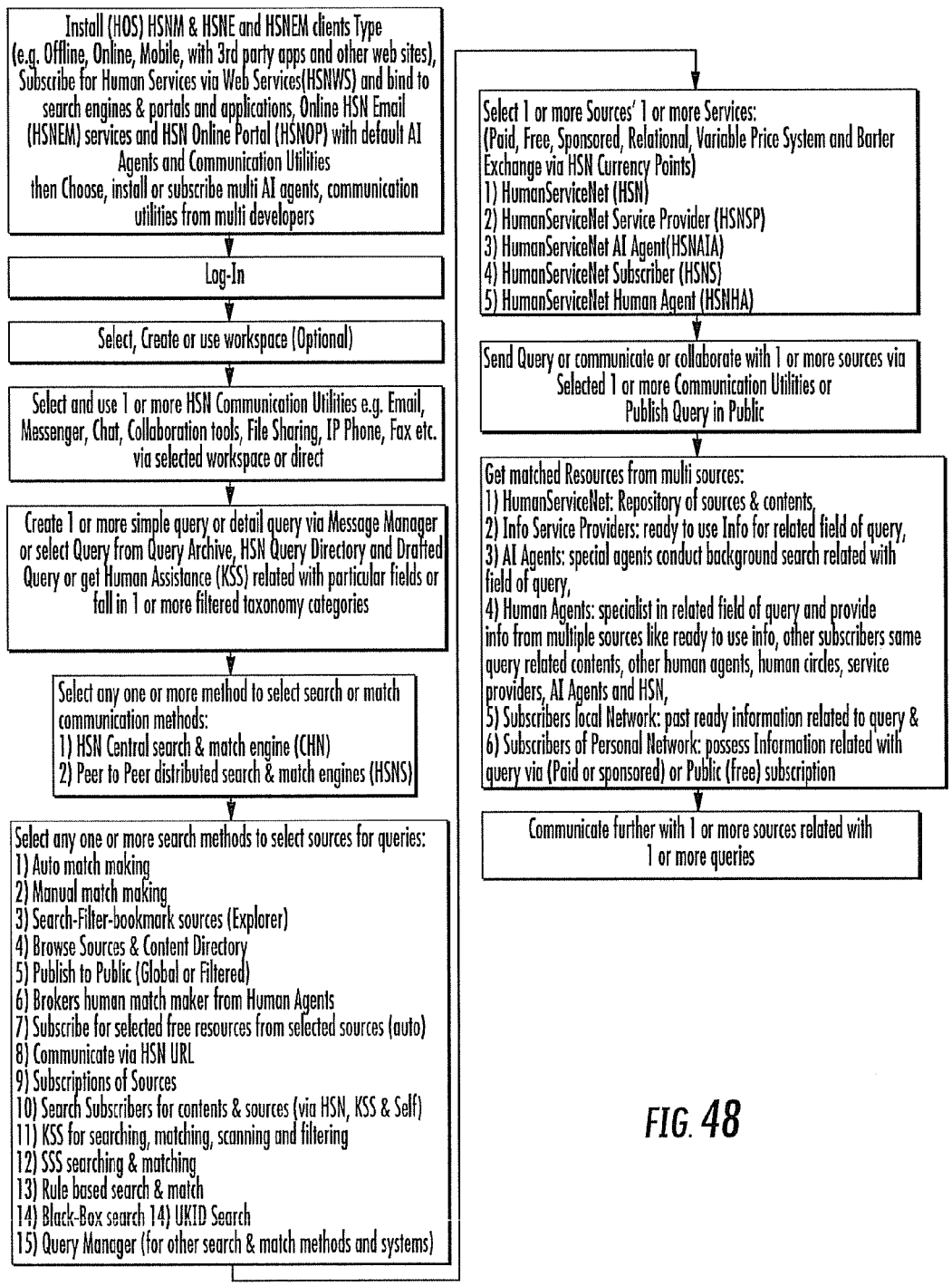
FIG. 48 illustrate algorithmic sequences flowchart of communication model of the Subscribers displaying multiple communications with the multiple channel nodes, including social personal group thereof and with the HSN controller.

FIG. 48 illustrate algorithmic sequences flowchart of communication model of the Subscribers displaying multiple communications with the multiple channel nodes, including social personal group thereof and with the HSN controller.

FIG. 49 illustrate algorithmic sequences flowchart of each of CHN's Service Package Keys Management displaying multiple package key configuring parameters related to each of subscriber thereof.

FIG. 50 illustrate algorithmic sequences flowchart of each of CHN's product Keys Management displaying multiple product key configuring parameters related to each of subscriber thereof.

Figure 51:
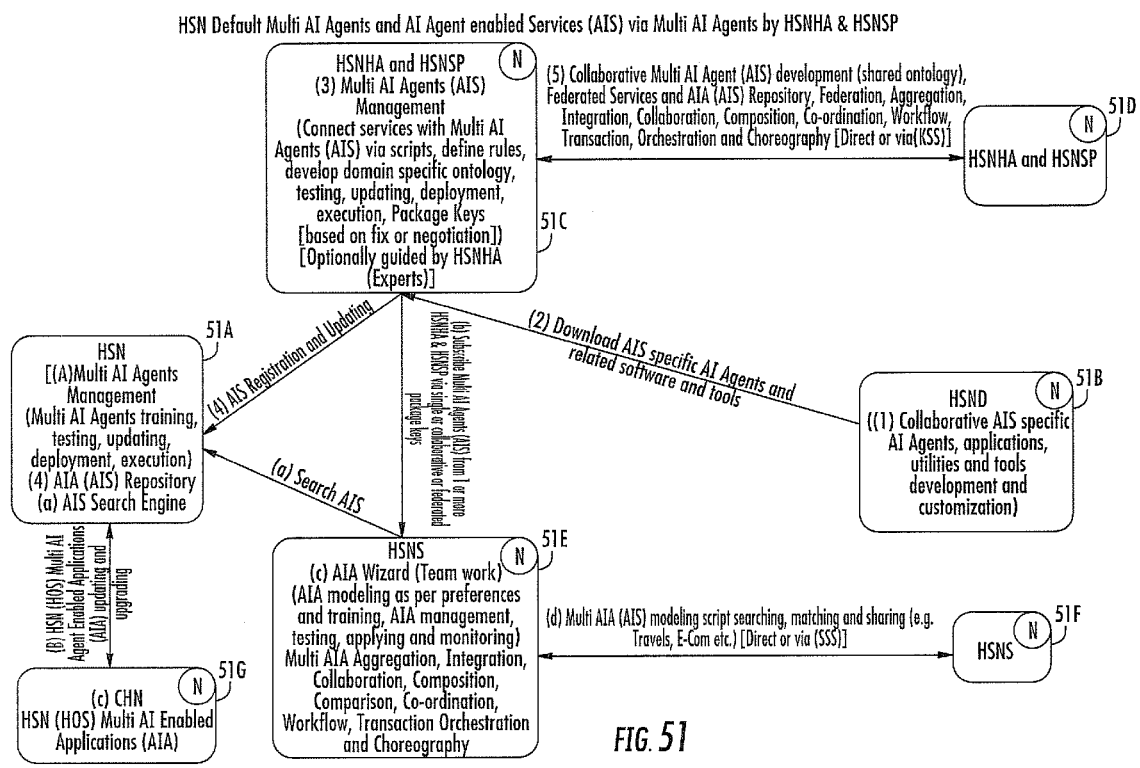
FIG. 51 illustrates a flow diagram of HSN Default Multi AI Agents and AI Agent enabled Services (AIS) working modality including its development, registration and subscription flow and exploitation for automation.

FIG. 51 illustrates a flow diagram of HSN Default Multi AI Agents and AI Agent enabled Services (AIS) working modality including its development, registration and subscription flow and exploitation for automation wherein plurality of developers (51B) developing one or more AI agents and each of service offeror (51C) including at least one human agent and at least one providers downloading one or more AI agents from one or more developers (51B) wherein each of service offeror (51C) customizing and training the downloaded AI agents to offer AI enabled services (AIS) to one or more channel nodes (51G) in the UHSF system and registering the said AIS with HSN controller (51A) wherein HSN controller storing and maintaining repository of each of registered MS and making them searchable to each of subscribers (51E) wherein the subscribers downloading requisite AIS from one or more searched human agents and providers offering AI enabled services and customizing and training said MS personally or collaboratively with other subscribers (51F) as per preferences thereof.

Figure 52:
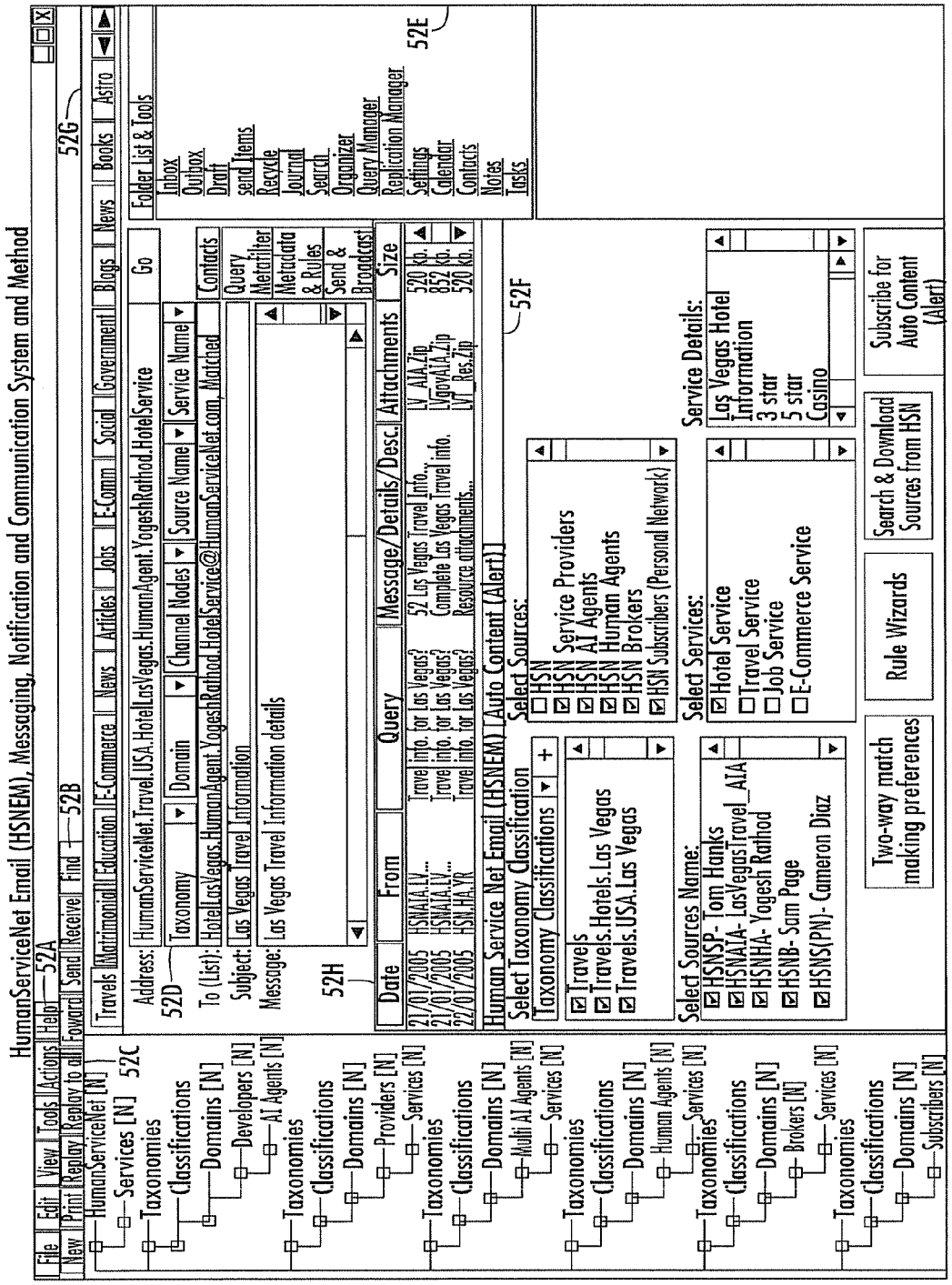
FIG. 52 showing comprehensive view of operational graphical user interface (GUI) for Email Service (HSNEM), Messaging, Notification and Communication System illustrate HumanServiceNet Email Service interface therein.

FIG. 52 showing comprehensive view of operational graphical user interface (GUI) for Email Service (HSNEM), Messaging, Notification and Communication System illustrate HSN Email Service interface wherein 52D showing the emailing posting windows and writing area whereas 52H showing the received emails arranged datewise. Each of mail can either be posted to specific channel node or can be broadcast using filter operation. The explorer 52C in the left hand side enabling email display to relevantly clicked channel node and 52E section forming a database part of the emailing system comprising of inbox, outbox, draft, sent item, recycles items, journal, search, organizer, query manager, replication manager, calendar, contact, notes and tasks. The functional aspect of emailing covering inmail and outmail alerts and asks for permissions as per settings via (52F) a auto content alters setting by the users thereof wherein selecting taxonomy, sources, source name and services for receiving auto alerts. The HSNE provides for all Human Services via Email and communicate with known as well as unknown users and subscribe for auto contents from selected multi sources. Send or advertise Email content any matched subscribers (two way match making) based on the associated metadata and send Emails to Multi known as well as unknown matched sources via multi Search Sources & Contents options.

Figure 53:
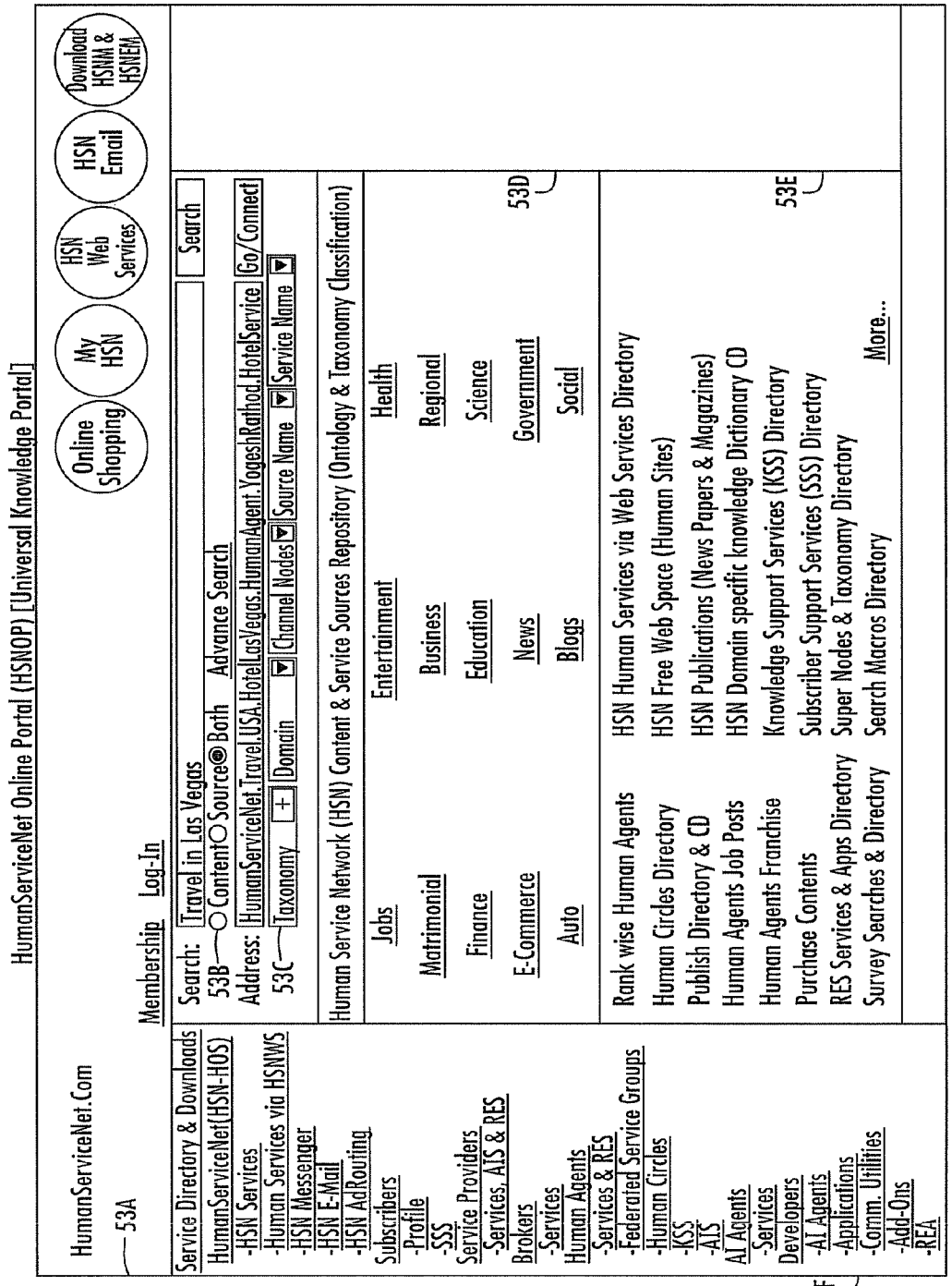
FIG. 53 showing comprehensive view of the graphical user interface (GUI) for HumanServiceNet Online Portal (HSNOP) illustrates the possible knowledge fields and tools therefor.

FIG. 53 showing comprehensive view of the graphical user interface (GUI) for HumanServiceNet Online Portal (HSNOP) illustrate the possible knowledge fields and tools therefor, 53D representing a typical directory structure of plurality of subject containing subject index followed by UHSF activity specific accomplishment of each of task including products and services subscription therefrom. An online portal providing for web based support, subscription system for online shopping, webservices, emailing and messaging, questions and answer publication, and primarily an interface for membership and channel node membership registration. Providing for a UHSF system wide 53E data analysis, facilitating users for better understanding the system function providing for rankwise human agents, human circle directory, Publish Directory & CD, Human Agents Job Posts, Human Agents Franchise, Purchase Contents, RES Services &Apps Directory, Survey Searches & Directory, HSN Human Services via Web Services Directory, HSN Free Web Space (Human Sites), HSN Publications (News Papers & Magazines), HSN Domain specific knowledge Dictionary CD, Knowledge Support Services (KSS) Directory, Subscriber Support Services (SSS) Directory, and Super Nodes & Taxonomy Directory. 53F provides for plurality of service directories and download facility of plurality of channel nodes including that of HSN controller. 53B and 53C providing interface for searching and navigating UHSF resources. Each of users having access to the said online portal is enabled to login via product key thereof.

Figure 54:
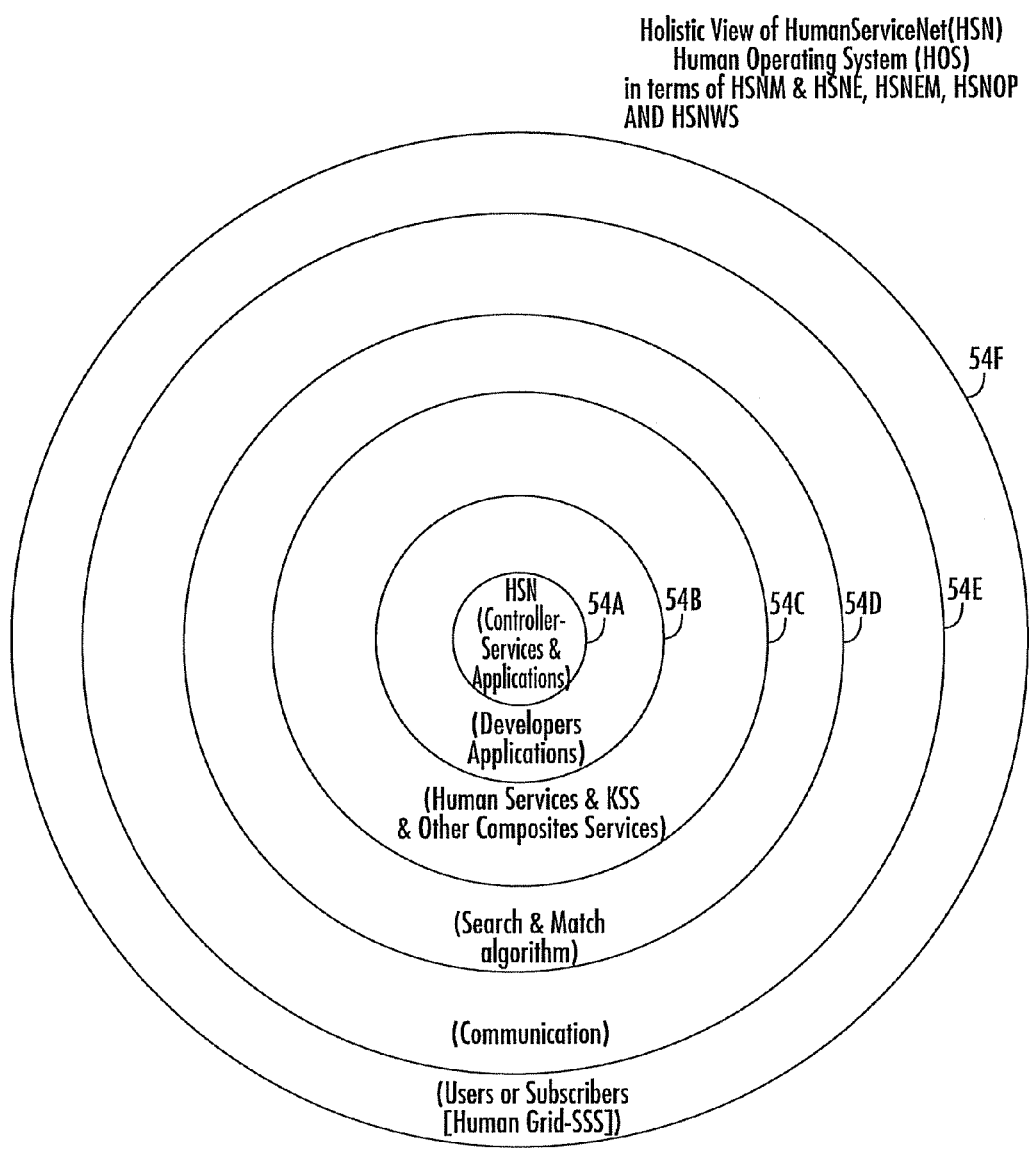
FIG. 54 illustrates Holistic View of Universal Human Service framework's (UHSF) Operating System (HOS) displaying the layered segregated circular operating tiers necessary for service integration.

FIG. 54 illustrates Holistic View of Universal Human Service framework's (UHSF) Operating System (HOS) displaying the layered segregated circular operating tiers necessary for service integration wherein users (54F) forming the external most layer of the UHSF operating system. This layer (54F) typical meant for human networking and social networking development on the UHSF interactive and communication platform as represented by communication layer (54E) the said layer comprising of plurality of communication modality integrated in one platform and provided by means of product key on demand, wherein each of user in layer 54F installing the said communication utility including HSNE, HSNM, HSNEM, and HSNOP providing for different modality including voice, text and video communication. The UHSF operating system further providing for core system level functionality (54D) search and matching of system resources including channel nodes for requisite keywords or full text queries. The operating system further providing for integration of human (54C) services at the internal core of the operating system model, wherein each of human in the UHSF system are perceived in the predefined and system identified attributes and parameters, facilitating KSS, RES, AIS, SSS, SSP and knowledge invocation services (KIS), the system level enability of plurality of functions provided by UHSF system are operated by means of various application and software utilities developed by plurality of developers (54B) so as to facilitate user perform advance functions on the UHSF platform, the HSN controller forming the core kernel (54A) of the said model of UHSF operating system is a means for system wide events, registration and certain essential functions which are not performed in peer to peer environment are centrally managed by the said controller.

Figure 55:
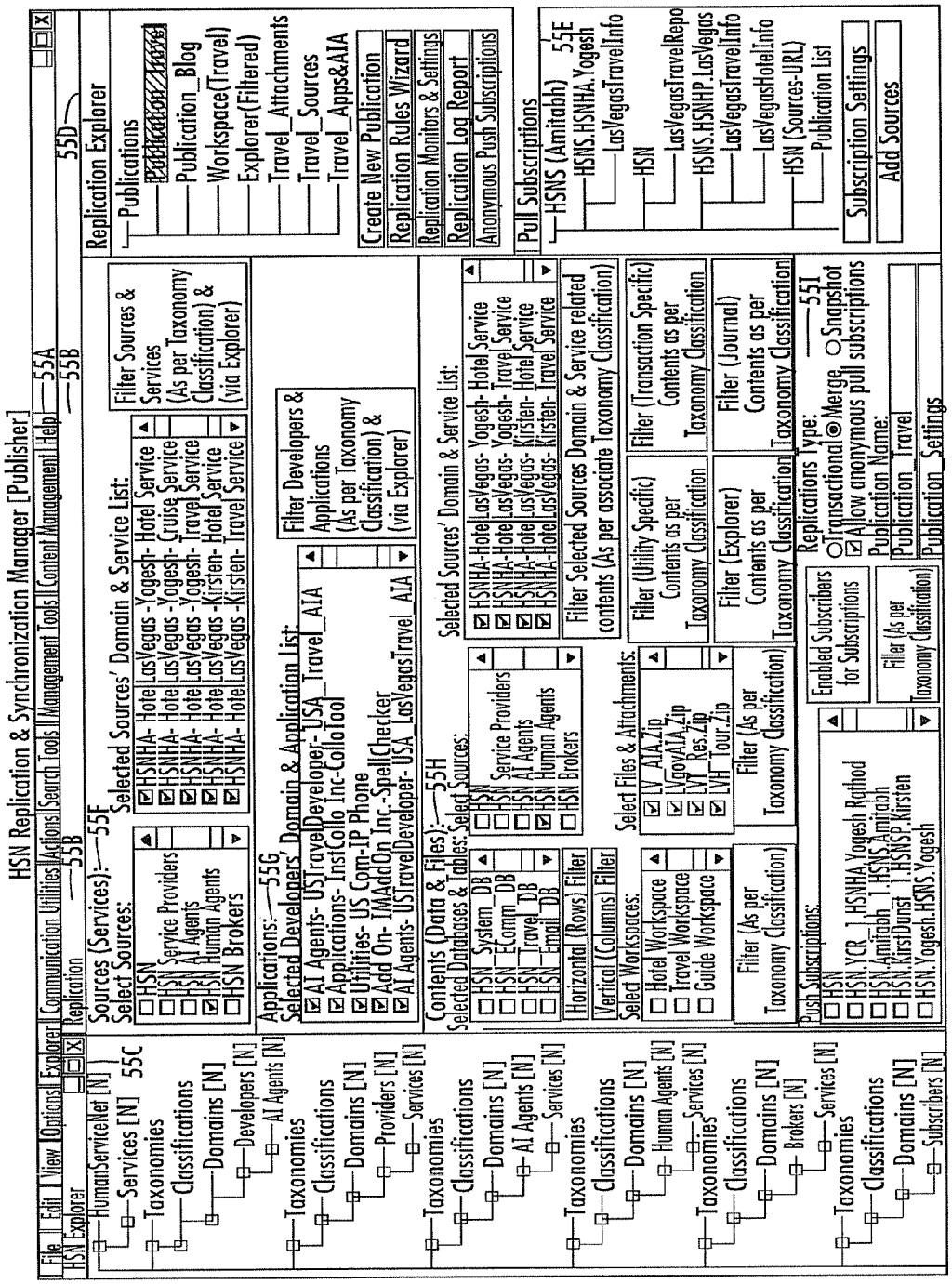
FIG. 55 showing graphical user interface (GUI) for HumanServiceNet Replication & Synchronization Manager (Publisher) illustrate multiple tools responsible for Synchronization and Replication of Services including Source links, applications and Contents alongwith the replication explorer thereof.

FIG. 55 showing graphical user interface (GUI) for HumanServiceNet Replication & Synchronization Manager (Publisher) providing knowledge replication services. User can replicate publications of Service Sources, Applications and Contents via push subscriptions to selected subscribers as well as subscribe for replication publications via pull subscriptions. In the UHSF system data can be published either globally i.e. complete UHSF systemwide or in the specified identified social group or to the identified privileged channel nodes for conditional access therefor. Replication is a set of technologies for copying and distributing Sources (Services), Applications and Contents (Data & Files) from one Source to another and then Synchronizing between Sources for consistency. Using replication, users are enabled to distribute data to different locations, to remote or mobile users over a local area network, using a dial-up connection, and over the Internet. Replication also allows users to enhance application performance, physically separate data based on how it is used or distribute database processing across multiple servers. The content of each of channel node needs replication and synchronization at the appropriate part of the system for updated picture of the system providing availability of data when and where it is needed. The replication and synchronization manager helps accomplish the said task via various tools wherein the interface thereof having regular system explorer (55C) to the left and specifically replication explorer (55D) to the right showing the publication details of the said publisher. Replication facilitating multiple users to keep copies of the same data which is useful when multiple users need to read the same data and facilitates greater autonomy in the system for distributing copies of data and changes on a scheduled basis wherein multiple users making changes then merging the data modifications together by means of creating publication. Publications are basically made for sources (55F), applications (55G), and contents (55H), wherein the publisher selecting each of services, data-files, and applications via filtering from the sources thereof. 55I selection providing for determination of replication type as a transactional, merge or snapshot and providing for privilege of anonymous pull subscription and selection and filter for subscribers for generating push subscription. The replication further can be preprogrammed via replication rules wizard and can be monitored.

Figure 56:
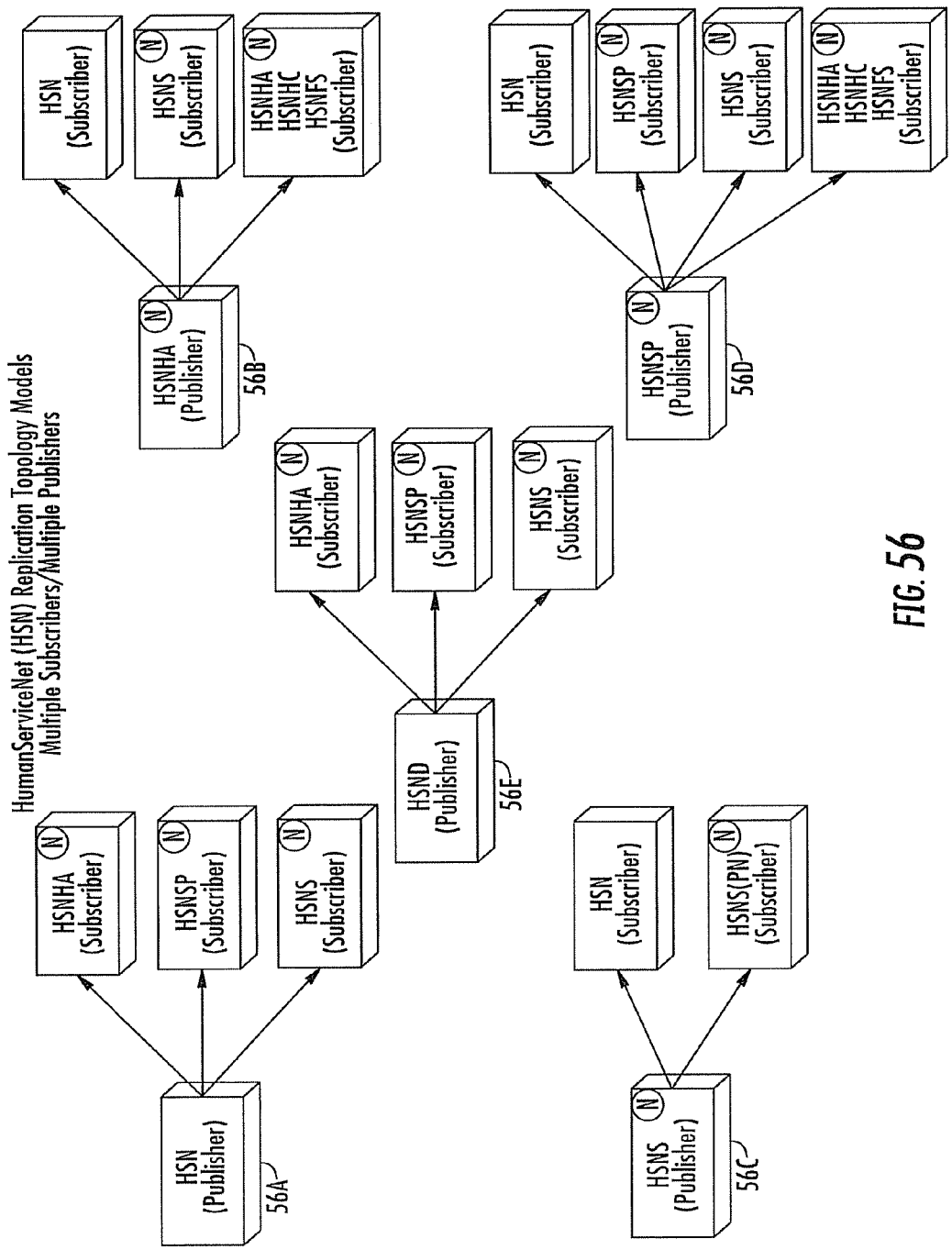
FIG. 56 shows a logical block diagram of HumanServiceNet (HSN) Replication Topology Models illustrate the replication topology of each of CHN as per protocols thereof.

FIG. 56 shows a logical block diagram of HumanServiceNet (HSN) Replication Topology Models illustrate the replication topology of each of CHN as per protocols and relationship established via FIGS. 7 and 16 wherein HSN controller (56A) replicating topologically to at least one human agent, service provider and subscriber, each of human agent providing replicating topologically to SN controller and to at least one human agent, human circle, human federated services and subscriber, each of subscriber replicating to HSN controller and at least one subscriber, each of service provider replicating to HSN controller, and at least one service provider, subscriber, human agent, human circle, and human federated services and each of developer replicating to at least one service provider, subscriber, human agent. The said replication and synchronization of various publications is regulated via protocol based correspondence logic.

FIG. 57 showing graphical user interface (GUI) for binding human services from the UHSF system via web services with the $3^{rd}$ party software and web sites like e-commerce, search engine and other web sites illustrate the required tools therefor including searching (57B) and navigation (57C) tools wherein each of UHSF system user searching for human agents services deemed to be used via web services and establishing connection therewith via webservices invocation logic.

FIG. 58 shows discrete services which Human Grid can integrate for true universal operation. Fields, domain and subject are being identified parameter whereby each of interested human are grouped together forming a segregated subjectwise human aggregation for social networking and knowledge sharing, the similar aspects are exemplified but not restricting the scope of operation of the said system which includes universal human operating system (58A), universal human service framework (58B), Universal Human Relationship Management (58C), Universal Innovation Networking (58D), Universal Clustered Virtual Brain (58E), Universal Social Networking (58F), Universal Knowledge Management (58G), Universal Digital Divide Solver (58H), Universal Human Search Engine (58I), Universal Human Match Maker (58J), Universal Human ID (58K), Universal Human Knowledge Transfer (58L), Universal Human Resources Repository (58M), Universal Human Linking & Network (58N), Universal Human Taxonomy Classification (58O), Universal Human Resource Planning (58P), Universal Human to Human Communication (58Q), Universal Human Collaboration (58R), Universal Human Grid Utilization (58S), Universal Human society (58T), Universal Human and Machine Collaboration via Human (Services) Grid and Information & Computing Grid (58U).

FIG. 59 shows a logical segregation of Human Grid in term of multiple Sub-Grids and integration thereof as exemplified in FIG. 58. 59A realizing a human grid and possible subcomponents into data & information grid (59B), physical grid (59E), knowledge grid (59C), computing grid (59D), resources grid (59H) and various sub grids as per attributes, taxonomy, ontology and classification (59G). In the UHSF system grid formation being considered at universal level, enterprisewide grid creation can not be ruled out as corporate are growing in sizes hence it is difficult to manage such distributed physical and computing resources without grid formation. Though communication and transactional aspects remains the same in any grid configuration what differs is subject headings, their behaviors, and their desired implementation, which can be worked out for any given situation.

Figure 60:
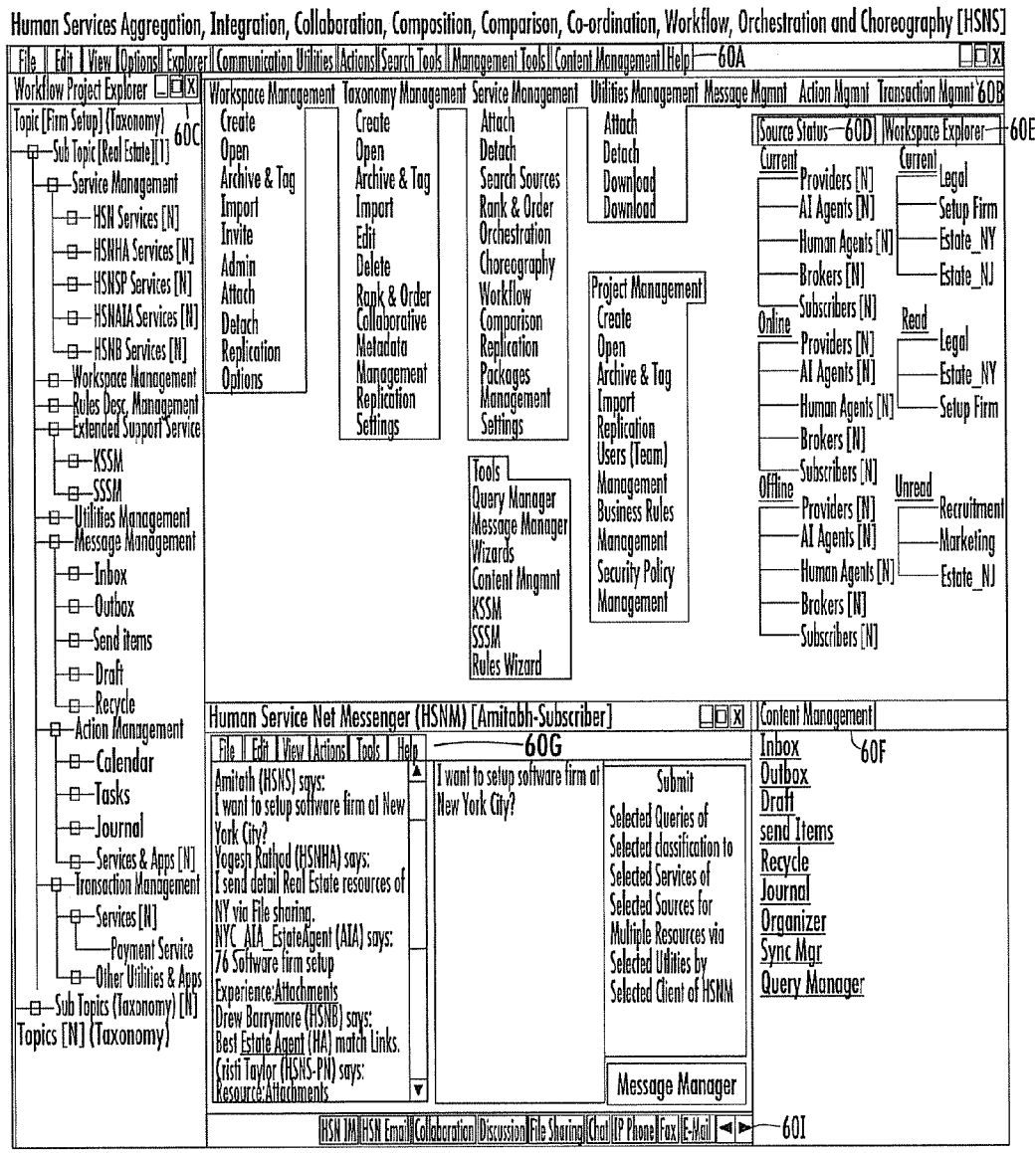
FIG. 60 showing graphical user interface (GUI) for Human Services Aggregation, Integration, Collaboration, Composition, Comparison, Co-ordination, Workflow, Orchestration and Choreography Manager for HumanServiceNet Subscribers [HSNS].

FIG. 60 showing graphical user interface (GUI) for Human Services Aggregation, Integration, Collaboration, Composition, Comparison, Co-ordination, Workflow, Orchestration and Choreography Manager for Subscribers (HSNS) wherein each of subscriber exploiting the UHSF system resources and enabling the communication, interaction and data transfer based on the predetermined protocol and widely automating various functions and managing them in the workspaces (60E). Services and resources utilization requires a platform having tools for aggregation integration, collaboration, composition, comparison, coordination, workflow management, orchestration and choreographing of the said services. Each of subscriber organizing services subscription and planning via tools provided for searching, inquiring and subscribing the said services. 60D providing for a ready reference showing status availability of various sources. 60G a messenger for submitting selected queries of selected classification of selected services for multiple resources via selected utilities by selected clients of HSNM. 60A & 60B providing for various tools for accomplishment of above stated objects wherein the said objects includes management tools for various operations related to workspace, taxonomy, services, utilities, tools, actions, message, transaction and project management. 60F providing for content organization wherein all communication and events related data is stored. Choreographing via use of various tools facilitating weaving of different Human Services into meaningful business process, Sequence, and transaction. Sequence whereby aggregating service groups and service collections, integrating $3^{rd}$ party web services, establishing collaborative communication flow between human agents, human services and other all services, composing life cycle management (e.g. creation, termination etc.), comparing Human Services as per quality (hits & ranks), relevance and package price (as per TCO), coordinating Workflow the management of steps in a business processes wherein a workflow specifies what tasks need to be done, in what order (sometimes linearly, sometimes in parallel), and who has permission to perform each task. Most task performers are humans but they can also be automated processes, orchestrating the control and data flow between Human Services into business process.

(60B and 60C) Workflow Explorer contains 1 or more user created Topic and all Sub-Topics related to particular subject or task or query or issue or problem or business requirements etc. e.g. Topic is [How to Setup Firm at New York City?] and its Sub Topics are (1) Real Estate (2) Legal Requirements (3) Recruitment (4) Marketing (5) Finance etc. which is classified and arranged via (Step-1) Taxonomy & Ontology Management which provides all functionalities like create new, open existing, use from archive or tag, replication from multi sources and import taxonomy project. Projects can be edited and deleted. Taxonomy can be ordered and ranked as per requirements and metadata can associate with each part of taxonomy. Each Sub-Topic has (Step-2) Workspace Management, in which 1 or more workspace can be managed. User can create new, open existing, attach, detach, use from Archive or tag, import, replication and invite for workspaces. E.g. Sub-Topic Real Estate has two workspaces like Estate_NY and Estate_NJ. Each Workspace can contain 1 or more utilities and applications for communication, collaboration and content management via (Step-3) Utilities Management which contains attach, detach, download and replication of Utilities. e.g. HSN IM, HSN Email, Collaboration, Discussion, File Sharing, Chat, IP Phone, Fax, E-Mail. Each Sub-Topic has (Step-4) Service Management, in which 1 or more services of HSN, HSNHA, HSNSP, HSNAIA, and HSNB are attached, detached, searches via multi options like Auto Match, Custom Match, Search & Bookmark, Browse HSN Directory, Publish (Global), Publish (Filtered), Auto Content (Alert), HSN Address Directory, HSN Explorer (HSNE) and Human Match Maker, Ranking & Ordering, Replication, Aggregation, Integration, Collaboration, Composition, Comparison, Co-ordination, Workflow, Orchestration and Choreography. (Step-5) is Message management with the help of Journal, Organizer, and Multi search & math options, Inbox, Outbox, Sent Items, Draft, Recycle and other options required for message and content management. (Step-6) is Action Management which provides varies utilities and tools for successful workflow Like Calendar, Tasks, Journals, Services and Utilities & Applications. (Step-7) is Transaction Management which has 1 or more Services e.g. Payment for successful transaction.

(60D) illustrates Service Sources status like Current indicates currently sources are communicating, Online status indicates service sources are online and available for communication and offline status indicates currently service sources are offline and available at later.

(60E) illustrates workspace status Current (Legal, Setup Finn, Estate_NY, Estate_NJ) indicates currently use workspaces, Read (Legal, Estate_NY, Setup Firm) indicates workspace contents already read and Unread (Recruitment, Marketing, Estate_NJ) indicates workspaces content not read.

Figure 61:
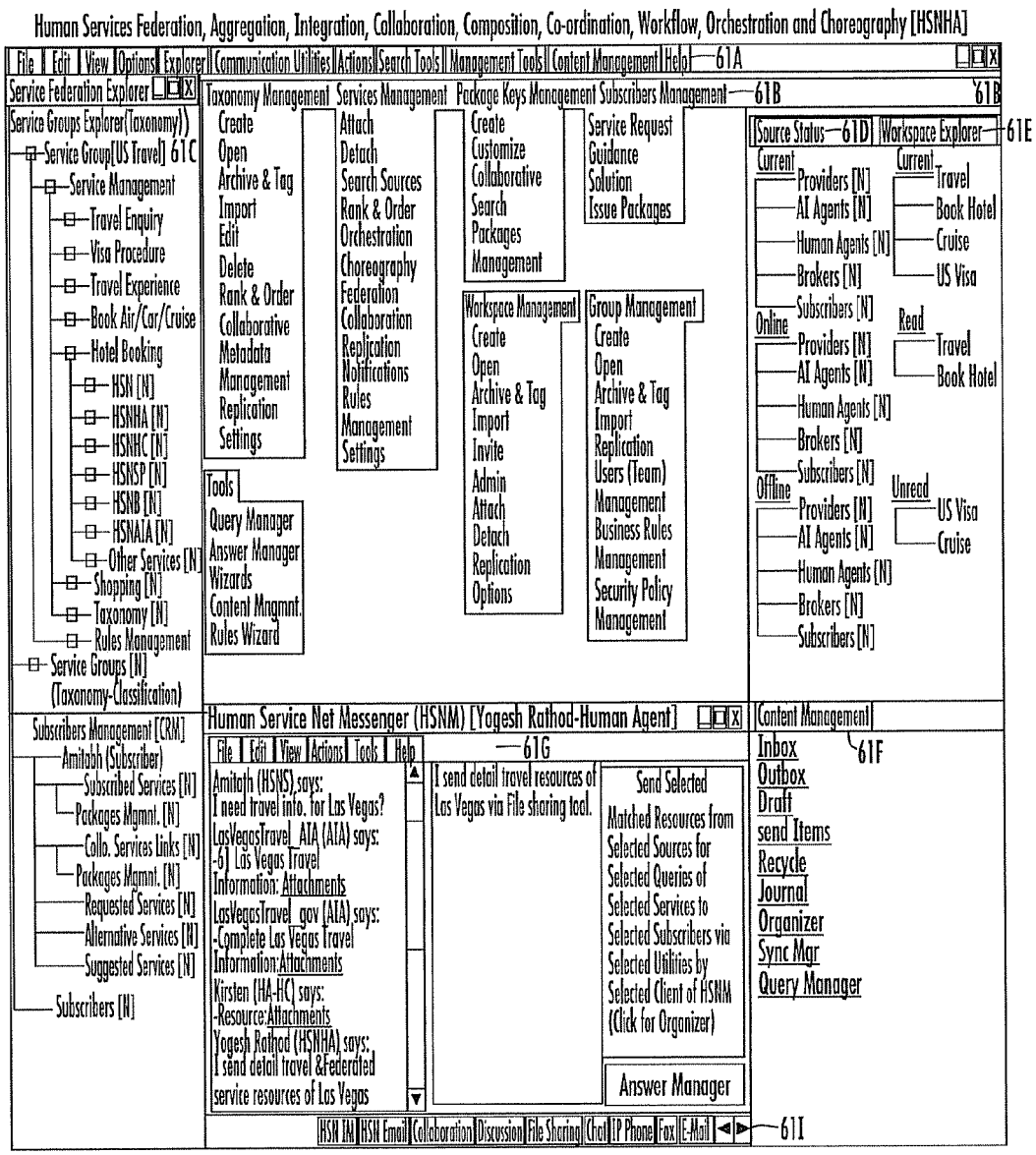
FIG. 61 showing graphical user interface (GUI) for Human Services Federation, Aggregation, Integration, Collaboration, Composition, Co-ordination, Workflow, Orchestration and Choreography Manager for HumanServiceNet Human Agents [HSNHA].

FIG. 61 showing graphical user interface (GUI) for Human Services Federation, Aggregation, Integration, Collaboration, Composition, Co-ordination, Workflow, Orchestration and Choreography Manager for Human Agents (HSNHA) wherein each of HA providing one or more federated services including devising services categories as per taxonomy and related to particular subject or task or problem or issue or topic and arrange and transmit for solution or answer thereof to one or more subscribers thereof composing one or more needs, behavior, likings, requirements, and queries of one or more subscribers and one or more service group explorers wherein the choreography of said composition is executed via workspace explorer thereof so as to orchestrate the federated services of plurality of HSNHA. The service federation by each of HA is enabled via various management tools (61A & 61B) including taxonomy, services, package key, subscribers, workspaces, group, and tools management, wherein each of human agent providing various federated services and communicating, interacting and transferring data based on the predetermined protocol. Each of service offering and federation thereof is widely automated and managing them in the workspaces (60E) wherein tools therefor organizing services federation and planning including searching, inquiring and subscribing the said services.

(61B and 61C) Service Groups or Federation Explorer contains 1 or more user created Service Groups and Sub-Groups related to particular subject or task or query or issue or problem or business requirements etc. e.g. Service Group is [US Travel] and all related services are (1) Travel Enquiry (2) Visa Procedure (3) Travel Experience (4) Book Air/Car/Cruise (5) Hotel Booking etc. which is classified and arranged via (Step-1) Taxonomy & Ontology Management which provides all functionalities like create new, open existing, use from archive or tag, replication from multi sources and import taxonomy project. Projects can be edited and deleted. Taxonomy can be ordered and ranked as per requirements and metadata can associate with each part of taxonomy. Each Sub-Topic has (Step-2) Service Management, in which 1 or more services of HSN, HSNHA, HSNHC, HSNSP, HSNB, HSNAIA are attached, detached, searches via multi options like Auto Match, Custom Match, Search & Bookmark, Browse HSN Directory, Publish (Global), Publish (Filtered), Auto Content (Alert), HSN Address Directory, HSN Explorer (HSNE), Human Match Maker and Federated Services Directory, Ranking & Ordering, Replication, Federation, Aggregation, Integration, Collaboration, Composition, Comparison, Co-ordination, Workflow, Orchestration and Choreography. (Step-3) is Package Keys Management in which system user (HSNHA) can create and customize package keys and search and collaborate with other service providers for combo or bundled services package keys related to particular service groups or subscribers requirements. (Step-4) is Subscribers Management in which system user (HSNHA) can check subscribers service request, provides guidance & solution and issue package keys as per requirements. E.g. Subscribers Management in service group explorer tree shows Subscriber Amitabh and his all subscribed services and service package keys management, Collaborative or others Services Links and service package keys management and lists requested Services, Alternate services and suggested services.

(61D) illustrates Service Sources status like Current indicates currently sources are communicating, Online status indicates service sources are online and available for communication and offline status indicates currently service sources are offline and available at later.

(61E) illustrates workspace status Current (Travel, Book Hotel, Cruise, US Visa) indicates currently use workspaces, Read (Travel, Book Hotel) indicates workspace contents already read and Unread (US Visa, Cruise) indicates workspaces content not read.

Figure 62:
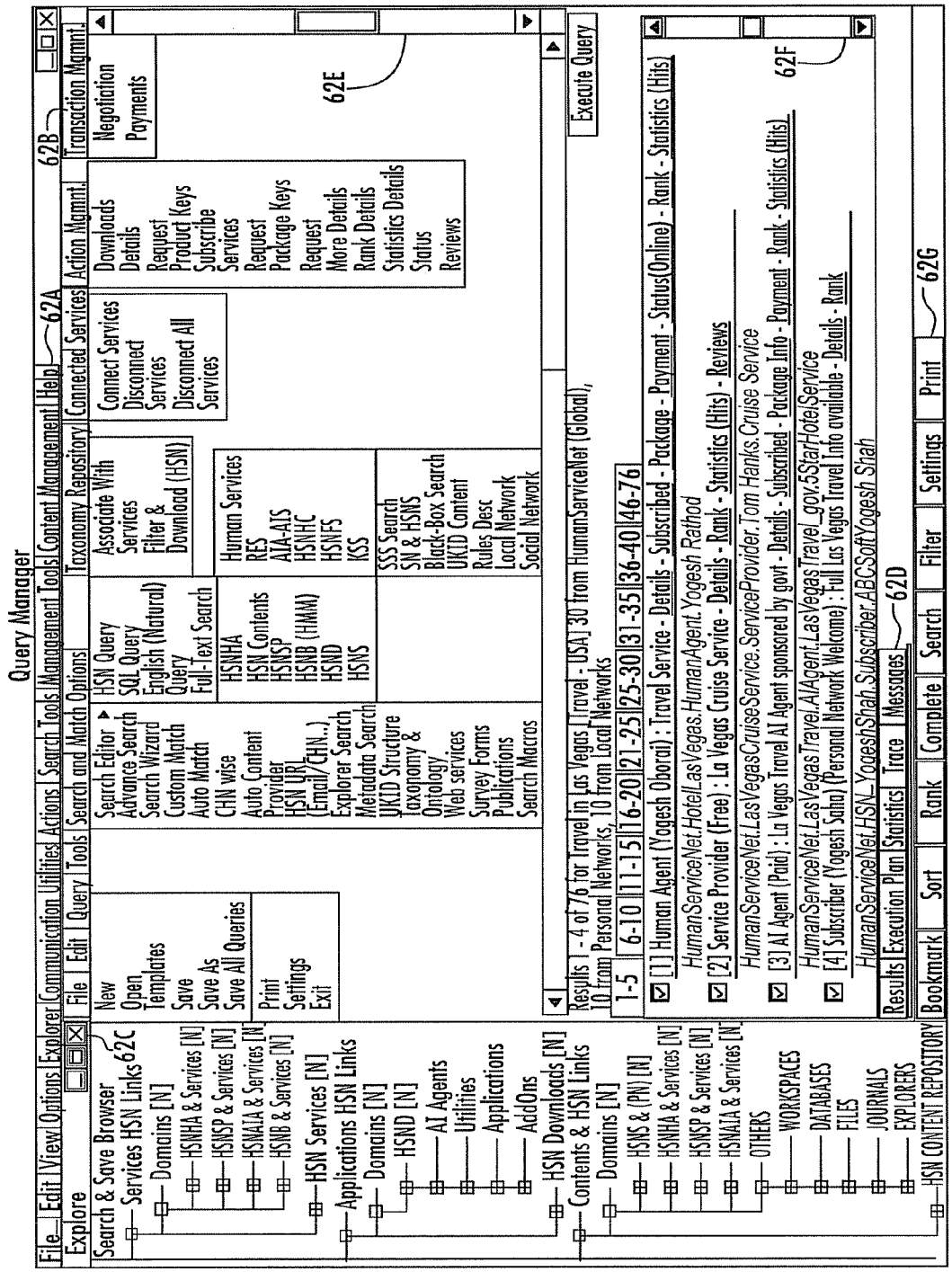
FIG. 62 showing graphical user interface (GUI) for HumanServiceNet Query Manager illustrate multiple tools for knowledge invocation and management thereof alongwith the pane showing answers to the posted query.

FIG. 62 illustrates HSN Query Manager which is an interactive graphical tool for knowledge invocation and management thereof alongwith the pane showing answers to the posted query that allows user to create one or more queries and other scripts and execute them against HSN Service Providers (Service or Content Providers Peer to Peer or centralize HSN search engine) and is providing for all search, match and post search management tools.

In HSN Query Manager, users enter simple keyword, natural language or HSN-SQL statements in a query window (62E), execute the statements, and view the results (62F) in a results window. HSN Query Manager also providing tools for determining how HSNM is interpreting and working with a HSN-SQL statement wherein a user can display a graphical representation of the execution plan generated for the statement, display statistics about the performance of the statement. Searches options provided therewith includes advance search, search wizard, search editor, templates, auto match, custom match, HSN Directory, Auto Content, Source Address navigator and explorer. The connect service tab in the tool bar (62B) providing for knowledge service connection for the intended to subscriber service by means of service connection wizard or disconnecting any or all of the already subscribed services. The transaction management tab in the tool bar (62B) providing for the means to negotiation and payment management for each of services subscribed by the said CHN. The search and match options provided therein the toolbar providing for selection of service types to be queried for posting the query with out of various channel nodes, human services, including RES, AIA-AIS, HSNHC, HSNFS, KSS.

The query window (62E) is composed of multiple panes. The Editor pane is a text editor where you can enter HSN Query, SQL Query, English (Natural) Query, Full-Text Search statements. The Results pane (62F) displays result sets. The Messages pane displays error messages. The Execution Plan pane displays a graphical representation of an execution plan. The Trace pane displays server trace information. The Statistics pane displays statistics information.

Taxonomy Repository menu provides options to Associate one or more taxonomy to one or more Services to put service in one or more categories for easy search and retrieval via Filter & Download (HSN) option system user can download filtered centralize taxonomy repository for search requirements. Action Management menu provides post search management operations including download searched AI Agents, application and utilities via Download Links, Check Details of Services and Products via Details Links, Request Product Keys for selected Products, Subscribe Services online, Request Package Keys for Selected Services and Request More Details for selected products and services and Transaction Management menu facilitates to all transaction via services like Make Payment for selected products and services etc.

Other search options are statistics details, status, reviews, Bookmark, Sort, Rank, Compare, Filter, Print search results and Search within Search. Apply various Search Settings to customize Query Manager and Search Results etc.

Figure 63:
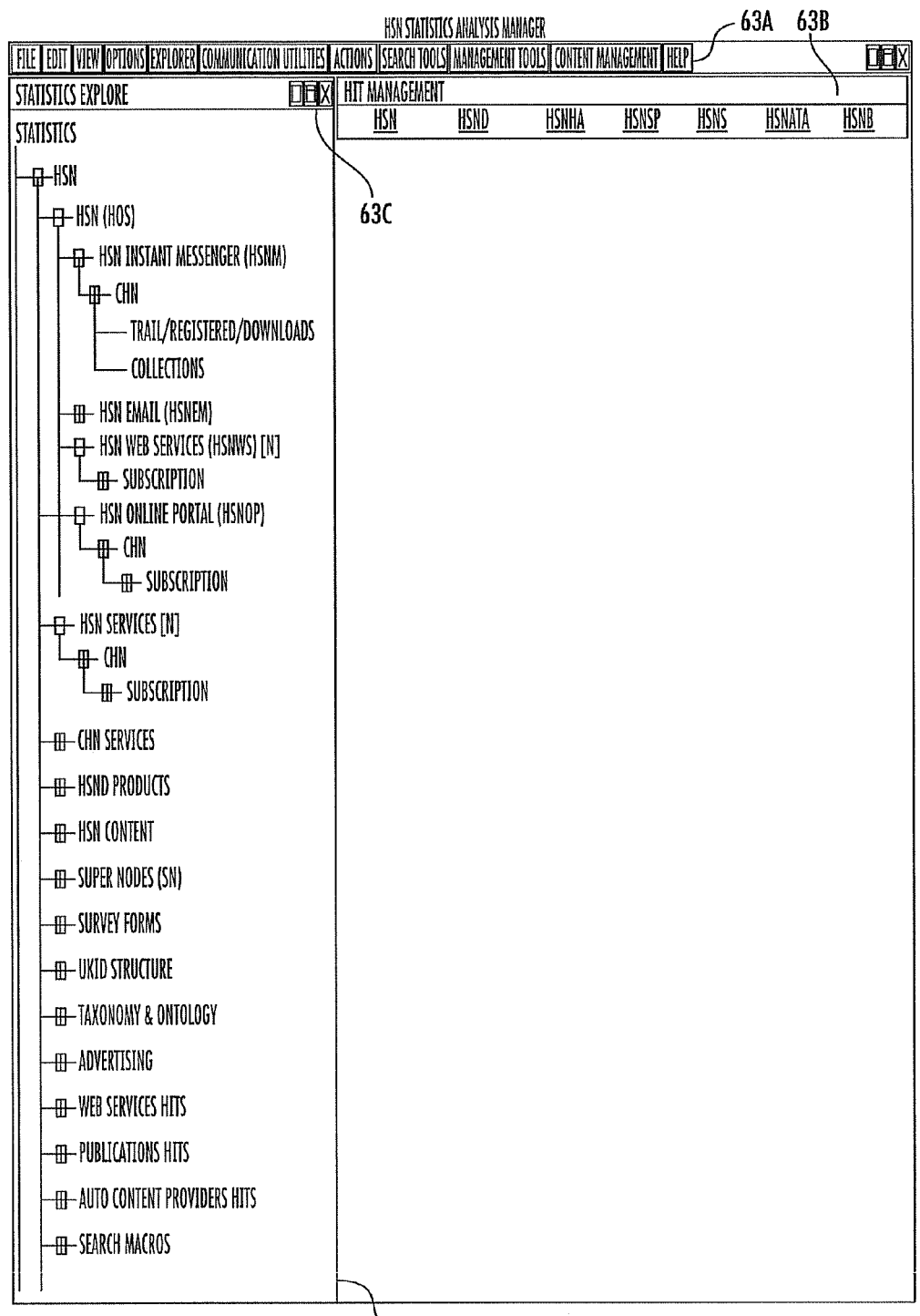
FIG. 63 showing graphical user interface (GUI) for Hit Statistics Manager for HSN Controller illustrate the hit statistics for each of the channel node.

FIG. 63 showing graphical user interface (GUI) for Hit Statistics Manager for HSN Controller illustrate the hit statistics of each of contents, utilities, search macros, published data in public and private domain of each of the channel node in the UHSF system.

Figure 64:
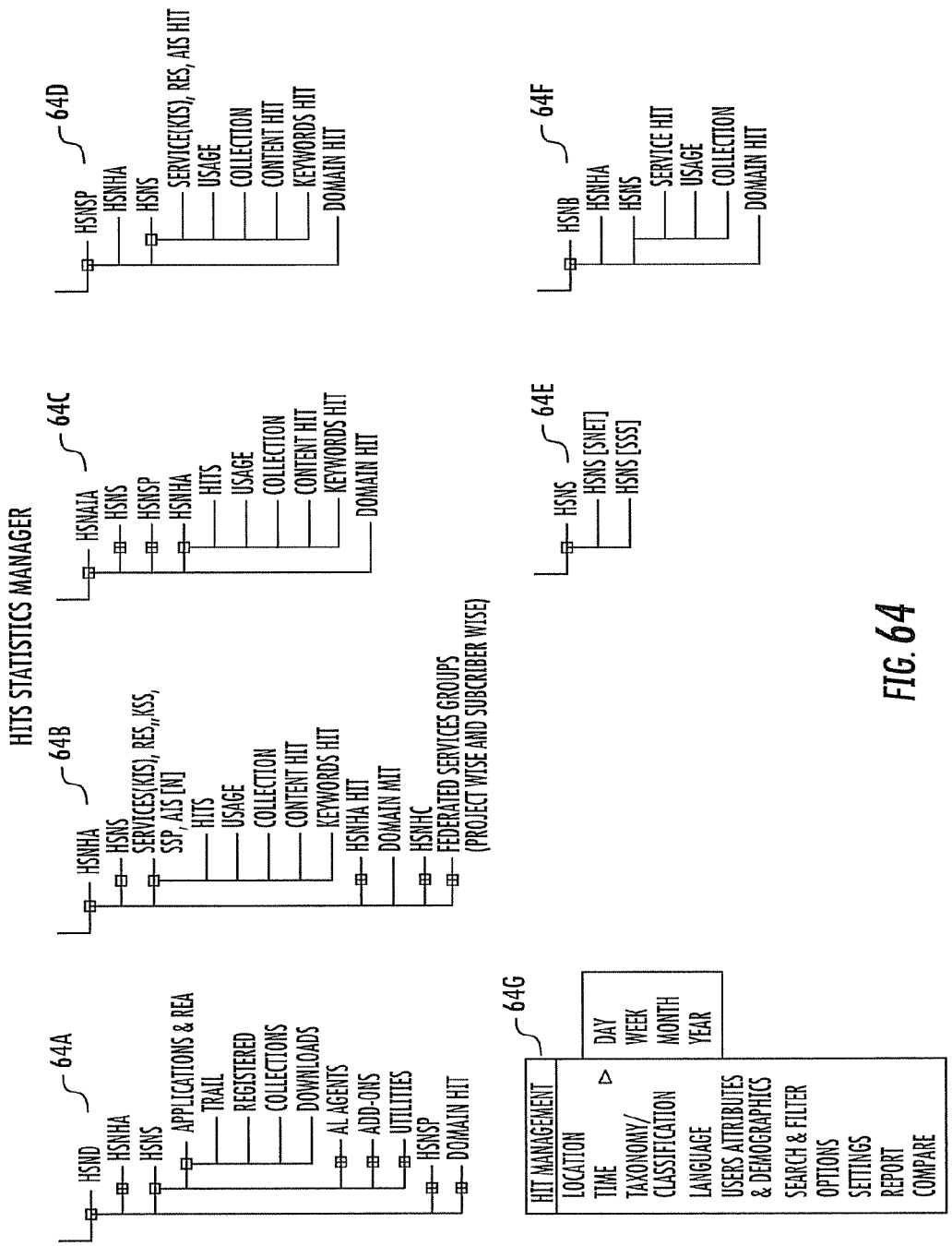
FIG. 64 showing graphical user interface (GUI) for Hit Statistics Manager for HumanServiceNet Developer (HSND), HumanServiceNet Human Agent (HSNHA), HumanServiceNet AI Agent (HSNAIA), HumanServiceNet Service Provider (HSNSP) and HumanServiceNet Broker (HSNB) and Hit Managements' menu options.

FIG. 64 showing graphical user interface (GUI) for Hit Statistics Manager for HumanServiceNet Developer (HSND), HumanServiceNet Human Agent (HSNHA), HumanServiceNet AI Agent (HSNAIA), HumanServiceNet Service Provider (HSNSP) and HumanServiceNet Broker (HSNB) and Hit Managements' menu options.

Figure 65:
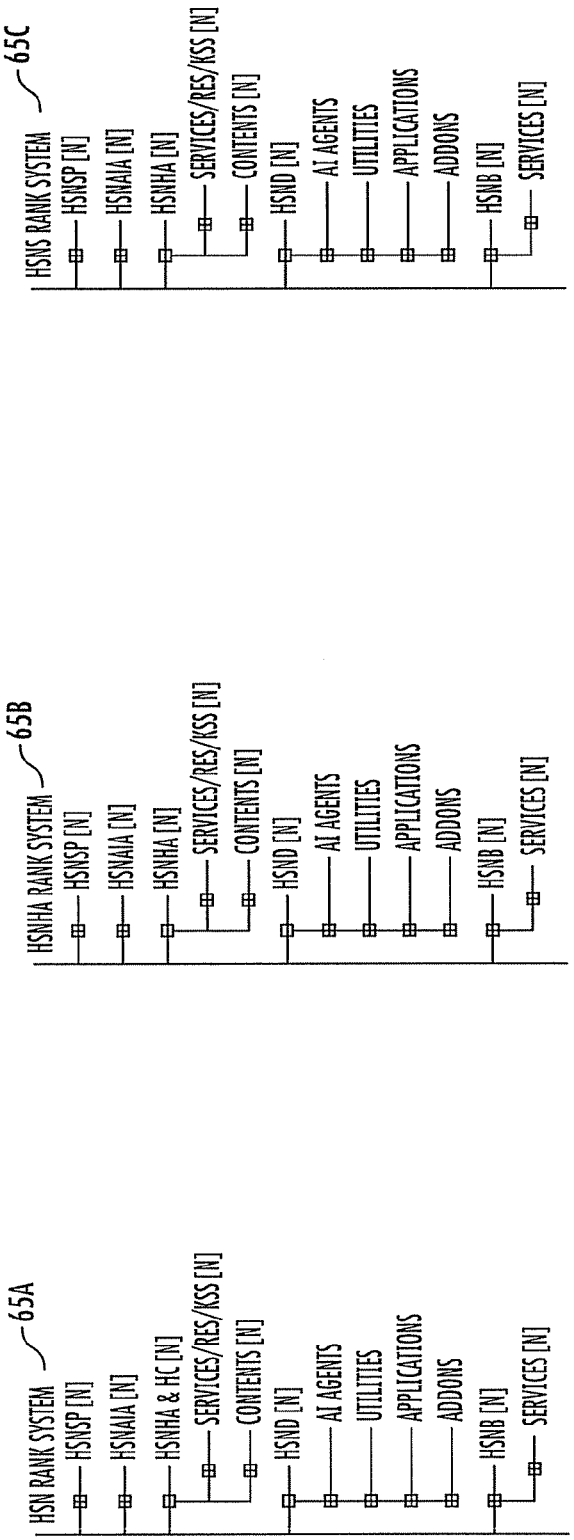
FIG. 65 showing graphical user interface (GUI) for Multi Rank System for HumanServiceNet (HSN), HumanServiceNet Human Agent (HSNHA) and HumanServiceNet Subscriber (HSNS).

FIG. 65 showing a graphical user interface (GUI) for Multi Rank System for HSN controller, Human Agent (HSNHA) and Subscriber (HSNS) wherein HSN provides two types of Rank Services namely HSN Auto Rank Service which is based on Hit Statistics in combination with scores generated by points assigned by content users (HSNS and HSNHA) and HSN Paid Rank Service which is based on Hit Statistics in combination with scores generated by points assigned by content users (HSNS, HSNHA & HSNB)] and one or more parameters out of quality, transaction, goodwill, brand and certification status. HSNHA and HSNS Rank Services (65B & 65C) providing for assignment of scoring points in the range of 1 to 100 to the services offered by various CHN & CHN Service related answered contents and comments on answered contents and also to the various search macros facilitating ranked knowledge package invocation wherein the rationale followed is based on hit statistics, grade or weight or rank assigned by HSN (65A) each of rank assignment is possible via $3^{rd}$ clicking the channel nodes and services thereof in the explorer, wherein selecting and providing numeric input to the ranking module. The said ranking module works on the cumulative aggregation basis, wherein rank is instantly revised on the basis of said input via mathematical algorithm, the said algorithm output being linked with the replication and synchronization module, providing for updated rank at display in the UHSF system.

Figure 66:
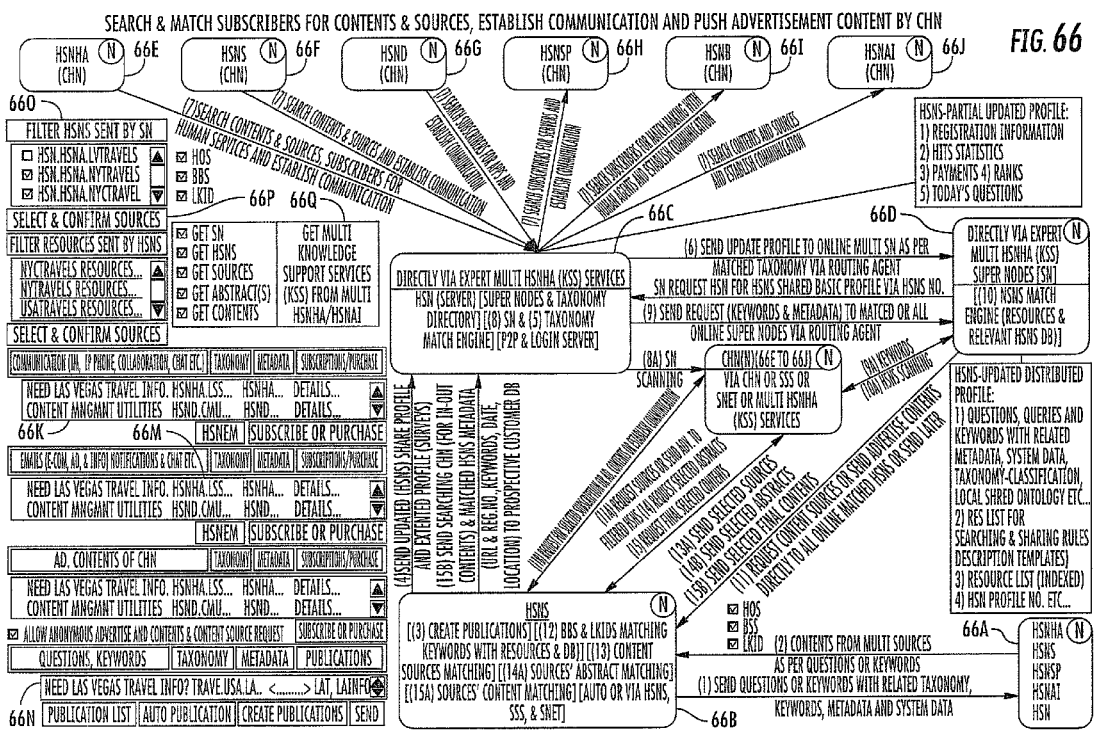
FIG. 66 showing a logical block diagram illustrates the scheme for Searching & Matching of Subscribers for Contents & Sources, mode of communication therewith and associated advertising of contents by each of CHN.

FIG. 66 showing a logical block diagram illustrating the scheme for searching & matching of subscribers for contents & sources, mode of communication therewith and associated advertising of contents by each of CHN. Showing 66E to 66J representational plurality of distributed HSN controller registered channel nodes communicating in the peer to peer environment, sending search queries to HSN supernode (SN) directory based routing server (66C) which is having SN lookup directories and plurality of subscribers partial profiles stored therein, the said SN directory based routing server (66C) emulating and routing the said query at the matched SN (66D) via routing agents which is based on the domain specific taxonomically precategorised supernodes matching logic, wherein each of matched SN (66D) sending plurality of spiders for fetching matched contents with respect to the said query or one or more searching CHNs (66E to 66J) requesting after filtering (66O) the said HSNS for the sources or sending advertisements via communication modules (66K to 66M). The said spider passing on the said keyword to the input module of the black box searching (BBS) wherein each of each of BBS providing the search results at the desktop of each of user and providing for OUT permission alert to each of desktop user, acceptance of said OUT permission provides for search contents to be routed via said spider to the querying CHN. Block 66A and 66B showing the subscriber's relationship with the each of service providing channel node and HSN controller wherein each of subscribers querying to 66A and in receiving answers therefrom. In the process of searching each of searchers are provided with penta tier searching capability via 66Q search depth selection option specifying the tier of searching as per desired granularity and being provided at options to select the human involvement in the searching operation. HSN controller being a means for repositing taxonomically and ontologically classified list of various UHSF wide CHNs, providing for lookup directories of precategorised and preidentified CHNs and resources thereof and establishing direct connection therewith, The penta tier searching model works at desired level throughout the UHSF system wherein the said search query terms are matched with taxonomically categorized supernodes (66D) via HSN controller (66C) central search and match engine and routing and replicating relevant matched SNs result to each of querying channel node towards $1^{st}$ tier refinement depth selection; one or more routing agent routing query term to $1^{st}$ online available matched supernode (66D) wherein said SN matching query term with plurality of HSNS extended shared profiles, indexed keywords, black box indexes, LKID resources in peer to peer environment by multiple taxonomy matching logic based on the profiles of plurality of HSNS being updated and clusterwise posted in the taxonomically classified profile database of one or more supernodes (66D) and routing & replicating relevant matched HSNSs (66B) results to each of querying channel node (66E to 66J) towards $2^{nd}$ tier refinement depth selection; one or more matched and filtered HSNS (66B) receiving request for content source pointers or advertisement either from querying CHN (66E to 66J) or to each of matched HSNS directly from matched SN and each of requested HSNS routing & replicating relevant matched source pointers result to each of querying channel node or advertisement subscription request to respective advertisers thereof towards $3^{rd}$ tier refinement depth selection wherein each of HSNS (66B) preselectively enabling or disabling respective BBS and LKID search thereof; one or more HSNS of $2^{nd}$ tier refinement depth result after routing source pointers, receiving abstract request from querying CHN (66E to 66J) and in response to that routing & replicating automatically or manually one or more abstract of one or more source pointers to each of querying CHN (66E to 66J) towards $4^{th}$ tier refinement depth selection; each of querying CHN (66E to 66J) filtering abstracts for determining and sending final selection request to one or more HSNS of $2^{nd}$ tier refinement depth result and one or more HSNS responding and sending full contents via associated one or more publications or resources towards $5^{th}$ tier refinement depth selection;

Each of query is selectively dealt by respective querying CHN (66E to 66J) by communicating either through HSNEM (66K) or through HSNE (66L) for various subscription and purchase in the UHSF system, and generating one or more publication (66N) filtering (66O) one or more matched subscriber for enabling effective searching experience.

Figure 67:
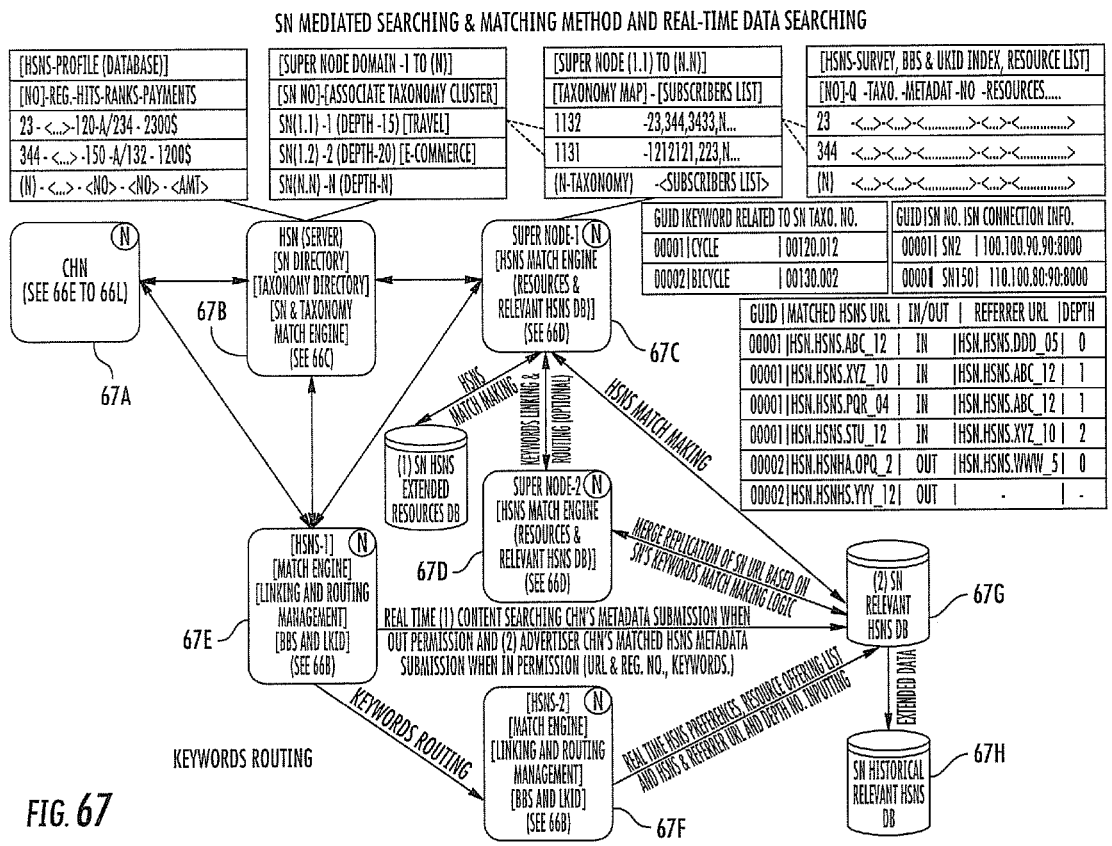
FIG. 67 showing a logical block diagram illustrates logical connection of each of supernode with the GIN, HSNS and the HSN controller, composition of a supernode and taxonomically organized connectivity of each of SN components for search and match of HSNS.

FIG. 67 showing a logical block diagram illustrating logical connection of each of supernode represented via supernode-1 (67C) and supernode-2 (67D) with the CHN (67A), HSNS represented by HSNS-1 (67E) and HSNS-2 (67F) and the HSN controller (67B), composition of a supernode and taxonomically organized connectivity of each of SN component for search and match of HSNS. The basic premise behind working of the supernode mediated searching system is real time data replication within UHSF system wherein as shown in the FIGS. 67C and 67D supernodes are having respective relevant HSNS database (67G) and associated historical relevant HSNS database (67H) wherein real time relevance is generated via replicating the metadata for each of IN and OUT permission of HSNS with the associated relevant HSNS DB (67G) of respective supernode. HSN server (67B) directing the query of each of CHN (67A) to the associated supernode (67C) or each of CHN (67A) via associated taxonomy cluster. CHNs directly searching through the BBS of identified HSNS-1 (67E), at HSNS-1 (67E) desertion accepting IN or OUT permission or routing the query of advertise to the other identified HSNS-2 (67F) wherein each of IN and OUT permission acceptance are captured by respective supernodes and are replicated in the SN relevant DB (67G). Each of SN facilitating HSNS match making via SN relevant DB & HSNS extended resources DB wherein each of SN linking and routing the keywords with the other matched SNs for carrying forward the irrelevant queries and keywords tries at it. The HSNS related data in the SN relevant DB is the most recent one in the UHSF system, and matching of the queries and keywords executed via the schematic logic explained in FIG. 66 with the said DB provides for highly relevant search results and matches. This aspect is uniquely significant as catching of realtime information of users in any networked system is a tedious job is currently challenges for working of all intelligent systems, the integrated organization of data storage, routing and replication mechanism accomplishing the said challenge in the UHSF system. Additionally provides for excellent platform for ecommerce operations enability and SN mediated human and auto searching & matching method. Each of vendor scanning supernodes for fostering ecommerce operations thereof. The data contents in the databases of HSN server, SN, and SN relevant database are exemplified in the table format, the data category being representation only can add or delete any of the category as per logic modulation.

Figure 68:
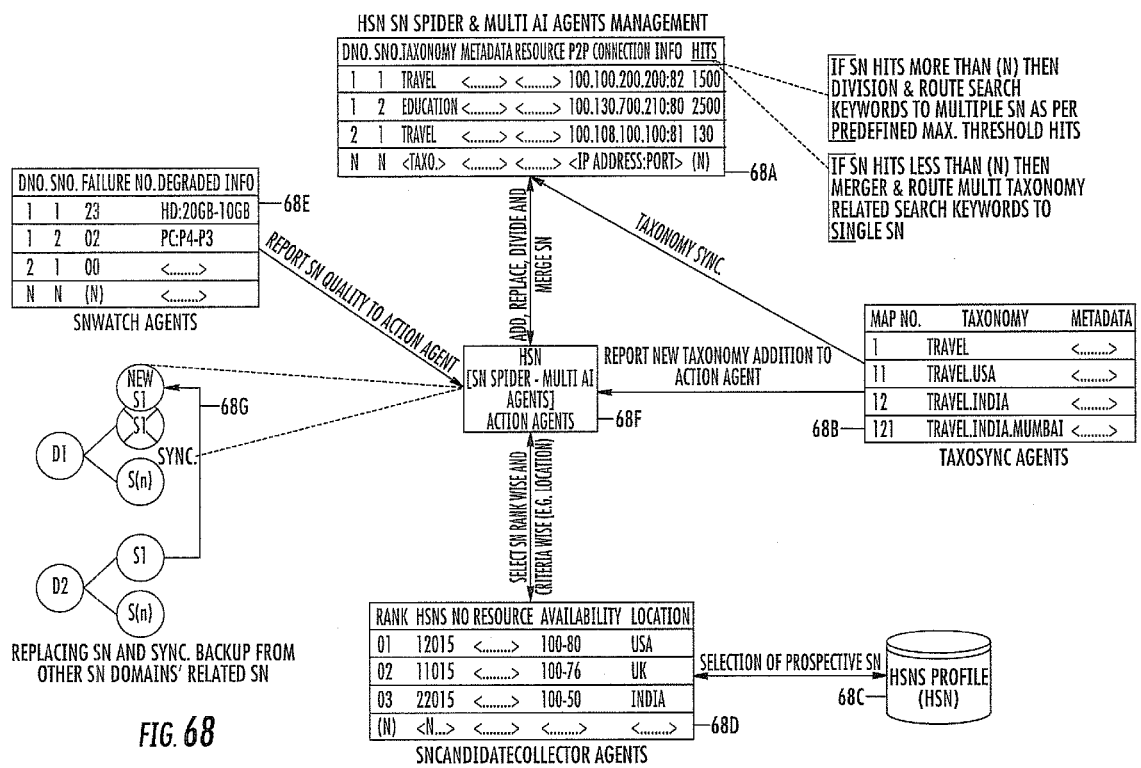
FIG. 68 showing a logical functioning of Spider agent of a supernode and integration of each of action agents alongwith relation data handling thereby each of action agent.

FIG. 68 showing a logical organization and integrated functioning of multiple spider agent (68F) of each of supernode and integrational, replicative connectivity of each of agents thereof alongwith relation data handling thereby each of agents wherein the said spider agent (68F) is a preprogrammed software module meant for plurality of independent functions of supernodes tasks via independent coordinated AI agents thereof including:

1. Taxo Sync Agent (68B)
2. SN candidate collection agent (68D)
3. Watch Agent (68E)
4. Action Agent (68F)

Each of said AI agents working independently facilitating combinational accomplishing building SN directories and plurality of actions, wherein SN candidate collection agent (68D) searching potential supernodes within the UHSF system based on predefined threshold parameters and entering the qualified SN into prospective SN directory at HSN controller's server, each of such selected SN is being plugged with one or more taxonomically segregated directory via one or more taxonomy sync agents (68B) and watch (68E) and action agents (68F) coordinating for alteration and restructuring of the said SN directory, wherein Taxo Sync Agents (68B) synchronizing the associated HSN taxonomy changes with the appropriate SN taxonomy directory and reporting the same to an action agent for further action. SN candidate collector agent (68D) crawling continuously through HSNS registration directory (68C) collecting plurality of related parameters thereof including public IP address, CPU details, memory capacity, network bandwidth level so as to prepare prospective SNs ranked database based on online availability thereof and concurrently SN watch Agents (68E) quantifying and keeping watch of existing SNs quality wherein checking online availability thereof by pinging thereto and adjunctively reporting alterations in each of the parameter collected by SN candidate collector agent and generating and appending a quality report therein the database thereof. The report from plurality if agents are executed via action agents (68F) performing plurality of actions based on the predefined threshold parameter conditions wherein primarily assigning one or more new or modified taxonomy to each of preemptively future operational SN based on rank thereof, performing plurality of load balancing actions wherein replacing, dividing and merging one or more existing SNs based on the quality report appended therein the database thereof by watch agent, performing load balancing of one or more overloaded or underloaded SNs wherein based on the predefining overload and underload threshold levels logically shifting the load to one or more other SNs for load value above prefixed overload threshold value and merging one or more SNs for load value below prefixed underload thresholds value, determining obsolesce of supernode on the basis of threshold predefined no of recursive pinging attempts wherein after crossing said threshold no of such pinging attempts the said supernode is made obsolete and replaced by either randomly selected new supernode in the said peer to peer environment or with the highest ranked SN from prospective SN database thereof.

Figure 69:
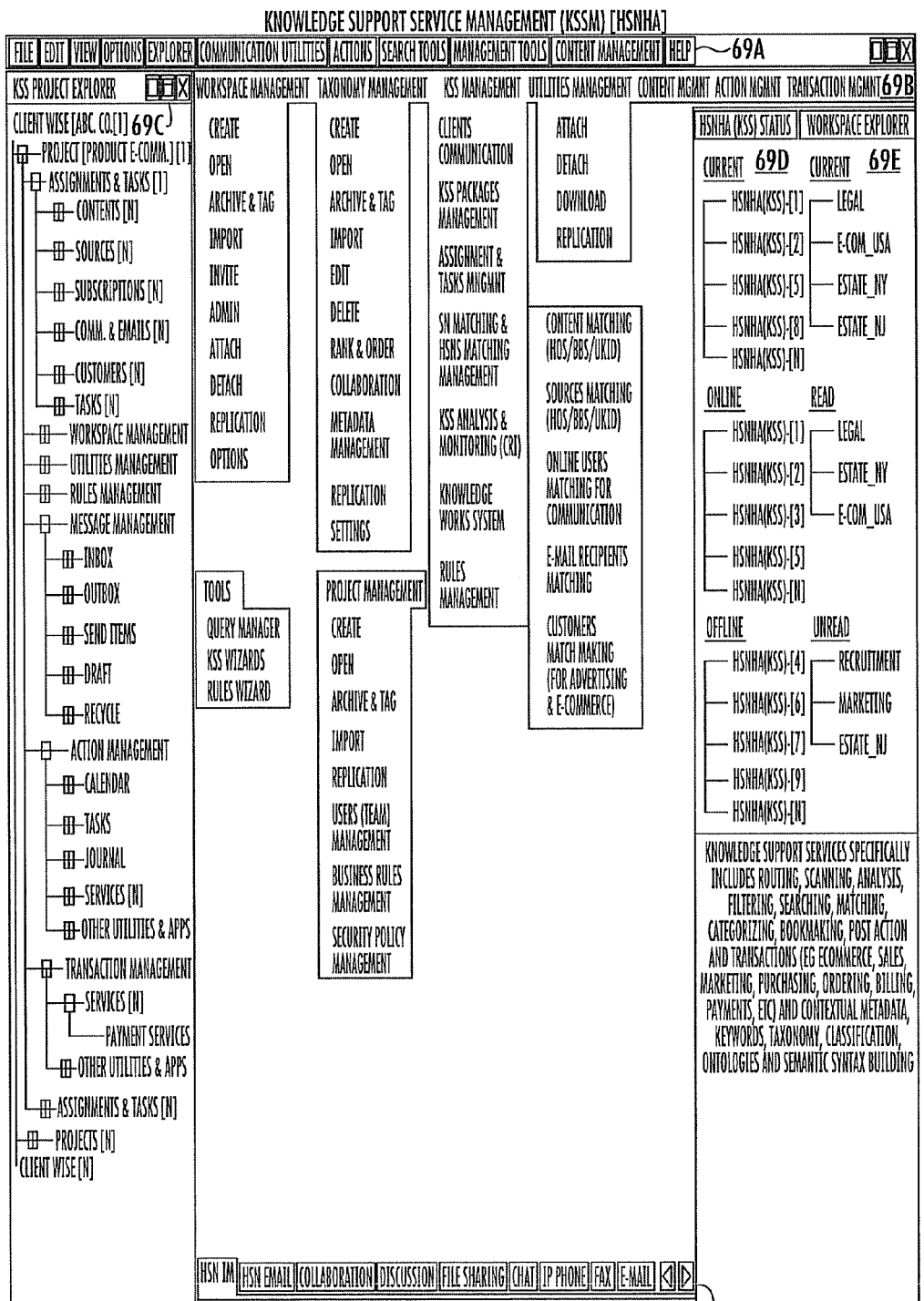
FIG. 69 showing an interface for management of knowledge support services (KSS) illustrates the KSS project explorer, workspace explorer, KSS status and plurality of management tools.

FIG. 69 showing an interface for management of knowledge support services (KSS) illustrates the KSS project explorer (69C), workspace explorer (69E), KSS status explorer (69D) and plurality of management tools (69A). the knowledge support services specifically includes routing, scanning, analyzing, filtering, searching, matching, categorizing, book marking, search macros configuration, post action and transactions of ecommerce, sales, marketing, purchasing, ordering, billing, payments and contextual metadata, keywords, taxonomy, classification, ontology and semantic syntax building. Each of HSNHA providing for KSS services via package keys thereof. Creating, opening or importing multiple separate KSS projects in the said workspace (69E), organizing the said KSS service delivery via taxonomy management and managing KSS services via multiple preidentified separate KSS management utility for each of KSS function and further managing the said project in the said workspace for collaboration with other KSS providers.

Figure 70:
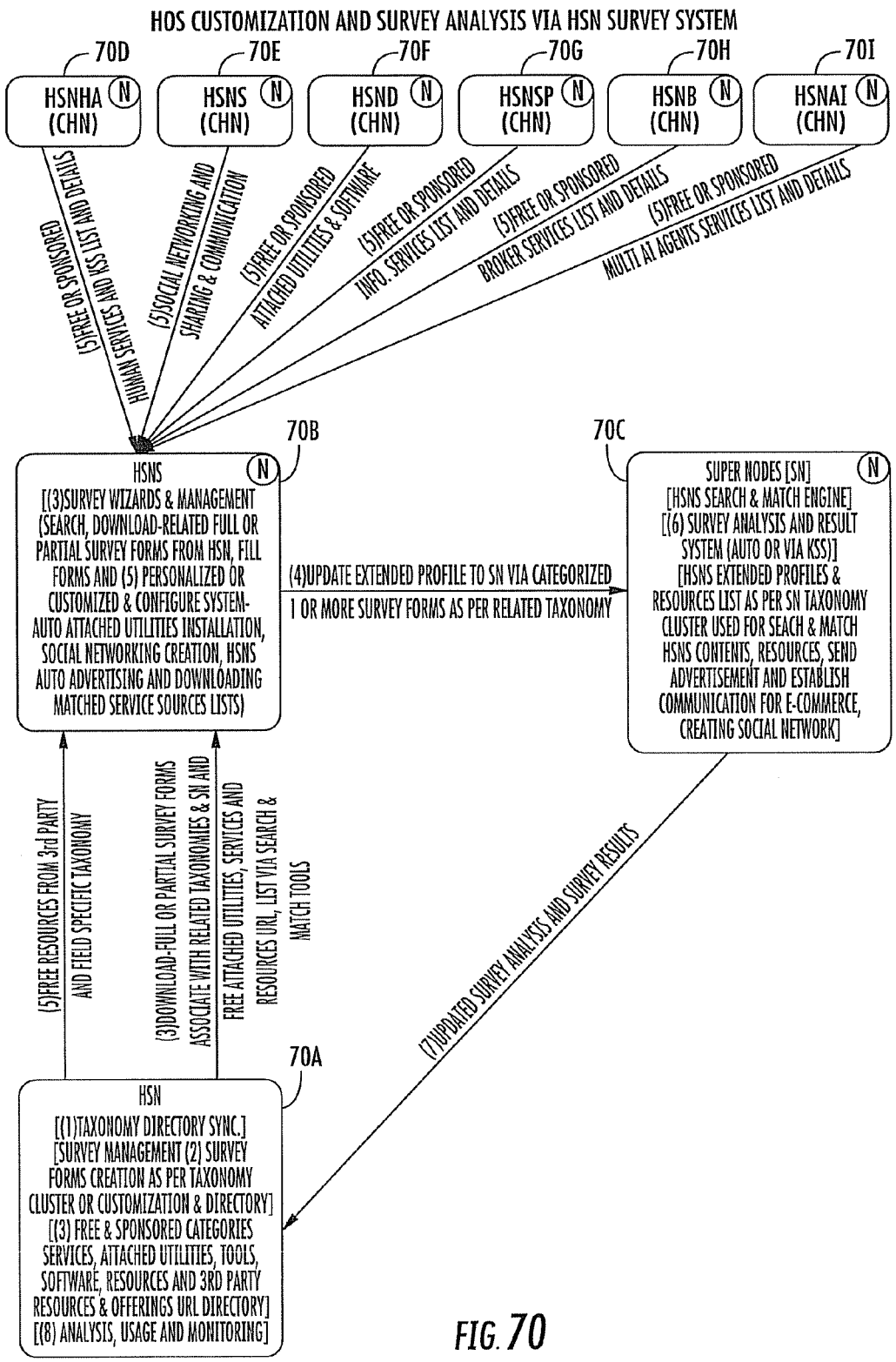
FIG. 70 showing a logical block diagram illustrate HSNS universal profile creation and updation at a supernode via survey system.

FIG. 70 showing a logical block diagram illustrating HSNS universal profile creation and updation at a supernode via survey system wherein each of HSNS (70B) intermittently being fed with HSN controller's surveying system (70A) at predefined or circumstantial times wherein HSN controller preparing and sending Survey forms to each of HSNS and each HSNS submitting the said survey towards consideration of free utilities, social networking creation, receiving relevant advertisement contents, and matched service list. Figure showing the relational benefits received by each of HSNS (70B) from plurality of CHNs from 70D to 70I, the submission of the said surveys at the HSN controller resulting in the extended profile updation followed by linked replication at the related domain specific supernodes (70C), wherein each of supernodes updating the HSN controller about survey analysis and survey results for survey forms creation as per taxonomy cluster. The updated profile of each of HSNS at respective SNs results in the higher relevance searching and matching.

Figure 71:
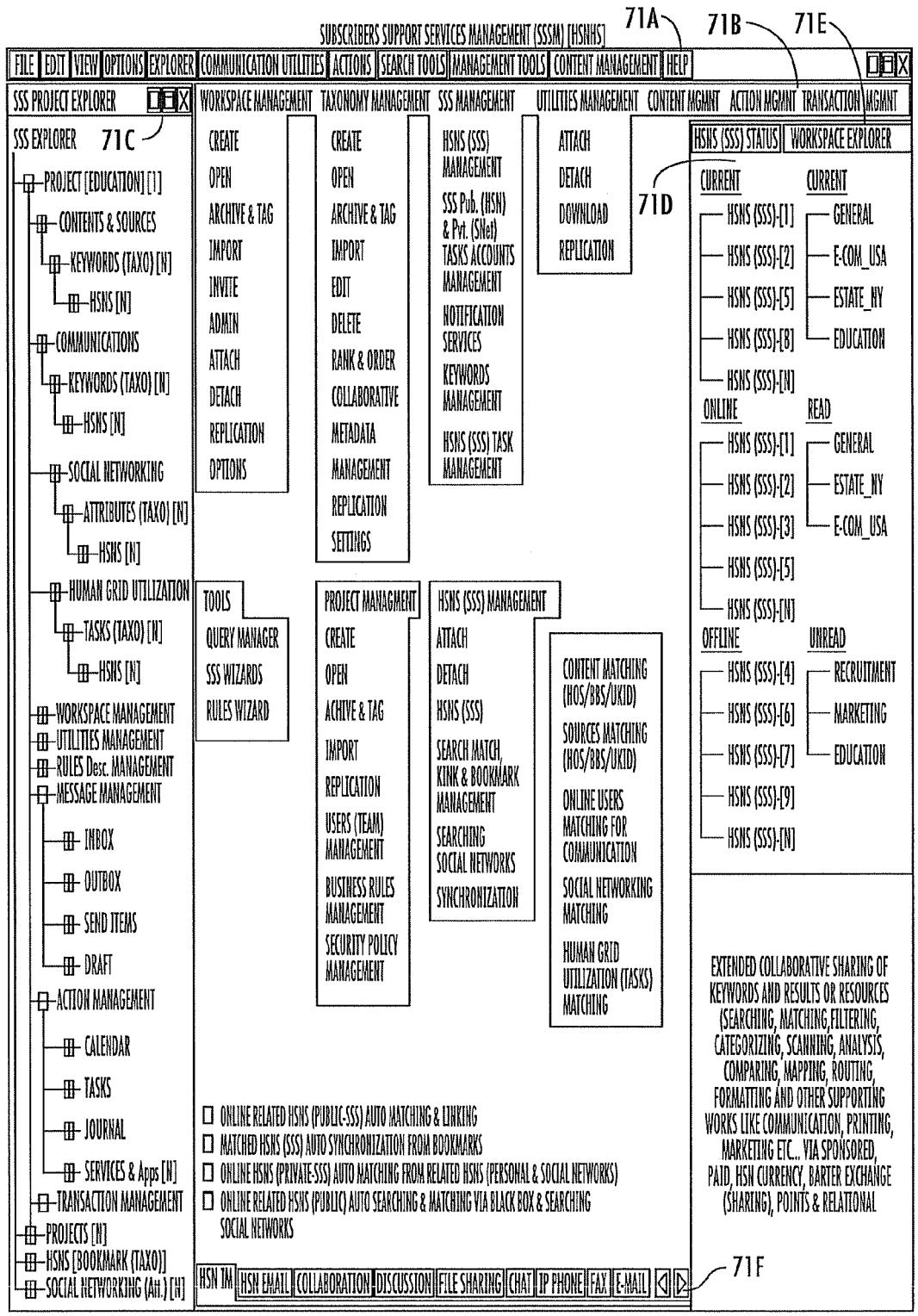
FIG. 71 showing an interface for management of subscriber support services (SSS) illustrates the SSS project explorer, workspace explorer, SSS status and plurality of management tools.

FIG. 71 showing an interface for management of subscriber support services (SSS) illustrate the SSS project explorer (71C), workspace explorer (71E), SSS status explorer (71D) and plurality of management tools (71A & 71B), the subscriber support services (SSS) specifically includes routing, scanning, analyzing, filtering, searching, matching, categorizing, comparing, mapping, formatting, and other supportive work like communication, printing, marketing, etc. via sponsored, paid, HSN currency, or barter exchange. Each of HSNS creating, opening or importing multiple separate SSS projects in the said workspace (71E), organizing the said SSS service delivery via taxonomy management and managing SSS services via multiple preidentified separate SSS management utility for each of SSS function and further managing the said project in the said workspace for collaboration with other SSS providers.

Figure 72:
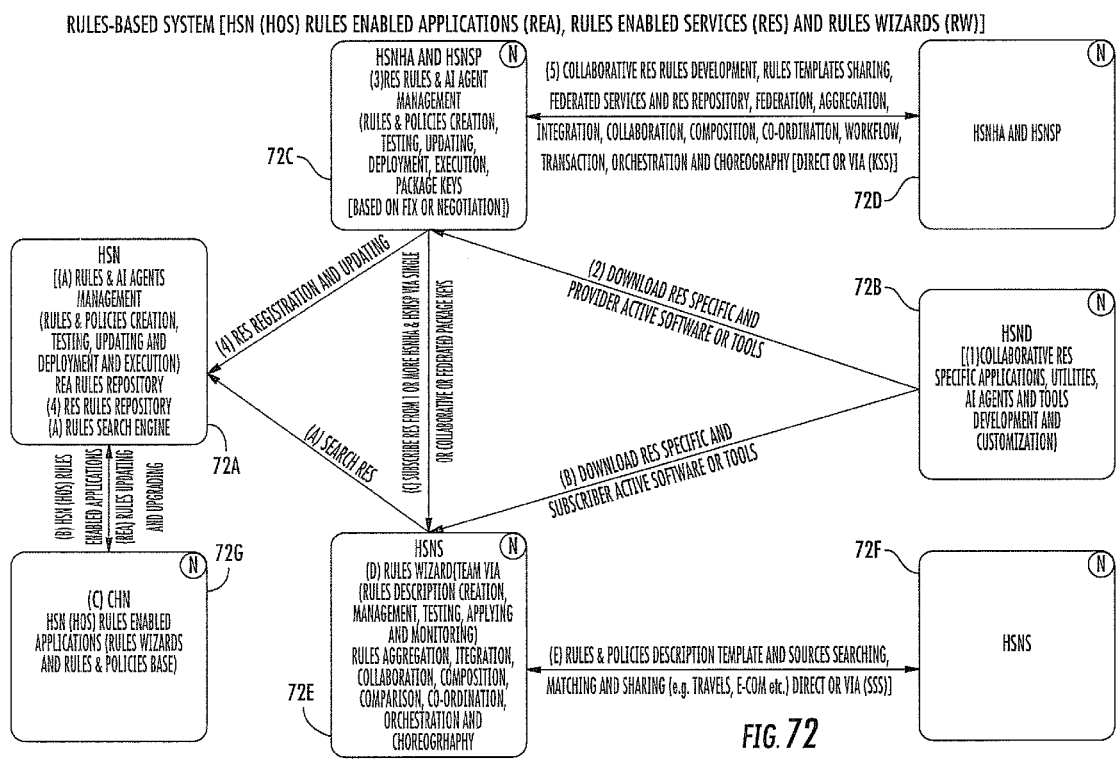
FIG. 72 shows a logical block diagram illustrate developers dissemination pattern of Rule Enabled applications [REA], rule enabled services [RES] and rule wizards including functioning of various components, and data flow in the Rules-Based System.

FIG. 72 shows a logical block diagram illustrating developers dissemination pattern of Rule Enabled applications [REA], rule enabled services [RES] and rule wizards (RW) including functioning of various components, and data flow towards implementation of the Rules-Based System. (72B) developer developing and customizing RES specific applications, utilities, AI Agents, and tools either independently or collaboratively and human agents (HSNHA) and service providers (HSNSP) (72C) downloading the said RES specific developed application & utilities for deploying the said applications & utilities for rules development for RES, testing, updating, and executing independently or via in collaboration with other (72D) service providers and human agents respectively wherein sharing said rules templates. The final rules policy implemented RES application & utilities are registered with the HSN controller (72A) and each of subscriber (72E) searching for the said registered RES at the HSN server, subscribing the said searched RES from one or more HSNHA & HSNSP via single or collaborative or federated package keys and sharing the said rule and templates with other peer subscribers (72F).

Figure 73:
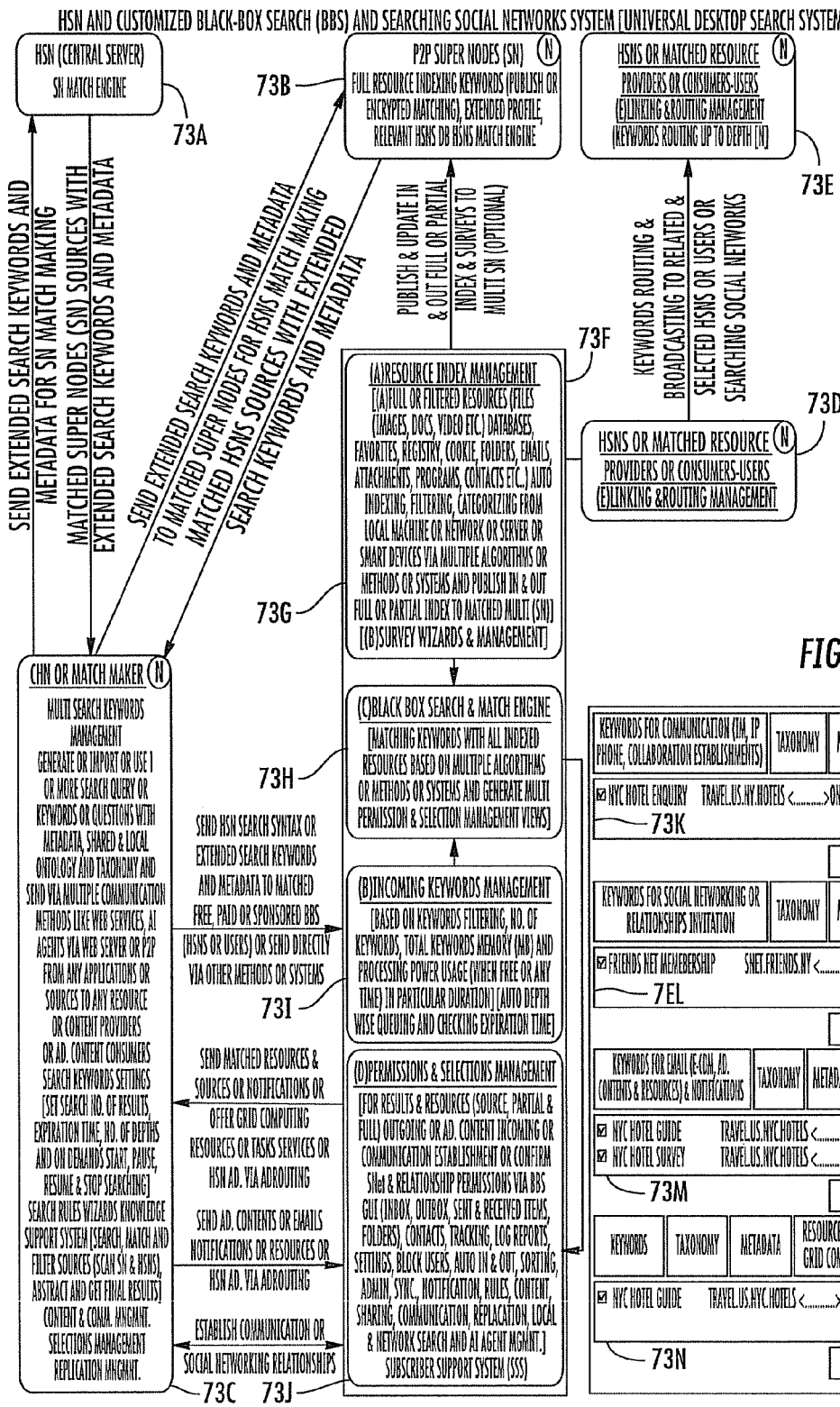
FIG. 73 showing a logical block diagram of Black-Box Searching (BBS) system illustrates internal components of BBS system and its functioning in the keyword handling from the CHN.

FIG. 73 showing a logical block diagram of Black-Box Searching (BBS) system illustrating internal components of BBS system and its functioning in the keyword handling from the various CHNs. Each of user's resources in the UHSF system are indexed and made searchable via black box search (BBS) logic as shown in the 73F. The black box search or desktop search utility is installed at the user machine (73F) having inport (73I) in the form of incoming keyword management for receiving multiple keywords, search syntax from plurality of BBS, searcher or CHNs and outport (73J) for permissions and selection management for providing the search results thereto. A black box searching system comprising of resource index management (73G) unit for indexing files, images, docs, video, databases, favorites, registry, cookie, folders, emails, attachments, programs, contacts, machine configuration & all other info. which are further auto indexed, filtered, and categorized from local machine or network or server via multiple algorithms or methods or systems and publishing IN and OUT full or partial index to the multiple matched SN (73B), the incoming keyword is searched and matched by means black box search and match engine (73H) with the indexed resources provided by resource index management unit (73G) and based on the search and match results transmitting multiple permissions generation signals to the permission and selection management unit (73J). If the query containing linking and routing request alongwith depth thereof for extended matching the host user forwarding the said incoming query via linking and routing management unit (73D) to the multiple users BBS (73E). Multiple CHNs (73C) and P2P supernodes (73B) are shown in searching facilitation engagement wherein CHN sending search query at matched SNs and each of SNs sending the matched HSNS and resources thereof wherein the said matched SNs are obtained by sending SN matching query at the HSN controller. 73K top 73N showing the permission and selection and communication enabling interfaces.

Figure 74:
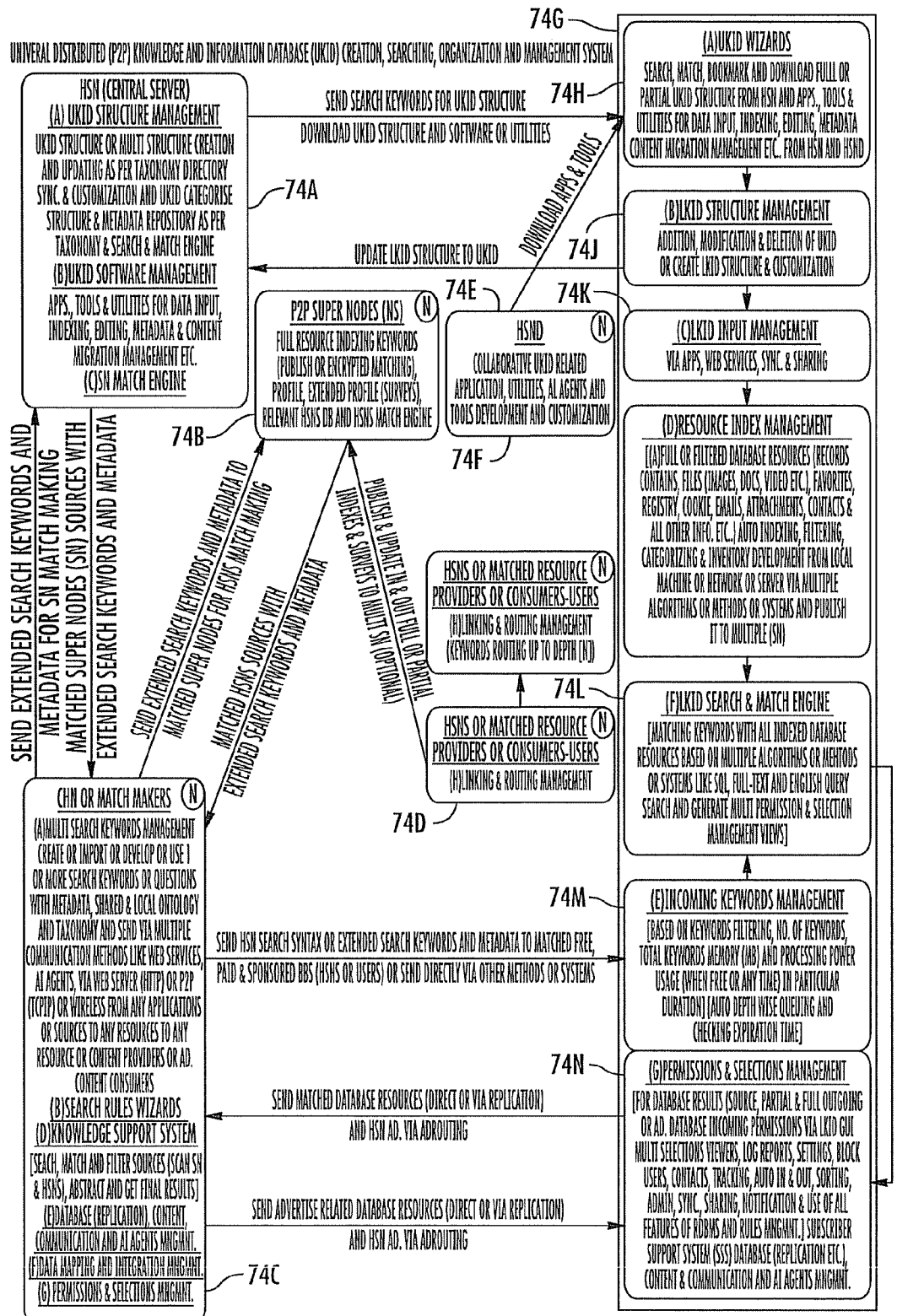
FIG. 74 showing a logical block diagram of Universal Distributed (P2P) Knowledge and Information Database (UKID) system illustrate a method for Creation, Searching, Organization and Management of plurality of UKID and LKID structures and replication thereof.

FIG. 74 showing a logical block diagram of Universal Distributed (P2P) Knowledge and Information Database (UKID) system illustrating a method for creation, searching, organization and management of plurality of UKID and LKID structures and replication thereof wherein HSN central server (74A) as per taxonomy creating and updating multiple universal knowledge and information database (UKID) structures and maintaining and synchronizing the said structures throughout the UHSF system and one or more HSNS (74G) searching, downloading and utilizing one or more existing UKID structures or part thereof from plurality of taxonomically derived database structures stored in one or more database servers from the HSN server and downloading UKID related applications, utilities, AI agents and tools from one or more developers (74F) whereby organizing and modifying respective local knowledge and information database (LKID) structures of each of HSNS facilitating management and organization of respective information and knowledge contents wherein one or more HSNS modifying or creating new taxonomy and sending the same to the HSN controller (74A) and HSN controller selectively updating the said taxonomy by creating and storing new database structure therein the UKID thereof whereby combinly aggregating each of LKID structures of plurality of HSNS into the Universal knowledge and information database (UKID) in a p2p distributed communication environment. 74G showing the LKID structure management for data organization of each of HSNS. The searching system and logic as explained in FIGS. 66 and 73 working in the similar fashion, all resource indexing and local HSNS data organization is managed via LKID structures.

The HSN controller having one or more database servers storing taxonomy or field or domains into the primary UKID database structure therein and one or more management and organization tools therefor wherein said UKID database structure comprising of plurality of tables which are being attached therewith associated metadata thereof wherein the said UKID structure of HSN controller forming a primary database structure's source mechanism enabling information and knowledge management process within UHSF system.

Each of channel node being provided with plurality of LKID (74G) organization and management utilities performing database creation, organization and modification includes:

1. LKID wizard (74H)
2. LKID structure management (74I)
3. Data input management (74J)
4. Resource index management (74K)
5. LKID search and match engine (74L)
6. Incoming keyword management (74M)
7. Permissions and selection management (74N)
8. Linking and routing management (74D)

wherein each of channel node creating one or more databases structures manually or through a LKID creation wizard (74H) and managing data and structure thereof by means of management tools thereof.

One or more channel nodes (74G) providing one or more KSS and SSS services in one or more taxonomically classified subject areas and further creating, updating and modifying one or more LKID structures of one or more channel nodes wherein other CHN (74C) sending search syntax or query at the incoming keyword management unit (74M) of the searching CHN (74C) which forwarding the said query to the searching and matching engine (74L) which is forwarding the search results to the permission and selection management unit (74N) which is generating multiple permissions, selections, views and popup for sending matched database structures and resources thereof to the querying CHN wherein the permission and selection management is a means for selecting permissions and options provided therewith for incoming and outgoing data resources wherein providing plurality of views and interfaces for outgoing database results and incoming advertisements into the database thereof via multiple selection viewers further managing the same by generating plurality of log reports, blocking one or more users, monitoring, sharing, notifying, synchronizing & replicating one or more updates and predefining rules and settings for secured operations thereof.

Figure 75:
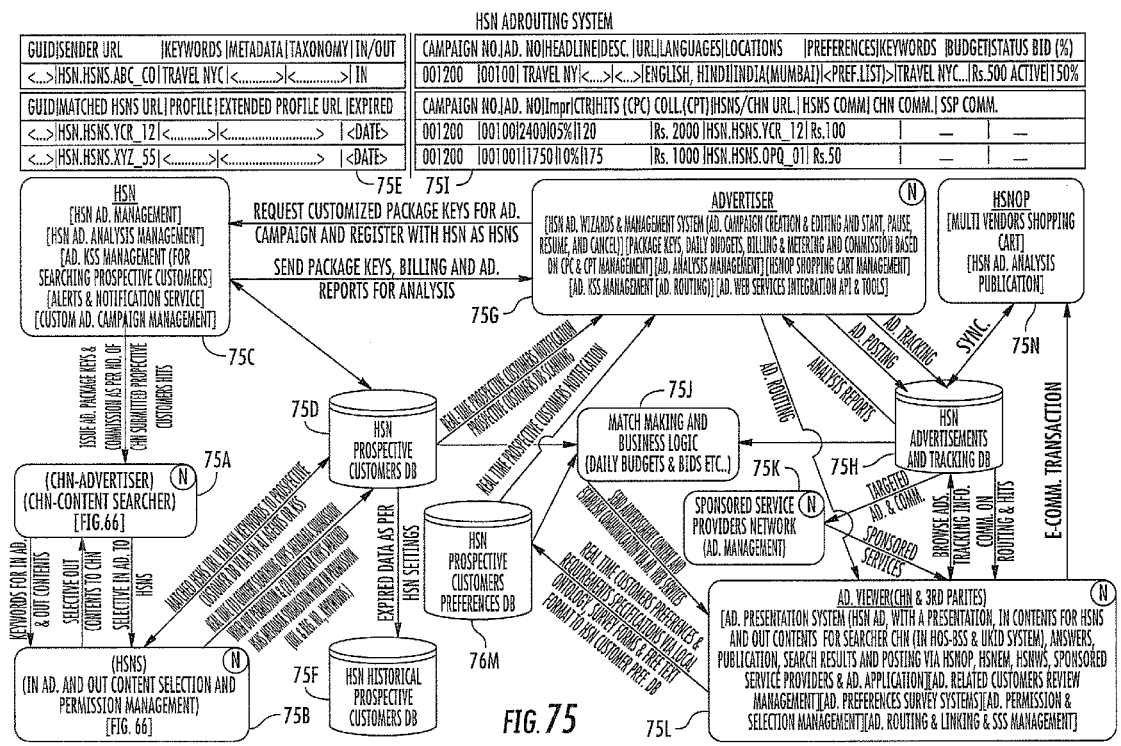
FIG. 75 showing a logical block diagram of HSN AdRouting System illustrates system components for advertisement storage, customer tracking and a method for advertisement relevancy optimization.

FIG. 75 showing a logical block diagram of HSN AdRouting System illustrating system components for advertisement storage, customer tracking and a method for advertisement relevancy optimization comprising of various components for storage (75H), retrieval (75N), routing (75J), linking (75L), and dissemination of plurality of advertisements (75A & 75N) and accomplishing associated pecuniary transaction effected thereby, wherein various advertisers posting one or more advertisements (75G) in the advertisings and tacking DB (75H) alongwith daily budget and possible keywords therefor. The match making and business logic unit (75J) providing for the relevant matches of the advertisement with the prospectively interested CHNs by matching the entries of the prospective customer DB and that of HSN prospective customer preferences. The routing of the advertisements to the relevant subscribers is a dependant function on the prospective customer DB (75D), which is an integral part of UHSF SN mediated search system as described in FIGS. 66 & 67. In the searching operations each of searching CHN (75A) receiving the matched results for the searched keywords wherein each of matched HSNS (75B) selecting IN and OUT permission selection options wherein the IN permission selection enablement triggering the auto posting the details of each of HSNS including metadata, URL, registration no, keyword responded, date, and location into the prospective customer database (75D) via HSN AI agent and OUT permission selection enablement triggering posting of content searching CHN's (75A) metadata into the prospective customer database (75D), and in an another instance one or more CHNs and 3$^{rd}$ parties providing for personalized preferences in the HSN prospective customer preferences DB (75M). Each of intended advertiser downloading advertisement wizard and management system and registering with HSN controller (75C) and requesting package key therefrom for posting one or more advertisements campaigns at HSN advertisement and tracking database (75H) and/or at HSNOP (75N) by means of HSN advertise wizard and management system; each of associated channel node involved in the accomplishment of the adrouting are governed via business logic to the each of associated channel nodes, subscribers and advertisers for fees and commission receipts or payments; HSNOP (75N) facilitating advertisement posting for various advertisers and eCommerce operations via multi vendor shopping cart for matched adviewers and further synchronizing the entry of each of products or services into the respective taxonomywise listing at HSNOP from advertise and tracking database thereof.

Each of the associated channel nodes for said advertisement are being determined via at least one correspondence relationship of each of CHN including:

1. CHNs posting, routing, hitting or linking the said advertise
2. CHNs referring the said prospective customers stored in the URL attached therewith the said advertise
3. CHNs offering sponsored services for the said advertise and
4. Prospective customers of the said advertise.

The said correspondence relationship is used to determine the payments and commissions for stipulated activities wherein HSN controller receiving the payments for each advertisement posting and later for commissions effected thereby in the further process of routing, linking and viewing of each of the said advertise campaign wherein the receipt of payments from and delivery of commissions to each of correspondingly related CHN is carried out by determinants thereof.

In an human alternative to ad sense generated via IN and OUT keyword tracking one or more Human Agents (HSNHA) and service Providers (HSNSP) registering with HSN controller for offering sponsored services (SP) (75K) forming the network thereof wherein the advertise management system attaching the related one or more advertisements with each of communication of each of sponsored service provider (SSP) (75K).

HSN controller determining CTR (Click Through Rate) wherein determining the no of impressions per hit signifying the conversion factor of impressions into actual hits by means of the business logic unit (75J)

Figure 76:
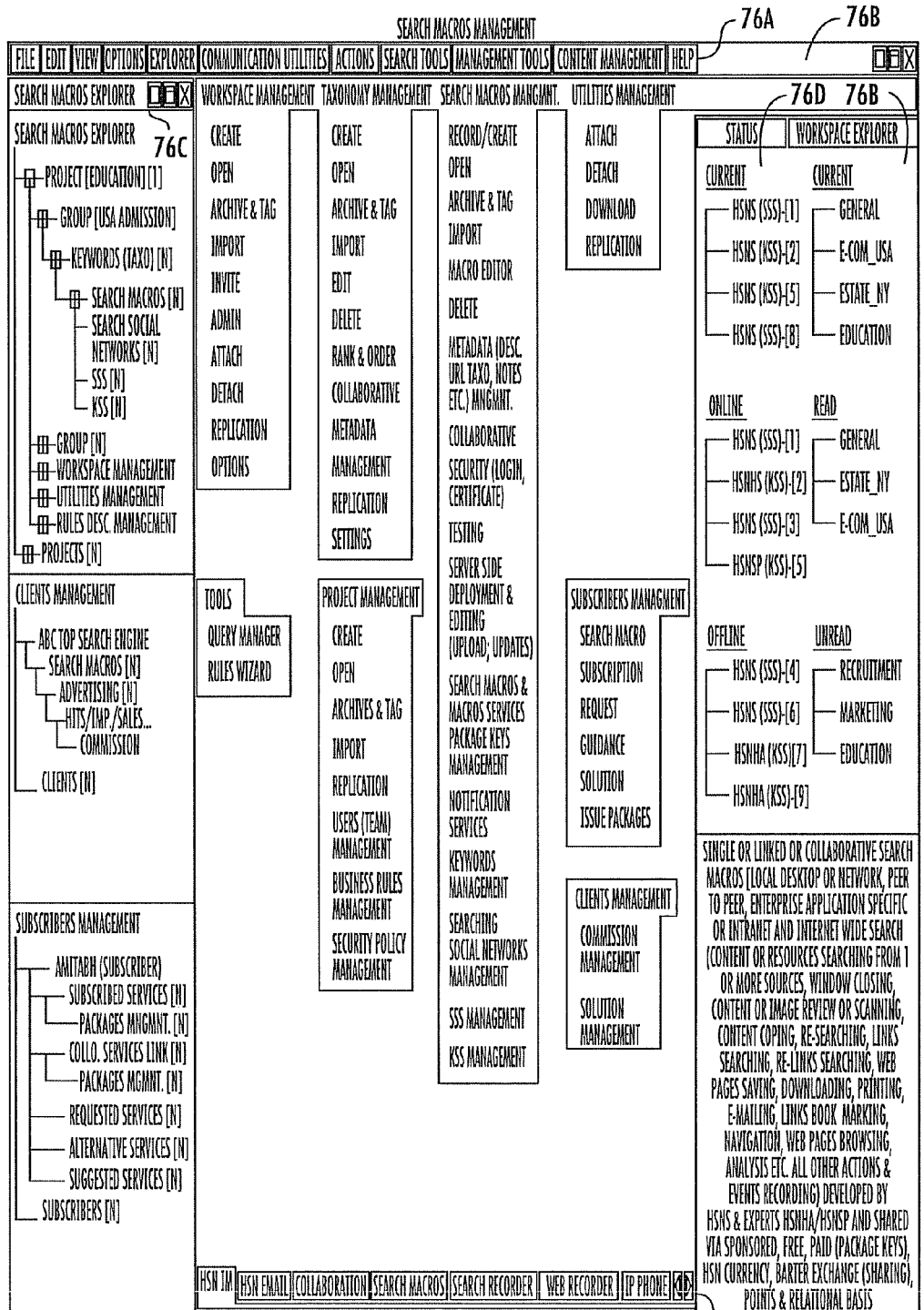
FIG. 76 illustrates a graphical user interface (GUI) for search macro management.

FIG. 76 showing the graphical user interface (GUI) for the search macro management, wherein provided with explorer (76C) for devising taxonomically organized projects and formulating plurality of subgroups therein the said project having one or more keywords to configure macros. The utilities section (76B) having various utilities for recording, testing and deployment of such configured macros. Further the utilities provide for project opening, editing, archiving and tagging, importing, inviting, replicating, ranking, collaborating, applying security features, notification, and SSS & KSS management. Each of human agents and serviced providers offering the subscription to such configured search macros by means of search macros package keys.

What is claimed is:

1. A method of sharing in one or more network(s), the method comprising:
    storing and managing each registered user's one or more profile(s), IN and OUT permission and relational connections or dynamic relationships in a non-transitory computer readable memory of a central server;
    mapping or requesting sharing of one or more selected contents by one or more requestor or sharing user(s) from one or more network(s) in a non-transitory computer readable memory of a central server;
    determining one or more target users by requestor(s) or sharing user(s) with the said request including share selected one or more contents from one or more network(s) with or via one or more selected communication channels or services, applications or modules, connections or relations from set of requestor(s) or sharing user(s) related subscribed communication channels or services, installed applications or modules and connected or related users;
    receiving, storing and processing one or more shared contents with metadata including determined target users of requestor(s) or sharing user(s) from one or more network(s) in a non-transitory computer readable memory of a central server;
    matching by the central server a target user with the requestor or sharing user, wherein the matching is conducted by the central server based on one or more selections, IN and OUT preferences, profiles and connections of requestor(s) or sharing user(s); and
    providing or synchronizing or updating said one or more shared contents of said requestor(s) or sharing user(s) from one or more network(s) to said determined one or more target users.

2. The method as claimed in claim 1, wherein said relational connections or dynamic relationships comprising one or more related or connected known, unknown like minded, referred, subscribed and matched users.

3. The method as claimed in claim 1, wherein said one or more network(s) comprising one or more personal networks, social networks, peer to peer networks, remote or external web sites or web pages, applications, web services, devices and sources.

4. The method as claimed in claim 1, wherein said target user comprises one or more channel nodes including one or more selected, connected or related users, one or more selected communication channels including one or more modules, applications, communication utilities, services, profile(s), resources or databases, devices of sharing user or of one or more selected, connected or related users of sharing user.

5. The method as claimed in claim 1, wherein said receiving sharing request or one or more shared contents from one or more sharing user(s) or requestor(s) from one or more network(s) via one or more AI agents, browser plug-ins, API and web service(s), 3$^{rd}$ parties applications, devices, networks and services.

6. The method as claimed in claim 1, wherein synchronizing or replicating or updating said one or more shared contents by sharing user or publisher of shared contents or central server to one or more connected users or subscribers of said updated shared contents based on one or more replication topology models and replication types including pull and push replication, snapshot, merge and transactional replication types.

7. The method as claimed in claim 1, wherein said merge replication track the modification of each shared contents and update the modified contents with the each related shared contents.

8. The method as claimed in claim 1, wherein one or more communication channel including journal, one or more personal or social networks, services, communication utilities including instant messenger, email, FTP and modules including explorer module, sharing module, workspace module, search macro, desktop search modules, synchronizing system, one or more installed applications, subscribed services, database(s).

9. The method as claimed in claim 1, wherein said shared contents comprising multimedia contents including text, image, video, URL and one or more file types.

10. The method as claimed in claim 1, wherein enabling sharing user to associate one or more metadata with said one or more shared contents including date and time, one or more categories, comments.

11. The method as claimed in claim 1, wherein allowing user(s) or one or more communication channels, modules or applications and services to further share or update or synchronize said one or more shared contents with one or more selected or connected or related or subscribed or matched users of existing network or one or more communication channels, modules or applications and services of user or of one or more selected or connected users of said user.

12. The method as claimed in claim 1, wherein monitoring and recording of each user's sharing related each actions and events with accessible metadata or fields or parameters and synchronizing related actions and events with accessible metadata or fields or parameters to related or connected and subscribed users.

13. The method as claimed in claim 12, wherein said each actions or events related accessible metadata or fields or parameters comprising date and time of action, source user of action, one or more categories of action, source of action, details of action, action URL, tracking status and status of action, action related attachments or lists including any types of multimedia contents, size of attachments, attached or associated utilities, workspace for sharing, downloading, viewing, collaborating, communicating and taking one or more further actions.

14. The method as claimed in claim 1, wherein the step of processing the one or more sharing request or shared contents by the central server comprises of indexing, analyzing and/or associating one or more metadata, said metadata including categories, taxonomies, keywords, rank, priority, system data and advertisements.

15. The method as claimed in claim 1, wherein the step of matching one or more target users with the requestor or sharing user by the central server further comprises selecting, auto matching, searching a database for one or more target users based on one or more user associated communication channels, services, modules, applications, connections, profile(s) and IN and OUT preferences, filters and/or matching the requestor's or sharing user's one or more selections, conditions and IN and OUT permission.

16. The method as claimed in claim 1, wherein the central server provides search to users for searching shared content based on one or more search criteria and book marking, re-sharing, sorting, assigning rank and provide comments and subscribing to sources of shared contents.

17. A system of sharing in one or more network(s), comprising:
a non-transitory computer readable memory of a central server;
one or more requestor(s) or sharing user adapted to map or request sharing of one or more selected contents from one or more network(s) at a central server, to determine one or more target users with the said request including share selected one or more contents from one or more network(s) with or via one or more selected communication channels or services, applications or modules, connections or relations from set of requestor(s) or sharing user(s) related subscribed communication channels or services, installed applications or modules and connected or related users;
wherein the central server is configured to receive, store and manage each registered user's one or more profile(s), IN and OUT permission and relational connections or dynamic relationships, to receive, store and processes one or more shared contents with metadata;
wherein the central server is further configured to match the target users with the requestor(s) or sharing user(s) from one or more network(s), and wherein the matching of the target users with the requestor(s) or sharing user(s) is based on one or more selections, IN and OUT preferences, profiles and connections of requestor(s) or sharing user(s), to provide or synchronize or update said one or more shared contents of said sharing user from one or more network(s) to said determined one or more target users; and
one or more target users adapted to receive one or more shared contents from sharing user(s).

18. The system as claimed in claim 17, wherein said relational connections or dynamic relationships comprising one or more related or connected known, unknown like minded, referred, subscribed and matched users.

19. The system as claimed in claim 17, wherein said one or more network(s) comprising one or more personal networks, social networks, peer to peer networks, remote or external web sites or web pages, applications, web services, devices and sources.

20. The system as claimed in claim 17, wherein said target user comprises one or more channel nodes including one or more selected, connected or related users, one or more selected communication channels including one or more modules, applications, communication utilities, services, profile(s), resources or databases, devices of sharing user or of one or more selected, connected or related users of sharing user.

21. The system as claimed in claim 17, wherein said sharing user or requestor is configured to share one or more contents from one or more network(s) via one or more AI agents, browser plug-ins, API and web service(s), $3^{rd}$ parties applications, devices, networks and services.

22. The system as claimed in claim 17, wherein enabling said sharing user or publisher of shared contents or central server to synchronize or replicate or update said one or more shared contents to one or more connected users or subscribers of said updated shared contents based on one or more replication topology models and replication types including pull and push replication, snapshot, merge and transactional replication types.

23. The system as claimed in claim 17, wherein said merge replication track the modification of each shared contents and update the modified contents with the each related shared contents.

24. The system as claimed in claim 17, wherein one or more communication channel including journal, one or more personal or social networks, services, communication utilities including instant messenger, email, FTP and modules including explorer module, sharing module, workspace module, search macro, desktop search modules, synchronizing system, one or more installed applications, subscribed services, database(s).

25. The system as claimed in claim 17, wherein said shared contents comprising multimedia contents including text, image, video, URL and one or more file types.

26. The system as claimed in claim 17, wherein enabling sharing user to associate one or more metadata with said one or more shared contents including date and time, one or more categories, comments.

27. The system as claimed in claim 17, wherein enabling user(s) or one or more communication channels, modules or applications and services to further share or update or synchronize said one or more shared contents with one or more selected or connected or related or subscribed or matched users of existing network or one or more communication channels, modules or applications and services of user or of one or more selected or connected users of said user.

28. The system as claimed in claim 17, wherein central server is configured to monitor and record each user's sharing related each actions and events with accessible metadata or fields or parameters and synchronize related actions and events with accessible metadata or fields or parameters to related or connected and subscribed users.

29. The system as claimed in claim 17, wherein said each actions or events related accessible metadata or fields or parameters comprising date and time of action, source user of action, one or more categories of action, source of action, details of action, action URL, tracking status and status of action, action related attachments or lists including any types of multimedia contents, size of attachments, attached or associated utilities, workspace for sharing, downloading, viewing, collaborating, communicating and taking one or more further actions.

30. The system as claimed in claim 17, wherein the central server is configured to process the one or more sharing request or shared contents, said processing comprising of indexing, analyzing and/or associating one or more metadata, said metadata including categories, taxonomies, keywords, rank, priority, system data and advertisements.

31. The system as claimed in claim 17, wherein the central server is further configured to determine one or target users by:
    select, auto match, search a database for one or more target users based on one or more user associated communication channels, services, modules, applications, connections, profile(s) and IN and OUT preferences, filters; and/or
    matching the requestor's or sharing user's one or more selections, conditions and IN and OUT permission.

32. The system as claimed in claim 17, wherein the central server is configured to provide search interface to users to search shared contents based on one or more search criteria and book mark, re-share, sort, assign rank and provide comments and subscribe to sources of shared contents.

33. A smart device for facilitating sharing, communication, and searching in a network, said network device configured to perform the method as claimed in claim 1.

* * * * *